US006487362B1

(12) United States Patent
Yuen et al.

(10) Patent No.: US 6,487,362 B1
(45) Date of Patent: Nov. 26, 2002

(54) ENHANCING OPERATIONS OF VIDEO TAPE CASSETTE PLAYERS

(75) Inventors: Henry C. Yuen, Redondo Beach, CA (US); Daniel S. Kwoh, Flintridge, CA (US); Roy J. Mankovitz, Encino, CA (US); Carl Hindman, Redondo Beach, CA (US); Hing Y. Ngai, Rancho Palos Verdes, CA (US)

(73) Assignee: Index Systems, Inc. (VG)

( * ) Notice: Subject to any disclaimer, the term of this patent is extended or adjusted under 35 U.S.C. 154(b) by 1193 days.

(21) Appl. No.: 08/777,799

(22) Filed: Dec. 31, 1996

Related U.S. Application Data

(63) Continuation of application No. 08/066,666, filed on May 27, 1993, now abandoned, which is a continuation-in-part of application No. 08/014,541, filed on Feb. 8, 1993, now abandoned, which is a continuation-in-part of application No. 08/001,125, filed on Jan. 5, 1993, now abandoned, which is a continuation-in-part of application No. 07/883,607, filed on May 7, 1992, now abandoned, which is a continuation-in-part of application No. 07/817,723, filed on Jan. 7, 1992, now abandoned, which is a continuation-in-part of application No. 07/805,844, filed on Dec. 5, 1991, now abandoned, which is a continuation-in-part of application No. 07/747,127, filed on Aug. 19, 1991, now abandoned.

(51) Int. Cl.[7] .................................................. H04N 5/91

(52) U.S. Cl. .............................. 386/83; 386/95; 386/77; 386/78

(58) Field of Search .............................. 386/83, 52, 55, 386/95, 57, 98, 64, 65, 77, 78; 348/468, 563; 360/69

(56) References Cited

U.S. PATENT DOCUMENTS 2,548,011 A  4/1951  Frost ............................. 35/35
3,601,544 A  8/1971  Murphy ........................ 375/17
4,125,844 A  11/1978  Bretschneider et al. ..... 346/74.1
4,173,026 A  10/1979  Deming
4,180,837 A  12/1979  Michaud (List continued on next page.)

FOREIGN PATENT DOCUMENTS

| DE | 3621263 | 1/1988 |
| DE | 3735539 | 5/1988 |
| DE | 3812747 | 10/1989 |
| DE | 3932696 | 4/1990 |
| EP | 0192445 | 8/1986 |
| EP | 0257534 | 3/1988 |

(List continued on next page.)

OTHER PUBLICATIONS

Article entitled "Das Video–Archiv ist eingebaut", Funkschau Oct. 1991 (and translation).
Japanese Patent Abstract, Publication No. JP 52006406, Publication Date Jan. 18, 1977.
Japanese Patent Abstract, Publication No. JP 58196670, Publication Date Nov. 16, 1983.
Japanese Patent Abstract, Publication No. JP 60142079, Publication Date Jul. 27, 1985.
Japanese Patent Abstract, Publication No. JP 60253079, Publication Date Dec. 13, 1985.

(List continued on next page.)

*Primary Examiner*—Vincent Boccio
(74) *Attorney, Agent, or Firm*—Christie, Parker & Hale, LLP

(57) ABSTRACT

Operation of a video cassette player is facilitated by providing a VBI decoder which decodes information, such as title, channel, date, time and length of broadcast programs and utilizing the information in providing directory of the programs as well as control of the VCR. The video cassette player is also provided with a VBI encoder for inserting control as well as directory information into the tape, either in the VBI portions of the video track or in the control track.

21 Claims, 167 Drawing Sheets

U.S. PATENT DOCUMENTS

| | | | |
|---|---|---|---|
| 4,210,785 A | 7/1980 | Huber et al. | 179/100.1 |
| 4,224,644 A | 9/1980 | Lewis et al. | 360/72.2 |
| 4,225,780 A | 9/1980 | Jacoub | |
| 4,338,644 A | 7/1982 | Staar | 360/132 |
| 4,357,638 A | 11/1982 | Yoshimaru et al. | 360/72.2 |
| 4,363,039 A | 12/1982 | Nishimura et al. | 360/19.1 |
| 4,390,901 A | 6/1983 | Keiser | 358/147 |
| 4,426,684 A | 1/1984 | Sechet et al. | 360/13 X |
| 4,516,164 A | 5/1985 | Moxon | 360/53 |
| 4,517,598 A | 5/1985 | Van Valkenburg | 358/142 |
| 4,554,599 A | 11/1985 | Shiozaki | 360/69 |
| 4,562,468 A | 12/1985 | Koga | 358/136 |
| 4,573,084 A | 2/1986 | Iida | 358/300 |
| 4,577,239 A | 3/1986 | Sougen | 360/15 |
| 4,587,577 A | 5/1986 | Tsunoda | 360/72.2 |
| 4,591,931 A | 5/1986 | Baumeister | 360/72.1 |
| 4,635,121 A * | 1/1987 | Hoffman et al. | 348/731 |
| 4,641,205 A | 2/1987 | Beyers, Jr. | 360/33.1 |
| 4,641,208 A | 2/1987 | Inazawa et al. | 360/72.2 |
| 4,703,465 A | 10/1987 | Parker | 369/30 |
| 4,706,121 A * | 11/1987 | Young | 348/27 |
| 4,723,181 A | 2/1988 | Hickok | 360/72.2 |
| 4,734,767 A | 3/1988 | Kaneko et al. | 358/133 |
| 4,755,888 A | 7/1988 | Hori et al. | 360/16 |
| 4,803,551 A | 2/1989 | Park | 348/468 |
| 4,814,924 A | 3/1989 | Ozeki | 360/133 |
| 4,841,386 A | 6/1989 | Schiering | 360/69 |
| 4,857,999 A | 8/1989 | Welsh | 358/84 |
| 4,866,434 A | 9/1989 | Keenan | 340/825.72 |
| 4,866,542 A | 9/1989 | Shimada et al. | 360/103 |
| 4,873,584 A | 10/1989 | Hashimoto | 358/335 |
| 4,880,963 A | 11/1989 | Yamashita | |
| 4,885,632 A * | 12/1989 | Mabey et al. | 358/84 |
| 4,890,171 A | 12/1989 | Nagao | 360/73.05 |
| 4,894,713 A | 1/1990 | Delogne et al. | 358/133 |
| 4,894,789 A | 1/1990 | Yee | 348/552 |
| 4,908,707 A | 3/1990 | Kinghorn | 348/460 |
| 4,908,713 A | 3/1990 | Levine | 358/335 |
| 4,908,859 A | 3/1990 | Bennett et al. | 380/10 |
| 4,922,341 A | 5/1990 | Strobach | 358/136 |
| 4,937,844 A | 6/1990 | Kao | 375/122 |
| 4,951,276 A | 8/1990 | Sakaegi et al. | 360/72.1 |
| 4,954,892 A | 9/1990 | Asai et al. | 358/133 |
| 4,965,827 A | 10/1990 | McDonald | 380/25 |
| 4,972,260 A | 11/1990 | Fujikawa et al. | 358/136 |
| 4,977,455 A | 12/1990 | Young | 348/460 |
| 4,982,074 A | 1/1991 | Ogasawara | 235/454 |
| 4,989,104 A | 1/1991 | Schülein et al. | 360/72.1 |
| 4,993,003 A | 2/1991 | Fechner et al. | 368/47 |
| 5,001,561 A | 3/1991 | Haskell et al. | 358/133 |
| 5,010,499 A | 4/1991 | Yee | 348/552 |
| 5,038,211 A * | 8/1991 | Hallenbeck | 348/460 |
| 5,038,231 A | 8/1991 | Harigaya et al. | 360/69 |
| 5,047,867 A * | 9/1991 | Strubbe et al. | 358/335 |
| 5,063,610 A | 11/1991 | Alwadish | 455/45 |
| 5,081,578 A | 1/1992 | Inazawa et al. | 360/72.2 |
| 5,119,507 A | 6/1992 | Mankovitz | 455/154.1 |
| 5,121,476 A | 6/1992 | Yee | 395/154 |
| 5,144,423 A | 9/1992 | Knauer et al. | 358/133 |
| 5,148,403 A | 9/1992 | Gardner | 360/15 |
| 5,161,019 A | 11/1992 | Emanuel | 358/183 |
| 5,164,831 A | 11/1992 | Kuchta et al. | 358/209 |
| 5,164,963 A | 11/1992 | Lawrence et al. | 375/39 |
| 5,172,363 A | 12/1992 | Greenspun | 369/85 |
| 5,179,479 A | 1/1993 | Ahn | 360/72.1 |
| 5,200,823 A | 4/1993 | Yoneda et al. | 358/146 |
| 5,206,937 A | 4/1993 | Goto | 395/325 |
| 5,228,014 A | 7/1993 | d'Alayer de Costemore d'Arc | 369/32 |
| 5,253,066 A * | 10/1993 | Vogel | 348/906 X |
| 5,285,276 A | 2/1994 | Citta | 368/409 |
| 5,293,357 A * | 3/1994 | Hallenbeck | 358/335 |
| 5,307,173 A * | 4/1994 | Yuen et al. | 358/335 |
| 5,353,121 A | 10/1994 | Young et al. | 348/563 |

FOREIGN PATENT DOCUMENTS

| | | | |
|---|---|---|---|
| EP | 0362561 | 4/1990 | |
| EP | 0363653 | 4/1990 | |
| EP | 90322429 | 10/1990 | |
| EP | 0413288 | 2/1991 | |
| EP | 0424653 | 5/1991 | |
| EP | 0424656 | 5/1991 | |
| EP | 0439282 | 7/1991 | |
| EP | 0485740 | 5/1992 | |
| EP | 0503519 | 9/1992 | |
| EP | 0526727 | 2/1993 | |
| EP | 0571774 | 12/1993 | |
| FR | 2461299 | 1/1981 | |
| JP | 5381106 | 7/1978 | 360/2 |
| JP | 55146667 | 11/1980 | 360/132 |
| JP | 5841472 | 3/1983 | 360/132 |
| JP | 94287 | 6/1983 | |
| JP | 6098542 | 6/1985 | |
| JP | 60251543 | 12/1985 | |
| JP | 61011985 | 1/1986 | |
| JP | 62157391 | 7/1987 | |
| JP | 6273479 | 9/1987 | |
| JP | 63031083 | 2/1988 | |
| JP | 112887 | 5/1988 | |
| JP | 63164084 | 7/1988 | |
| JP | 2083879 | 3/1990 | |
| JP | 2232879 | 9/1990 | |
| JP | 3016076 | 1/1991 | |
| JP | 3125380 | 5/1991 | 360/72.1 |
| JP | 3125382 | 5/1991 | |
| JP | 636532 | 2/1994 | |
| JP | 6309848 | 11/1994 | |
| JP | 46551 | 2/1995 | |
| JP | 73479 | 3/2000 | |
| JP | 96958 | 4/2000 | |
| JP | 158984 | 6/2000 | |
| JP | 158985 | 6/2000 | |
| JP | 158986 | 6/2000 | |
| JP | 171685 | 6/2000 | |
| JP | 174091 | 6/2000 | |
| JP | 223877 | 8/2000 | |
| JP | 241082 | 9/2000 | |
| WO | WO8910615 | 11/1989 | |
| WO | WO9000847 | 1/1990 | |
| WO | WO9015507 | 12/1990 | |
| WO | WO9304473 | 3/1993 | |

OTHER PUBLICATIONS

Japanese Patent Abstract, Publication No. JP 60253979, Publication Date Dec. 14, 1985.

Japanese Patent Abstract, Publication No. JP 1208753, Publication Date Aug. 22, 1989.

Japanese Patent Abstract, Publication No. JP 1208753, Publication Date Nov. 16, 1989.

Japanese Patent Abstract, Publication No. JP 2021480, Publication Date Mar. 30, 1990.

Operating Instructions, Sony Video Cassette Recorder 1990, SN SLV-373UC.

Hildenbrandt et al., "Transparent Support Structure,"IBM Technical Disclosure Bulletin, vol. 13, No. 18, p. 2138, Jan. 1971.

German Publication (English Translation) *Funkschau*, Home Videorecorder "The Video Archiving System is built-in, " Grundig, Oct. 1991, pp. 54–56.

* cited by examiner

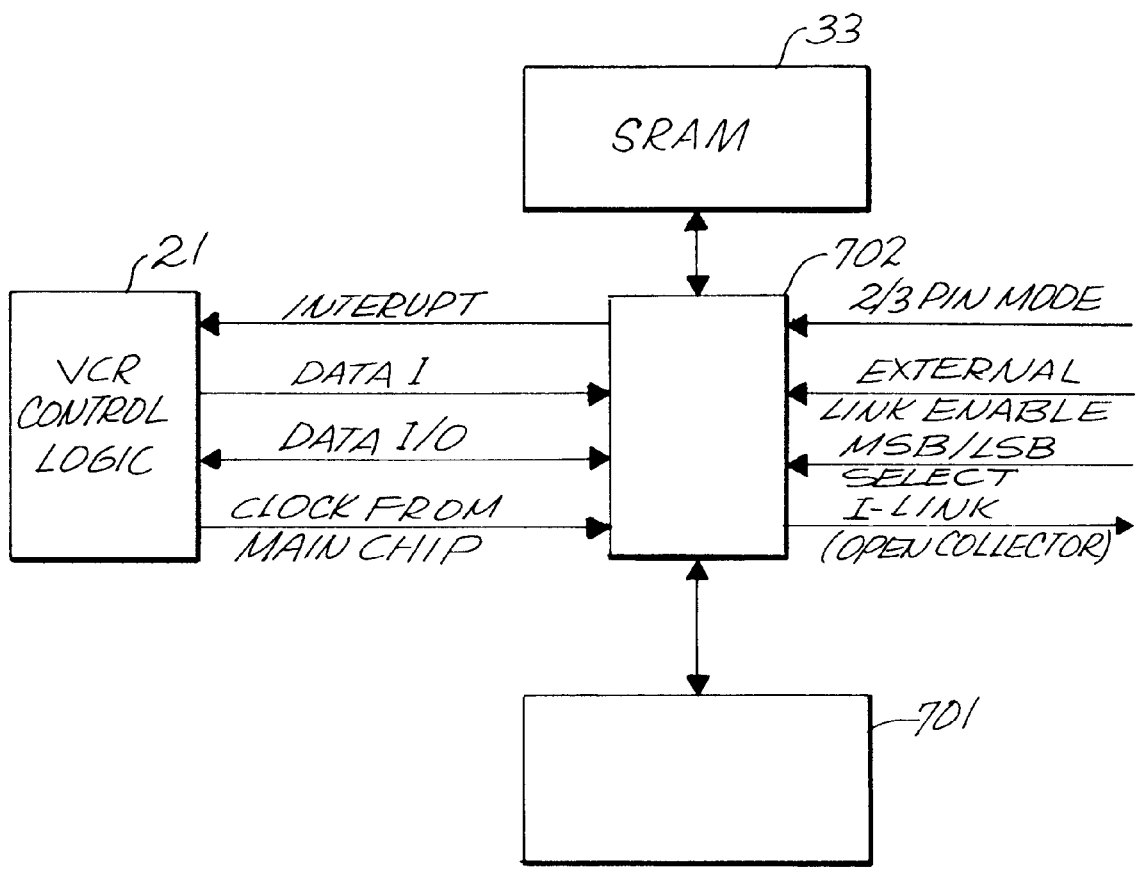

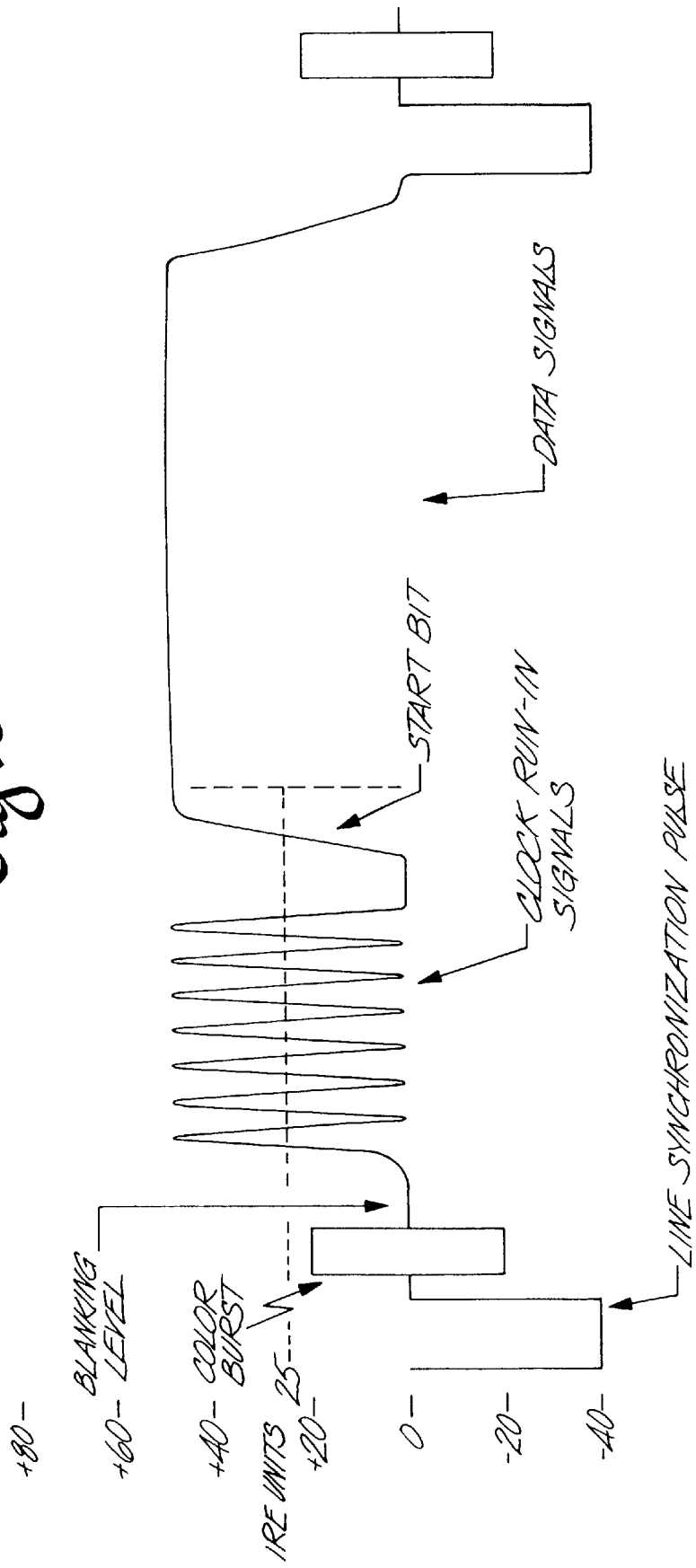

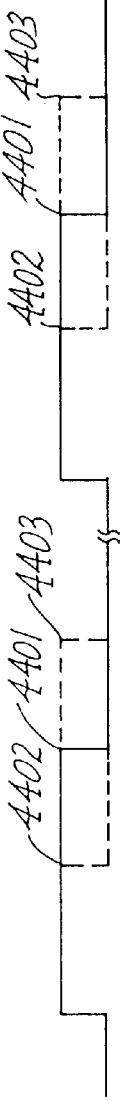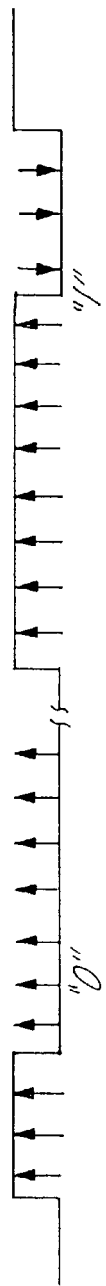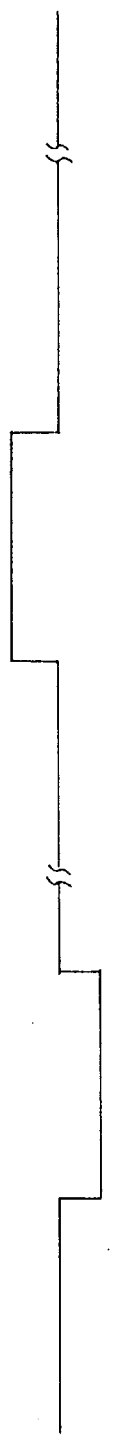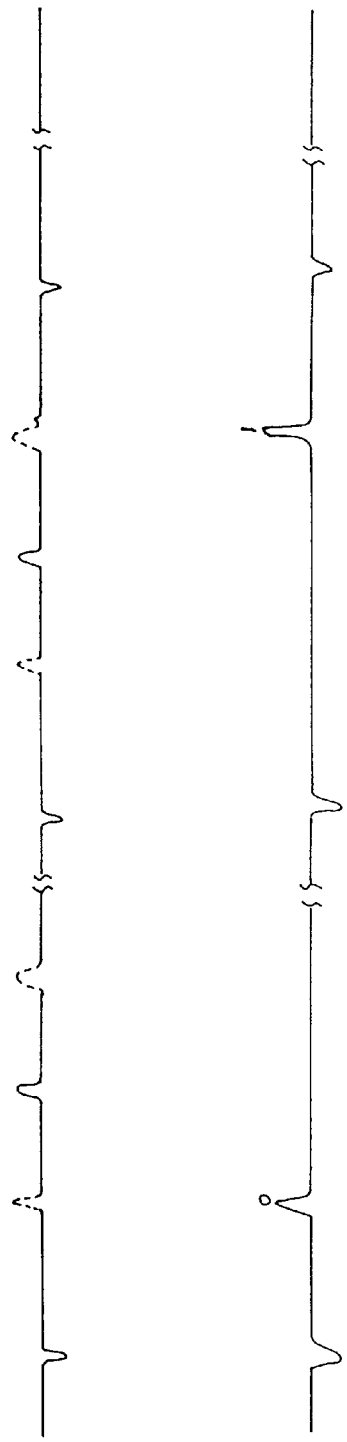
Fig. 10a
Fig. 10b
Fig. 10c
Fig. 10d
Fig. 10e

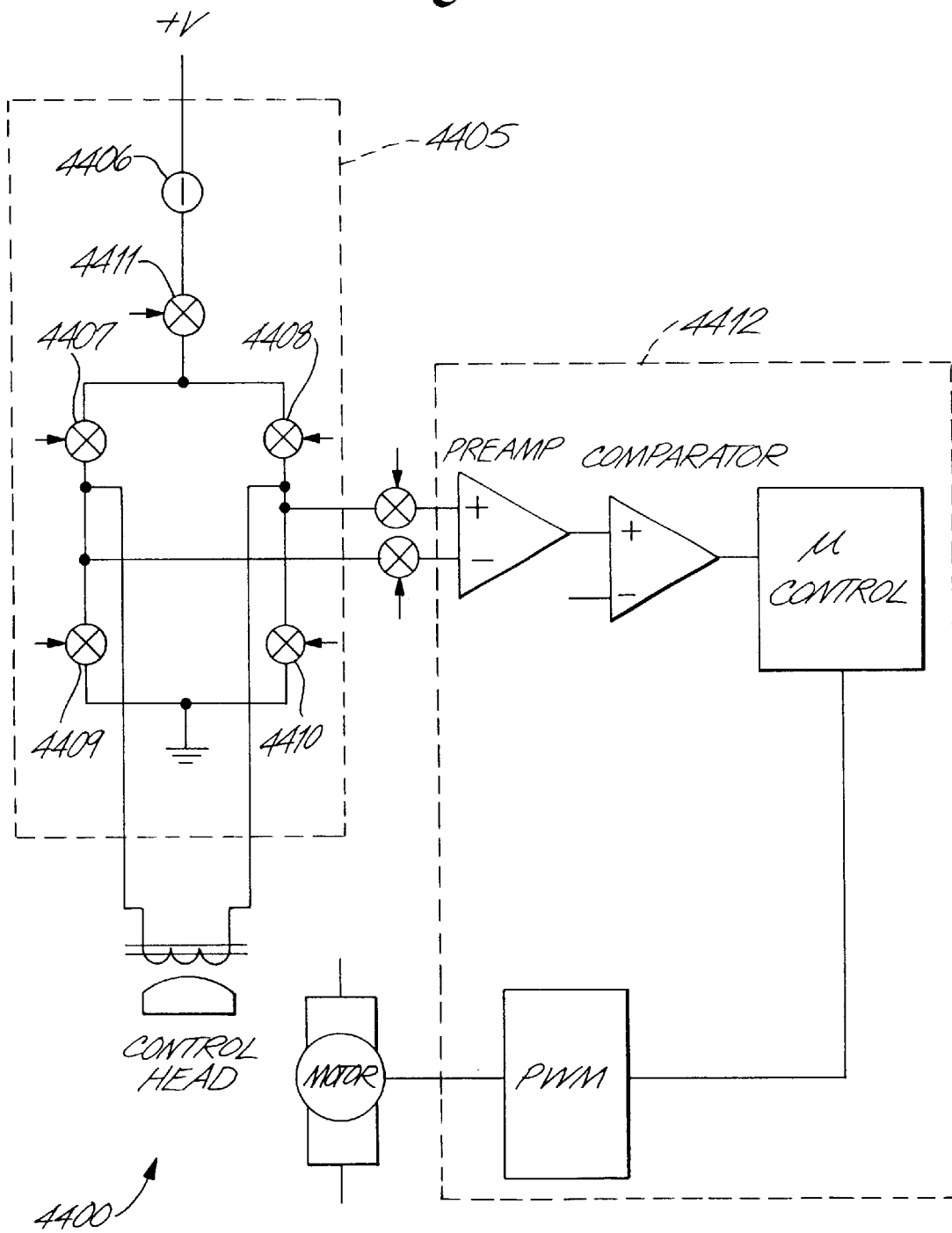

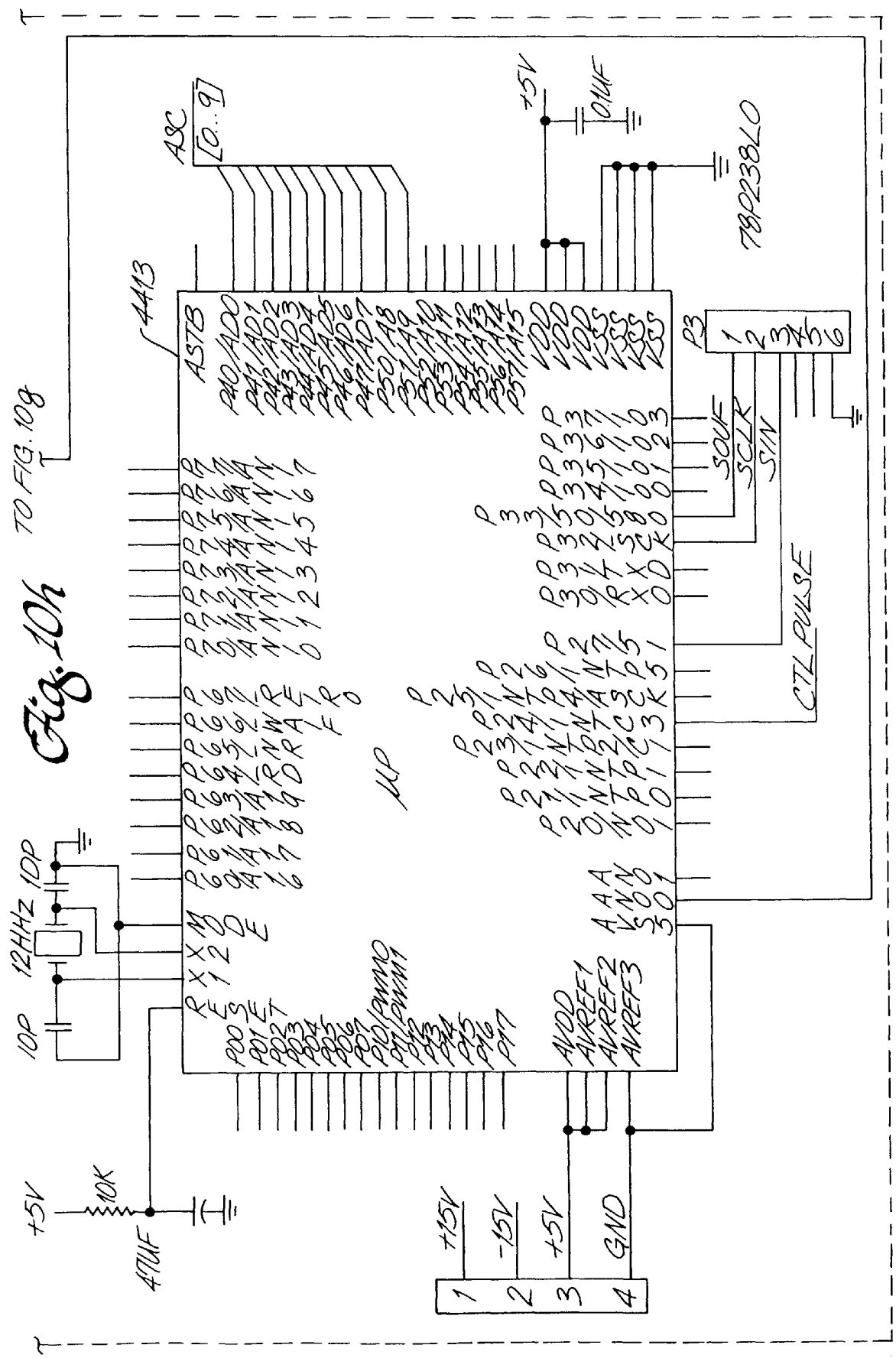

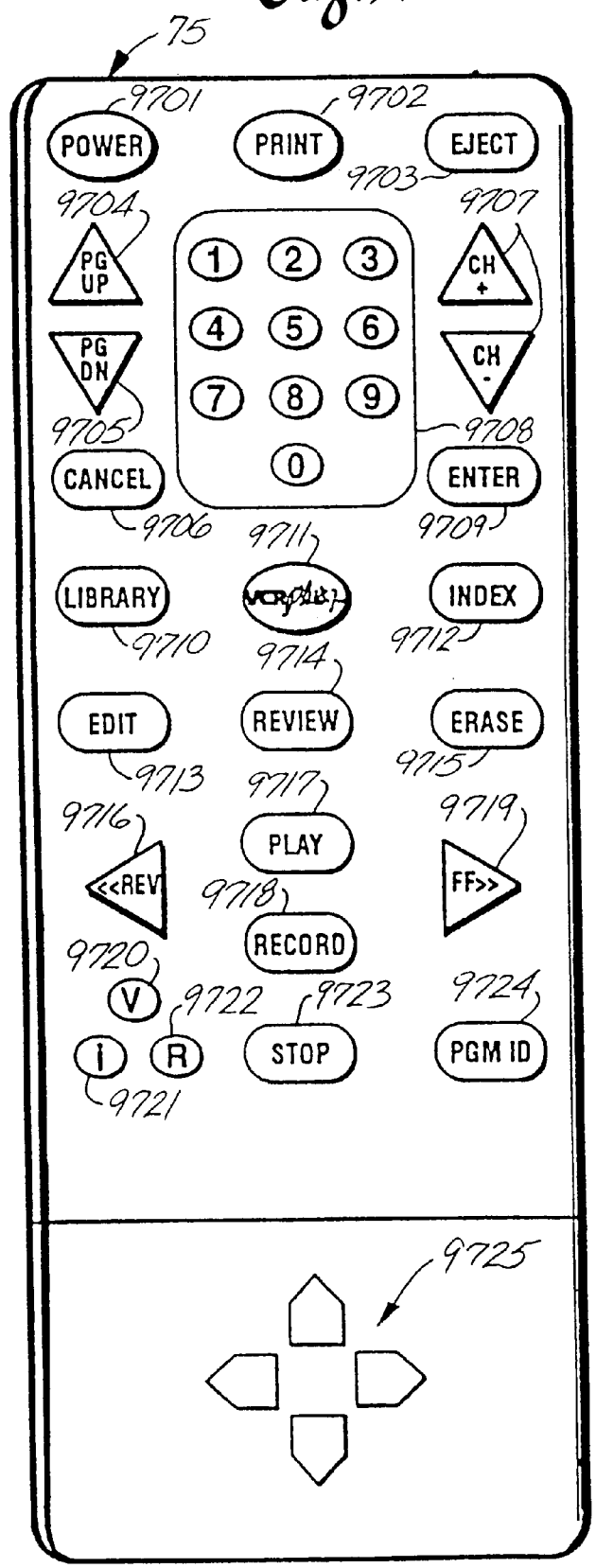

Fig. 13

HR TAPES:

CT   ADD TID ADD TID ADD TID ADD TID ADD TID ADD TID ADD TID
     START OF PROG.1   START OF PROG.2   START OF PROG.3   END

VBI

SRAM   DIRECTORY

PR TAPES:

CT   ADD TID ADD TID ADD TID ADD TID ADD TID ADD TID ADD TID
     START OF PROG.1   START OF PROG.2   START OF PROG.3   END

VBI   DIR DIR DIR DIR DIR DIR DIR DIR DIR DIR DIR DIR DIR DIR DIR

SRAM

RI TAPES:

CT   ADD TID         ADD TID ADD TID ADD TID         ADD TID
     START OF PROG.1   START OF PROG.2   START OF PROG.3   END

VBI

SRAM   DIRECTORY

Fig. 14

HR TAPES:

VBI | ADD TID ADD TID ADD TID ADD TID ADD TID ADD TID
CT | MARK ^ START OF PROG. 1 | MARK ^ START OF PROG. 2 | MARK ^ START OF PROG. 3 | MARK ^ START OF PROG. 4
SRAM | DIRECTORY

PR TAPES:

VBI | ADD DIR TID ADD DIR TID ADD DIR TID ADD TID ADD TID
CT | MARK ^ START OF PROG. 1 | MARK ^ START OF PROG. 2 | MARK ^ START OF PROG. 3 | MARK ^ END
SRAM |

RI TAPES:

VBI | ADD TID ADD TID ADD TID
CT | START OF PROG. 1 | START OF PROG. 2 | START OF PROG. 3 | ^ END
SRAM | DIRECTORY

Fig. 15

HR TAPES:

VBI  ADD TID ADD TID ADD TID ADD TID ADD TID ADD TID ADD TID

CT

SRAM   DIRECTORY

PR TAPES:

VBI  ADD DIR TID ADD DIR TID ADD DIR TID ADD DIR TID ADD TID

CT

SRAM

RI TAPES:

VBI

CT   ADD TID        ADD TID        ADD TID        ADD TID
     ▲              ▲              ▲              ▲
     START OF PROG.1  START OF PROG.2  START OF PROG.3  END

SRAM   DIRECTORY

Fig. 22 DIRECTORY FORMAT

| START CODE (9101) | TYPE CODE (9102) | NUMBER OF TITLES (9103) | 1ST PROGRAM ENTRY (9104) | 2ND PROGRAM ENTRY (9105) | ... | NTH PROGRAM ENTRY (9106) | END CODE (9107) | CHECKSUM (9108) |
|---|---|---|---|---|---|---|---|---|
| 1 | 1 | 2 | 37 | 37 | | 37 | 1 | 1 |

NUMBER OF BYTES

Fig. 23 ABSOLUTE ADDRESS PACKET (9110)

| START CODE (9111) | TYPE CODE (9112) | ABSOLUTE ADDRESS (9113) | END CODE (9114) | CHECKSUM (9115) |
|---|---|---|---|---|
| 1 | 1 | 4 | 1 | 1 |

NUMBER OF BYTES

Fig. 24 TID (9120)

| START CODE (9121) | TYPE CODE (9122) | TAPE ID (9123) | END CODE (9124) | CHECKSUM (9125) |
|---|---|---|---|---|
| 1 | 1 | 8 | 1 | 1 |

NUMBER OF BYTES

Fig. 25

D(N) PACKET ON THE VBI / 2601

| START CODE | TYPE | N | START ADDRESS | STOP ADDRESS | RECORD SPEED | PC | PC EXTENSION | VERSION | LANGUAGE | TITLE TEXT | EXPAND | STOP CODE | CHECKSUM |
|---|---|---|---|---|---|---|---|---|---|---|---|---|---|
| 1 | 1 | 2 | 3 | 3 | 1 | 1 | 1 | 1 | 1 | m | n | 1 | 2 |

NUMBER OF BYTES

Fig. 26

D(0) PACKET FOR TAPE TITLE / 2602

| START CODE | TYPE | N | LENGTH | RESERVE | REEL DIAMETER | RESERVED | VERSION | LANGUAGE | TITLE TEXT | EXPAND | STOP CODE | CHECKSUM |
|---|---|---|---|---|---|---|---|---|---|---|---|---|
| 1 | 1 | 2 | 3 | 3 | 2 | 1 | 1 | 1 | m | n | 1 | 2 |

NUMBER OF BYTES

Fig. 27

TP PACKET ON VBI 2603

| START CODE | TYPE | TID | RESERVED | N | STOP CODE | CHECKSUM |
|---|---|---|---|---|---|---|
| 1 | 1 | 10 | 1 | 3 | 1 | 1 |

NUMBER OF BYTES

HR TAPE

| 0 | 0 | 0 | MACHINE ID | TAPE NUMBER |
|---|---|---|---|---|

BIT 39 38 37 31 30 15 0

PR TAPE

| 1 | UPC |
|---|---|

39 38 0

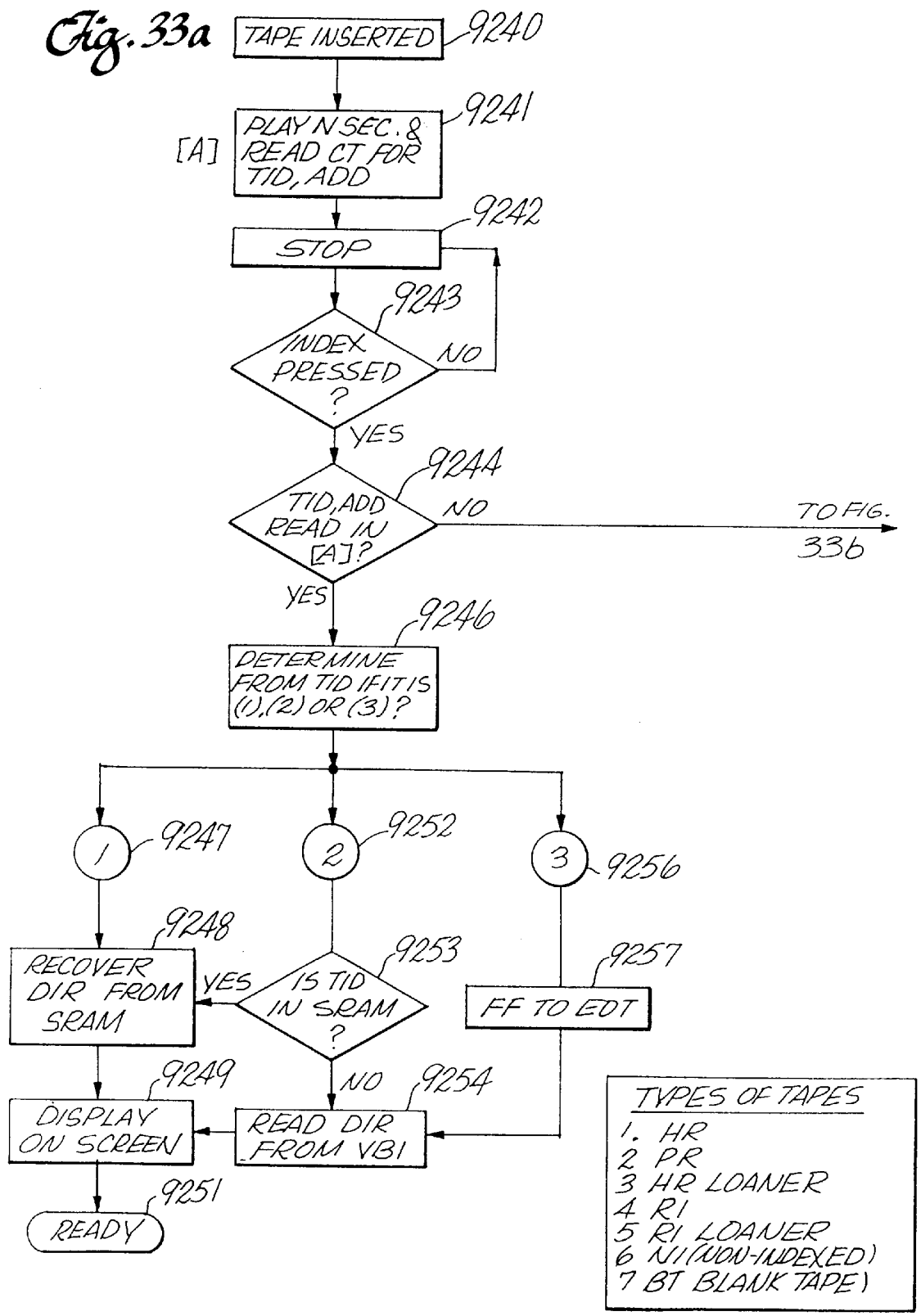

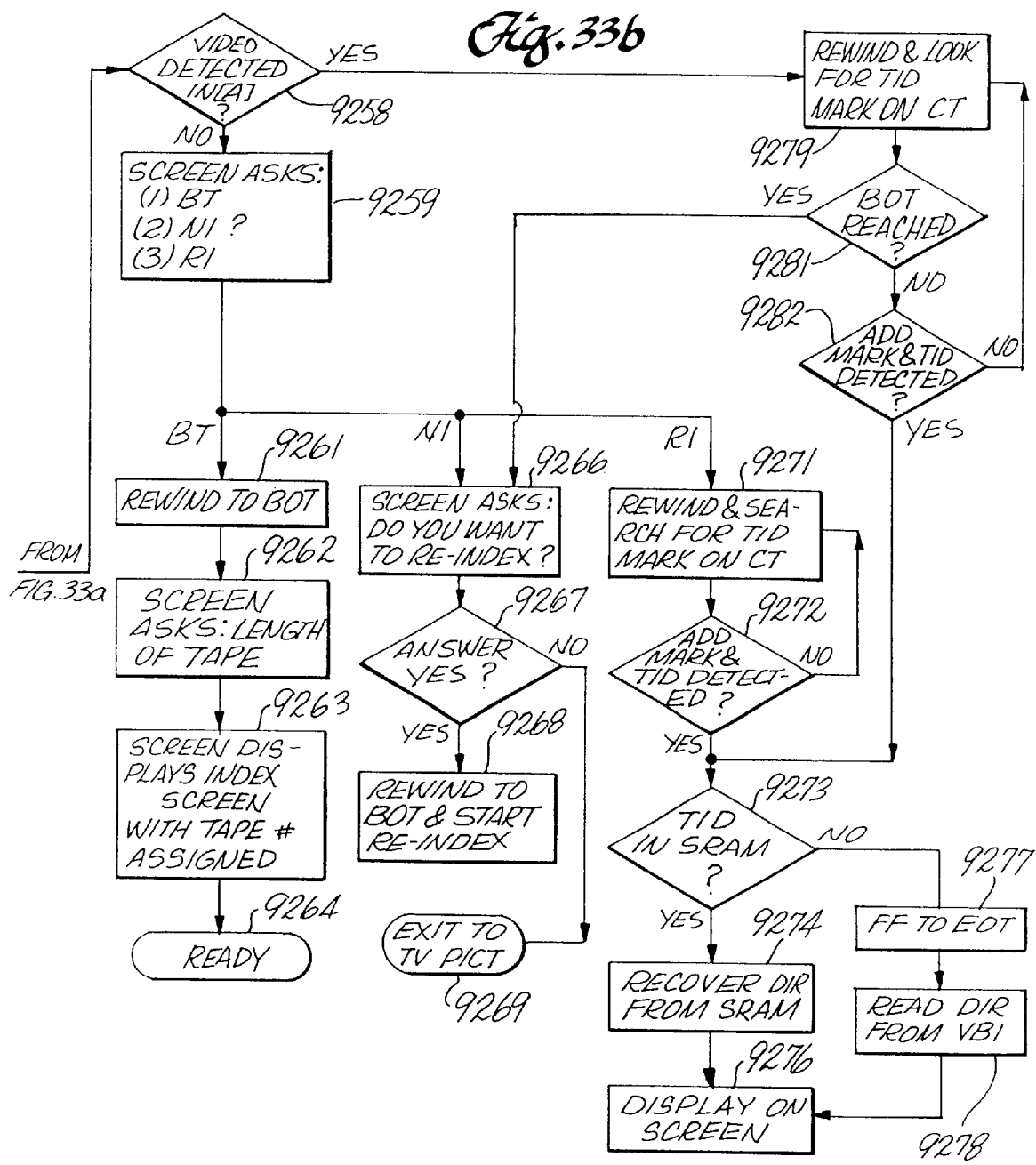

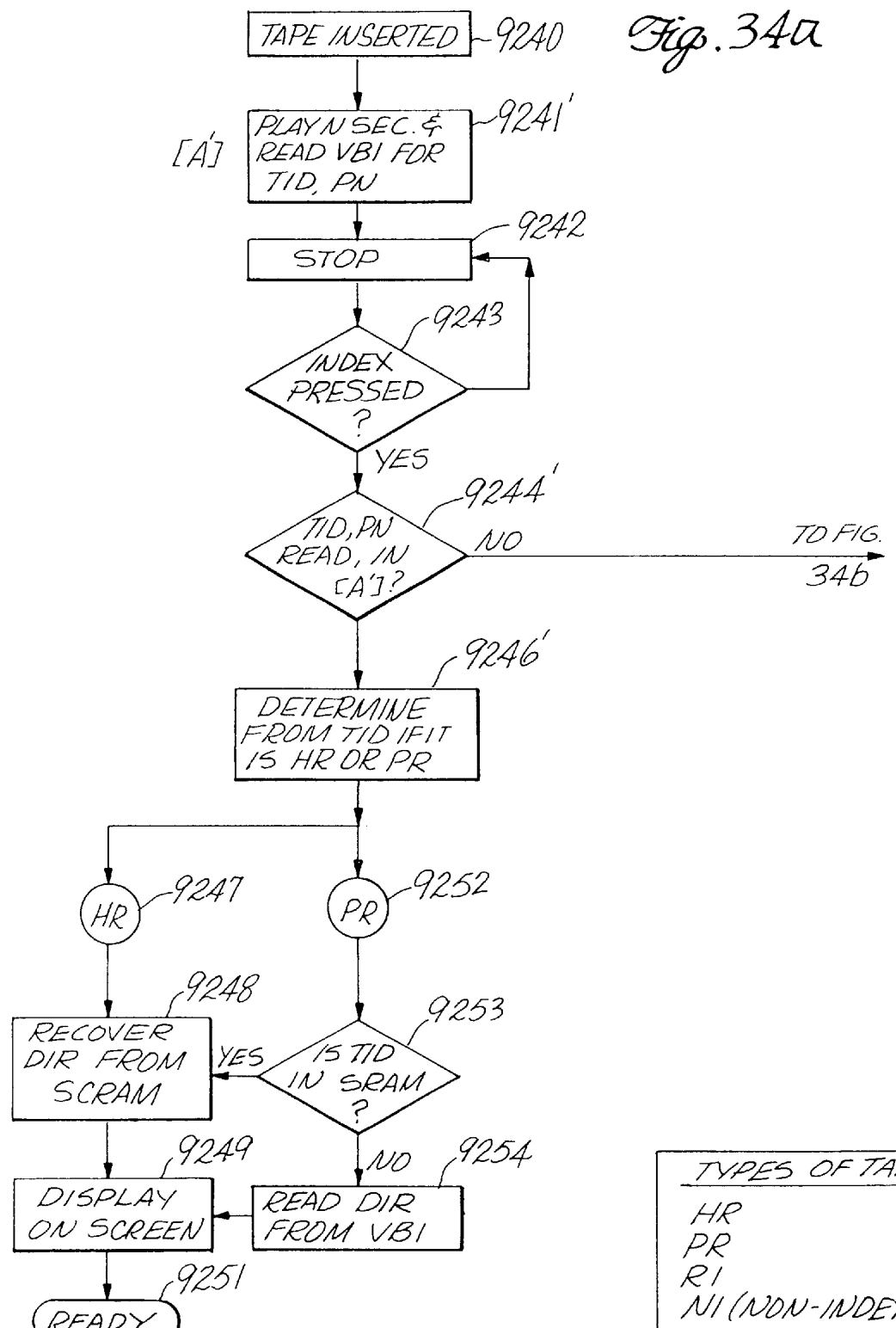

*Fig.* 44

```
                    STORED
    PR1 B:   VCR PLUS™ PROGRAMMER COUPON
    PR1 D:   LOSE WEIGHT FAST BY THIN JIM
                   TEMPORARY
    PR1 E:   FRUGAL GOURMET RECIPE
 →  PR1 F:   WINNING LOTTERY NUMBERS
    PR1 G:   GM REBATES FOR CADILLAC
    PR1 H:   ABC MOVIE OF THE WEEK
```

Fig. 48

| PROG. NUMBER | LENGTH |
|---|---|
| PROGRAM 1 | 10 |
| PROGRAM 2 | 12 |
| HBO MOVIE PROGRAM GUIDE 5/15/93 | 35 |
| PROGRAM 4 | 20 |

Fig. 49

| PROG. NUMBER | LENGTH |
|---|---|
| PROGRAM 1 | 10 |
| PROGRAM 2 | 12 |
| HBO MOVIE GUIDE 5/15/93 (VM) | 35 |
|     7:30 FANTASIA (120 MIN) | |
|     9:30 TERMINATOR II (135 MIN) | |
|     11:45 BATMAN (115) | |
| PROGRAM 4 | 20 |

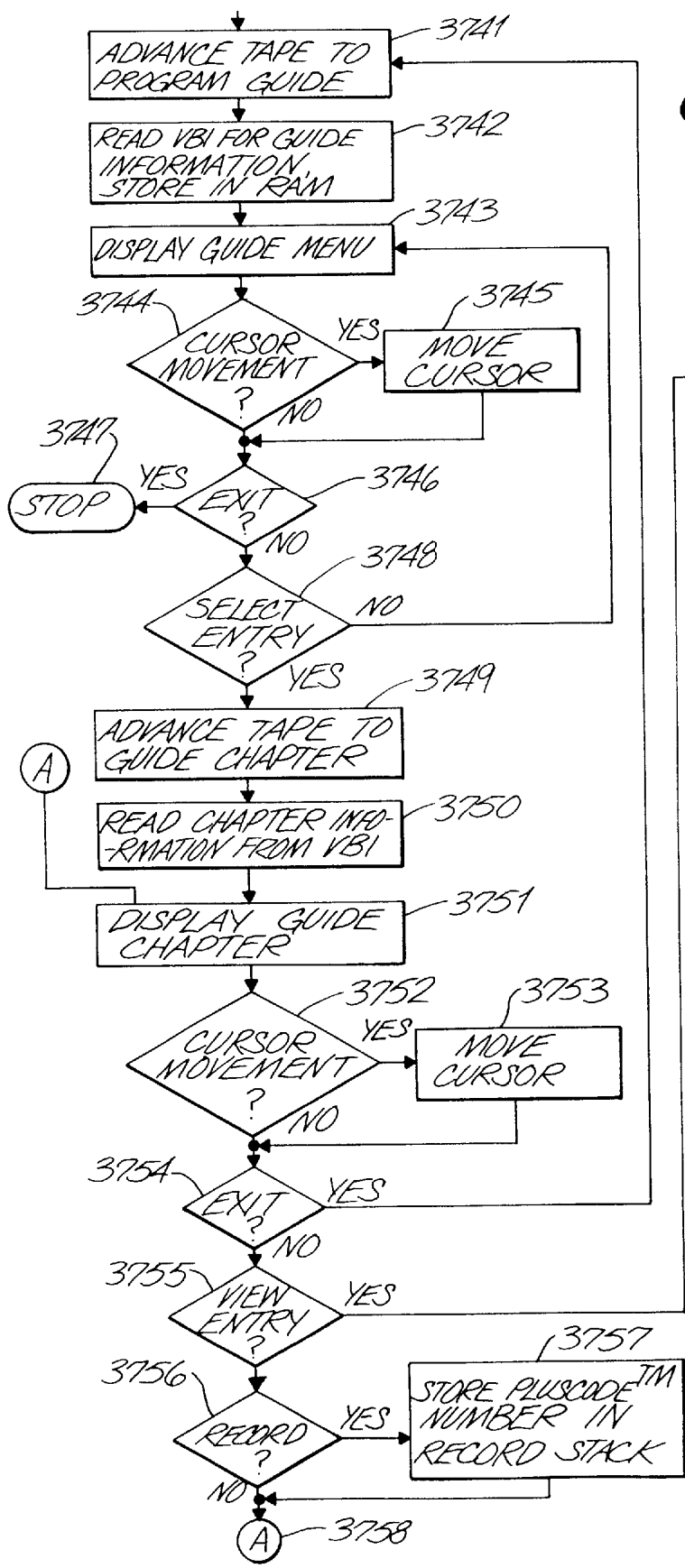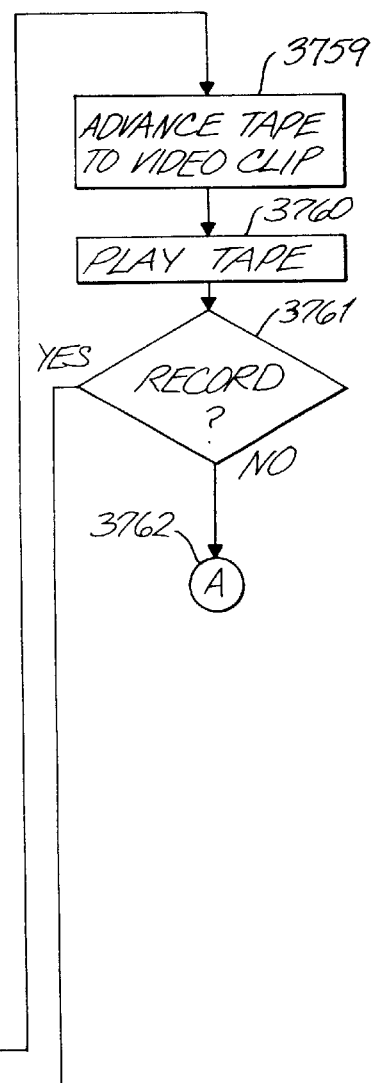
Fig. 51

Fig. 54

| POINTER DATA | | | | | | | | |
|---|---|---|---|---|---|---|---|---|
| START CODE | TYPE | ADDITIONAL ID | POINTER DES-CRIPTION (1) | POINTER (1) | ... | POINTER DESCRIP-TION (M) | POINTER (M) | STOP CODE | CHECKSUM |
| 1 | 1 | 2 | 1 | 1 | | 1 | 1 | 1 | 2 |

NUMBER OF BYTES

CUPG/PRI DATE PACKET 2606

| START CODE | TYPE | USAGE | INFORMATION | STOP CODE | CHECKSUM |
|---|---|---|---|---|---|
| 1 | 1 | 2 | 2-128 | 1 | 2 |

NUMBER OF BYTES

| START CODE | TYPE | PID | STOP CODE | CHECKSUM |
|---|---|---|---|---|
| 1 | 1 | 1 | 1 | 2 |

NUMBER OF BYTES

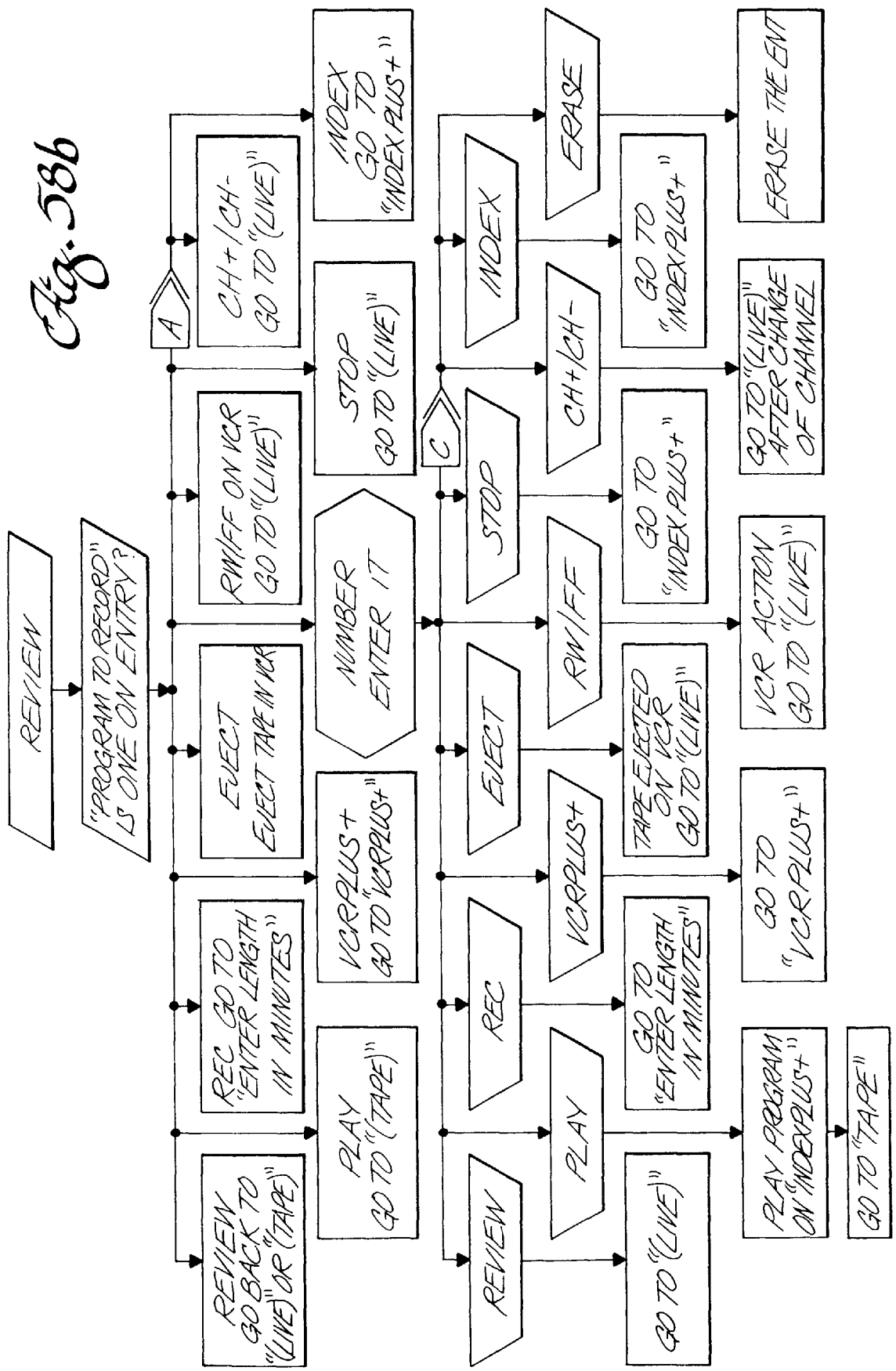

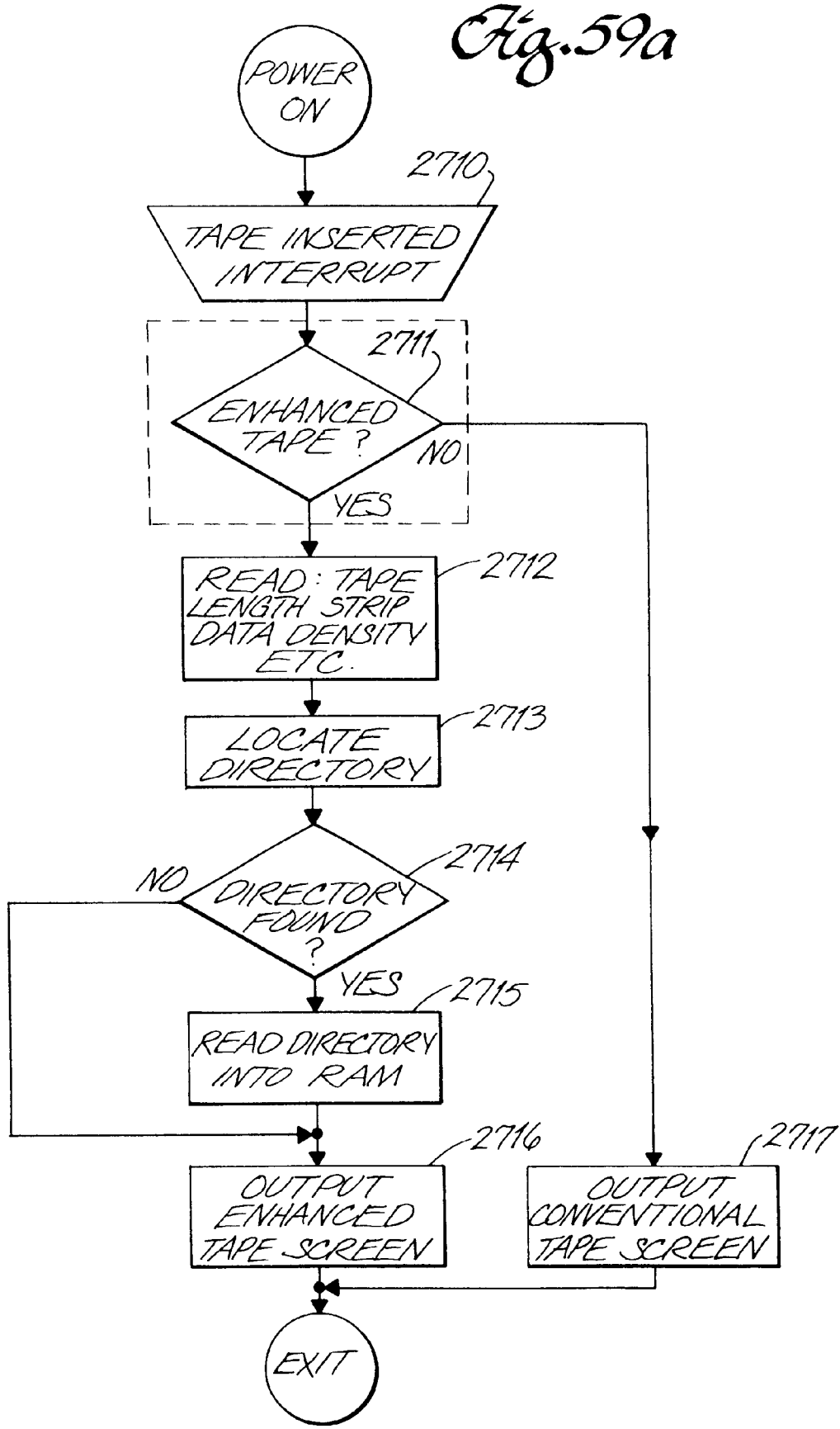

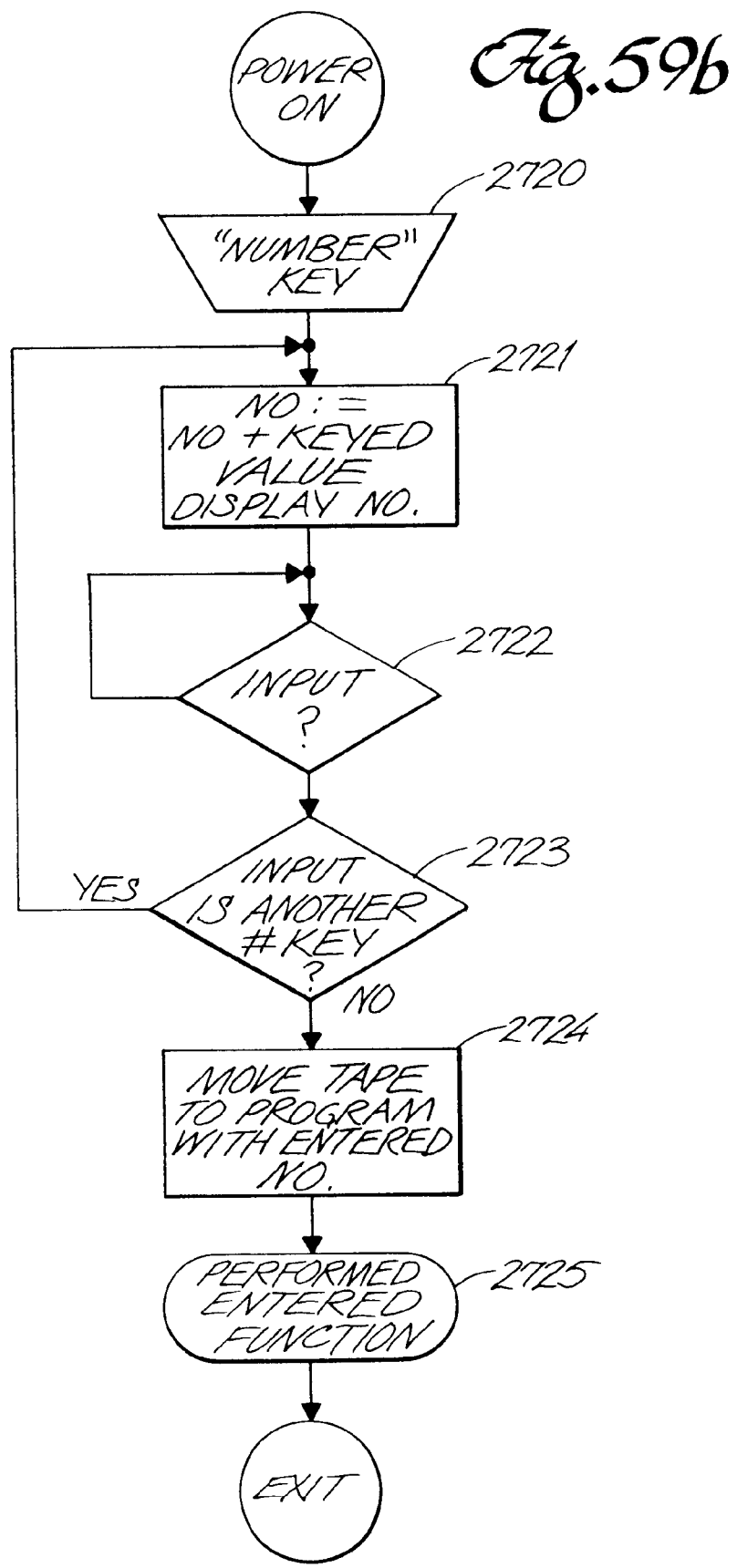

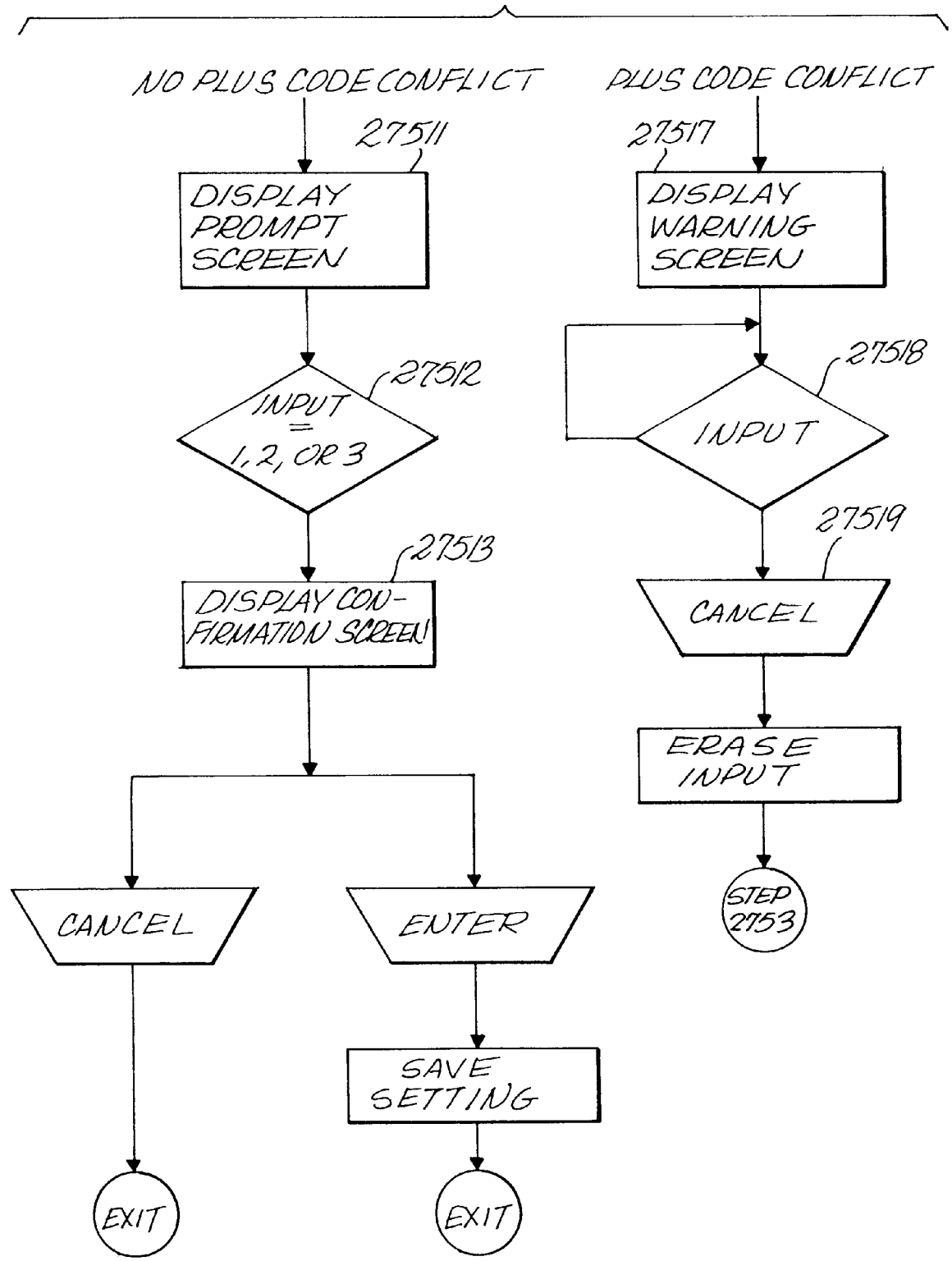

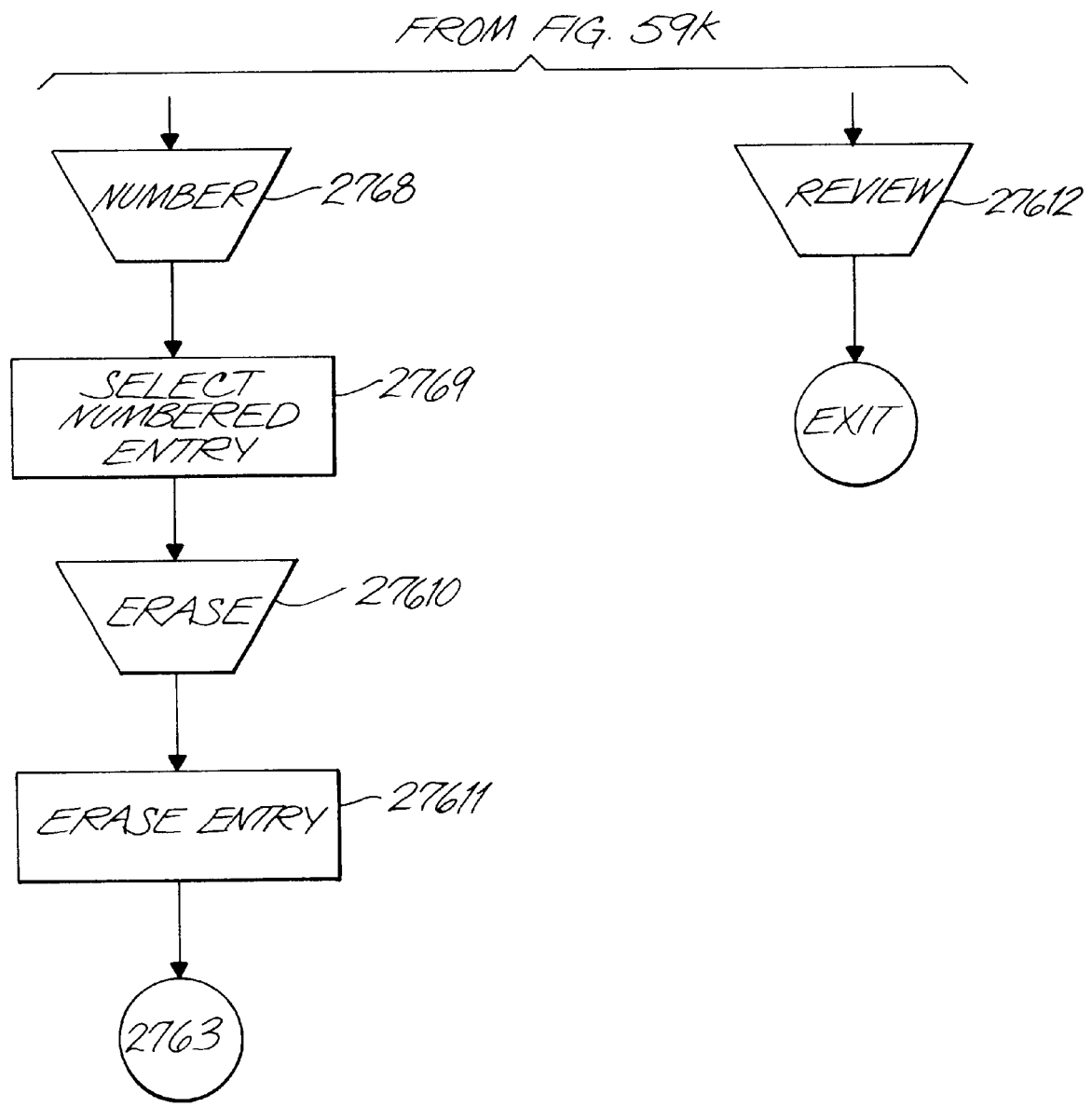

Fig. 60a

```
                    INDEX PLUS +

MIN      MODE

1  STAR TREK PART 2               30        SP
  2  (BLANK)                        19
  3  JOHN'S GRADUATION              36        SP
  4  8:30 PM, DEC. 12, 1992         18        LP
  5  (END)                          24

SPEED: SP
  COMMAND:
```

Fig. 606

```
                    INDEX PLUS +

MIN

1  STAR TREK                             30
      2  RODEO                                 17
      3  BEYOND 2000                           26
      4  CHIP AND DALE                         18
      5  (END)                                 24

MOVING TO 4
      COMMAND: 4 RECORD
```

Fig. 60c

```
              INDEX PLUS +

MIN

→ 1    STAR TREK                       30
   2    RODEO                           17
   3    BEYOND 2000                     26
   4    CHIP AND DALE                   18
   5    (END)                           24

→ → →  PROGRAM 03
 COMMAND : 3 PLAY
```

Fig. 60d

ENTER LENGTH IN MINUTES

PRESS [ENTER] TO RECORD
OR [CANCEL] TO QUIT

Fig. 60e

WARNING !!!
RECORDING WILL OVERWRITE THE
FOLLOWING PROGRAMS:
    CHIP AND DALE

PRESS [5] TO RECORD AS PROGRAM #5
OR [CANCEL] TO EXIT
OR [RECORD] TO OVERWRITE

Fig. 60f

```
                    INDEX PLUS +

MIN

1  STAR TREK PART 2                 30
       2  (BLANK)                          19
       3  BEYOND 2000                      26
       4  (BLANK)                         120
       5  CHIP AND DALE                    18
       6  (END)                            24
```

Fig. 60g

```
                    INDEX PLUS +

PLEASE ENTER PLUS CODE™ NUMBER
         OF DESIRED PROGRAM
         -------------------------------
         PRESS [CANCEL] TO EXIT
               [ENTER] TO SAVE
               [ERASE] TO ERASE INPUT
```

Fig. 60h

INDEX PLUS +

INPUT IS AN INVALID PLUS CODE$^{TM}$ NUMBER
PLEASE CHECK LISTING AND RE-ENTER
— — — — — — — — — — — — — — — —

PRESS [CANCEL] TO EXIT
[ENTER] TO SAVE
[ERASE] TO ERASE INPUT

Fig. 60i

INDEX PLUS +

PLUS CODE$^{TM}$ NUMBER SAVED

PRESS [1] FOR RECORDING ONCE ONLY
[2] FOR RECORDING WEEKLY
[3] FOR RECORDING EVERY WEEKDAY

Fig. 60j

INDEX

PLUS CODE™ NUMBER BUFFER FULL
CANNOT PERFORM VCR PLUS+™
PROGRAMMING

PRESS [CANCEL] TO EXIT
      [REVIEW] TO REVIEW PLUS CODE
              BUFFER

Fig. 60k

PROGRAM TO RECORD

| # | CH | DATE  | TIME  | LEN | ST |
|---|----|-------|-------|-----|----|
| 1 | 3  | 12-01 | 3:00  | 5   | OK |
| 2 | 2  | 12-03D| 2:00  | 10  | OK |
| 3 | 5  | 12-04 | 19:00 | 15  | OK |
| 4 | 3  | 12-05 | 18:00 | 20  | OK |

TO ERASE A PROGRAM:
PRESS PROG # AND [ERASE]

Fig. 601

```
                    INDEX

WARNING: THE PROGRAM YOU JUST SET
         CONFLICTS WITH PREVIOUSLY SET
         PROGRAM

CH    DATE     START    STOP
PREVIOUS      4     12-01    12:00    14:00
NEW           5     12-01    13:00    15:30

PRESS [CANCEL] TO CANCEL
      [REVIEW] TO REVIEW PLUS CODES
```

Fig. 60m

```
                INDEX
                                        MIN
  → 1    STAR TREK                      30
    2    RODEO                          17
    3    BEYOND 2000                    26
    4    CHIP AND DALE                  18
    5    (END)                          24

COMMAND: 2 ERASE
```

Fig. 60n

```
              WARNING !!!

DO YOU REALLY WANT TO
       ERASE PROGRAM #02 ?

PRESS [ENTER] TO ERASE
       OR [CANCEL] TO EXIT
```

Fig. 60o

```
                    INDEX
              LIBRARY OPTIONS

1. ADD TAPE VOLUME TO LIBRARY
    2. ACCESS LIBRARY
    3. CANCEL

PRESS SELECTION AND [ENTER]
```

Fig. 60p

```
                    INDEX
            ACCESS LIBRARY OPTIONS

1. SEARCH PROGRAMS BY PROGRAM TITLES
    2. SEARCH PROGRAMS BY PROGRAM TYPES
    3. DISPLAY A TAPE DIRECTORY

PRESS NUMBER OF OPTIONS AND
       [ENTER] TO CONTINUE A PREVIOUS SEARCH
       PRESS "C" BEFORE SELECTING AN
       OPTION
```

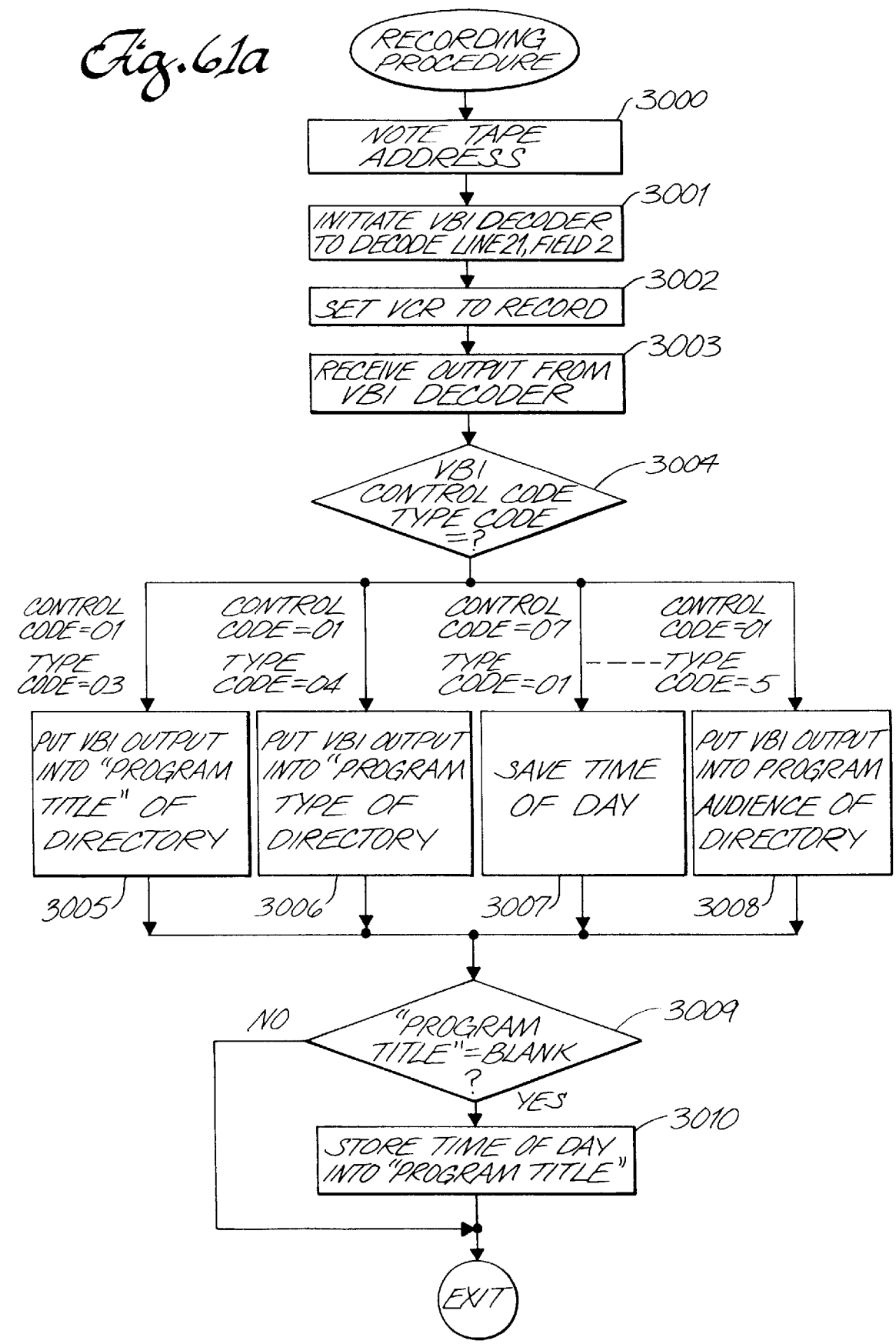

Fig. 61b
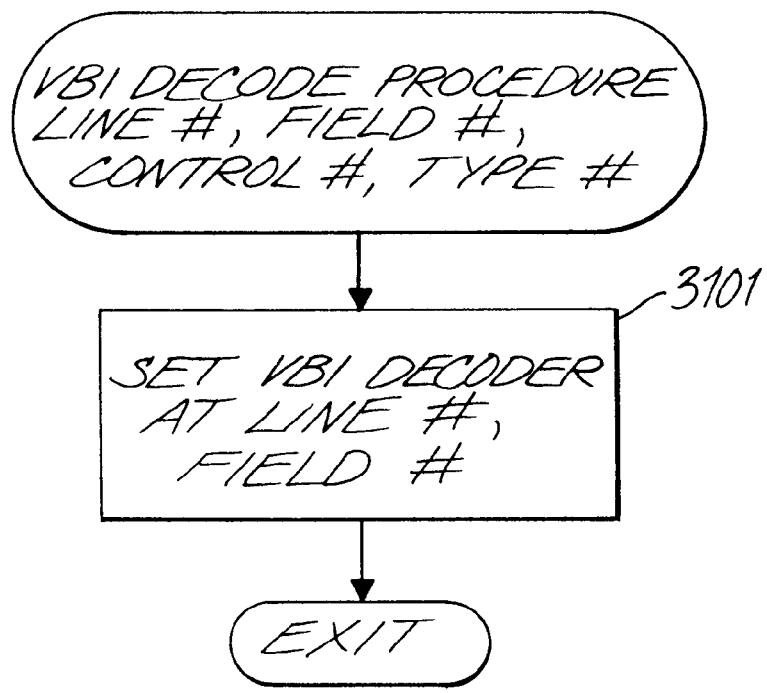
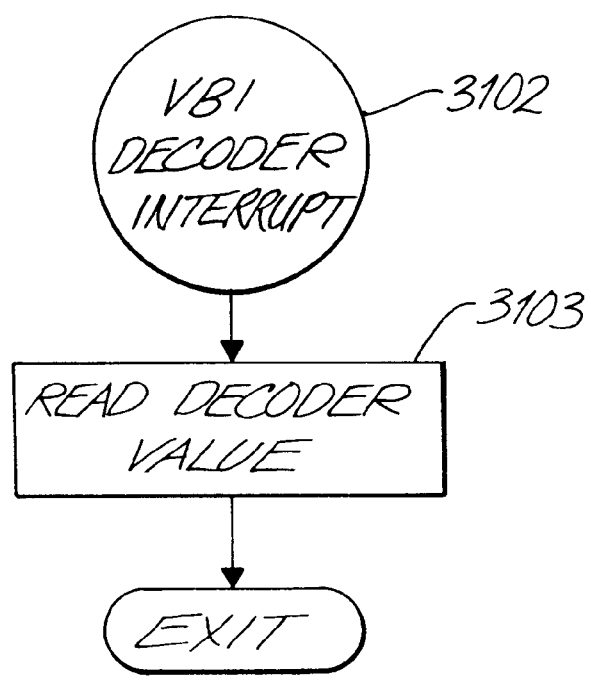

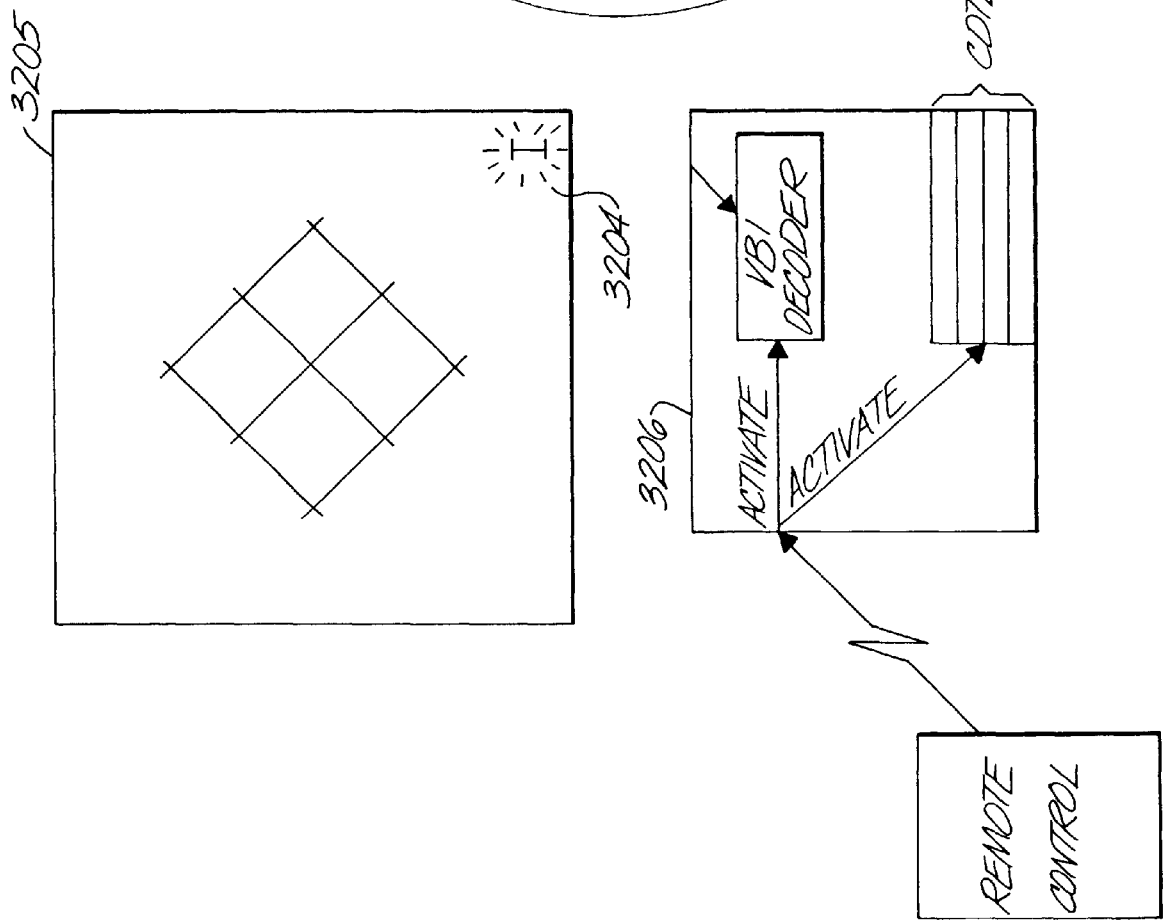

THIS IS A NEW BLANK TAPE
ENTER LENGTH OF TAPE

_ _ _ MINS

[ENTER] TO CONFIRM
[CANCEL] TO START OVER

Fig. 65b

THE CURRENT TAPE INDEX
INFORMATION HAS BEEN
ADDED TO THE LIBRARY

PLEASE EJECT THE TAPE
NOW AND LABEL THIS TAPE
AS NUMBER 8

Fig. 65c

PROGRAM TO RECORD

| CH | DATE | TIME | MIN | ST |
|---|---|---|---|---|
| 4 | 2/13 | 9:00 | 60 | OK |
| 2 | 2/17 | 18:00 | 30 | OK |
| 5 | 2/20 | 20:00 | 60 | NO |
| 11 | 2/20 | 19:30 | 30 | |

TO ERASE:
HIGHLIGHT SELECTION
PRESS [ERASE]

*Fig. 65e*

ENTER LENGTH OF PROGRAM
TO RECORD

__ __ MINS

[ENTER] TO CONFIRM
[CANCEL] TO START OVER

Fig. 65f

INDEX          TAPE NO. 8

| TITLE | MIN |
|---|---|
| WHEEL OF FORTUNE | 30 |
| ENTERTAINMENT TONITE | 30 |
| MURPHY BROWN | 30 |
| TERMINATOR | 90 |
| END | 60 |

HIGHLIGHT SELECTION

INDEX           TAPE NO. 8

| TITLE | MIN |
|---|---|
| WHEEL OF FORTUNE | 30 |
| ENTERTAINMENT TONITE | 30 |
| MURPHY BROWN | 30 |
| TERMINATOR | 90 |
| END | 60 |

HIGHLIGHT SELECTION

WARNING!

DO YOU REALLY WANT TO ERASE

MURPHY BROWN?

[ENTER] TO ERASE
[CANCEL] TO EXIT

Fig. 65j

INDEX      TAPE NO. 8

TITLE                       MIN
WHEEL OF FORTUNE             30
ENTERTAINMENT TONITE         30
MURPHY BROWN                 30
TERMINATOR                   90
END                          60

HIGHLIGHT SELECTION

EDIT PROGRAM TITLE

TERMINATOR

T2 _ _ _ _ _ _ _ _ _

[ENTER] TO CONFIRM
[CANCEL] TO CANCEL
CHANGES

Fig. 651

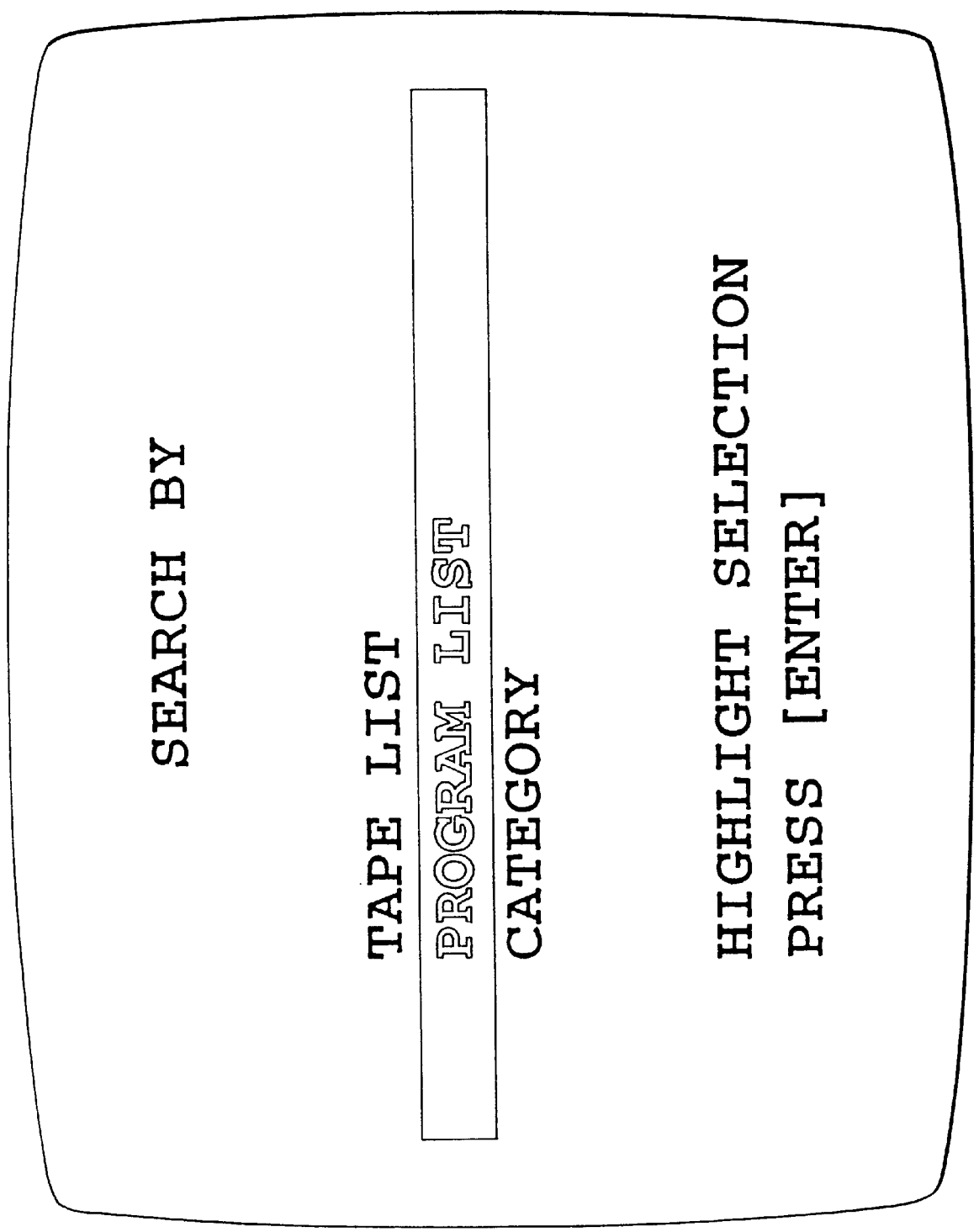

ENTER THE FIRST LETTER
OF PROGRAM TITLE

|

[ENTER] TO CONFIRM

Fig. 650

| TITLE | TAPE NO. |
|---|---|
| TARZAN | 12 |
| TERMINATOR | 8 |
| THELMA & LOUISE | 46 |
| TWO OF A KIND | 77 |
| UNIVERSAL SOLDIER | 98 |
| WHAT ABOUT BOB | 46 |
| WILD ORCHID | 23 |
| YOUNG EINSTEIN | 49 |

USE PG▲ PG▼ TO REVIEW
MORE TITLES

Fig. 65p

ENTER TAPE NO.

— | —

[ENTER] TO CONFIRM
[CANCEL] TO START OVER

*Fig. 65r*

INDEX     TAPE NO. 8

| TITLE | MIN |
|---|---|
| WHEEL OF FORTUNE | 30 |
| ENTERTAINMENT TONITE | 30 |
| MURPHY BROWN | 30 |
| TERMINATOR | 90 |
| END | 60 |

Fig. 65

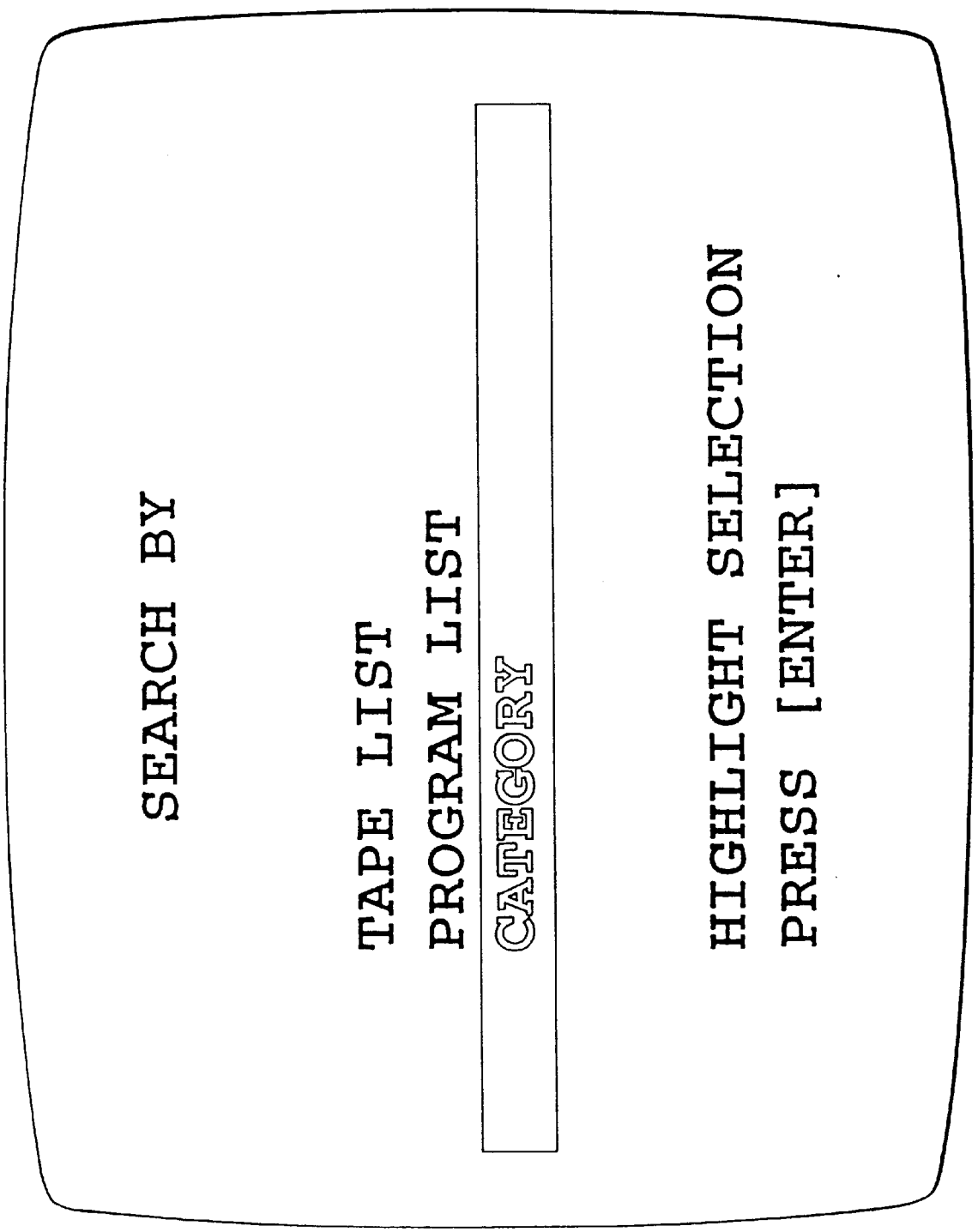

SEARCH BY CATEGORY

RELIGION
SOAP OPERA
SPORTS
GENERAL

EDUCATION
GAMES
MOVIE
MUSIC
NEWS/DOCUMENTARY

HIGHLIGHT SELECTION
PRESS [ENTER]

Fig. 65u

SPORTS

BASEBALL            HORSE RACING
BASKETBALL          ICE HOCKEY
CAR RACING          TENNIS
FOOTBALL            WATER SPORTS
GOLF                GENERAL

HIGHLIGHT SELECTION
PRESS [ENTER]

Fig. 65v

FOOTBALL

| PROGRAM TITLE | TAPE # |
|---|---|
| BEARS VS. 49ERS 12/29 | 17 |
| BEARS VS. RAIDERS 1/3 | 76 |
| EAGLES VS. CHARGERS 11/11 | 9 |
| RAIDERS VS. COWBOYS 10/3 | 67 |
| RAIDERS VS. JETS 10/10 | 23 |

USE PG▲ PG▼ TO REVIEW

MORE TITLES

Fig. 65w

```
INDEX            LIBRARY

SEARCH
      REGISTRATION
      DOWNLOAD
      BACKUP
      INITIALIZE TAPE

HIGHLIGHT SELECTION
      PRESS [ENTER]
```

Fig. 65x

LIBRARY REGISTRATION

ADD
DELETE
CHANGE

HIGHLIGHT SELECTION
PRESS [ENTER]

Fig. 65y

ENTER TAPE NO. TO BE DELETED FROM LIBRARY

Fig. 65z

WARNING !

TAPE 8 WILL BE DELETED.
ARE YOU SURE?

| TITLE | MIN |
|---|---|
| WHEEL OF FORTUNE | 30 |
| ENTERTAINMENT TONITE | 30 |
| MURPHY BROWN | 30 |
| TERMINATOR | 90 |
| END | 60 |

[ENTER] TO ERASE
[CANCEL] TO EXIT

Fig. 65a'

DOWNLOADING COMPLETED

PLEASE EJECT THE TAPE NOW

Fig.65d

LIBRARY REGISTRATION

ADD
DELETE
CHANGE

HIGHLIGHT SELECTION
PRESS [ENTER]

Fig. 65f'

LIBRARY REGISTRATION

ADD
DELETE
CHANGE

HIGHLIGHT SELECTION
PRESS [ENTER]

Fig. 65h

CHANGE TAPE #

FROM __ __
TO __ __

[ENTER] TO CONFIRM
[CANCEL] TO START OVER

Fig. 65i'

NO. 18 IS ALREADY
TAKEN. PLEASE CHOOSE
ANOTHER NUMBER

FROM     _ _   _8_
TO       _ _   _ _

[ENTER] TO CONFIRM
[CANCEL] TO START OVER

Fig. 65

SELECT THE TAPE CATEGORY

NON-INDEXED TAPE
INDEX TAPE
BLANK TAPE

HIGHLIGHT SELECTION
PRESS [ENTER]

Fig. 65k'

DO YOU WANT TO
RETRO-INDEX THIS TAPE?

YES
NO

HIGHLIGHT SELECTION
PRESS [ENTER]

Fig. 651

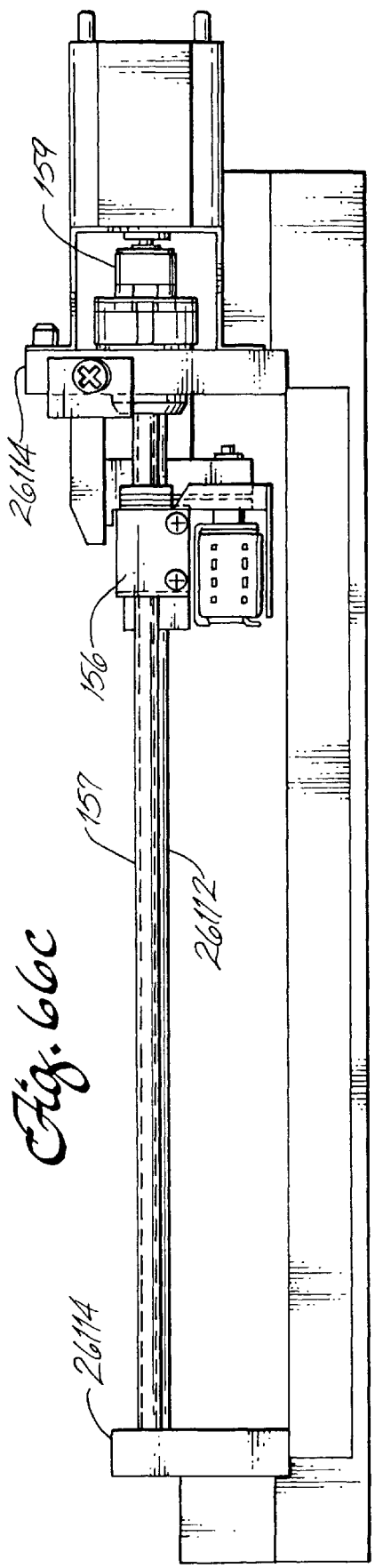
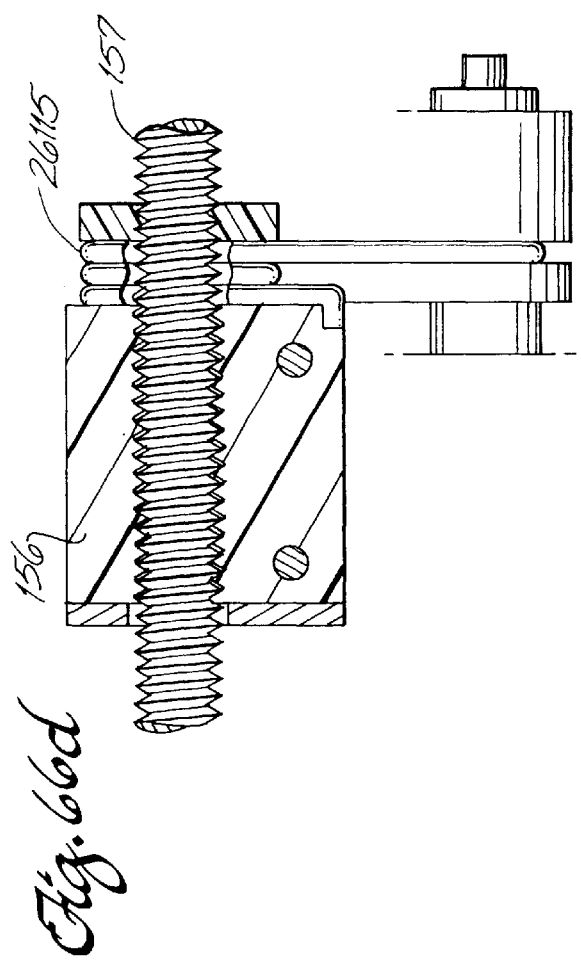
Fig. 66c
Fig. 66d

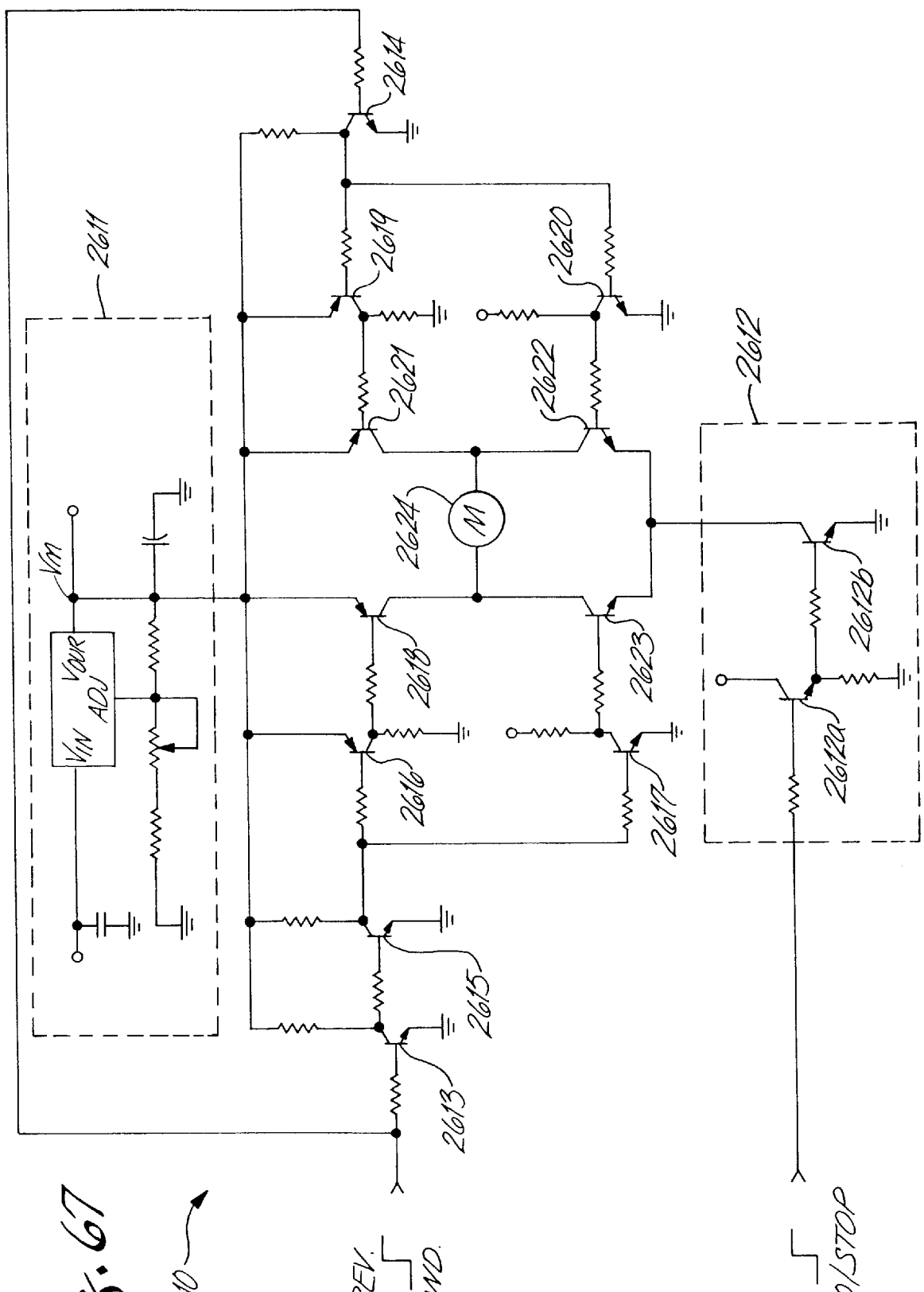

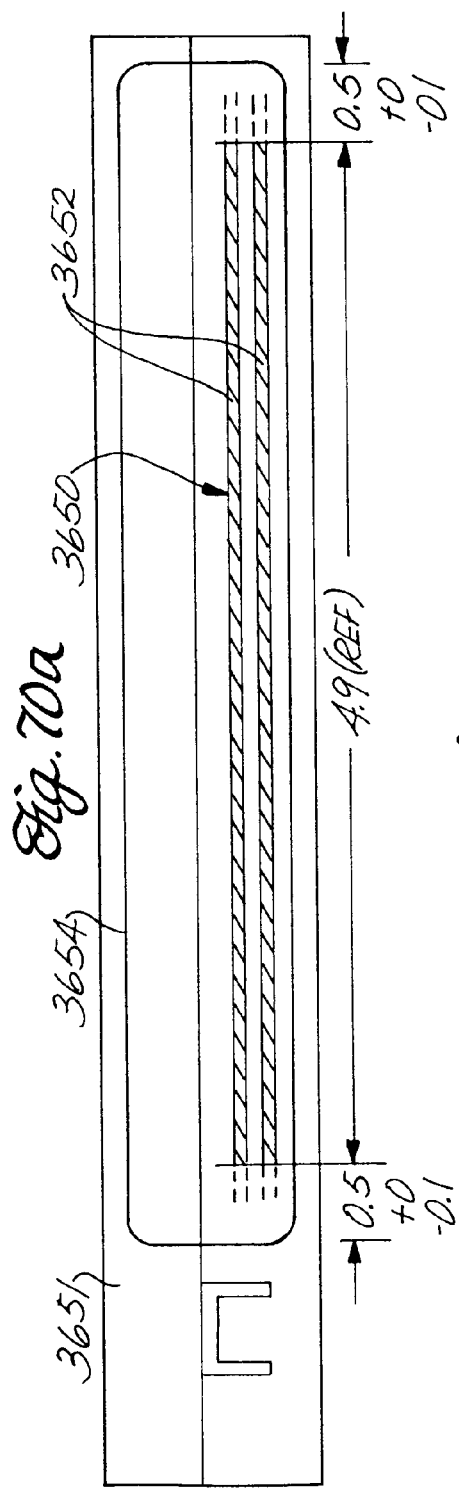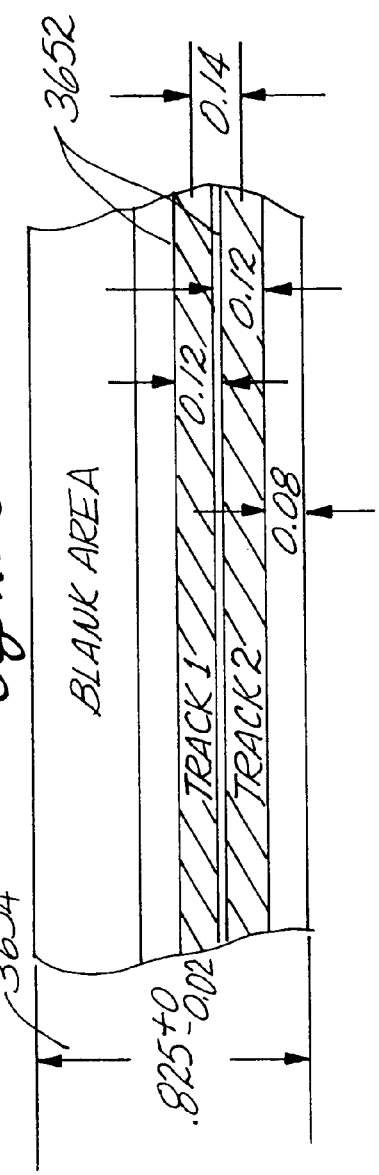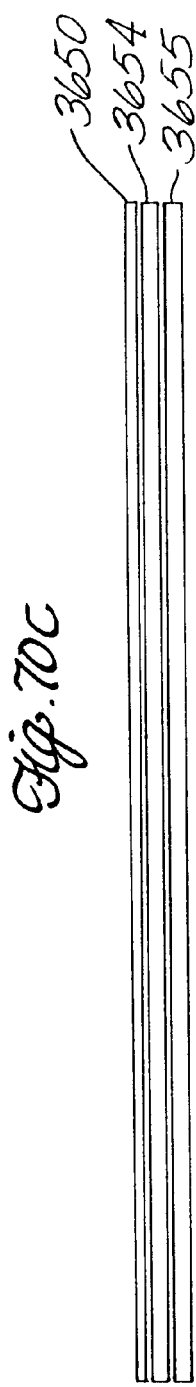

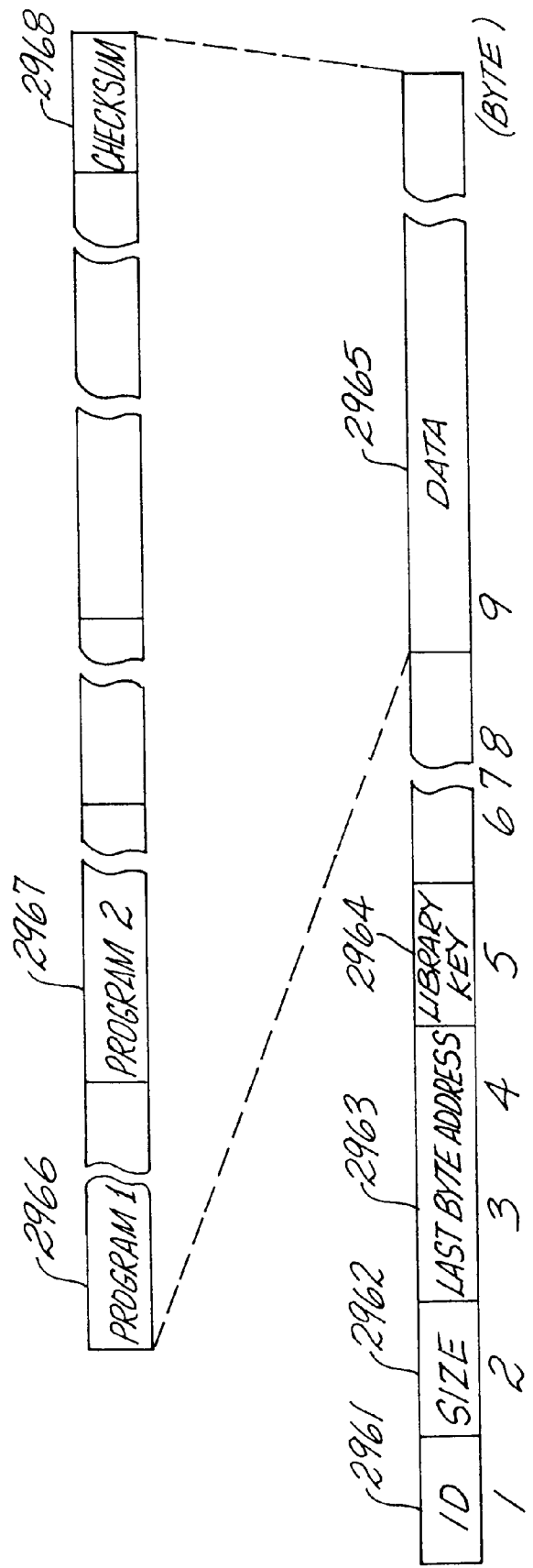

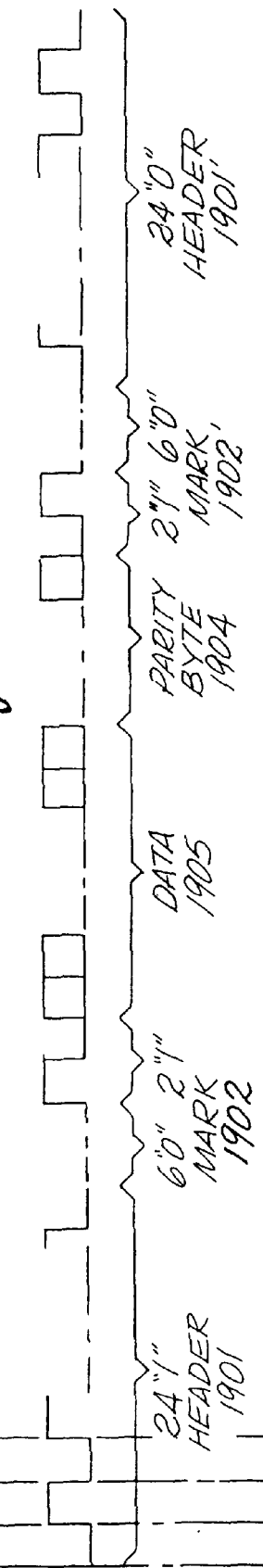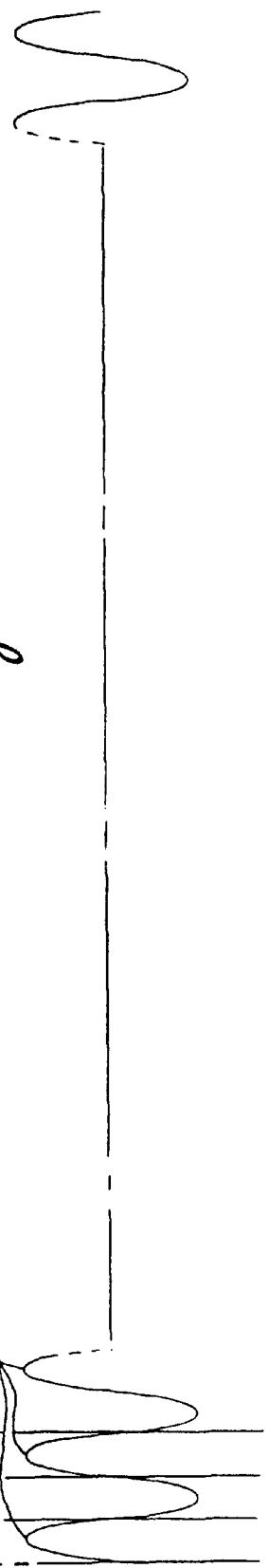

MAGNETIC STRIPE CONTAINS TAPE LOCATION OF LATEST DIRECTORY

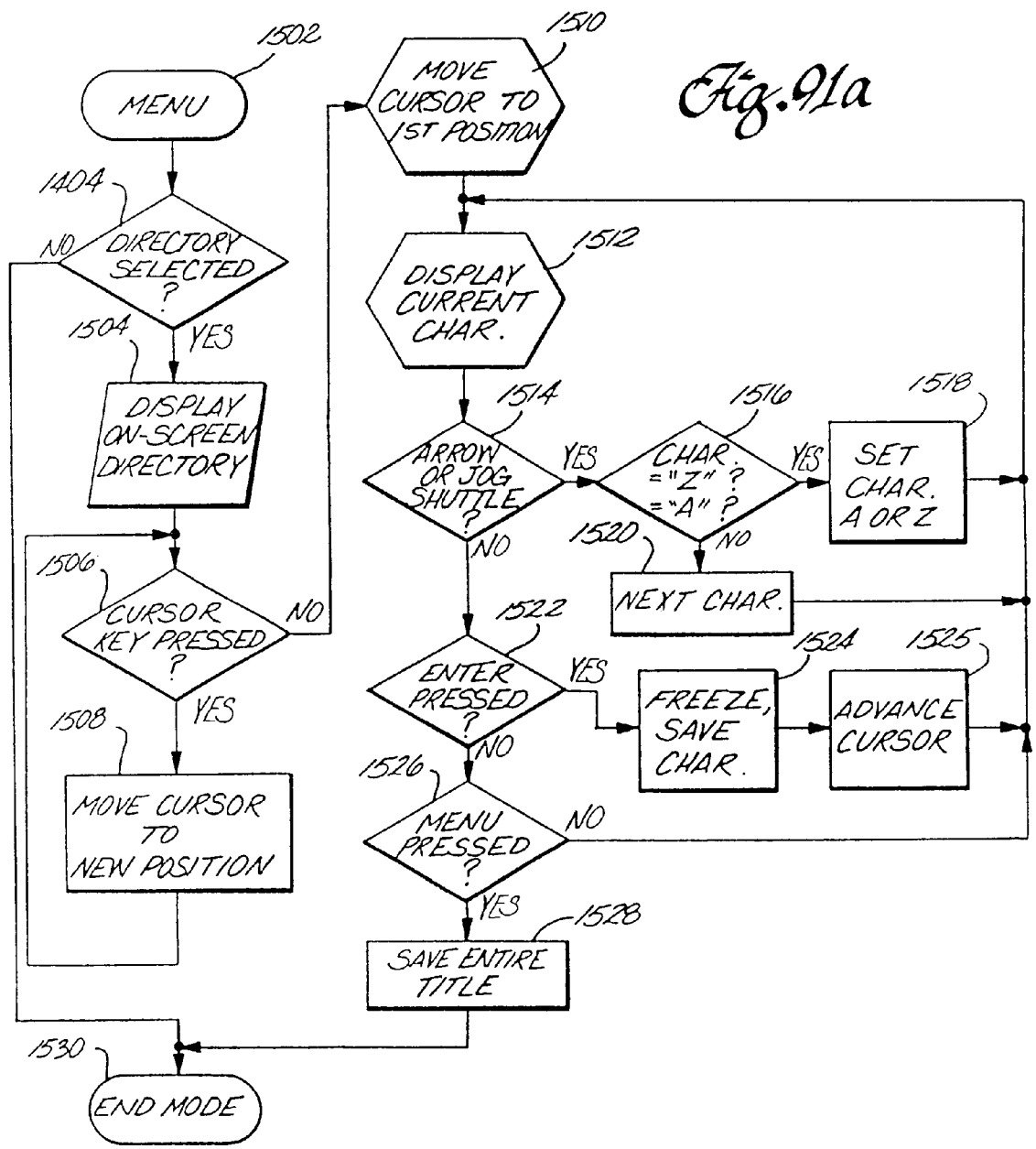

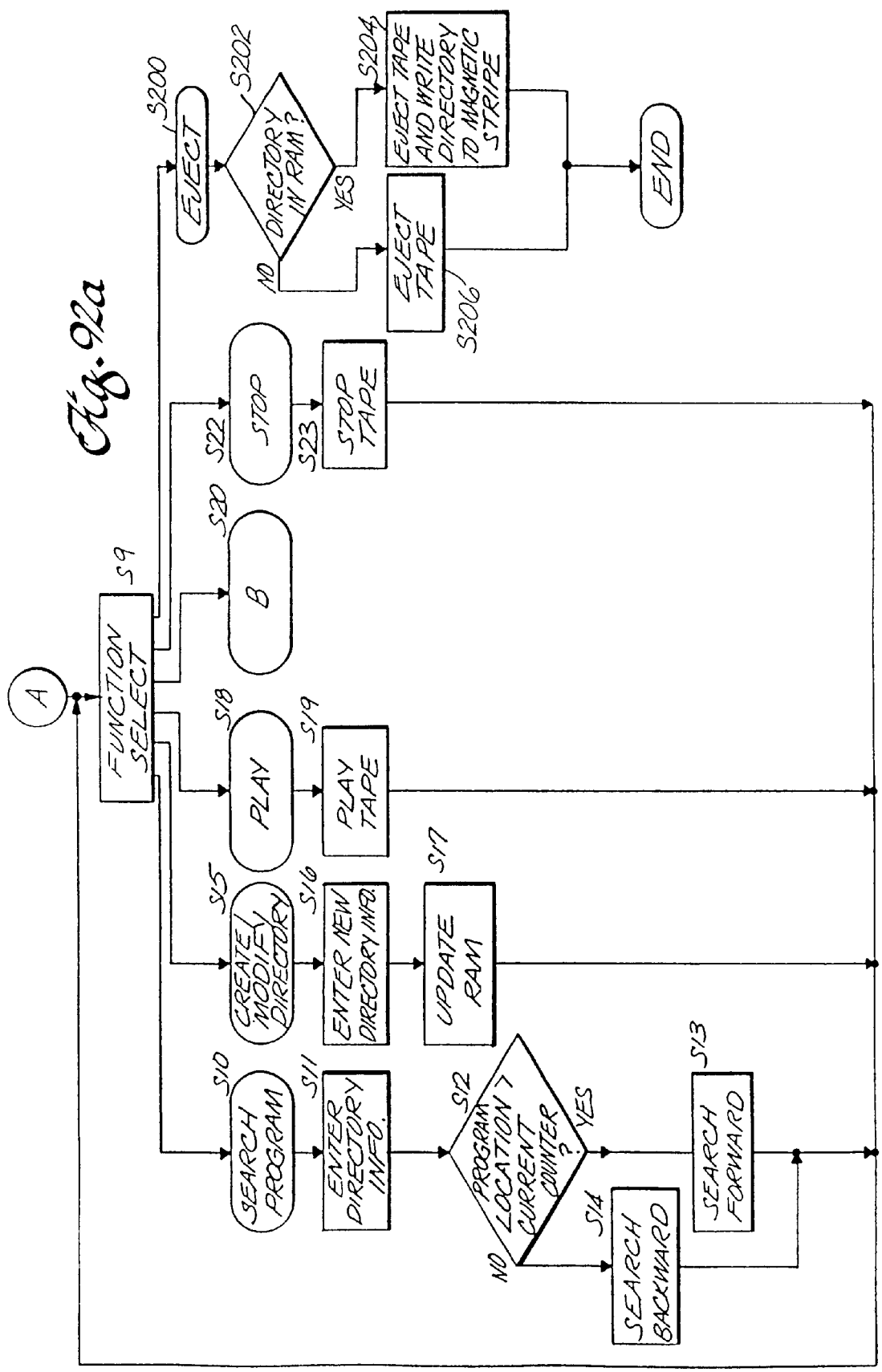

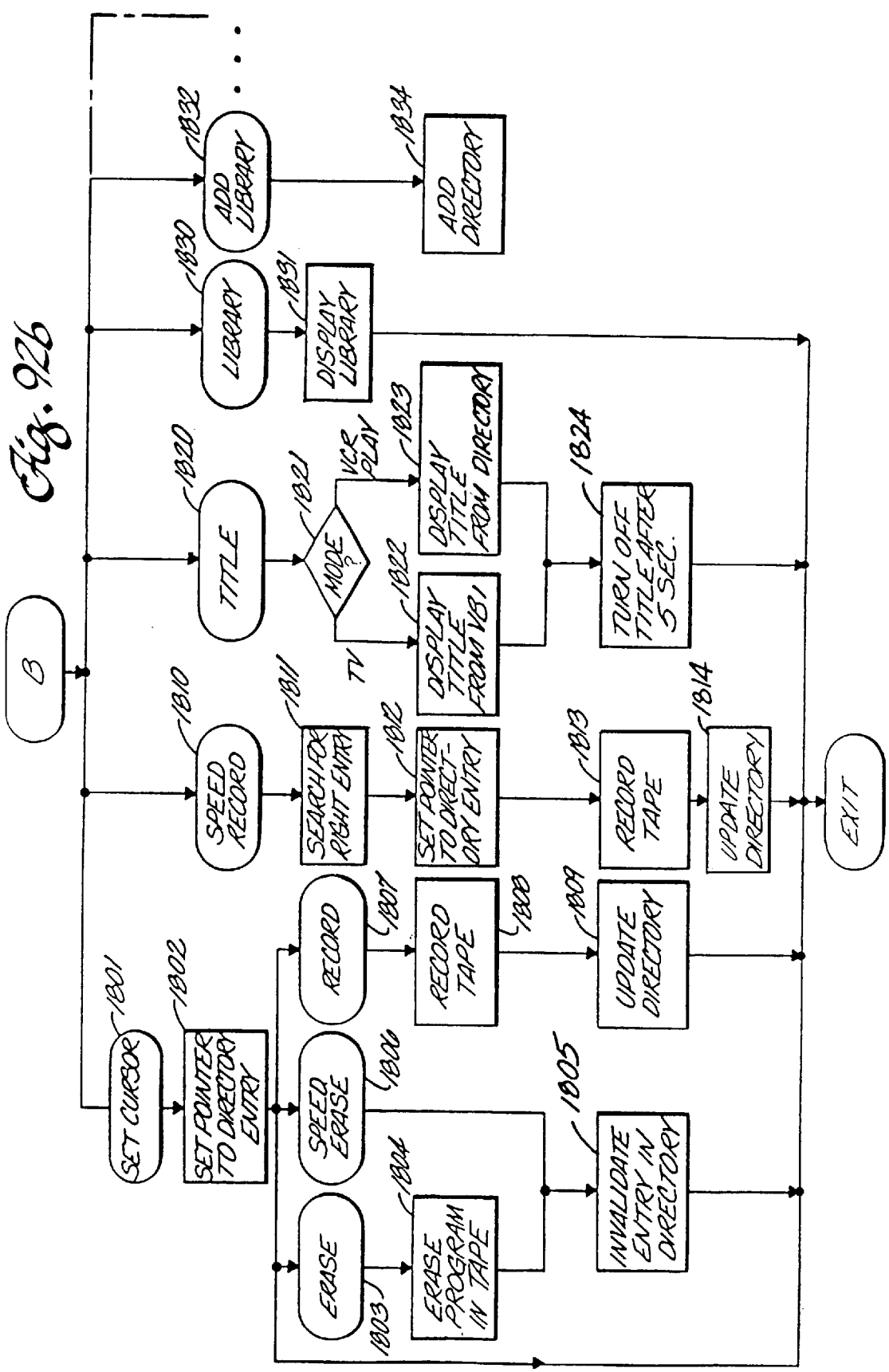

ENHANCING OPERATIONS OF VIDEO TAPE CASSETTE PLAYERS

CROSS-REFERENCE TO RELATED APPLICATION

This is a continuation of application Ser. No. 08/066,666, filed May 27, 1993.

CROSS-REFERENCE TO RELATED APPLICATION

This is a continuation-in-part of application Ser. No. 08/014,541, filed Feb. 8, 1993 now ABN, which is a continuation-in-part of application Ser. No. 08/001,125, filed Jan. 5, 1993 now ABN, which is a continuation-in-part of application Ser. No. 07/883,607, filed May 7, 1992 now ABN, which is a continuation-in-part of application Ser. No. 07/817,723, filed Jan. 7, 1992 now ABN, which is a continuation-in-part of application Ser. No. 07/805,844, filed Dec. 5, 1991 now ABN, which is a continuation-in-part of application Ser. No. 07/747,127, filed Aug. 19, 1991 now ABN, the subject matter of which is incorporated herein by this reference.

FIELD OF THE INVENTION

In one aspect, this invention is related to means and method for facilitating management, storage and retrieval of programs on a cassette of magnetic tape. In another aspect, this invention is related to maintaining current information about a tape in a magnetic tape cassette and more particularly to maintaining current information about such a tape using a magnetic tape reader/recorder, and magnetic tape cassettes therefor.

BACKGROUND OF THE INVENTION

Two general methods for long term mass storage of data are known; random access and sequential access. The random access method uses long playing (LP) record players, compact disc (CD) drives and video disc drives for consumer use, and hard disc drives, floppy disc drives and optical disc drives for use with computers. In all, information is accessed at random by moving a playing head directly over the desired playing area of the stored media.

a. Problems with Serial Storage Devices

In the sequential method, stored information can only be accessed sequentially. The sequential method uses audio tape drives, video tape drives and digital audio tape drives for general consumer use and digital tape drives and tape backup cassette drives for use with computers and analog tape drives for instrumentation purposes. All of these devices use magnetic tape as the stored media. The big advantage of tape drives is low cost compared with random access devices. The disadvantages and problems of using magnetic tape are three-fold.

i. To go to a particular location on tape, the tape must be either advanced or rewound in a serial or sequential manner. Unless forward or reverse operations can be performed at very high speed, this can be a time consuming process.

ii. The exact contents and location of records on the tape are not known. Random access devices can record (usually at the outermost tracks) an index of the content at the beginning of the disc and anytime the index information needs to be accessed, the read or write head simply skips over to read the index. For magnetic tape, even if the index is recorded in a reserved area at the beginning of the tape, as is presently done in some video tape or computer tape backup systems, its usefulness is limited, due to the time required to rewind the tape all the way to the beginning, assuming the tape is not at the beginning when the need arises to search for the index. owners of large numbers of tapes desire to place titles on the tapes to enable rapid identification of the program thereon. Usually titling is done by hand writing a title on a label on the tape or its box. However, the tape can become separated from the box, or the label may fall off. Some tape owners repeatedly record over the same tape and prefer not to use permanent labels. Computer tapes may contain hundreds of records or files and handwriting or updating the index onto the box is not practical.

iii. The absolute current location of the tape is not known. Most tape drives have tape counters which only indicate relative location. For example, if a tape cassette is played and then removed from a tape drive without rewinding, the next time the cassette is inserted and played by a tape drive, the absolute location of the tape in the cassette will no longer be known. Attempts have been made to overcome this problem by writing absolute address marks onto the tape. For example, some recent video tapes use the VHS Address Search System (VASS) whereby absolute address marks are written at 1 minute intervals onto the control track of a VHS tape. In computer backup of hard discs by tape, the streaming mode is usually used where a constant stream of data blocks (usually 512 bytes) are written onto the tape, each block being usually preceded by one or two address bytes. Thus, absolute addressing is available but not yet universally used on tape.

Knowing the absolute address is important. For example, assume that there are 5 programs (or records) on a tape and each of their starting addresses is known and a user desires to go to the starting location of program 4. Without knowing the absolute address of where the tape is currently positioned, the user or the drive has no way of knowing whether to rewind or fast forward the tape to reach the desired record.

In order for tape drives to compete against random access devices it is important that these three problems be either overcome or ameliorated.

b. Providing Program Titles

Placing a descriptive title on the tape presents another problem. Video titling is usually known and recorded on a leader portion of the tape. Ordinarily, the title is computer-generated and recorded in a sequence of regular video frames, rather than on the control track. If multiple copies of the tape are made, the quality of the title drops off drastically. Also, the title cannot be conveniently edited without re-recording the sequence of frames. Prior art systems for applying such titles are either expensive or cumbersome. Professional video titling systems include the well-known Chyron system and many others. Typically these systems include a complete computer, a complex, high-resolution character generator, a special effects generator for making shadows, italics and other effects, and a video interface to generate a video signal. Such systems are too expensive and complicated for the home video market.

Some videocassette recorders (VCRs) and camcorders are equipped with simple character generators for displaying simple block letters and numbers, either superimposed over a recorded video signal or recorded and mixed with the picture signal. A typical camcorder application is adding characters representing the recording date and time to a video signal as it is being recorded, thereby adding a "date stamp." In VCRs, the character generator can be used to show programming information such as channel, date, and time on screen as the VCR is being programmed to record programs at a future date. However, currently there is no simple way to use the VCR character generator as a titling device.

In "Recommended Practice For Line 21 Data Services, Part Seven, Extended Data Service Packets", Draft EIA-608, Oct. 12, 1992, there is suggestion of using VBI line 21, field 2 to send information such as program title and type along with the broadcast program. Yet, the possible use of such information for facilitating operation of a videocassette recorder, such as providing a title for a recorded program, is never suggested.

c. Title Editing

Another problem with prior art titling systems is data input and editing. With Chyron systems, a full-size typewriter-style keyboard is used which is inappropriate for home use and slow for poor typists. Editing of a title is impractical with most home-generated titles, because the title is recorded as a video image on the tape. Thus, the prior art fails to provide a convenient means for generating, storing, and editing video titles for use with sequentially-stored magnetic tape. Users of home video equipment would likewise appreciate a system using internal character-generator hardware and VCR remote controls, thereby precluding the need for complex or expensive hardware to generate titles.

It is an object of the invention that the addressing system provide a fast and accurate way of searching for the starting points of the programs. It is a further object that the addressing system determine the current position on the tape and provide a means of homing in to the destination address, during a search. It is yet another object of the address system to provide a means for accounting for the lengths of programs as they are recorded or modified.

It is an object of the invention to have a memory that is randomly accessible for storing the directory. It is another object of the invention that the directory be changeable without degrading the quality of the recorded information on the tape.

It is an object of the invention to provide a program guide that is broadcasted to the user and which provides current scheduling and descriptive information that includes special events which are scheduled on short notice. It is a further object that the program guide be usable for timer programming an Indexing VCR with minimal interaction by the user so that the user finds time shifting for viewing programs easier. It is yet another object that the broadcaster can provide increase the viewing of programs broadcasted during traditional off-hours.

It is an object of the invention to have an indexing VCR with greater reliability and utility and at a lower cost than the Moving Head System.

SUMMARY OF THE INVENTION

The invention provides, in a magnetic tape cassette reader/recorder, a method and apparatus for maintaining current information, such as a directory of recorded programs, about a tape in a magnetic tape cassette. The availability of the program directory can greatly facilitate operation of the tape cassette reader/recorder. For example, with a program directory, a user can perform an erase operation of a taped program by simply indicating on the directory that the program can be over-written and/or no longer accessible; or a recording operation by selecting from the directory a proper tape segment to perform the record operation without having to go through the tape to find the right spot. In brief, the availability of a program directory will eliminate much of the frustration that has been felt for so long by so many users of tape devices such as VCRs.

Different embodiments of the present invention are disclosed in the specification for storing current information about a tape. For example, in one embodiment, the information is kept in a secondary memory carried on the exterior of a tape cassette.

According to one implementation of the above embodiment, the secondary memory is a storage medium carried on the cassette. The storage medium preferably comprises a magnetic layer and an adhesive layer for affixation of the storage medium to the housing of the cassette. A stationary magnetic head/sensor is provided on the VCR to access the current information stored on the magnetic layer. The method of accessing the current information comprises the steps of reading the content on the magnetic layer after commencement of the insertion of such cassette in the reader/recorder, and causing the magnetic layer to be updated with current information about the tape therein whenever such cassette is ejected from the reader/recorder.

According to another implementation of the above embodiment, the secondary memory is also a magnetic layer carried on the cassette and preferably a magnetic layer affixed to the housing of the cassette. However, the magnetic head/sensor for reading/writing data on the magnetic layer is movable over the magnetic layer. Under such implementation, information about the tape can be read and written with more freedom than the above implementation which uses a stationary head.

According to another implementation of the above embodiment, the secondary memory for storing information of the tape is a semiconductor memory carried on the cassette. Preferably, the semiconductor memory has serial input/output so that the number of contact points for communicating addresses and data between the cassette and a VCR is minimized. Advantageously, storage of information into the semiconductor memory can occur at any preferred time between the update and ejection of the tape.

According to another embodiment of the present invention, directory information of a tape is recorded on the tape itself. The advantage of the embodiment is that the invention can be practiced without modification to the tape or its housing.

In one implementation of this embodiment, directory information is written on the video track of the tape in the vertical blanking intervals (VBI) of recorded video signals.

In another implementation, directory information is written on the control track of the tape. Preferably, a marker is formed on the tape to uniquely identify the position of a current directory. Also preferably, a first marker is recorded on tape in close proximity to a current directory when the directory is recorded on the tape. The tape is searched for a directory with the first marker. A second marker is recorded on the tape in close proximity to the first marker when the current directory is read. Alternatively, a marker may be recorded on the tape in close proximity to a current directory when the directory is recorded on the tape. The tape is searched for a current directory with the marker in close proximity thereto. The marker is erased when the directory is read. Also, the current tape position may be read from the housing of the cassette during insertion of the cassette into the reader/recorder. A current position of the tape may be written on the housing of the cassette during removal of the cassette from the reader/recorder.

In one embodiment, the directory is erased from the tape immediately after the step of reading the directory. In another embodiment, the reader/recorder re-positions the tape in the cassette, after reading the directory and prior to removal of the cassette, to a position such that the directory will be read out by the reader/recorder upon reinsertion of the cassette in the reader/recorder and prior to reading by the reader/recorder of one of the records from the tape. In still another embodiment, the tape is not rewound after the directory is read and prior to removal of the cassette; however, the tape is read for the directory in a reverse direction when it is reloaded.

Preferably there is recorded on the tape in association with the directory, a current position of the tape at which the reader/recorder will commence reading the tape upon reinsertion of the cassette in the reader/recorder. Also preferably, when reading the directory from the tape, the current position is also read from the tape and a representation of the current position is stored in the memory. Preferably, the current position in the memory is updated as the tape is being moved for reading or writing and the updated position may be recorded on the tape.

In still another embodiment of the present invention, directory information of a tape is stored in a random access memory located in the VCR. An identification (e.g. a volume label) is written on the tape whereby the corresponding directory information can be retrieved from the random access memory when the tape is loaded into the VCR.

Index information are provided on the tape to facilitate searching of programs recorded thereon and positioning the tape to selected programs.

According to one implementation, the index information is written at predetermined space intervals on the tape. The index information is represented by the value of the tape reel counter at the time the information is written. In one specific implementation, the index information is written onto the control track. In another specific implementation, the index information is written onto the VBI portions of the video track.

In another implementation, a cue signal is written at the beginning of each program. The address of a program is represented by its sequential position relative to other programs on the tape. A program under this implementation is located by counting the cue signals encountered during either a fast forward or a rewind operation, until the appropriate number of cue signals are encountered.

Different implementations are provided to further enhance the creation, maintenance and usefulness of the program directory. For example, in one embodiment, a program title, forming one part of the directory, is entered using controls on a jog shuttle remote control of the recorder/reader as an input device. A representation of an alphanumeric keyboard is displayed on a monitor screen by a character generator in the recorder/reader under control of the controller. Arrow buttons or a jog shuttle knob on the remote control can be used to select individual characters forming words in the program title. After the complete title is composed by a user it is saved in the directory. In another embodiment, a scrollable character is displayed instead of a keyboard representation. The arrow buttons or jog shuttle knob cause the character to change by stepping sequentially through the alphabets/numerals until a desired character is located.

In another embodiment, the controller is coupled to a decoder for decoding data (e.g. a program title) communicated in the VBI portions of a broadcast television signal. The decoded data is fed to the directory in the memory and also is displayed on a monitor screen. The displayed data can then be edited using controls on a jog shuttle knob of a VCR remote control. In one specifically contemplated embodiment, the decoder decodes data from line 21, field 2 of the VBI.

In another embodiment, the data communicated in the VBIs include data, such as a program title, which can be used to detect extension of a program beyond its scheduled time, thereby causing the VCR to continue recording the program.

In yet another embodiment, auxiliary information of a first program, such as the channel-date-time-length of a related second program is broadcasted in the VBI of the first program. In response to a user input, the auxiliary information is retrieved from the VBI and used for automatically setting the VCR to record the related second program.

In yet another embodiment, the auxiliary information are text data relating to the first program. Under the embodiment, the VCR has means responsive to user input for storing the text data in a memory so that they can be displayed at selected time.

In another embodiment, a library containing the directories of a plurality of selected tapes is stored in the VCR. The availability of the library facilitate searching of programs among the plurality of tapes.

In still another embodiment, broadcast programs are classified into different categories. The identification of the category of a broadcast program is broadcasted in its VBI. According to the embodiment, the category identification is retrieved from the VBI and stored as part of the directory information, which can later be used to facilitate searching of a specific category of programs from an archive of tapes.

In a preferred embodiment, a hybrid VCR system is capable of detecting the address and the tape identification number (TID) from either the control track or the VBI of a video tape and identifying the type of tape therefrom. A first type of tape is a home recorded tape (HR tape) in which the directory thereof is stored in a RAM and the TID and the address are stored in the control track in a first embodiment and in the VBI in a second embodiment. A second type of tape is a prerecorded tape (PR tape) from a publisher in which the directory is stored in the VBI and the addresses are stored in a similar manner to the HR tapes. A third type of tape is a retroactively indexed tape (RI tape) which was previously recorded without an index and to which an index is being added. A directory is created in the RAM and the TID and addresses are recorded in the control track.

The address is determined from the location of the recording on the tape as a distance from the beginning of the tape. In a first embodiment, the address is determined by counting the spindle rotation either by counting the number of pulses reflected from light reflective lines on the spindle or calculating the length from the number of sync pulses recorded on the tape. In a second embodiment, the distance is determined by measuring the rotation of a capstan that rotates in unison with the tape movement.

In a first embodiment, the address system is a file mark plus a synchronous sprinkling address system (FMAS). This system writes the absolute address on the control track in the form of address packets. These packets are written in two types of locations. The first type (type 1) is written at the beginning of each program and at the end of the last program on the tape. The main function of these packets is to serve as "file marks" for search of starting points of programs. The second type of packet (type 2) is asynchronously recorded as often as possible in between the type 1 packets. These packets serve as "road marks" for determining current tape location.

In a second embodiment, two separate address systems are used. A high resolution address system (HRAS) writes an absolute address at high repetition rate (e.g., once every few seconds) on a line of the VBI. The second type of address system is a low resolution address system (LRAS) where the absolute address is written on the control track at the beginning of each program as well as the end of the last program as an address mark. An alternate LRAS is to write only marks, such as VISS or VASS marks in the control track at the beginning of each program on the tape and at the end of the tape.

The TID is generated by seeding a random number generator with the time of the first usage of the VCR so that the probability of two VCRs having the same identification number is reduced. The TID also includes a tape number.

Multiple indexing VCRs may be interconnected on a bus for transferring directory data therebetween. In a specific implementation, a household may have several VCR systems that will play some video tapes in both systems. The interconnection allows the directory to be transferred between multiple VCRs so that each VCR has the same directory library.

In yet another embodiment, an input/output port is provided so that the user may connect the VCR system to a printer or another external device such as a telephone line or a floppy disk drive. The directory or auxiliary information broadcast with a program may be printed in hard copy.

BRIEF DESCRIPTION OF THE DRAWINGS

FIG. 7 is a block diagram illustrating the microprocessor controller of FIG. 1 and its interfaces for implementing another specific implementation of the microprocessor controller 31.

FIG. 8 is a timing diagram showing the format of the line 21 field 2 video signal in the vertical blanking interval of a typical video signal.

FIG. 10a is a timing diagram showing modification of the synchronization pulse recorded on the control track of a video tape for encoding a directory thereon.

FIG. 10b is a timing diagram showing the synchronization pulses recorded on the control track when a binary bit "0" is to be written at one time instant (one frame) and a binary bit "1" is written at another time instant (another frame).

FIG. 10c is a timing diagram showing the timing of the current of opposite polarity through the coil of the control head.

FIG. 10d is a timing diagram showing the head signals generated by the control pulse edge detector shown in FIG. 10f.

FIG. 10e is a timing diagram showing the head signals generated by the control pulse edge detector shown in FIG. 10f in response to the current flow shown in FIG. 10c.

FIG. 10f is a block diagram of a circuit 4400 for controlling the reading and writing of encoded data signals on the control track.

FIGS. 10g–10h is a detailed schematic of the circuit of FIG. 10f.

FIG. 10i is a block diagram for an alternate embodiment of the circuit for encoding and decoding data on the control track shown in FIG. 10f.

FIG. 12 is a schematic diagram of another embodiment of the remote controller for the indexing VCR of FIG. 1.

FIG. 13 is a schematic view of an embodiment for storing tape identification numbers and addresses using a file mark plus asynchronous sprinkling address system.

FIG. 14 is a schematic view of an alternate embodiment for storing tape identification numbers and addresses using a high and low resolution addressing system.

FIG. 15 is a schematic view of another alternate embodiment for storing tape identification numbers and addresses using a high and low resolution addressing system.

FIG. 22 is a schematic view showing the data format for the directory recorded on pre-recorded tapes.

FIG. 23 is a schematic view showing the data packet format for the absolute address packet.

FIG. 24 is a schematic view showing the data packet format for the tape identification number (TID).

FIG. 25 is a schematic view showing the format for another embodiment of the directory packet recorded in the VBI for prerecorded tapes.

FIG. 26 is a schematic view showing the format for another embodiment of the directory packet D(0) for the tape title recorded in the VBI for prerecorded tapes.

FIG. 27 is a schematic view showing the format for another embodiment of a TP packet recorded on the VBI for HR tapes and PR tapes.

FIG. 28 is a schematic diagram showing the format for another embodiment of a TID for an HR tape.

FIG. 29 is a schematic diagram showing the format for another embodiment of a TID for a PR tape.

FIGS. 33a–33b are flow charts showing the steps employed in the operation of the indexing VCR using a FMAS addressing system when a tape is inserted therein.

FIGS. 34a–34b are flow charts showing the steps employed in the operation of the indexing VCR, using the VISS PLUS TP addressing system, when a tape is inserted therein.

FIG. 44 is a schematic diagram of the display of the program related information stored in the buffers.

FIG. 48 is a schematic diagram of the display of the directory selected in FIG. 47.

FIG. 49 is a schematic diagram of the display of the directory including the electronic guide selected in FIG. 47.

FIG. 54 is a schematic view showing the format for the pointer packet data broadcasted in the VBI for auxiliary information.

FIG. 55 is a schematic view showing the format for the CSPG/PRI packet data recorded in the VBI as pointed to by the pointer in line 21 of the VBI.

FIG. 56 is a schematic view showing the video magazine (VM) packet used for video magazines.

FIG. 57 is a flow chart showing the steps employed in storing a directory in a library.

FIGS. 58a–58f are flow charts showing the steps employed in one specific embodiment of the invention.

FIG. 59 is a flow chart showing the steps performed by the controller when an enhanced tape is inserted into the VCR embodying the present invention.

FIGS. 59b–59n are flow charts showing the steps performed by the controller when different keys are pressed.

FIGS. 60a–60p illustrates the different screens displayed by the VCR embodying the present invention.

FIGS. 61a–61c illustrate the steps of different procedures performed by the VCR embodying the present invention.

FIG. 62 illustrate how instant information is decoded from the VBI and used in the VCR embodying the present invention.

FIGS. 66b–66d illustrate the mechanical design of the movable head assembly of the system shown in FIG. 66a.

FIG. 67 is a schematic circuit diagram of a motor control circuit.

FIGS. 70a–70c illustrate the construction of a magnetic strip.

FIG. 73 illustrates how data are recorded in the semiconductor memory of FIG. 71 according to the specific implementation.

FIG. 83a is a timing chart of the clock signals prerecorded on the control track of a magnetic strip for synchronizing a reading operation.

FIG. 83b shows the signals recorded on the data track of a magnetic strip for allowing read/write operations to be performed in opposite directions.

FIG. 83c shows the output from a data track in an ideal situation.

FIGS. 87a and 87b are flow charts illustrating the sequence of operation for updating and using the directory during loading and ejecting of a video tape cassette in the video cassette recorder of FIG. 1.

FIG. 90b is a flow diagram of a cursor position updating method used with the method of FIG. 90a.

FIG. 91a is a flow diagram of a scrolling character entry titling method.

FIGS. 92a and 92b are flow charts illustrating the sequence of operation for a video cassette recorder having additional features according to the present invention.

DETAILED DESCRIPTION

The Indexing VCR

Figure 1:
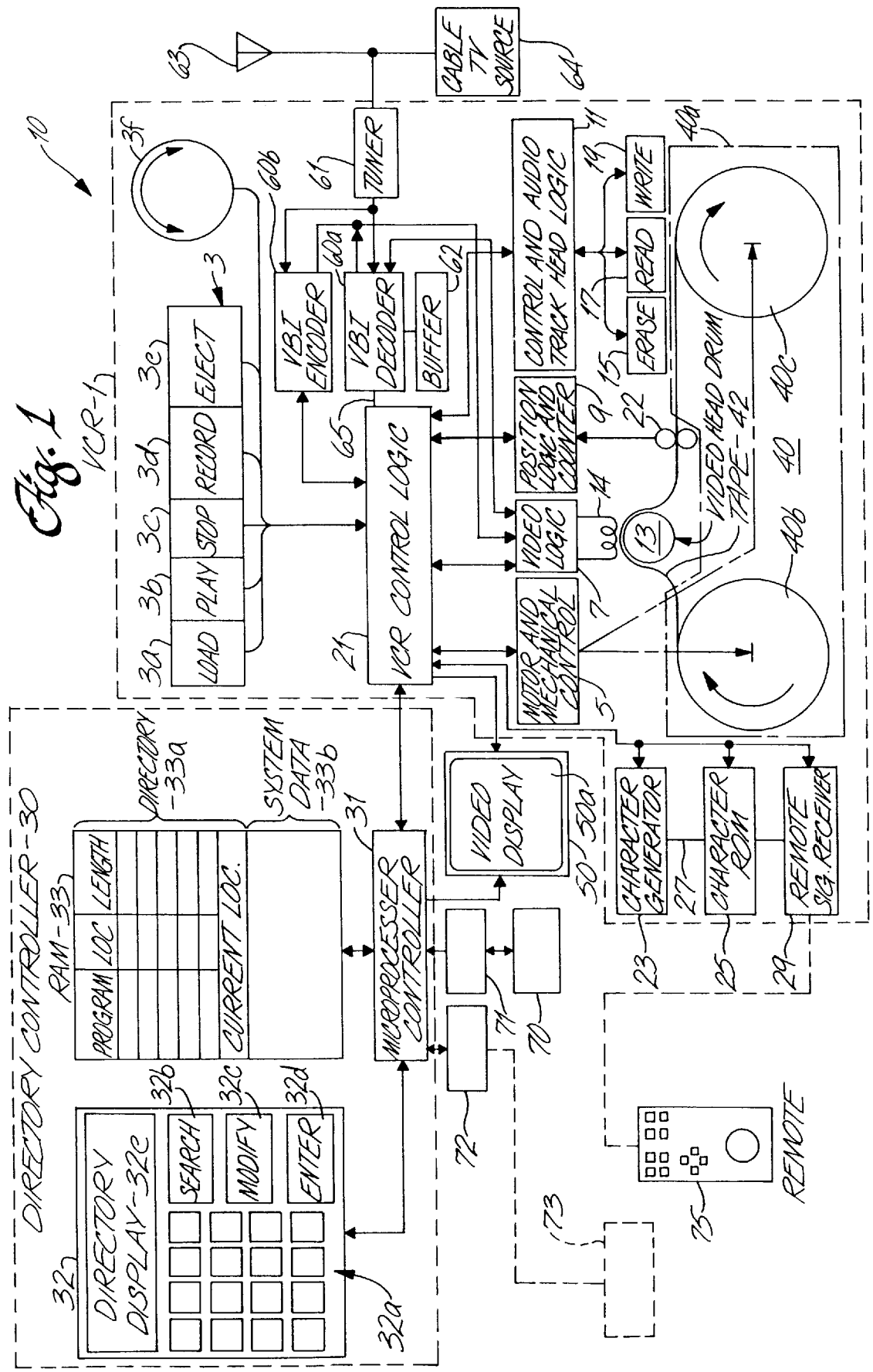
FIG. 1 is a block diagram illustrating a indexing video cassette recorder, using a hybrid indexing system that provides indexing of recorded programs for home recorded tapes, prerecorded tapes, and retroactively indexed tapes, and a standard video cassette format, and that has a directory controller, a bus interface, and an output interface and embodies the invention.

FIG. 1 is a block diagram of an indexing VCR system 10 including a video cassette reader/recorder (VCR) 1 with a conventional video tape cassette 40, a video display 50, and a directory controller 30. The VCR 1 is a conventional video reader/recorder device and uses any one of many different recording technologies such as BETA, VHS, super VHS, 8 mm, VHS-C or any other popular technologies. In particular, VHS-C indexed tapes can be played directly on a VHS indexing VCR with full index functioning. The cassette 40 is a conventional video cassette having a magnetic tape 42 packaged in a cartridge or cassette housing (hereafter called cassette). Even though the size and design of the housing is different for different types of recording technology, the basic information that goes on the tape itself is similar. The technology and operation of a VCR are well understood in the art.

The VCR 1 has a button control panel 3 with control buttons, including LOAD 3a, PLAY 3b, STOP 3c, RECORD 3d, and EJECT 3e, for controlling the operation of the VCR 1. The LOAD button 3a is optional and is not used on machines which load automatically. The VCR control logic circuit 21 receives control signals from the button control panel 3 and controls the overall operation of the VCR 1 by sending control signals to a motor and mechanical control logic circuit 5, a video logic circuit 7, a position logic and counter circuit 9, and a control and audio track head logic circuit 11 of the VCR 1, as well as to the video display 50 and the microprocessor controller 31 of the directory controller 30.

The motor and mechanical control logic circuit 5 controls loading and ejecting of the cassette 40 and also controls movement of the video tape 42 within the video cassette 40 during recording, reading (playback), fast forward, and rewind. The video logic circuit 7 controls the operation of a video read/write head drum 13 in reading from or recording video signals to the tape 42. The electrical signals are magnetically coupled between the video logic circuit 7 and the video head drum 13 using a winding 14. The position logic and counter circuit 9 monitors tape movement through a cassette tape movement sensor 22 and generates signals that represent tape position. The control and audio track head logic circuit 11 controls writing, reading, and erasing of signals on the control or audio track of the tape 42 through the write head 19, the read head 17, and the erase head 15.

The directory controller 30 includes a microprocessor controller 31, a random access memory (RAM) 33 and a directory input/output display and control panel 32. Preferably the microprocessor controller 31 comprises an integrated circuit microprocessor, a program store, such as a read-only-memory (ROM), for storing a control program to implement methods of the invention, and a clock for generating a clock signal for timing functions and providing the time. The time may be set using the directory input/output display and control panel 32 in a manner known in the art. Alternatively, the VCR 1 may maintain the time. The RAM 33 is a conventional random access semiconductor memory which interfaces directly with the microprocessor controller 31. The RAM 33 is preferably non-volatile. Alternatively, the RAM 33 is battery backed up. A portion of the RAM 33 shown as system data 33b, is also used for storing the system software of the microprocessor controller 31. The RAM 33 is also used for storing the program directory 33a. The size of the RAM 33 is at the discretion of the manufacturer. However, the RAM 33 preferably can store the directory of at least 100 tapes. Accordingly, the RAM 33 is preferably at least 128 kbits. Data compression may be used for storing the directory in the RAM 33.

The directory input/output display and control panel 32 has an alphanumeric keyboard 32a and special function keys, such as a SEARCH key 32b for commanding searches for data in the directory 33a and on the tape 42, a MODIFY key 32c for modifying or deleting directory information in the RAM 33, and an ENTER key 32d for entering program directory information. Instead of providing special function keys, functions can also be initiated by entering predefined sequences of conventional keys on the alphanumeric keyboard 32a.

A display 32e is a conventional liquid crystal or other type display for displaying data being entered on the keyboard 32a, and to display the directory or other information stored in the RAM 33. Alternately, as discussed below, an on-screen display 50a can be used. The directory information stored in the RAM 33 is processed by the microprocessor controller 31.

The VCR 1 additionally comprises a character generator circuit 23 coupled to the VCR control logic circuit 21 and to a character generator read-only memory (ROM) 25. Character generators are well-known in the art. Typically, the character generator ROM 25 stores a data table representing pixel or bit patterns of a plurality of alphanumeric characters, such as the Roman alphabet and the Arabic numerals. Upon command by the VCR control logic circuit 21 and the character generator circuit 23, the data in the character generator ROM 25 is read and placed in an output signal to the video display at a position on the display determined by coordinates generated by the microprocessor controller 31. The end result is visual display of a alphanumeric character on the display screen. Character generators are well-known for channel display in television receivers, and for use in professional titling equipment.

The screen 50a is preferably 36 characters×15 rows. As will be described below, a broadcaster preferably broadcasts auxiliary information in this format. For displays with a different format, the indexing VCR 10 reformats the information. For example, a VCR with a higher screen display density, such as 36 characters×15 rows, may center the information in the 24 characters×10 rows format. Alternatively, for a higher screen display density, the data may be broadcasted at the higher density. When there are more rows than can be displayed on one page, the indexing VCR 10 displays a message, such as "(MORE)," to inform the user that there is another page of information.

Commercially available decoder circuits well known in the art for decoding the closed caption broadcasting system for the deaf can be optionally connected to the directory controller 30 for automatic generation of the program title for the directory of the program being recorded. Television broadcasts include titles and subtitles transmitted during the Vertical blanking interval (VBI) portion (described below) of the broadcast video signal, which can be decoded and displayed as text subtitles along with the video image by means of special decoding circuitry. Regular TV receivers do not decode nor process the signal, but with special decoder circuitry, the encoded text can be extracted and fed to the directory controller 30 for automatic generation of the title of the program being recorded. The extracted, decoded program title can be edited by a user or saved in the directory. Thus, the extracted program title can serve as an alternate data input source for the program directory, reducing the needed amount of user input. Other auxiliary information described below may also be broadcasted during the VBI.

As shown in FIG. 1, caption decoding can be implemented by coupling an input of a VBI signal decoder 60a to the output of a tuner 61 which is generally included in the majority of consumer VCR's for off-the-air recording. The tuner 61 receives a broadcast TV signal from an antenna 63 or a cable TV signal source 64. Both the decoder, the tuner, and the interaction of both, are conventional in the art. Examples of commercially available VBI caption decoders include the TeleCaption 4000 Adaptor, commercially available from National Caption Institute, Falls Church, Va., and Teletext Decoder, available from Norpak Corporation, Ottawa, Canada. In a specific embodiment of the present invention, the VBI decoder 60a is a circuit from ITT with part number of CCD3000. The CCD3000 decoder may be set to decode a selected field and line of the VBI by setting a control and status register. Field selection is accomplished by selectively setting bit 4 of the IM BUS control register with a RAM address of 02H. Line selection is accomplished by selectively setting the IM Bus control register a with RAM address of 04H. (See "CCD 3000 Closed-Caption Decoder preliminary", table 4.2, page 31, Edition Apr. 22, 1991, ITT Semiconductors.) A decoder signal line 65 is coupled from the decoder to the VCR control logic circuit 21 to carry decoded caption data to the control logic circuit. The VCR control logic circuit 21 is commanded by the microprocessor controller 31 to pass the decoded data to the directory 33a under control of a stored program in the RAM 33. The program then causes the caption information to be stored as a program title in the directory and displayed on the display 50. The VBI data is sent to the RAM 33 during or immediately before the display of an on-screen directory at step 1408 described below for FIG. 35a, so that when the directory is displayed, the caption data immediately appears in the directory display. A user then can edit the caption to adjust it as desired.

Caption data is placed in a broadcast TV signal by a broadcast TV station in a continuous stream; a user of the VCR 1 cannot stop or slow down the stream without additional hardware. Thus, it is possible that the first caption data received by the antenna 63 is not the program title. This problem can be overcome by coupling a data buffer memory 62 to the decoder. Under control of the decoder, all caption data received by the VBI decoder 60*a* is stored in the caption buffer and serially output to the VCR control logic circuit 21. Each caption data word is displayed in the directory, and the user presses the ENTER button to accept the word and store it as a program title. For a period of time dependent on the size of the buffer and the rate of data received by the VBI decoder 60*a*, received data remains in the buffer from which it can be recalled by a user and saved as a program title. When the buffer 62 fills, any additional data words received will cause overflow, resulting in loss of the earliest received word. If a large enough buffer 62 is used, this overflow effect will not be a problem. The functions of reviewing buffered data and storing saved titles can be controlled by a stored computer program or subroutine in the RAM 33.

Not only can the information (e.g. title, subtitle, program identification) transmitted during the VBI portion be displayed in real time or used to generate program title for the directory, it can be utilized to further facilitate operation of the VCR. For example, by monitoring the transmitted title, the VCR can automatically detect the end of a program and stop recording thereto. Also by monitoring the VBI portion used for transmitting the title, the VCR can filter out (in recording a program) segments that are unrelated to the program (e.g. commercials), by temporarily stopping the VCR if changes in the title portion are detected.

It is disclosed in the preceding paragraphs that the VBI data may be broadcast at a relatively high repetition rate prior to broadcast, enabling a suitable decoder to detect the data. In the system of FIG. 1, the decoder 60*a* can be designed to receive and store in buffer 62 the program identification information from line 21 of field 2 of each frame. Using suitable logic, the program title and other information can be stored automatically in the directory 33*a*, without user intervention.

Caption data decoding is further described in the following specifications, which are hereby incorporated by reference herein: Title 47, Code of Federal Regulations, Part 15 as amended by GEN. Docket No. 91-1; FCC 91-119; "CLOSED CAPTION DECODER REQUIREMENTS FOR THE TELEVISION RECEIVERS"; Title 47, C.F.R., Part 73.682(a)(22), Caption Transmission format; Title 47, C.F.R. Part 73.699, FIG. 6; "TELEVISION SYNCHRONIZING WAVEFORM"; Title 47, C.F.R., Part 73.699, FIG. 17A; "LINE 21, FIELD 1 DATA SIGNAL FORMAT"; and PBS Engineering Report No. E-7709-C, "TELEVISION CAPTIONING FOR THE DEAF: SIGNAL AND DISPLAY SPECIFICATIONS".

Memory Structure

Figure 2:
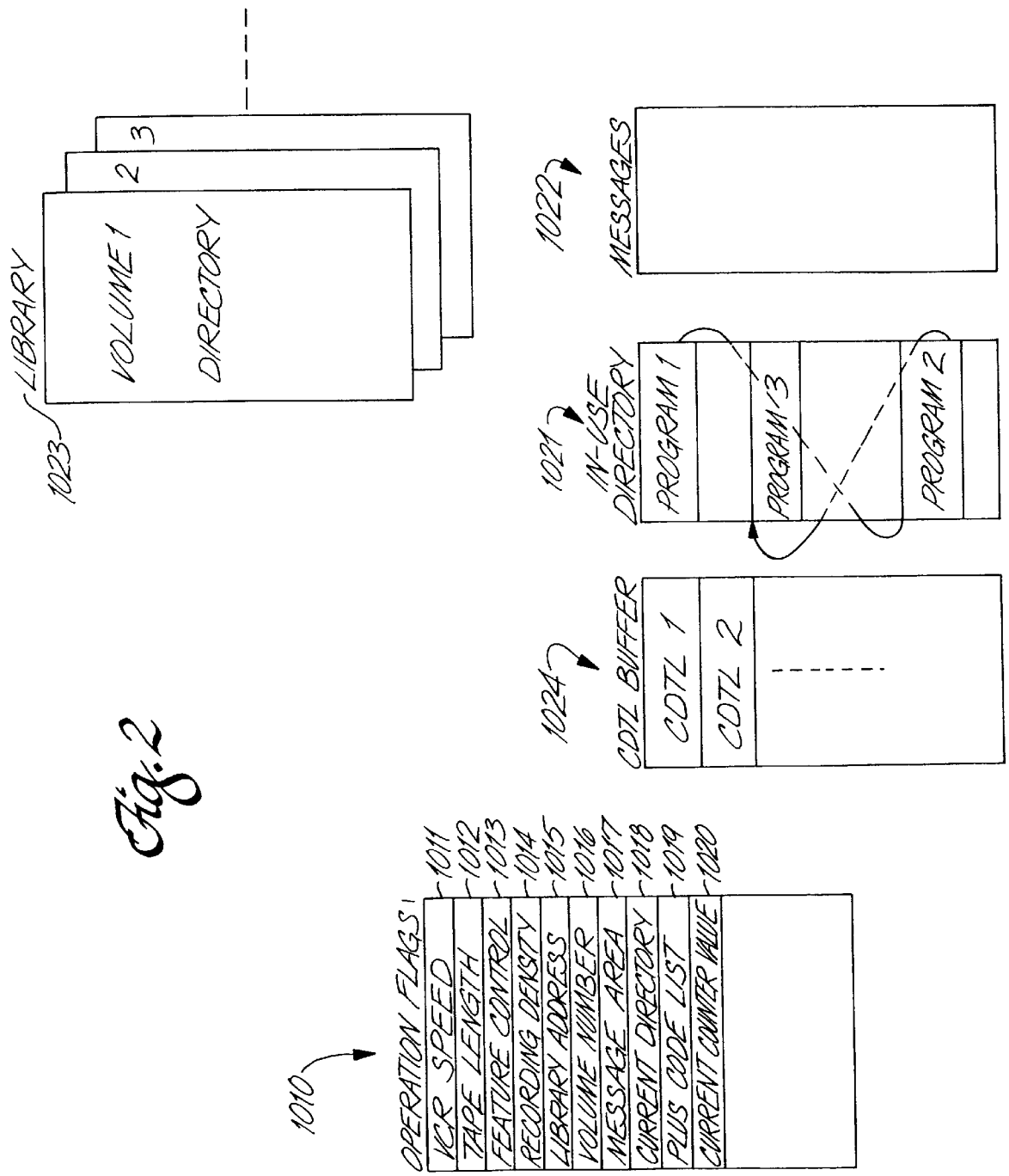
FIG. 2 is a schematic conceptually illustrating a structure of data stored in the RAM of the directory controller of FIG. 1 according to a specific implementation of the present invention.

Now the memory structure of the RAM 33 is described by referring to FIG. 2 which is a schematic conceptually illustrating a typical structure of the data stored in the RAM 33 according to one embodiment of the present invention. The RAM 33 can be viewed conceptually as having an area 1010 for storing operation flags. These flags include a mode flag (MODEFLAG) 1011 for indicating the operation speed (e.g. SP, LP, or SLP) of the VCR 1 and which will be changed whenever the operation speed of the VCR 1 is changed. A tape length flag (TAPELNG) 1012 indicates the length (e.g. E-60, E-90, E-120) of an inserted tape 42. A second memory flag 1014 (SECMEM) stores access information of a secondary memory which may be provided on the cassette 40 for storing directory information. For example, if the secondary memory is a magnetic strip, described below for FIGS. 66–70 and 74–93, SECMEM 1014 may store the recording density of a magnetic strip, or if the secondary memory is a semiconductor memory described below for FIGS. 71–73, SECMEM 1014 may store the access time and capacity thereof.

The flags also include a feature control field (FTCNTL) 1013 for specifying the VCR functions that are available to a user. In the simplest case, if a secondary memory is needed on the cassette for storing directory information, FTCNTL 1013 will be set in one way if an inserted cassette has the secondary memory and in another way if the inserted cassette has no secondary memory. FTCNTL 1013 may also specify other functions, and can be set by reading a code carried at a predetermined area of the cassette (e.g. on a magnetic strip on the cassette housing).

Area 1010 also stores a message pointer 1017 pointing to a message area 1022 which stores input and output messages; and a CDTL pointer 1019 pointing to a CDTL buffer 1024 which stores channel-date-time-length (CDTL) data of future recordings.

In a preferred embodiment, a library 1023 is also provided in the RAM 33. The library 1023 stores directories of tapes which users of the VCR 1 have archived. Each directory stored in the library contains substantially the same information as the in-use directory. If a library is present, a library pointer 1015 is provided for pointing to the library 1023.

A directory pointer 1018 is also provided for pointing to an in-use directory 1021 which stores the directory of the currently inserted tape. This directory pointer 1018 may actually point to a location in the library wherein the directory of the tape is located.

In addition, the area 1010 also stores a volume number field (VOLNO) 1016 which stores a counter value representing the number of tape directories already stored in the library 1023. Other flags may be added as needed.

Figure 3:
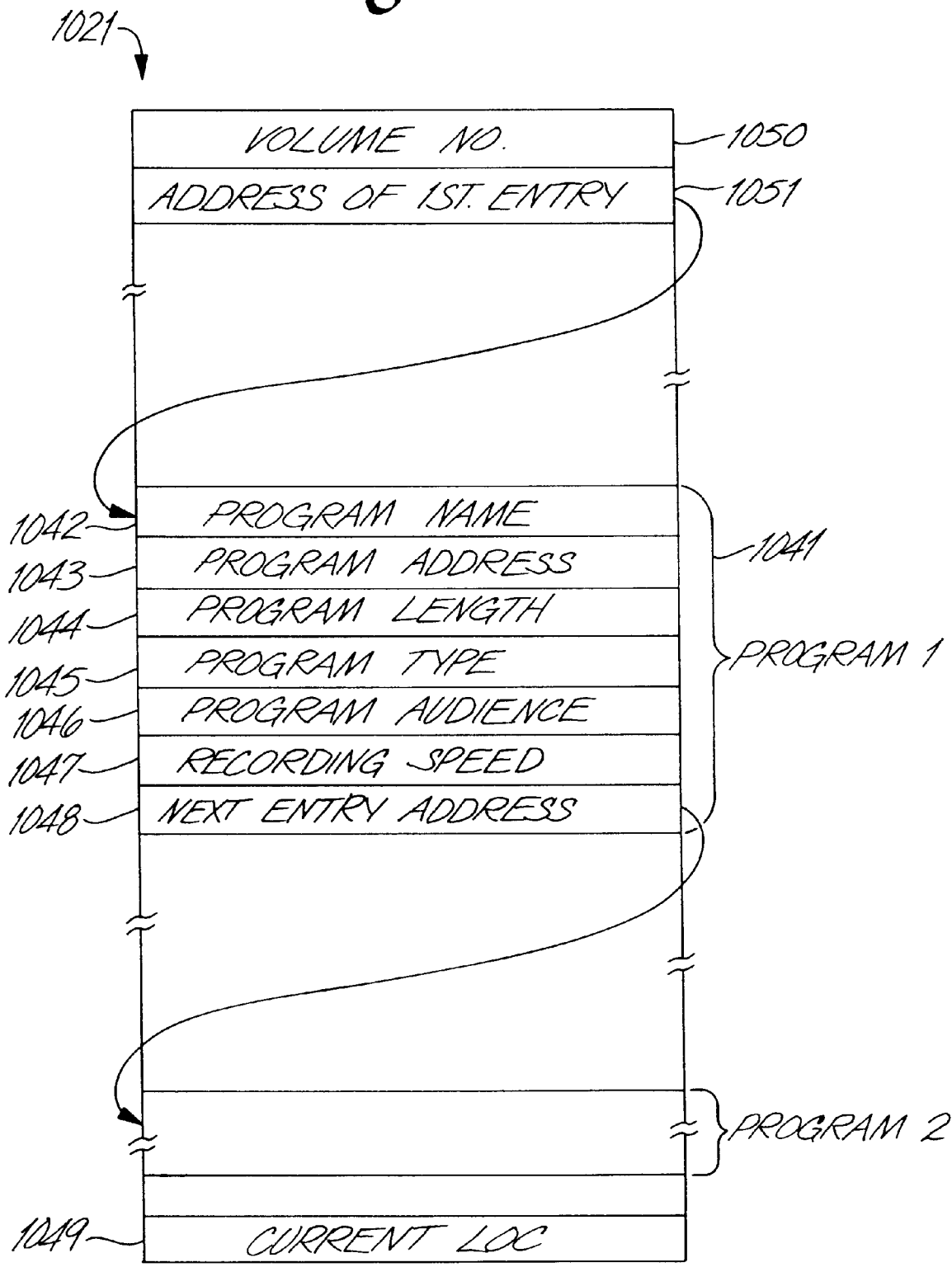
FIG. 3 is a schematic illustrating a conceptual structure of an in-use directory in the data structure of FIG. 2 according to a specific implementation of the present invention.

Referring to FIG. 3, which is a schematic illustrating a conceptual structure of the in-use directory 1021 in the data structure of FIG. 2, the in-use directory 1021 stores the directory of the cassette tape currently inserted into the VCR 1. For each program recorded on the cassette tape, a corresponding entry 1041 is set up in the in-use directory 1021. For purposes of illustration, FIG. 3 shows the entry 1041 only for program 1. However, each program similarly has an entry 1041. Each entry 1041 stores a title or program name (PROGRAM) 1042; a program address (LOC) 1043 which stores the absolute tape counter value of the beginning of the program; a program length value (LENGTH) 1044 which stores the length of the recorded program, represented as a function of the difference between its address from the address of the next program or record or a measure of time from a fixed reference point, such as the beginning of the tape; an optional program type field (TYPE) 1045 which stores the category of the recorded program; an optional program audience field (AUDIENCE) 1046 which stores the recommended audience of the program; and an optional recording speed (SPEED) 1047 which stores the speed at which the program is recorded.

A current tape location (CURRENT LOC) 1049 is also stored in the directory for indicating the absolute position from the beginning of the tape 42 in the cassette 40 where the valid directory is located, or the value of the tape counter when the tape is ejected. This field is used for setting the tape counter when the tape is reloaded into the VCR 1. The recording on the tape of the absolute tape position is described below.

A field 1051 is a pointer pointing to the address of the first entry of the directory 1021 represented in FIG. 3 by an arrow pointing to the program name (PROGRAM) 1042. Each entry also has a field 1048 storing the address of the next entry in the directory also represented in FIG. 3 by an arrow pointing to program 12. These fields provide a link from one entry to the next entry and are used for facilitating search, deletion, and addition of entries. In the preferred embodiment, the directory information is not stored on the tape 42, but is retrieved from the library 1023. In this embodiment, a volume label (VOLNO) 1050 is provided in the in-use directory 1021. This field is used for retrieving the directory information of the tape from a library 1023 stored in the RAM 33.

Each item in the directory can be modified through the use of the buttons on the keyboard 32a and the special function keys 32b, 32c, 32d of the directory controller 32, as will be described below.

Tape Format

Figure 4:
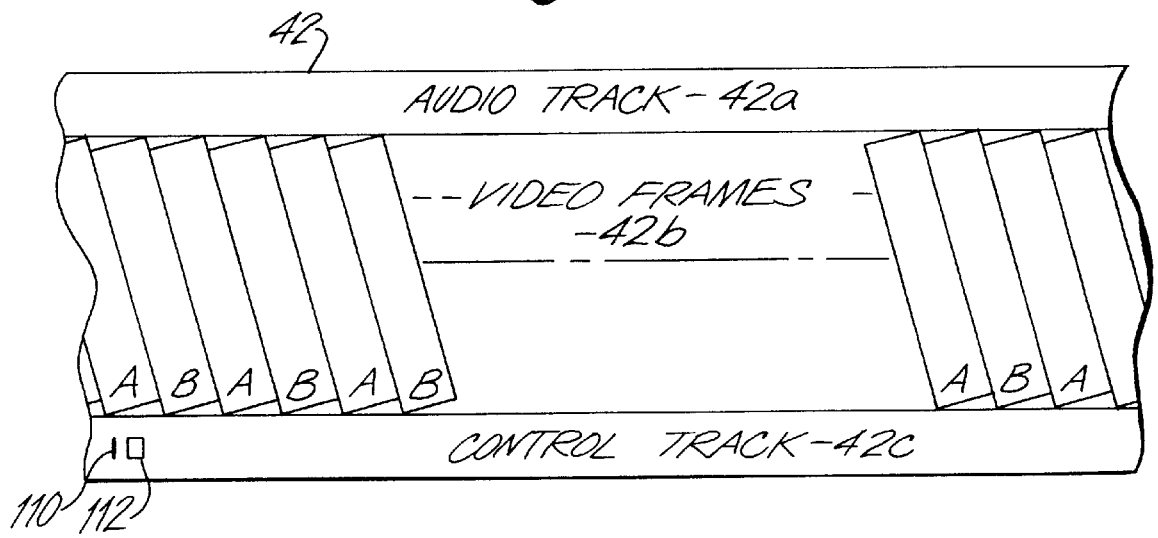
FIG. 4 is a graphical representation of the format of the information recorded on the magnetic tape in the cassette of FIG. 1 with markers and directories in the control track.
Figure 5:
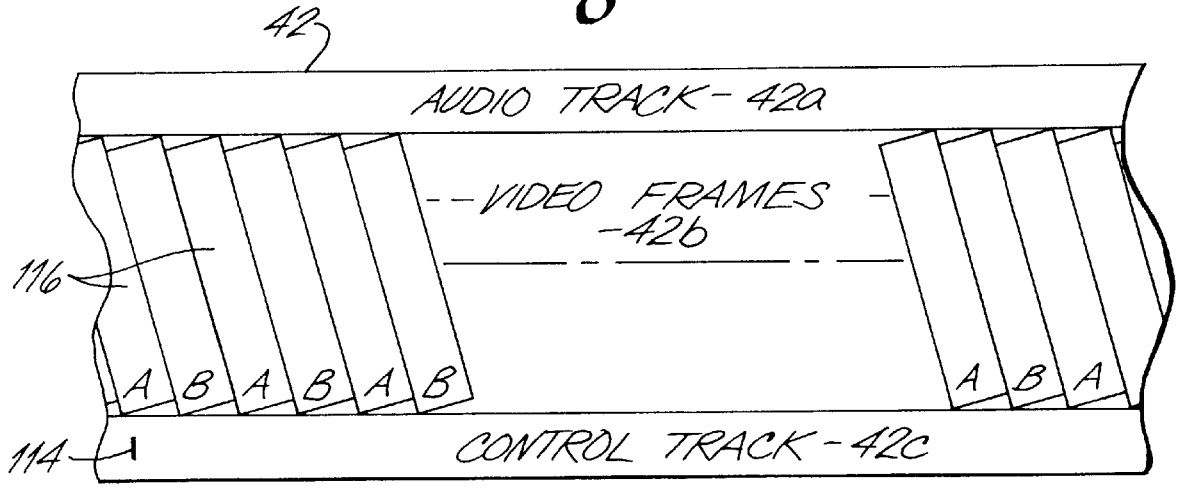
FIG. 5 is a graphical representation of the format of the information recorded on the magnetic tape in the cassette of FIG. 1 with markers in the control track and the directories in the fields of the video frames.

By way of background, the format of the tape 42 is now described. FIGS. 4 and 5 illustrate the information content of one example of video tape for both BETA and VHS format which both use the same general tape layout. The tape 42 is divided into three areas. A narrow strip running along the upper edge of the tape 42 is an audio track 42a which contains audio signals. A second narrow strip running along the bottom edge of the tape is a control track 42c which contains synchronization ("sync") control signals. The middle area 42b is for video signals which are recorded in pairs of parallel fields going up and down the width of the tape at a slight angle. The markers 110, 112, and 114 will be described below.

The video head drum 13 is fitted with two read/record heads 180 degrees apart, so that even numbered lines make up one field and odd numbered lines make up the other field. To reduce flicker on the video screen, these fields are projected onto the face of the cathode ray tube (CRT) screen 50a of the video display 50 at alternating intervals.

Decoding VBI Information

Video images in cathode ray tube (CRT) type video devices (e.g. television) are generated by scanning a beam along a predefined pattern of lines across a screen. Each time all the lines are scanned, a frame is said to have been produced. Each video frame in the broadcast signal is divided into two fields, referred to as field 1 and field 2.

The VCR control logic circuit 21 scans the beam typically from the top, left hand corner and scans across the screen. After it finishes scanning one line, the beam returns to the left-hand side and repeats along another line which is parallel to but lower than the previous line. The scanning continues along the odd-numbered lines until the beam reaches the center of the bottom part of the screen. These odd-numbered lines form field 1.

From the bottom center of the screen, the beam returns to the top, where it starts scanning from substantially the center of the screen along the even-numbered lines which interlace the lines of field 1. The even-numbered lines form field 2. When the beam reaches the bottom, right-hand corner of the screen, a picture frame is formed. In the NTSC protocol widely used in North America, each field contains 262.5 horizontal lines and a pair of fields constitute a single 525 line video frame and creates one video picture at one instant in time on the video display 50.

During the time in which the beam returns from the bottom to the top of the screen, it carries no television signals because it does not produce any picture element on the screen. This time interval is generally known as the vertical blanking interval (VBI). Its duration is generally several times the time duration when the beam takes to scan across the screen. In other words, the length of the VBI is equal to the time for the beam to scan several lines. Thus, the VBI typically contains a plurality of lines and is identified by the field with which it is associated. Apparatus and methods using these techniques are well known in the art and therefore are not discussed in detail herein.

Since no image element is produced on a television screen during a vertical blanking interval, no information therefore needs to be carried by the broadcast signals. Thus, proposals have made to use the VBI for conveying auxiliary information from a television network or station to the audience. For example, Closed-Caption data associated with a television program are transmitted as encoded composite data signal during VBI line 21, field 1 of the standard NTSC video signal, at a rate of 480 bits per second. In the above-identified Draft EIA-608, information are sent in the VBI as packets. Currently, six classes of packets are proposed, including:

- a "Current" class for describing a program currently being transmitted;
- a "Future" class for describing a program to be transmitted later;
- a "Channel Information" class for describing non-program specific information about the transmitting channel;
- a "Miscellaneous" class for describing other information;
- a "Public Service" class for transmitting data or messages of a public service nature such as National Weather Service Warnings and messages; and
- a "Reserved" class reserved for future definition.

According to the E.I.A. proposal, a packet is preceded by a Start/Type character pair, followed by information/ informational characters pairs until all the informational characters in the packet have been sent.

Table I lists a subset of the control and type codes of various kinds of information to be broadcasted in the VBI according to the E.I.A. proposal. For example, to transmit the program identification number (scheduled start time) of a program, a control code of 01h, a type code of 01h and a packet of four characters (one character specifying the minute, one character specifying the hour, one character specifying the date and one character specifying the month) are sent. Similarly, to transmit the program name, a control code of 01h, a type code of 03h and a packet of between 2 to 32 characters are sent. As another example, the VBI may also be used to transmit a time-of-day value, by sending a control code of 07h, a type code of 01h and a packet of two characters.

TABLE I

| CONTROL CODE | TYPE CODE | |
|---|---|---|
| 01 h | 01 h | PROGRAM IDENTIFICATION NUMBER (PROGRAM START TIME) |

TABLE I-continued

| CONTROL CODE | | TYPE CODE |
|---|---|---|
| (CURRENT CLASS) | 02 h | LENGTH/TIME-IN-SHOW |
| | 03 h | PROGRAM NAME |
| | 04 h | PROGRAM TYPE |
| | 05 h | PROGRAM AUDIENCE |
| | 06 h | AUDIO SERVICES |
| | 07 h | CAPTION SERVICES |
| | 09 h | ASPECT RATIO INFORMATION |
| | 0Ch | COMPOSITE PACKET-1 |
| | 0Dh | COMPOSITE PACKET-2 |
| | 10 h–17 h | PROGRAM DESCRIPTION YOU 1 TO YOU |
| 05 h (CHANNEL INFORMATION CLASS) | 01 h | NETWORK NAME |
| | 02 h | CALL LETTERS (STATION ID) AND NATIVE CHANNEL |
| 07 h (MISCELLANEOUS) | 01 h | TIME OF DAY |
| | 02 h | IMPULSE ID |
| | 03 h | SUPPLEMENTAL DATA LOCATION |

Figure 6:
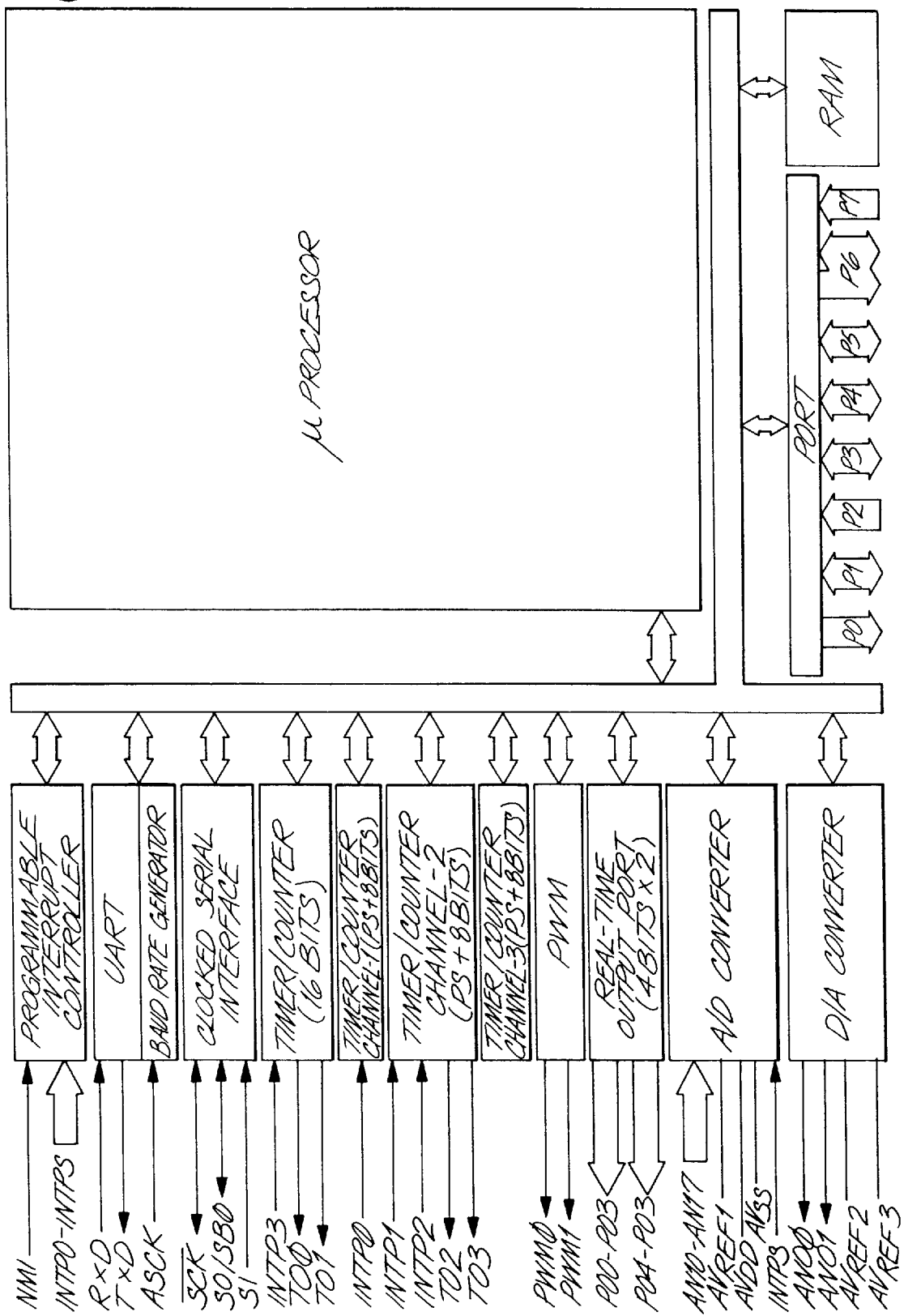
FIG. 6 is a block diagram illustrating the microprocessor controller of FIG. 1 and its interfaces for implementing a specific embodiment of the present invention.

Referring back to FIG. 1, the microprocessor controller 31 controls the sequence and operation of the directory controller 30 and interfaces with the VCR control logic circuit 21 to implement the necessary functional capabilities for reading, updating and recording the directory. The microprocessor controller 31, according to a specific embodiment, is a microcomputer chip with part number of UPD78234 from NEC Corporation, a logical block diagram of which is illustrated in FIG. 6. This microcomputer chip preferably is a microprogrammed processor capable of accessing a data memory of up to one megabyte. A plurality of input/output ports, P0–P7, are provided for coupling to various components of the VCR 1, such as the motor and mechanical control logic circuit 5, the video logic circuit 7, the position logic and counter circuit 9, and the control and audio track head logic circuit 11. Asynchronous communication between the microcomputer chip and these components is achieved by the provision of a plurality of interrupt inputs INPT0–INPT5.

FIG. 7 shows a block diagram of another specific implementation of the microprocessor controller 31. A chip 701 performs the vertical and horizontal synchronization separation of the VBI lines. The chip 701 also slices and encodes the VBI lines. This chip performs the functions of the VBI encoder 60b, and the buffer 62 (see FIG. 1). A chip 702 controls the RAM 33 and performs error correction and decryption for some type of data coming from the chip 701. The chip 702 also provides an interface with the serial link (I-LINK) and an interface with the VCR control logic circuit 21. The chip 702 also controls the RAM 33. The microprocessor controller 31 in the indexing VCR 10 performs all indexing functions and human interface, interprets (e.g. tab, indent, screen format, attributes) and processes the auxiliary information display. The microcontroller also performs all normal indexing VCR 10 functions.

In this embodiment, the interface between the chip 702 and the VCR control logic circuit 21 is a clock serial bus via two or three I/O lines which is hardware selectable by the two/three pin mode input signal to the chip 702. The interrupt signal line allows the VCR control logic circuit 21 to monitor the status of the chip 702 by interrupt. In a two pin configuration, the data I/O signal line functions as a two way signal path between the VCR control logic circuit 21 and the chip 702. In the three pin configuration, the chip 702 provides data on a data output signal line. Also, in the three pin configuration, the VCR control logic circuit 21 sends data on the data "I" line to the chip 702. The external length enable signal enables the chip 702 to communicate with the external RAM 73. The MSB/LSB select signal sets the serial bus to MSB first.

Indexing Overview

The VCR uses the directory described above in FIGS. 2–3 to perform searches of the user's tape library to find the tape that a selected program is on. The directory of a particular tape may be searched using keywords, or title information to locate a program on the tape. The tape may then be advanced to the selected program. Indexing is used herein to describe these searches, the generation of these directories, and all related functions.

The indexing VCR 10 provides a hybrid method for indexing recorded programs, which are recorded on one of three types of tape: home recorded tapes, prerecorded tapes, and retroactively indexed tapes. A home recorded tape (HR tape) is a tape on which the user has made recordings from broadcast or cable by either real time recording, timer programming his VCR, or using a VCR PLUS+™ programming system. As will be described below, the index is created at the time of recording by the VCR. The second type of tape is a prerecorded tape (PR tape) that is a commercially purchased tape, such as a Raquel Welch work-out tape, a karaoke tape, songs, lectures or speeches, that contains many titles on it or may contain only one program. These tapes are not expected to be overwritten. As used herein, a PR tape is a tape that is not expected to be overwritten. The index is stored on the tape by the video publisher at the time of the recording. The third type of tape is a retroactively indexed tape (RI tape) which is a previously unindexed recorded tape on which the user retroactively adds an index. For this type of tape, the index is added by the VCR at the time of the retroactive indexing. For the HR tapes and the RI tapes which are both produced by the home VCR, the directories all reside in the RAM 33 of the indexing VCR 10.

As will be described in detail below, each tape has tape identification numbers (TID) written at some repetition rate along the whole tape on either a VBI line for HR tapes or on a control track 42c for RI tapes.

If the directory or directories are stored in the video fields, corruption of video signals with directory signals on selected video fields, such as a few odd fields spaced apart by a certain number of fields, has little noticeable visual degradation of the video picture. This is because the human brain retains a visual image for a brief period after the image is removed ("persistence of vision").

The TID's reference the tape to a corresponding directory stored in the RAM 33. When either a HR tape or a RI tape is inserted into the VCR, the VCR locates and reads the tape identification and then retrieves the corresponding directory from the RAM 33. This operation is preferably independent of the point of tape insertion to thereby effectively create a random access capability for selections on the tape. On the other hand, for PR tapes which are produced by the video publisher, the directory is stored on the tape preferably by writing it repeatedly on a VBI line. When the PR tape is inserted into an indexing VCR, the indexing VCR 10 independently of the point of tape insertion can quickly locate and read a copy of the directory from the VBI line. Thus, the PR tape can be read by random access also.

In one embodiment, RI tapes are created by only writing VISS marks on the control track and manually entering the program title information into the memory. Because this embodiment does not add TID information to the tape itself, the user must identify the tape to the indexing VCR. Once the tape is identified, the VCR operates as if the RI tape is an HR tape. Consequently, the tape becomes random access at this time and not when the tape is first inserted.

The VCR 1 includes a VBI encoder 60b coupled to the video logic circuit 7 which receives digital data, such as tape label (e.g. a volume number), directory, and/or addresses, from the microprocessor controller 31 and encodes such data for recording into the VBI portion of the video signals which are to be recorded on the cassette tape 40. When line 21 field 2 is encountered, the digital data stored in the registers are output so that they can be written on the video track as described above.

VBI encoder 60b can be implemented in a similar manner as one of those already existing in the art, e.g. encoders for encoding closed-caption data into the VBI portions of video signals. An exemplary implementation of the VBI encoder 60b is also illustrated in the schematic block diagram of FIGS. 9a and 9b. Such implementation is explained herein with reference to the timing diagram shown in FIG. 8.

FIG. 8 is a timing diagram showing the format of the line 21 field 2 video signals. The figure shows the signals being preceded by a line synchronization pulse, followed by color burst signals. The color burst signals are followed by a blanking level, 7 cycles of clock run-in signals and then the data signals.

Exemplary VBI Encoder

Figure 9A:
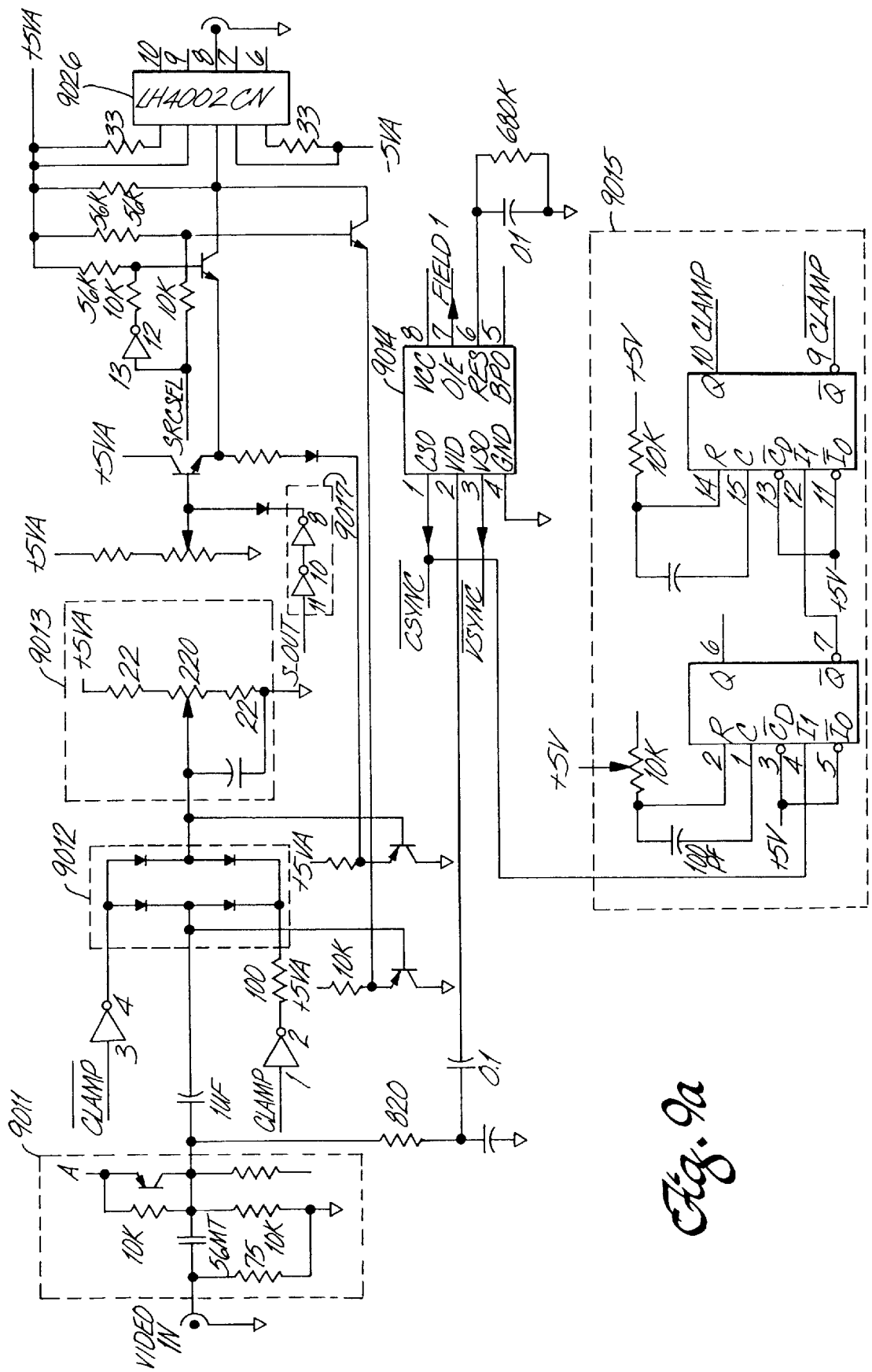
FIGS. 9a–9b are parts of a schematic circuit diagram of a VBI encoder shown in FIG. 1.
Figure 9B:
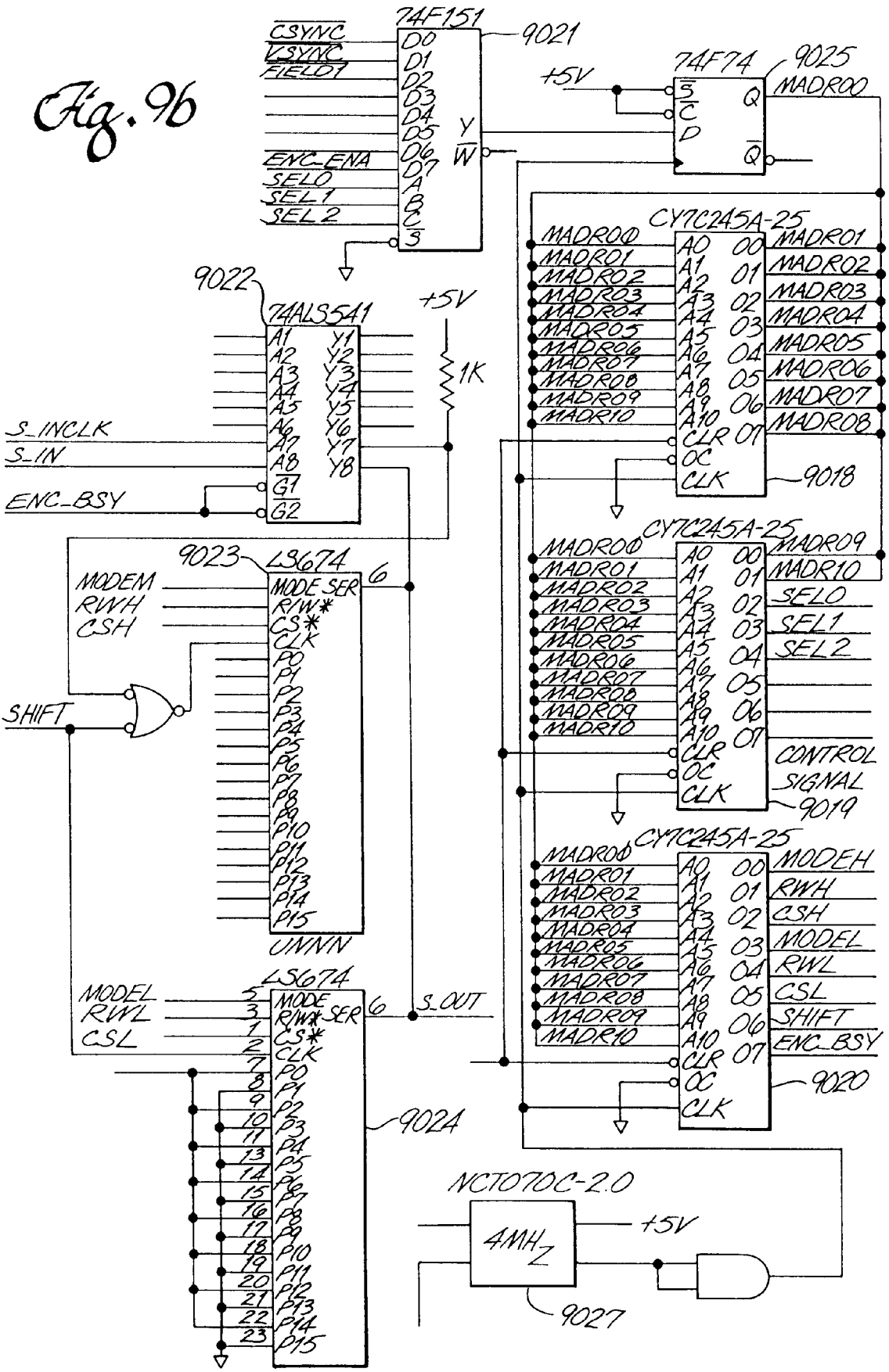

Refer now to FIGS. 9a and 9b, the VBI encoder 60b receives the video signal VIDEO IN from the tuner 61 for recording onto a cassette tape. A buffer 9011 is provided to receive the video signal VIDEO IN so that the tuner 61 is not loaded down by the VBI encoder 60b. The output from the buffer 9011 is provided to a clamping circuit 9012 so that the D.C. level can be restored to facilitate inserting of information signals into the video signals. The D.C. level is fixed by a circuit 9013, by setting the variable resistor therein.

The output from the buffer 9011 is also provided to a decoder 9014 which is an integrated circuit, such as part no. LM1881N from National Semiconductor. The integrated circuit decodes the video signal to produce a composite sync $\overline{\text{CSYNC}}$ signal, a vertical sync $\overline{\text{VSYNC}}$ signal, and a field signal FIELD 1.

The composite sync $\overline{\text{CSYNC}}$ signal is provided to a circuit 9015 whereby a monostable one-shot signal with a fixed pulse width is produced. Two output signals are generated from the circuit 9015 and they are used as the input signals, $-\overline{\text{CLAMP}}$ and CLAMP, into the clamping circuit 9012.

Input data (i.e. directory information or address) signal S_IN for encoding into the VBI and a clock by a signal S_INCLK are provided to a register 9023 (see FIG. 9b) through a buffer 9022. These signals may be sent by the microprocessor controller 31 from one of its output ports.

A circuit 9024 is another register circuit. Its inputs are alternately connected to high and low voltage levels. This circuit is used for producing the clock run-in signals, as shown in FIG. 8, before data are stored into the VBI.

Data from the register circuits 9023 and 9024 are provided as signals S_OUT into a circuit 9017 (see FIG. 9a). The data signals from the circuit 9017 are combined with the D.C. signal outputted from the circuit 9013 (so that they have the same D.C. level as the video signals). When the data signals are to be written onto the tape, the data from the register 9023 (see FIG. 9b) will be written first. A signal, SRCSEL, which is generated from the microprocessor controller 31, is used to select whether the signals for recording into the video track through a chip 9026 (see FIG. 9a) should come from the data signals (which may contain directory or address information) or the broadcast video signal VIDEO IN.

Referring back to FIG. 9b, operation of the encoder is controlled by a sequencer formed by chips 9018, 9019, 9020 and 9021 operating in conjunction with the chip 9025, a 74f74 D flip-flop and a clock signal from the clock circuit 9027.

Figure 9C:
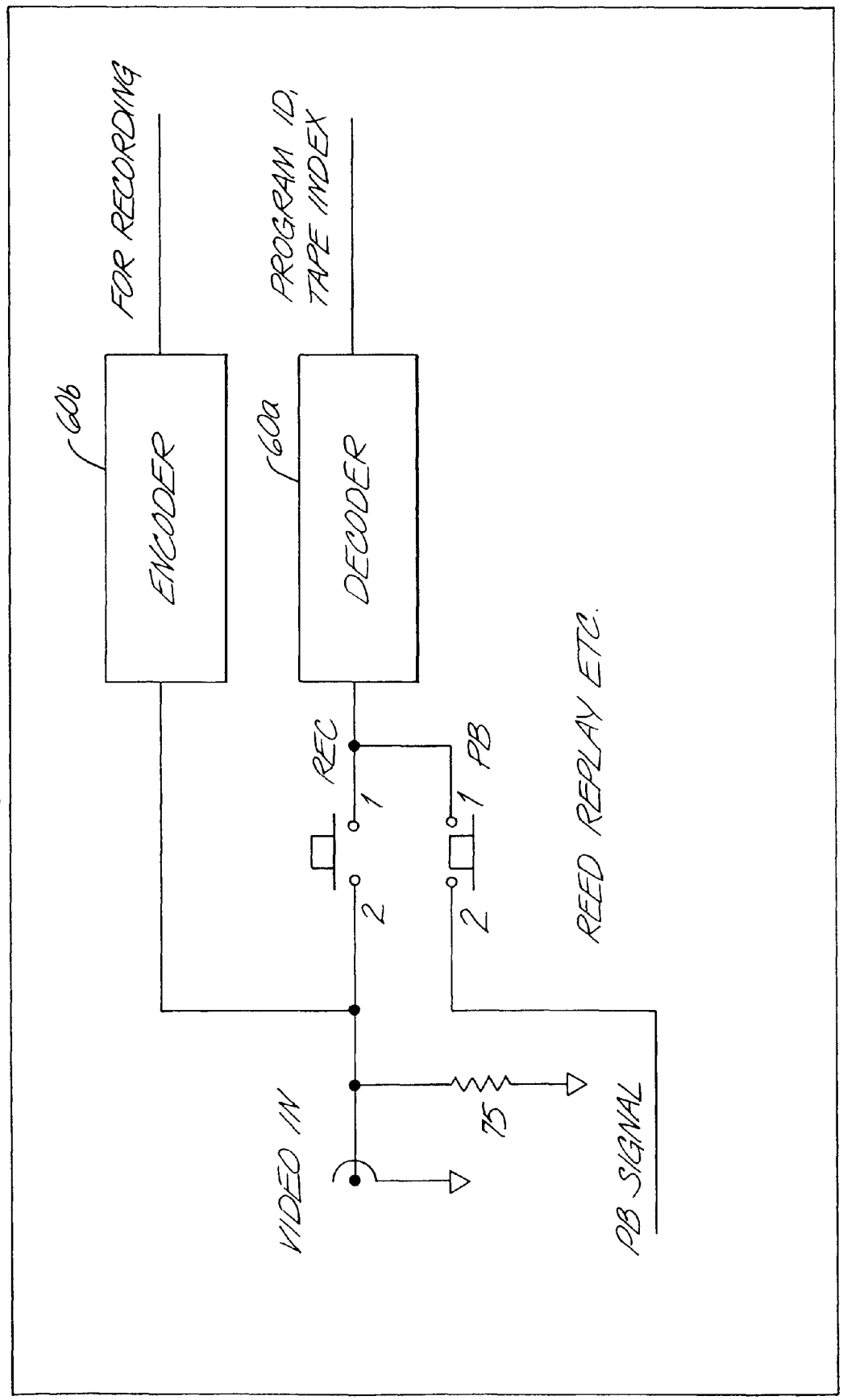
FIG. 9c illustrates a VBI decoder for decoding both broadcast signals and recorded signals.

As illustrated in FIG. 9c, the VBI decoder 60a can be used at different time durations to decode either the broadcast signals (Video In) from the tuner 61 or the recorded signals (PB Signal) read by the video logic circuit 7 from the tape 42. When the VCR 1 is recording a program, the VBI decoder 60a operates to decode information in the VBI of the broadcast signals. When the VCR 1 is playing back a program from the cassette tape 40, the VBI decoder 60a can operate to decode information stored in the VBI of the recorded signals (e.g. previously recorded directory information).

It needs to be noted that although the decoder 60a in the embodiment is used both for decoding broadcast signals and recorded signals, it will be understood that a separate decoder can be provided for each operation. Moreover, although the decoder 60a and the encoder 60b are shown and described as two units, they can be incorporated into a single semiconductor chip or implemented by discrete logic components. In the implementation of FIG. 7, the chip 701 performs the VBI signal processing.

Prerecorded Tape

As described above, prerecorded tapes (PR tape) are manufactured by a tape publisher and contain a plurality of different titled programs thereon. A program directory or directories containing information about the names and locations of each program or record on the tape is stored on the tape. In one of the specific embodiments, the label (e.g. a volume number or a name) for the tape is also recorded.

Either the video frames 42b or the control track 42c (see FIGS. 4–5) may be used for storing the program directory (s). In one embodiment, the program directory is stored, by the VCR control logic circuit 21 under control of the microprocessor controller 31, in the control track 42c and in another embodiment in odd and/or even numbered fields of spaced apart pairs of video fields, either as full video frame or in the VBI.

Using the Control Track

It is well understood that modern video recorders typically have a capstan for pulling the cassette tape past a rotating video head drum. The control track 42c on the tape is normally provided for recording a synchronization pulse for synchronizing the rotation of the capstan with the rotation of the video head drum. The synchronization pulse is conventionally a 30 Hz pulse, with only the leading edge being used for the synchronization. According to the present invention, directory information can be stored on the control track by modifying the control track pulse duty cycle so that the location of the flux reversal on a prerecorded video tape is modified so that these relative locations represent digital data.

Figure 10G:
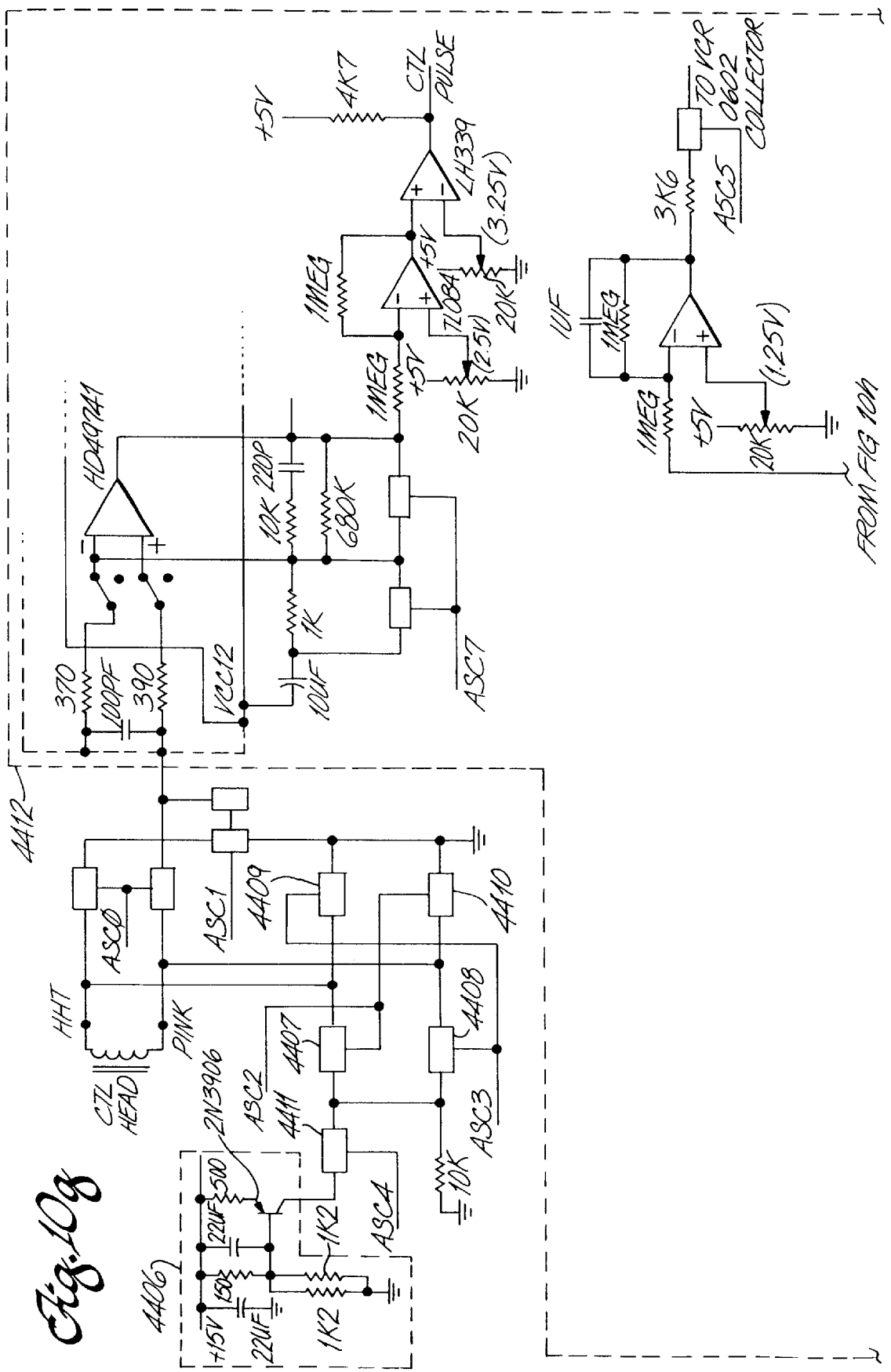
Figure 101I:
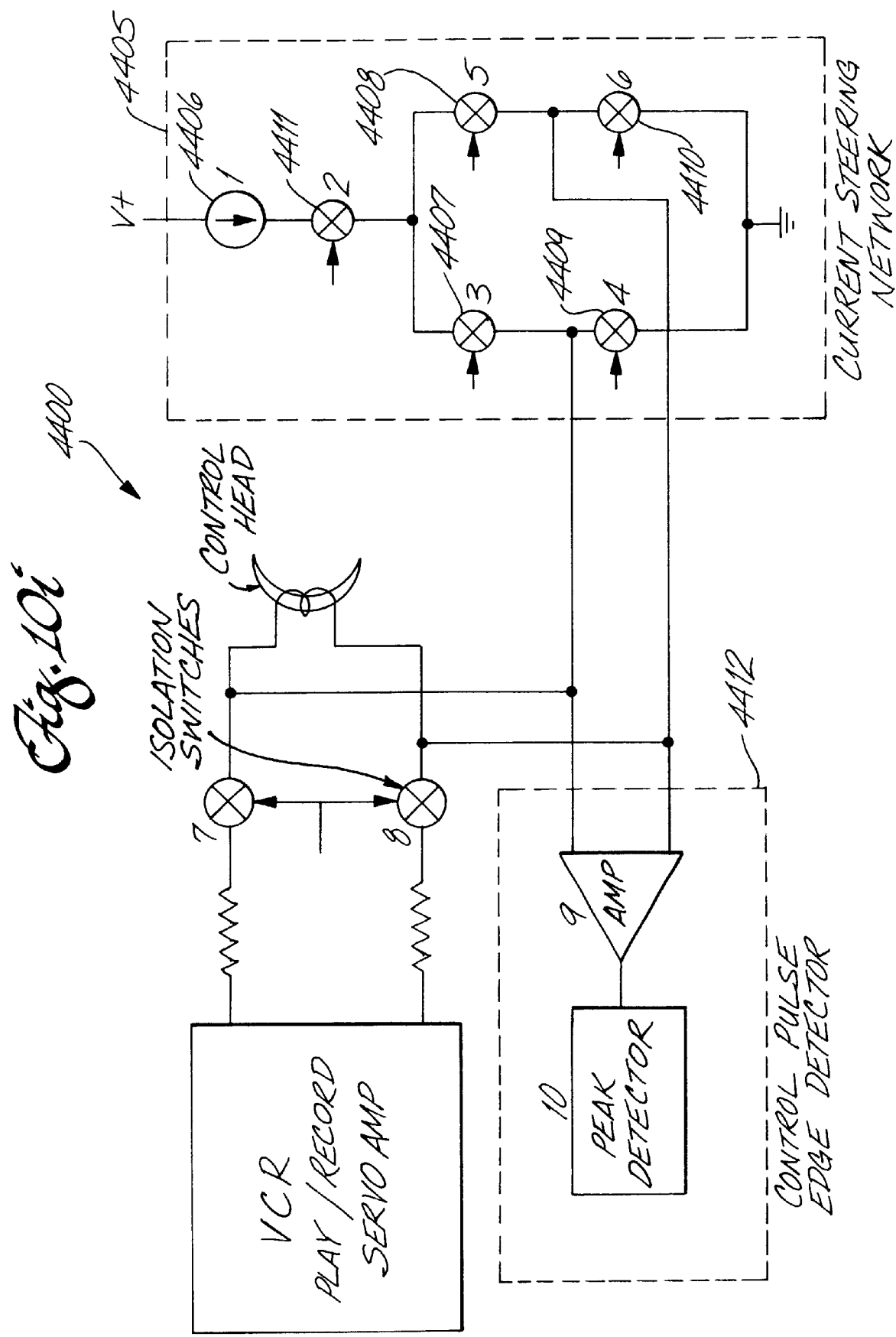

FIG. 10a is a timing diagram showing the synchronization pulse recorded on the control track. FIG. 10d is a timing diagram showing the head signals generated by the control pulse edge detector shown in FIG. 10f. FIG. 10e is a timing diagram showing the head signals generated by the control pulse edge detector shown in FIG. 10f in response to the current flow shown in FIG. 10c. The negative going head signal shown in FIG. 10d corresponds to the leading edge of the control pulse shown in FIG. 10a which will not be modified during the encoding of data. In a standard video recorder, when no data is recorded, the falling edge of each pulse occurs at substantially the mid-point 4401 of a pulse interval. According to one implementation of the present invention, to encode one of the binary values (e.g. "0"), the falling edge is shifted forward (the corresponding positive going head signal shown in FIG. 10d is also shifted), e.g. to a time 44 or at about 37% of the pulse width 4402 from the rising edge. To encode another one of the binary values (e.g. "1"), the falling edge is shifted backward, e.g. to a time 4403 at about 63% of the pulse width from the rising edge. Alternatively, the time of the pulse width may be other values, e.g., a "0" may be 30% and a "1" may be 70%. The position of the positive going head signal is shown in its modified location by the circuit 4400 to be described in connection with FIGS. 10f and 10g depending on the data that the signal represents.

Because the leading edge of the pulse in FIG. 10a or the corresponding negative going pulse in FIG. 10d is not rewritten, the timing between negative going pulses is uniformly spaced at the control track 30 Hz frequency. However, in areas where two separate recordings adjoin, this uniform timing may not be met and the written data may be in error. Thus, it may be necessary to use preambles and post-ambles to identify encoded data and either error detection codes such as cyclic redundancy codes or checksums to ensure data integrity. FIG. 10b is a timing diagram showing the synchronization pulses recorded on the control track when a binary bit "0" is to be written at one time instant (one frame) and a binary bit "1" is written at another time instant (another frame).

Normally, the synchronization pulses on a control track are recorded by saturated magnetization. To alter the timing of a falling edge, appropriate current must be applied to shift the magnetization at the altered portion of the track. To advance the falling edge, as when a "0" is to be written, a first current (e.g. negative) must be applied so as to cause the magnetization between time 4402 and time 4403 to be in one direction. To delay the falling edge, as when a "1" is to be written, a second current opposite in polarity to the first current (e.g. positive), must be applied so as to cause the magnetization between time 4402 and time 4403 to be in another direction.

FIG. 10f is a block diagram of a circuit 4400 for controlling the reading and writing of encoded data signals on the control track. FIG. 10g is a detailed schematic of the circuit 4400. The circuit 4400 comprises a current steering network 4405 which comprises a plurality of analog current switches controlled by a microprocessor 4413 (for clarity, control signals are not shown in FIG. 10f). The microprocessor 4413 is preferably a NEC 78238 microprocessor. By activating the appropriate switches, current may be driven through a control head in a desired direction and at a predetermined timing relation to the leading edge of the control pulse.

The current steering network 4405 has a current source 4406 which provides a constant current through a control switch 4411 into two current paths, a first path formed by current switches 4408 and 4410, and a second path formed by current switches 4407 and 4409. The control inputs of current switches 4408 and 4409 are coupled to a common control signal (ASC3). The control inputs of current switches 4407 and 4410 are coupled to another common control signal (ASC4). To write a "0" to the control track, current switches 4408 and 4409 are closed and current switches 4407 and 4410 are opened during the time duration between 4402 and 4403. As a result, a current passes from the current source 4406 through the current switch 4408 into the lower terminal of the control head, exits from the upper terminal of the control head and passes through the current switch 4409 to ground. To write a "1" to the control track, current switches 4407 and 4410 are closed and current switches 4408 and 4409 are opened during the time duration between 4402 and 4403. As a result, a current passes from the current source 4406 through the current switch 4407 to the upper terminal of the control head, exits from the lower terminal of the control head and passes through the current switch 4410 to ground.

By selectively controlling the closing and opening of the two pairs of current switches, current of opposite polarity can be caused to flow through the coil of the control head, as illustrated in FIG. 10c. The current changes the direction of magnetization of the control track, advancing the flux change in one instance and delaying the flux change in another instance, thereby recording encoded data onto the track. As described, information is encoded on the control track at one bit per frame as illustrated in FIG. 10e. In other embodiments, different duty cycles may be used to encode different values; for example, if 32 different duty cycle values are used, then 5 bits of information can be encoded into one frame.

Data written on the control track 42c are read by the control pulse edge detector circuit which comprises generally a preamplifier for amplifying the control pulse read from the tape and a comparator for generating a pulse corresponding to the logic level recorded on the tape 42. The edge of this logic pulse corresponds to the flux transitions on the tape.

The pulses on the control track 42c are used for controlling the motor speed controller. By monitoring the period of the control pulse using the microprocessor 4413 the tape speed is known. The microprocessor 4413 can then control the motor speed control circuit to keep the tape speed within a reasonable range during the time when control pulses are rewritten. To prevent sudden flux changes from adversely affecting the play/record servo amplifier, a pair of isolation switches are provided to isolate it from the rest of the circuit.

FIG. 10i is a block diagram for an alternate embodiment of the circuit for encoding and decoding data on the control track shown in FIG. 10f. This circuit operates in a manner similar to that of FIG. 10f.

Writing on Control Track

In order to avoid disastrous result of leaving the current switches on while the tape is free running, a software write protect check is implemented. Writing is permitted only when a shorting bar is inserted between pins 32 and 33 of the microprocessor 4413.

The control pulse is fed to a pin 24 of the microprocessor 4413, and an interrupt INTP3 is conditioned to respond to the positive going edge of the signal. This triggers a capture register TM0 internal to the microprocessor 4413. The first pass through of the routine is to note down the reading of the capture register. The second interrupt cycle, and all the subsequent ones, read the capture register and establish the length of the previous cycle by subtracting the last register content from the current register content. This value is used as the current cycle length, assuming that the speed can not vary so rapidly. By shifting this value 2 places to the right, the value is divided by 4. Since a 25 percent value is to be the threshold value in a timer TM1 internal to the microprocessor 4413, and the timer TM1 is fed by a 1/64 clock (CLK) instead of a 1/8 CLK as the capture register TM0, a further shift of 3 more places is done. This shifted value is then stored in a register_T25 in the microprocessor 4413. A further right shift of 1 place provides the 12.5 percent value (1/8 clock), which is then stored in a register_T12 in the microprocessor 4413. The values in the registers_T12 and _T25 are added together to generate a 37.5 percent value, which is stored in a register_T37 in the microprocessor 4413.

In between the interrupt responses and the above calculation are the turning off of the gain clamp switches and the turning off of the VCR amplifier switches. The microprocessor 4413 then looks the polarity of the data that is to be written. If it is a zero, the microprocessor 4413 then subtracts the value in the register T1 from the value in the register_T37, and loads the result into the compare register of timer TM1. The value in the register T1 is a constant representing the dead time used in performing the above calculations and the overhead of the interrupt. The microprocessor 4413 then waits for the timer TM1 to expire, and commands, using a signal ASC3, the current switches 4408 and 4409 to open and using current from the current source 4406, creates a flux reversal on the tape at this point. At the same time, the microprocessor 4413 reloads the timer TM1 with the value in the register_T37 after subtracting another empirical time constant T2 from it. When the timer TM1 expires, it then turns off the current, allowing the head inductance current to recover through a 10K resistor to ground. After a time of about 600 microseconds, the microprocessor 4413 turns off the steering switch 4405, turns on the VCR preamp switch, releases the gain clamp, clears the interrupt status of INTP3 caused by the switching currents, restores the registers, and exits the interrupt routine.

If the data to be written is a one, the process is similar except that instead of using the register_T37 to start the current, a register_T25 is used. Instead of providing the signal ASC3, a signal ASC2 is provided. The microprocessor 4413 uses the same register_T37 for the duration of the current. But because it starts the current earlier, it also finishes earlier. Therefore, a value_T12 is added to the end of the cycle after the current steering switches are off before turning the VCR preamp back on.

In one specific embodiment where directory information is stored on the control track, the tape contains only one single valid directory and a plurality of obsolete directories corresponding to the number of times the tape has been played and ejected from the VCR 1. The valid directory is distinguished from the obsolete directories by a marker system to be described later.

In another embodiment, each time the directory is read into the local RAM memory, the directory is erased from the tape. During the process of tape ejection from the VCR 1, the updated directory is rewritten onto the tape at the place of ejection such that only one directory is maintained on the tape. The disadvantage of this embodiment is the added hardware and time required to selectively erase the directory without disrupting the control or video signals.

Remote Controller

The VCR 1 also comprises a remote commander unit 1300 which communicates through wireless means with a remote signal receiver 29 in the VCR. As is known in the art, the remote commander comprises a plurality of push buttons, switches, and a jog shuttle knob which create output signals. The signals are transmitted by wireless means known in the art, such as infrared transmission or radio-frequency signals, to the remote signal receiver 29. The receiver 29 decodes the received signal and passes the decoded data to the VCR control logic circuit 21.

Figure 11:
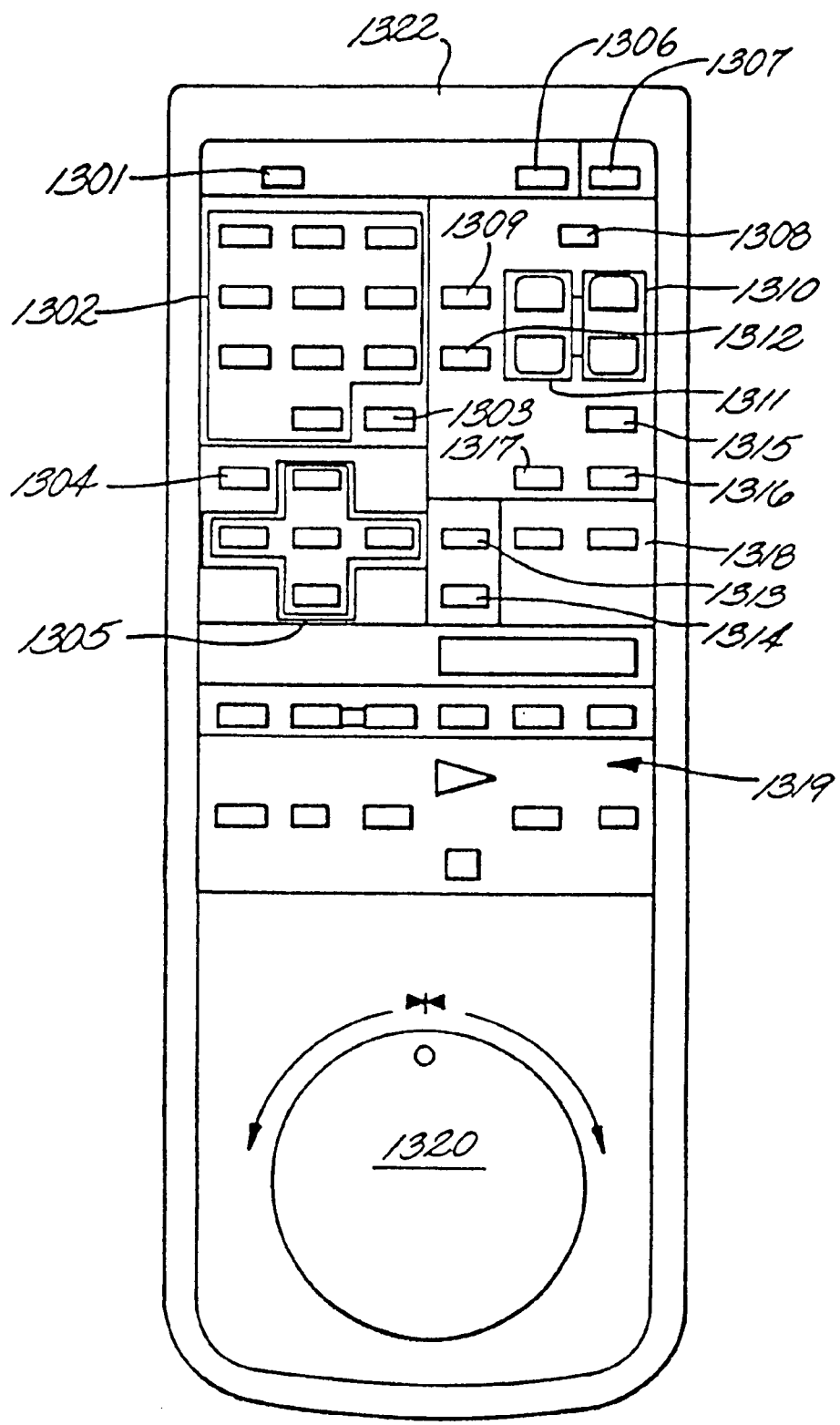
FIG. 11 illustrates an embodiment of a remote control unit for operating the indexing VCR of FIG. 1.

An exemplary remote control unit is the Remote Commander provided with the above-identified Sony VCR. FIG. 11 illustrates an embodiment of a remote control unit 1300. The unit 1300 comprises a hand-held housing 1322 provided with a plurality of push buttons 1301–1319. A remote jog shuttle knob 1320 is provided for hand-held operation of the jog shuttle feature of the VCR. A command mode selector switch 1301 enables activating the control unit. A plurality of channel number buttons 1302 enable remote entry of channel numbers. An ENTER button 1303 is used to enter channel numbers and menu options in the methods discussed below. A menu button 1304 is used to display a menu of user options, as discussed below. A plurality of cursor movement buttons 1305, each marked with an arrow, is used to move an on-screen cursor in various menu operations. An antenna TV/VTR button 1306 is used to command the video display 50 to display a signal coming either from an antenna or the output of the VCR 1. A power switch 1307 enables turning power to the VCR 1 on and off. A TV/VTR switch 1308 enables selectively using the remote control unit to control the VCR 1 or the video display 50. An input select button 1309 enables selection of the source to be recorded. Channel change buttons 1310 enable toggling the channel selection up and down. Similarly, volume buttons 1311 enable toggling the volume louder or softer. A record mode button 1312 enables selection of recording tape speed. A timer clear button 1313 is used to clear timer settings of the VCR. A timer record button 1314 is used to enter a timer recording mode. An index button 1315 is used to enter an index mode. Other buttons 1316–1319 can be used to control various functions on the VCR, including the direction, speed, and mode of the tape transport. The functions and implementation of each button are well known in the art, and have been commercially embodied in the above-mentioned Sony VCR.

FIG. 12 is a schematic diagram of another embodiment of the remote controller 1300 for the VCR of FIG. 1. A remote controller 9700 has a plurality of push buttons or keys 9701–9725. A power switch 9701 enables turning power to the VCR 1 on and off. A print button 9702 allows the user to print on hard copy or to disk the directory or other information in the RAM 33. An eject button 9703 is used to eject the cassette 40 from the VCR. A page up button 9704 and a page down button 9705 are used to move up or down pages on the screen. A cancel button 9706 is used to cancel selections made. Channel change buttons 9707 enable toggling the channel selection up and down. A number keypad 9708 is used to enter numbers for commands and selections. An ENTER button 9709 is used to enter channel numbers and menu options in the methods discussed below. A library button 9710 is used to retrieve directories. A VCRPlus+™ button 9711 is used to enter "PLUSCODE™" numbers. An index button 9712 is used to enter an index mode.

An edit button 9713 is used to edit selections on the screen. A review button 9714 is used to review stored selections. An erase button 9715 is used to erase selections. A rewind button 9716, a play button 9717, and a fast forward button 9719 are used to control tape movement and are well known in the art. A record mode button 9718 enables selection of recording tape speed and to record programs. A "V" button 9720 allows the user to store or retrieve auxiliary information associated with a program being viewed and that is transmitted concurrently with the program. An info "i" button 9721 is used to store "PLUSCODE™" numbers or channel-date-time-length data associated with a separate broadcast that provides additional information related to the program or commercial being viewed. A "R" button 9722 is used to review stored selections using the "i" button 9721. Alternatively, the "v", "i", and "r" buttons may be used to dial a telephone number transmitted as part of the auxiliary information as described above. A stop button 9723 is used to stop movement of the tape. A program identification (PGM ID) button 9724 is used to display the program title and other information of the program being viewed either direct from cable or airwaves or from tape. A plurality of cursor movement or directional arrow buttons 9725, each shaped like an arrow, are used to move an on-screen cursor in various menu operations.

Alternatively, the VCR 1 or the display controller 30 may include these buttons.

Alternatively, the remote controller 75 may be included in a television remote controller or a universal remote controller which control a television or a plurality of electronic devices respectively.

Directory

For HR and RI tapes, the directories are stored in the RAM 33 and referenced either by the TIDs which are written repeatedly on line 19 of the VBI for HR tapes or by a tape number inputted by the user, which the indexing VCR 10 uses to cross reference to a TID for RI tapes. For PR tapes, the directory is written repeatedly, preferably as often as space allows, on line 20 of both fields of the VBI. Alternatively, the directory is written repeatedly on a line pointed to by a pointer in line 21, field 2. As a default, if the indexing VCR 10 cannot find a pointer in line 21, it looks for the directory in line 20. The recording format is per the E.I.A. specifications on Extended Data Services. The directory is stored as D(N) data packets, defined below in conjunction with FIG. 25, which contains all the information that relates to a program entry in the directory. Alternatively, the D(N) packet may be written in two or more lines to speed up the read process. Also, the D(N) packet may be written at a faster rate, such as two to four times faster, than the E.I.A. specification. The D(N) data packet contains a program entry where N ranges from 1 to the maximum program numbers in the directory. For PR tapes, the TID and the program number are repeatedly written on both fields of line 19 of the VBI.

For RI tapes, the RAM 33 is capable of storing the program number and up to 32 characters per title.

When a PR tape is inserted into an indexing VCR 10, the indexing VCR 10 reads the VBI line 19 to quickly determine the TID and program number and then stops. When the user presses the Index button, the indexing VCR 10 determines from the TID that the tape is not a HR tape. The indexing VCR 10 then goes into PLAY mode and reads the directory from VBI line 20 and displays it on-screen.

Addressing System

FIG. 13 is a schematic view of an embodiment for storing tape identification numbers and addresses using a file mark plus asynchronous sprinkling address system. In the preferred embodiment, the address system is a file mark plus asynchronous sprinkling (FMAS) address system. This system writes an absolute address on the control track 42c (see FIGS. 4–5) in the form of address packets. Since control track data is not readily copied from one VCR to another, some copy protection is provided. These packets are written in two types of locations. The first type (type 1) is written at the beginning of each program and at the end of the last program on the tape. The main function of these packets is to serve as "file marks" for search of starting points of programs. The second type of packet (type 2) is asynchronously recorded as often as possible in between the type 1 packets. The main function of these packets is to serve as "road marks" so that on insertion of the cassette 40 into the VCR 1, the current tape location can be quickly determined.

As an overview, when an indexed tape is inserted into the VCR 1, the VCR quickly determines from surrounding type 2 address packets the exact current tape location. To search for the starting point of some other program, the VCR 1 either fast forwards or rewinds and monitors the control track of the correct destination address packet. Once this packet is located, the VCR 1 stops and goes back at play speed to land exactly at the destination address packet. With the FMAS system, the determination of the current location is faster because of the asynchronous sprinkling of addresses. The search for the starting point of a program is accomplished since the VCR 1 monitors the control track 42c while fast forwarding or rewinding and is also accurate since the destination address packet is written exactly at the start of the program like a file mark.

In the FMAS address system, the absolute address is written on the control track 42c of the tape 42 in the form of address packets using the data encoding and decoding described above in connection with FIGS. 10a–10i. The absolute address is a measure of the distance from the beginning of the tape. This distance is preferably determined by counting control track pulses. For example, an address at a point of the tape may be the number of seconds in the SLP mode from the beginning of the tape to that point. Thus, an E-120 tape has an address range from 0 to 21600 (120 minutes×60 seconds). An address of 1140, for example, defines a point whose distance from the beginning of the tape can be covered in 1,140 seconds in SLP mode. If the VCR mode is recording or replaying in SP mode from the beginning, then after 380 seconds (1140 seconds÷3), the address is also 1140. If there is a blank space in between two programs, the address system takes that into account. For example, if program 1 is recorded in SLP mode and has an address of 1,000 at the end of the program, the tape then travels some distance before it starts program 2. Since there is no video signal between the end of program 1 and the beginning of program 2, there are no control track pulses to keep track of the distance travelled. In this case, the takeup spools spindle revolution counts can be used to interpolate. For example, the takeup spool spindle may be counting 1 count for 30 control track pulses, i.e. 1 address count at the end of program 1. At the beginning of program 2, the takeup spool may be counted in two counts for 30 control track pulses, i.e. 1 address count at the beginning of program 2. Thus, on the average, the takeup spool counts 1.5 counts per 30 control track pulses, i.e. 1 address count for the blank space between program 1 and program 2. If the takeup spindle counts 150 counts of blank space, it is assumed the control track would have counted 3,000 control track pulses (150÷1.5×30), i.e. 100 address counts. The starting address of program 2 is 1,000 (end of address of program 1)+100 (length of blank area)=1,100. The absolute address is written once at the beginning of each program and at the end of the last program. For HR tapes and PR tapes, the address is repeated as often as possible (in the order of once every few seconds) between the beginning and the end of every program. For RI tapes, the address is repeated as often as possible for some programs as will be described in detail below.

In alternate embodiments, two separate address systems are used. In a high resolution address system (HRAS), the VCR writes an absolute address at high repetition rate (e.g., once every few seconds) on a line of the VBI. The absolute addressing system is maintained both for finding the current location as well as for calculating the length of programs and blank spaces. The absolute address is a measure of the distance from the beginning of the tape. For example, an address with a value of 1120 may represent a distance from the beginning of the tape after the take-up spool spindle has made 140 revolutions (with 8 counts per revolution). This information may be written once every few seconds. Alternatively, the absolute address may represent the time from the beginning of the tape. Because the play time depends on the recording speed of the tape, the time from the beginning of the tape should also account for the different tape speeds. The second type of address system is a low resolution address system (LRAS) where the absolute address is written on the control track at the beginning of each program as well as the end of the last program as an address mark. An alternate LRAS is to write only marks, such as VISS or VASS marks, in the control track at the beginning of each program on the tape and at the end of the tape.

FIG. 14 is a schematic view of an alternate embodiment for storing tape identification numbers and addresses using a high and low resolution addressing system. The HR tapes and the PR tapes employ both the high resolution address system and the low resolution address system. The HRAS is possible because address data can be written onto the VBI while recording is taking place. For an HR tape, the address and TID are stored in the VBI and the directory is stored in the RAM 33. For PR tapes, the address, directory, and TID are stored in the control track 42c. The LRAS uses a marker at the beginning of each program and at the end of the last program. When a HR tape or PR tape is inserted into the VCR 1, the VCR quickly reads the TID and address from the VBI and finds out the exact current tape location.

On the other hand, the RI tapes employ the low resolution address system. For RI tapes, an address mark is written on the control track at the beginning of each program and at the end of the last program. The RI tapes cannot in practice employ the high resolution address system because writing a high resolution address requires writing over the whole tape which is too time consuming for the user. Further more, the VBI cannot be retroactively overridden without destroying the picture. On the other hand, a limited amount of data can be overwritten onto the control track, e.g., in a video index search system (VISS). Hence, for retroactively indexing old tapes, the address data is written on the control track 42c. When an RI tape is inserted into the VCR, the VCR first determines whether the tape has a high resolution address system. It searches the VBI for the TID and an absolute address. Failing to find that, the VCR then looks for the LRAS on the control track. It rewinds the tape to find the closest address mark and reads the address and TID to obtain a current location.

To search for the starting point of some other program, the process for HR tapes and PR tapes are as follows. The VCR knows the current absolute address as well as the destination absolute address. While monitoring the take-up spool spindle revolution count, the machine quickly fast-forwards or rewinds to the vicinity, typically within 5 seconds of the destination, and then slows down to play speed to read the VBI and stop at the correct address. For RI tapes, the first part of the search process is identical to that of HR and PR tapes. Knowing the current absolute address and the destination absolute address and while monitoring the take-up spool spindle revolution count, the machine can quickly fast-forward or rewind to the vicinity of the destination. It then slows down to play speed to read the control track and stop at the correct address mark.

To perform a search, for HR and PR tapes, when the tape is inserted into the indexing VCR, the current location of the tape is known from the absolute address on the VBI line. From this address and from the directory recovered from the RAM 33 for HR tapes or from the VBI for PR tapes corresponding to the TID, the current program number is known. For example, if the current program is program 3 and the command is to go to program 6, the VCR must fast forward to land on the third indexing mark, such as a VISS or VASS mark, from the present location. Since the VCR can read the control track during fast forward or rewind, it can read marks stored in the control track. When the third mark is seen during the fast forward, the VCR switches to stop and then rewind since the third mark has been passed. The VCR then switches to play to read the absolute address and can then "soft-land" on the selected address. For RI tapes, once the program number is found, the process is the same.

FIG. 15 is a schematic view of another alternate embodiment for storing tape identification numbers and addresses using a high and low resolution addressing system. The HR and PR tapes employ only a HRAS addressing system. As with the embodiment of FIG. 14, the address and TID are stored in the VBI and the directory is stored in the RAM 33. The RI tapes use the LRAS described above in FIG. 14. In this embodiment, when searching is done on HR and LR tapes as described below in FIG. 35, the system measures location on the tape using the spindle revolution counts or position counters described below in FIGS. 38–41. Searching on RI tapes is the same as described above for the embodiment of FIG. 1.

Figure 16:
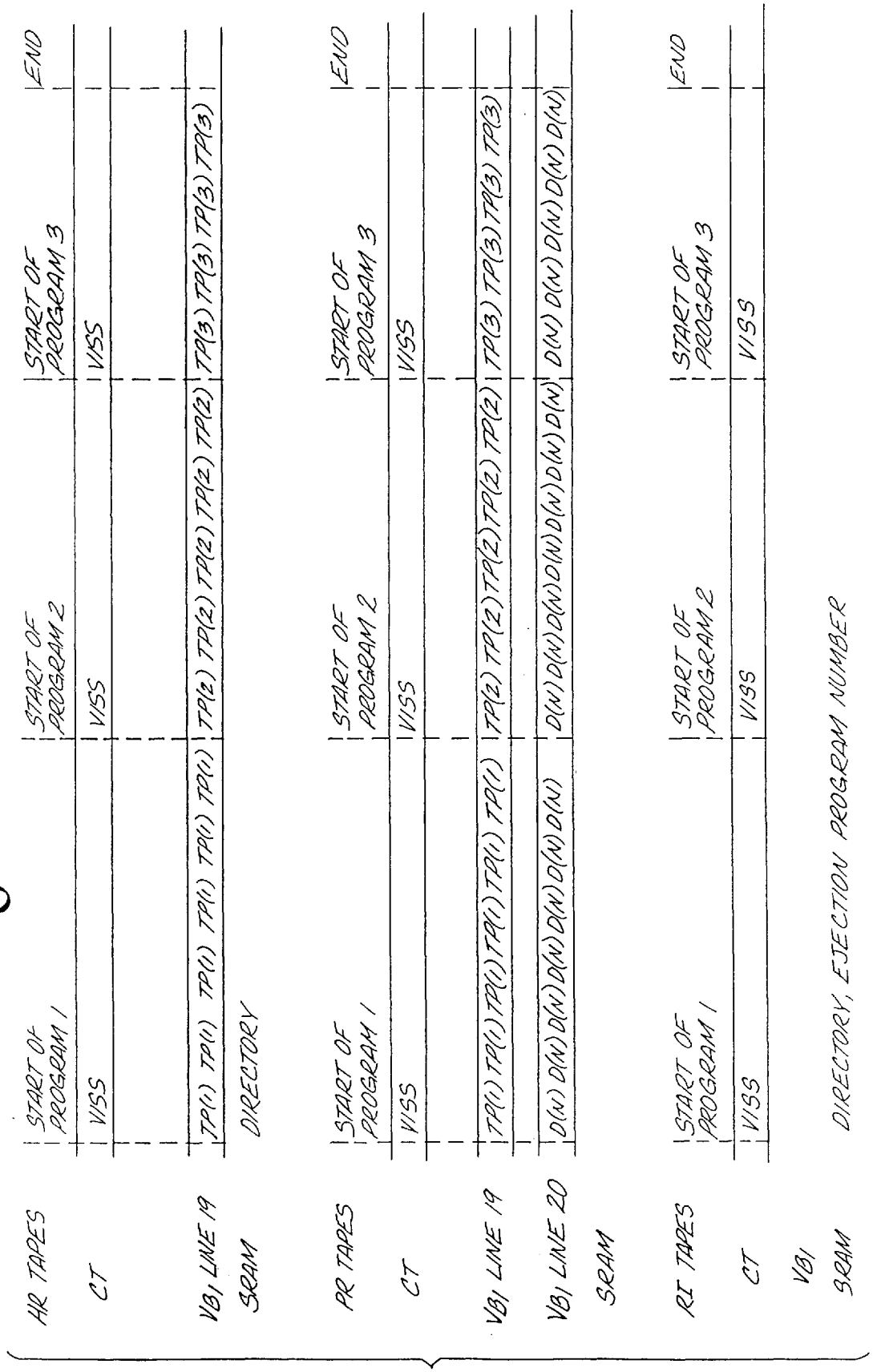
FIG. 16 is a schematic view of yet another embodiment for storing tape identification numbers and program numbers using a VISS PLUS TP data packet address system.

FIG. 16 is a schematic view of another embodiment for storing tape identification numbers and program numbers using a VISS PLUS TP data packet address system. In this embodiment, the system writes a TP data packet, which comprises a TID and a program number in line 19 of the VBI. As will be described below, the TP data packet may be written on other lines of the VBI where a pointer on VBI line 21 points to these other lines. However, the default mode uses line 19. The program number represents the order in which the program was recorded. For example, program 3 is the third program written on the tape. If program 3 is the last program written on the tape, the next program that is written has a program number of 4, even if the program is physically written on the tape before program 3. The format of the TP packet is described below in conjunction with FIGS. 27–29. The recording format for the TP data packet conforms with the E.I.A. specifications on Extended Data Services. As will be described below in conjunction with FIGS. 28–29, the TID is constant for a tape. The program number is constant within a program, but changes from program to program.

As a subset of the VISS PLUS TP system, the indexing VCR 10 uses a VISS system to write a VISS mark on the control track 42c at the beginning of each program on the tape. RI tapes use only the VISS system.

For HR and PR tapes, the VISS PLUS TP system is used. In this system, the TID and program number are written in TP data packets at a high repetition rate, e.g., about once every 1/12 seconds, on line 19 of both fields of the VBI. The VISS marks on the control track serve as file marks for searching for the starting points of the programs. The TP data packets serve as road marks so that upon insertion of the cassette into the indexing VCR 10, the current tape location can be quickly determined. In addition, the address system provides a method for determining the length of programs as they are recorded or modified, as will be described below.

As an overview, when an HR or PR tape is inserted into the indexing VCR 10, the indexing VCR 10 scans the VBI for a predetermined time, e.g., two seconds, and quickly determines from surrounding TP data packets the TID of the tape and the current program number. When the user presses the Index button, the indexing VCR 10 retrieves the directory from the RAM 33 and displays it. When the user requests the indexing VCR 10 to move to the starting point of another program, the indexing VCR 10 executes a search by either fast forwarding or rewinding the tape while counting the number of VISS marks in the control track to the destination location.

For an RI tape, because the TP data packet is not written on the VBI or elsewhere on the tape, a different method is employed. Instead, when a RI tape is ejected from the indexing VCR 10, the current program number at the time of ejection (also referred to as an ejection program number) is stored in the RAM 33. The next time that the RI tape is inserted into the indexing VCR 10, the indexing VCR 10 attempts to find a TP packet in the VBI. Because no TP packet is found, the indexing VCR 10 prompts the user to enter the assigned tape number, when the user presses the Index button. Using this number, the indexing VCR 10 determines the corresponding TID, recovers from the RAM 33 the ejection program number and uses it as the current program number, and displays the directory. At this time, the indexing VCR 10 may search using the search process described above for HR and PR tapes.

In summary, Table II shows the directory and address systems for the 3 types of tapes.

TABLE II

| Tape Type | Directory | Address System |
|---|---|---|
| HR | RAM 33 in indexing VCR 10 | VISS + TP |
| PR | VBI on tape | VISS + TP |
| RI | RAM 33 in indexing VCR 10 | VISS |

Figure 17:
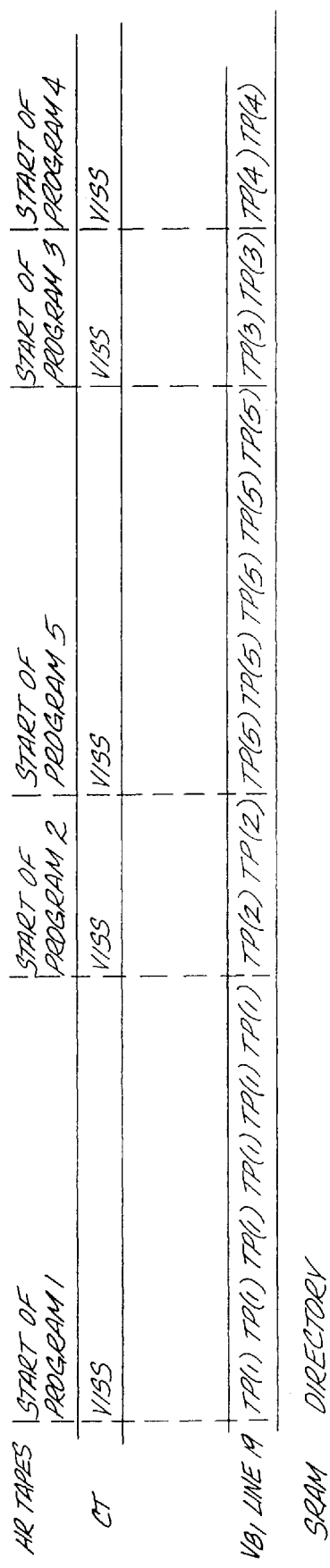
FIG. 17 is a schematic view of the embodiment of FIG. 16 where a program has been overwritten on the tape.

In an alternate embodiment to the VISS+TP system, the indexing VCR 10 also uses an absolute address system (also called VISS+TP+AA). Several absolute address systems are described in detail below in conjunction with FIGS. 38–41. The absolute address system provides faster searches. In some indexing VCRs, the VISS marks cannot be monitored during high speed fast forward or rewind, but only at moderate search speed (semi-load condition). In contrast, the reel ratio can be measured at very high speed fast forward or rewind (unloaded condition). Using the absolute address calculated from the reel ratio, the indexing VCR 10 can search the tape. The absolute address system also provides a more accurate determination of the location of the tape. For example, referring now to FIG. 17, a program five is recorded on a previously recorded HR tape starting in the middle of a previously recorded program two and ending after the beginning of a previously recorded program three. As seen in FIG. 17, when program five is recorded, the indexing VCR 10 writes a VISS mark at the beginning of program five and writes a TP packet corresponding to program five in line 19 of the VBI. Upon reaching the start of program three, the indexing VCR 10 erases the VISS mark corresponding to the start of program three and writes a new mark at the end of program five which becomes the start of the remaining portion of program three. With an absolute address system, the indexing VCR 10 can automatically calculate the length of programs two and three and correspondingly update the directory. Without an absolute address system, the indexing VCR 10 can flag the length of programs two and three as being unknown and when the tape is played, measure the length of the programs for a later updating of the directory. Alternatively, in an indexing VCR 10 without an absolute address system, the indexing VCR 10 may force new programs to be written at the starting point of an old program to avoid programs of unknown length.

VBI Line Conflict Resolution

Because various VBI lines are used for different purposes by different users, the indexing VCR employs a conflict resolution system. As examples of other uses of the VBI, line 21 is used for both closed captioning and Extended Data Services. Line 19 is used in ghost cancellation. Macrovision uses lines 13–20 of field 1, and lines 12–19 of field 2 for copy protection in prerecorded tapes. Neilson uses lines 10–12 for encoding of audience survey information in prerecorded tapes. Although line 21 is used for broadcasting purposes, it may be used in prerecorded tapes when there is no close captioning. The VBI lines presently used by Macro Vision for copy protection may be moved to other lines at the discretion of the PR tape manufacturer. In addition, less than eight lines may be used with some copy protection efficiency loss. After reception of the broadcast signal, the use of line 19 has served its purpose and becomes free for writing the TP packet. Thus, for PR tapes, there is no broadcasted line 19 conflict. However, with PR tapes, if some tapes cannot use line 19 or line 20 or both, the write of TP and D(N) packets may be done on other lines by using pointers, which are written on line 21, field 2, to these other lines as described above according to the E.I.A. specifications for supplemental data location. When only one of lines 19 or 20 are available, the TP packets and the D(N) packets may be written onto one line. Accordingly, even in the absence of pointers on line 21, the indexing VCR 10 checks lines 19 and 20 for the presence of both TP and D(N) packets.

Interconnected VCRs

Multiple indexing VCRs in the same household create a special problem. The user wants to use an indexed tape interchangeably between all of his indexing VCRs. However, since the directory of HR and RI tapes resides in the VCR and does not travel with the tape, the consequence may seem to be that tapes can only be used in the VCR in which they are created. To solve this problem, the different indexing VCRs in the same household are able to communicate.

Figure 18:
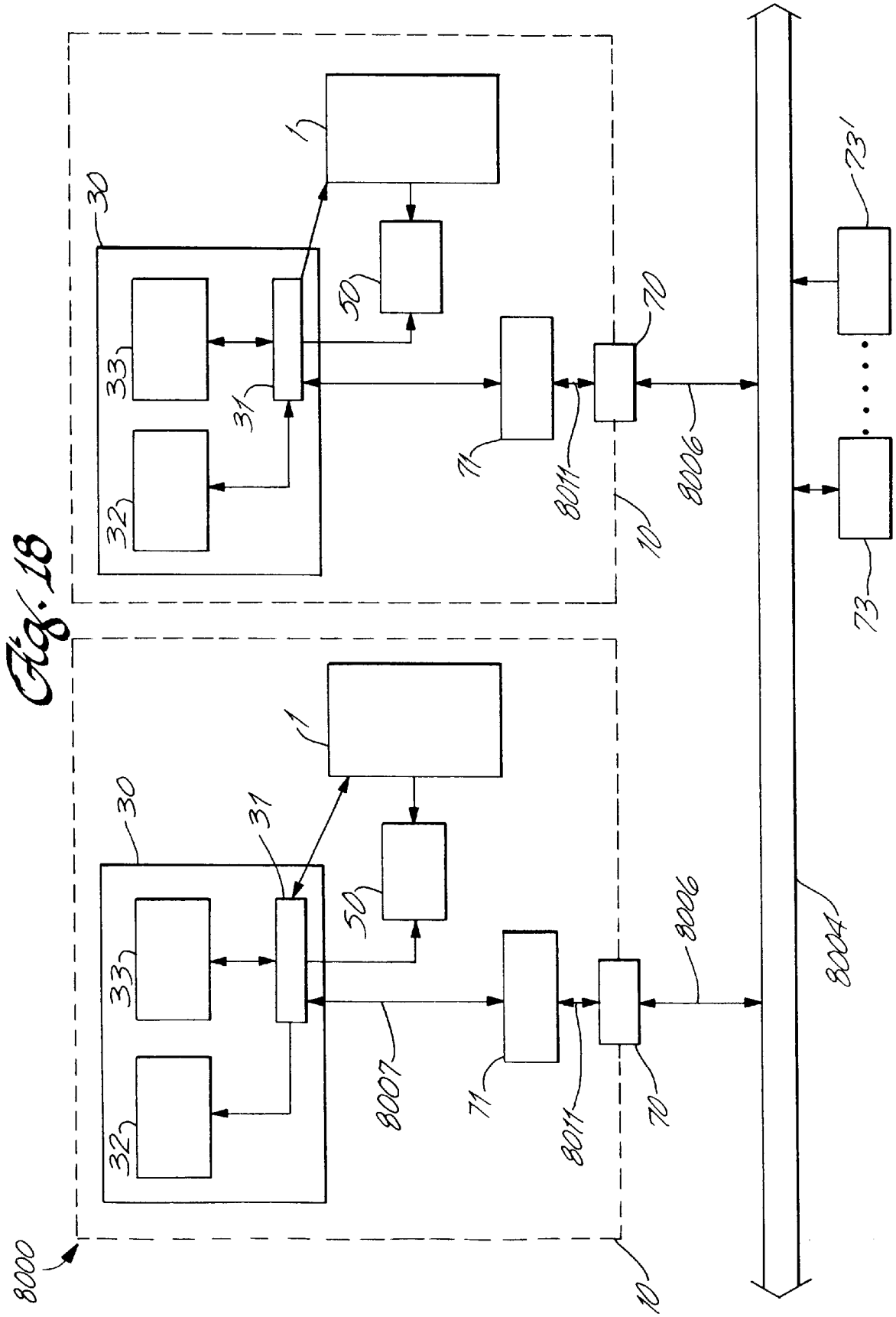
FIG. 18 is a functional block diagram showing a multiple VCR system for transferring directory data between the VCRs over a communication bus.

Referring now to FIGS. 1 and 18, a multiple VCR system 8000 comprises a plurality of indexing VCR systems 10 connected by a bus cable 8006 to a bi-directional bus 8004. The microprocessor controller 31 transmits and receives data and commands over a line 8007 to a bus interface circuit 71 which processes data to communicate between the microprocessor controller 31 and the bus 8004.

In a first embodiment of the bus system, any VCR system 10 on the bus 8004 can acquire the bus and become the talker (also referred to as a driver). At any one time, only one talker is allowed on the bus. During this time, all other units are listeners. Once the related activities are finished, the talker must give up the bus.

The bus interface circuit 71 comprises a transmitter (not shown) for driving signals on the bus and a receiver (not shown) for receiving signals from the bus. The transmitter is preferably a TTL open collector driver. The bus driver preferably is capable of sourcing 48 ma. In addition, it is pulled up to +5 volts by an internal 150 ohm resistor which can be removed to prevent overloading of the bus driver if more than two VCR systems 10 are connected to the bus 8004. In addition, the bus 8004 is preferably active low and stays at the high state when there is no bus activities. The receiver preferably has a maximum load of one standard TTL load on the bus.

The data on the bus is preferably serial data comprising data cells. Each data cell is defined as the time slot between two high to low transitions. The bit length is typically 2.0 milliseconds. Data is preferably encoded in Manchester code. A "zero" is defined as a 25% low to 25% low between the high to low transition and the low to high transition. Conversely, a "one" is defined as a 50% low to 75% low between the high to low transition and the low to high transition. The bus interface circuit 71 communicates over line 8011 through a connector 8008 to the line 8006. The connector 8008 is preferably an RCA phono female connector.

Having described the multiple VCR system 8000, the operation of the system is now described.

One of the VCR systems 10 becomes an initiating unit by desiring to either transmit or receive data over the bus 8004. In particular, when a new home made recording tape is created in a VCR system 10, that VCR communicates this information to the other VCR system 10 on the bus 8004. To request this data, the microprocessor controller 31 of the initiating unit sends a command over the line 8007 to the bus interface 71 for communication over lines 8011 and 8006 with the bus 8004. The microprocessor controller 31 preferably generates one of two types of commands. The first command, a type I command, is a one-to-many broadcast command. All units on the bus other than the initiating unit, which acts as the talker, are addressed. There is no feedback from the addressed units. Thus, for the type I commands, data always flows only from the talker to the listener. The second type of command, a type II command, is a one-to-one communication type. Only one unit is addressed at a time. For the type II commands, the addressed unit sends data to the initiating unit in response to a request for information command from the initiating unit, or the initiating unit sends data to the addressed unit in response to a send information command. Table V summarizes the bus commands.

TABLE V

| Command | Type | Descriptions |
| --- | --- | --- |
| FFFFhex | I | All units receive library |
| 1AAAhex | II | Address unit AAA to report library RAM size |
| 2AAAhex | II | Address unit AAA to receive library |
| Others | | (Reserved for future expansion) |

The bus control commands are bracketed by a leading zero and a trailing zero. An end bit follows the trailing zero. The end bit is the last high to low and back to high transition. Thus, it is a "half" bit. It is not a data bit but a terminator bit. Its width is preferably 2 to 4 times the width of the regular bit length.

Figure 19:
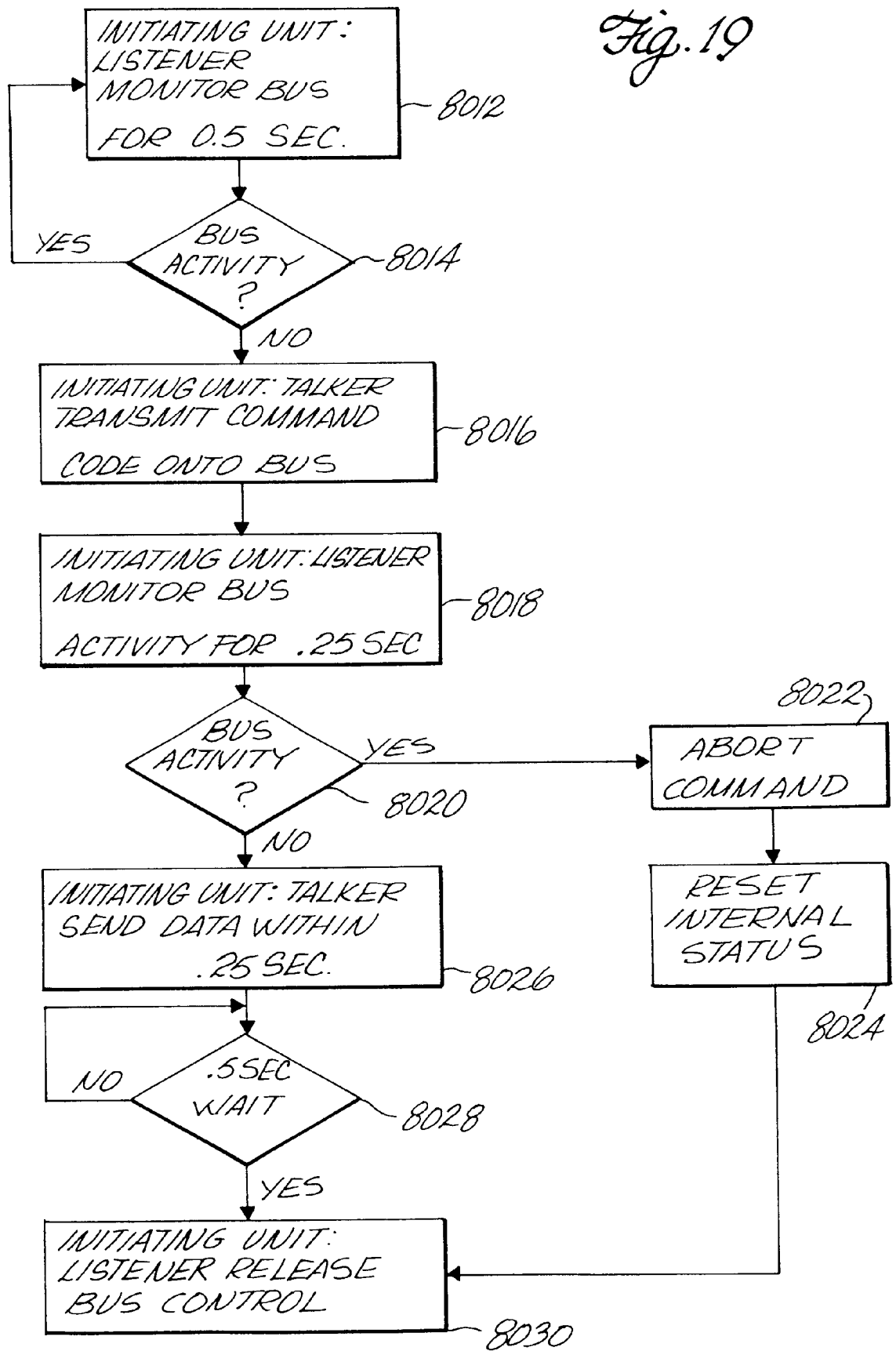
FIG. 19 is a flow chart showing the steps employed in the operation of broadcasting a library to other VCRs for one embodiment of the system shown in FIG. 18.

Referring now to FIG. 19, the initiating unit (VCR system 10) is a listener and monitors the bus 8004 for 0.5 seconds to ensure that there is no bus activity (step 8012). When there is no bus activity (step 8014), the initiating unit becomes a talker and takes control of the bus. The initiating unit transmits a type I-command code (FFFFhex) onto the bus to command all units to receive the library (step 8016). The initiating unit then becomes a listener, and monitors the bus activity for 0.25 seconds for a response (step 8018). If there is bus activity (step 8020), the initiating unit abandons its attempt to become bus controller by aborting the command (step 8022) and resets its internal status to become a listener (step 8024), thereby releasing control of the bus (step 8030). On the other hand, if there is no bus activity after the command code is transmitted (step 8020), the initiating unit again becomes a talker and sends the data in the library within 0.25 seconds after determining it controls the bus (step 8026). After transmitting all the data, the initiating unit waits 0.5 seconds (step 8028), becomes a listener, and releases bus control (step 8030).

Figure 20:
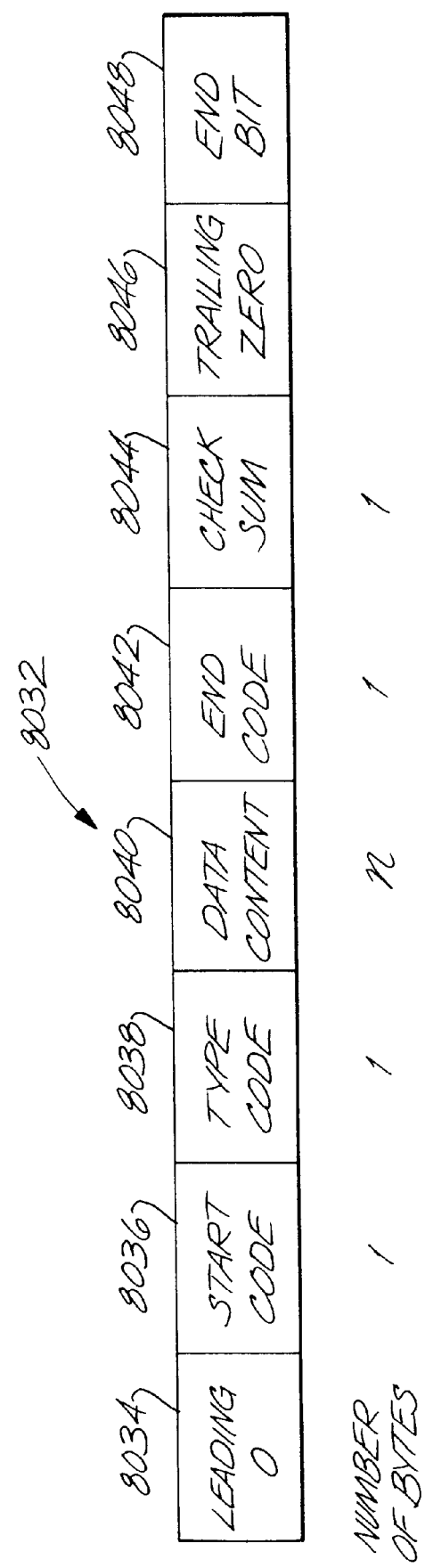
FIG. 20 is a schematic view showing the data packet format for the transmitted data for one embodiment of the system shown in FIG. 18.

Referring now to FIG. 20, the library data is transmitted as a data packet 8032. The data packet 8032 has a leading zero 8034 followed by a start code 8036 having a length of one byte. The start code 8036 preferably has a value of 01hex. Following the start code, there is a type code 8038 having a one byte long symbol. Its value preferably is between 01hex and FFhex. The type code 8038 is decoded as follows in Table IV.

TABLE IV

| Type | Descriptions |
| --- | --- |
| 01 hex | Library RAM size packet |
| 01 hex | Library packet |
| 03 hex-FFhex | (Reserved for future expansion) |

Following the type code 8038, a data content 8040 contains the directory or other information that is to be transmitted. The data content 8040 has an n byte length and is preferably coded in ASCII. In the preferred embodiment, only ASCII symbols '0'–'9' and 'A'–'Z' are used. An end code 8042 having a length of 1 byte follows the data content 8040. The end code 8042 preferably has a value of 03hex. Next, the data packet includes a checksum 8044 that is 1 byte long. The checksum makes the modulo 128 sum of the whole data packet 0, i.e., modulo 128 (start code 8036+type code 8038+data content 8040+end code 8042+checksum 8044)= 0. A trailing zero 8046 followed by an end bit 8048 follow the checksum 8044.

Figure 21:
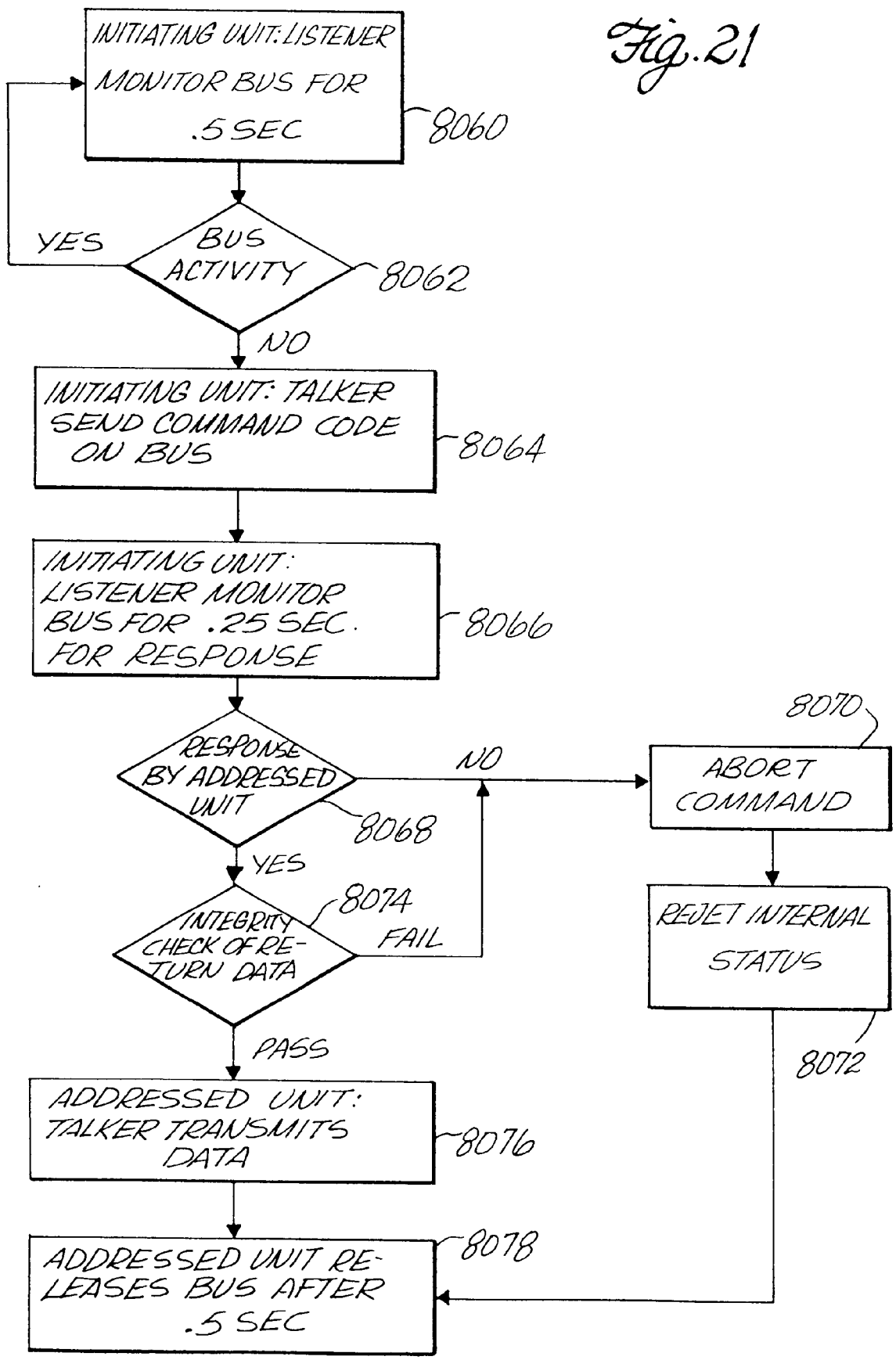
FIG. 21 is the flow chart showing the steps employed in the receiving of library information from another VCR for one embodiment of the system shown in FIG. 18.

Referring now to FIG. 21, a type II command having a value of 1AAAhex is a request from the initiating unit to an addressed unit AAA to report its library RAM size. In order to take control of the bus 8004, the initiating unit operates as a listener and monitors the bus for 0.5 seconds (step 8060) and determines whether the bus is available. If there is no bus activity (step 8062), then the bus 8004 is available and the initiating unit becomes a talker and sends the command code 1AAAhex on the bus 8004 (step 8064). The initiating unit then becomes a listener and monitors the bus 8004 for 0.25 seconds for a response from the addressed unit (step 8066). If there is no response from the addressed unit (step 8068), the initiating unit aborts its command (step 8070) and resets its internal status (step 8072). On the other hand, if, at step 8068, there is a response by the addressed unit, the initiating units checks the integrity of the returned data (step 8074). If there is a failure in the integrity check, the initiating unit aborts its command (step 8070) and resets its internal status (step 8072). However, if the integrity check passes at step 8074, the addressed unit becomes the talker on the bus 8004 and transmits the data (step 8076). The addressed unit releases the bus after 0.5 seconds (step 8078).

For a type II command in which an addressed unit is to receive a library, the flow chart of FIG. 19 is followed for type I commands, except that at step 8026 when the initiating unit is the talker and sends data, the initiating unit sends the library to the addressed unit AAA in response to a type II 2AAAhex command.

Another Bus Embodiment
Bus Description

In a second embodiment of the bus system, the bus 8004 is a bidirectional bus. An external device 73, such as an external RAM, is coupled to the bus 8004. A description of the external device 73 is described below. Within the bus interface circuit 71, a transmitter (not shown) is a TTL open collector driver preferably capable of sinking 16 milliamps. A driver (not shown) is preferably pulled up to +5V by an internal 1.0 kiliohm resistor. The receiver provides a maximum load to the bus of one standard TTL load. The bus 8004 is preferably active low. When there are no bus activities, the bus 8004 stays at the high state. The driver drives the bus by pulling the bus 8004 low. Preferably, the indexing VCR 10 is the master of the bus 8004 and initiates all transactions on the bus.

The data on the bus 8004 is preferably transmitted serially. The data is defined by data cells where each data cell is defined to be the time slot between two successive high to low transitions. The bit length is preferably from 0.2 milliseconds to 2 milliseconds. The data is preferably encoded by 7 bits with an odd parity LSB bit providing a total length of 8 bits first Manchester coding method. The separation between bytes preferably is 1 to 10 milliseconds. The communication is reset, if no data is transmitted for longer than 10 milliseconds, to avoid bus lock ups.

Bus Control Protocol and Command Packet Format

The indexing VCR 10 sends over the bus 8004 a bus command packet to the external device 73 to request data. The command packet has a format:

Command [data]

1 byte N byte

The command symbol is one byte long and ranges in value from 00 hex to 7F hex. A data symbol follows the command symbol and ranges in length from 0 to N bytes of data. N can be sufficiently large so that the data byte includes the entire directory of a tape. In response to the command packet, the external device 73 sends back either a return code or data based on the command issued by the indexing VCR 10. Table VI lists the commands for the bus.

TABLE VI

| Command | Data | Description |
| --- | --- | --- |
| 01hex | — | Check if external device is ready. |
| 02hex | PRI | Print PRI data. |
| 03hex | — | Send directory to RAM 33 |
| 04hex | — | Request for the first TID stored in RAM 33. |
| 05hex | — | Request for the next TID stored in RAM 33. |
| 06hex | — | Request for the previous TID stored in RAM 33. |

TABLE VI-continued

| Command | Data | Description |
| --- | --- | --- |
| 07hex | TID and number X | Request external device 73 to send the Xth entry of the specified tape. |
| 08hex | TID | Request external device 73 to send copy version number of the tape specified. |
| 09hex | TID | Request external device 73 to send program number for next recording for the specified tape. |
| Others | | Reserved for later expansion. |

The indexing VCR 10 issues a 01hex command on the bus 8004 to check if the external device 73 is ready. This command is preferably issued before other commands to check the device. After issuing the command, the indexing VCR 10 waits for the return code. If 00hex is returned on the bus, the external device 73 is ready. If 7F hex is returned, the external device 73 is busy. If no response is received on the bus, the commanded external device 73 may be non-existent. The indexing VCR 10 retransmits the command to again check status. The indexing VCR 10 stops further commands to the external device 73, if the device is not ready.

The indexing VCR 10 issues a 02hex command on the bus to command the external device 73 to print PRI data. After issuing the command packet, the indexing VCR 10 issues the PRI packet to the external device 73. If the external device 73 accepts the packet, it returns a 00hex code. Otherwise, it returns a 7F hex code.

The indexing VCR 10 issues a 03hex command to save the directory of one tape to the external RAM 33. Before transmitting the directory, the indexing VCR 10 reformats the information into the D(N) and TP packet format described below in connection with FIGS. 25 and 27, respectively. The first packet includes the TID and the copy version number (described below) in the same format as the TP packet. The next packet is the D(0) packet which describes the tape parameters, including tape length and reel diameter. The remaining directory entries are transmitted in the D(N) packet format in the order of their location from the beginning of the tape. A TP packet is sent after the last D(N) packet to indicate the end of transmission. This TP packet includes the TID and the program number for the next recording. The external device 73 returns a 00hex code, if it receives all packets. Otherwise, it returns a 7F hex code. In response thereto, the indexing VCR 10 may resend the data.

The indexing VCR 10 issues a 04hex command to request the first TID stored in the external RAM 73. In response thereto, the external device 73 returns the first TID stored therein. In combination with the 05hex and 06hex commands (to be described below), the indexing VCR 10 can use the 04hex command to read out all the TIDs in the external RAM 73. The external device 73 returns a 7F hex code, if there is no TID inside the device 73.

The indexing VCR 10 issues a 05hex command to request the next TID stored in the external RAM 73. In response thereto, the external RAM 73 returns the next TID in the RAM 73. After the last TID is returned, the external RAM 73 returns a 7F hex code.

The indexing VCR 10 issues a 06hex command to request the previous TID stored in the external RAM 73. In response thereto, the external RAM 73 returns the previous TID in the RAM 73. This allows the indexing VCR 10 to read the TID in reverse order. After the first TID is returned, the external RAM 73 returns a 7F hex code.

The indexing VCR 10 issues a 07hex command and a TP like packet, which includes the TID and a number x, to request the xth directory entry of the specified tape. In response thereto, the external device 73 returns the xth directory entry of the tape in a D(N) packet format. If, however, the TID is not in the external RAM 73, it returns a 7F hex code.

The indexing VCR 10 issues a 08hex command and the TID in TP packet format with PN set to 0 to request the copy version number. In response thereto, the external device 73 returns a TP line packet which includes the TID and the copy version number. If, however, the TID is not inside the external RAM 73, it returns a 7F hex code.

The indexing VCR 10 issues a 09hex command and the TID in TP packet with PN set to 0 to request the program number for the next recording. In response thereto, the external device 73 returns a TP like packet which includes the TID and the program number for the next recording. If, however, the TID is not in the external RAM 73, it returns a 7F hex code.

The copy version number is a 12 bit number used to check the updated status of the directory in the external RAM 73. The indexing VCR 10 stores a copy version number for each tape in the RAM 33. When a new tape is created, this number is set to zero. Every time the directory content is changed, the indexing VCR 10 increments the number by one. When a copy of a directory having the same TID is found in both the external RAM 73 and the internal RAM 33, the indexing VCR 10 uses the more updated version which is identified by comparing the copy version number and using the higher number. In this embodiment, the copy version number ranges from 0 to 4095.

In alternate embodiments, the bus interface 71 may be packaged external to the VCRs. In these embodiments, the microprocessor controller 31 communicates over the line 8007 directly to the connector 8011. The bus interface 71 is connected external to the indexing VCR 10 to the connector 8011 and to the bus 8004.

In yet other embodiments, the method of communication may be either radio transmission at UHF or modulation on an AC power line.

One method for transmitting signals on AC power lines is disclosed in U.S. Pat. No. 4,418,333 to Schwarzbach, et al., issued Nov. 29, 1983, the subject matter of which is incorporated herein by reference.

INTERFACE PORT

Referring again to FIG. 1, the VCR system 10 has an interface connector 72 which is coupled to the microprocessor controller 31 and allows communication between the microprocessor controller 31 and an external device 73. The connector 72 is preferably an RCA phono female connector. The external device 73 may be a memory, a printer, a computer, a telephone line or a specialized machine for communicating with the microprocessor controller 31.

In a specific implementation, the microprocessor controller 31 communicates with a printer to print coupons captured using the Auxiliary Information feature described below.

In another specific implementation, the microprocessor controller 31 may print the tape identification number labels for marking the cassette housing. For example, instead of the step 9211 described below in FIG. 57 in which the microprocessor controller 31 displays the TID assigned to the tape that is about to be ejected, the microprocessor controller 31 commands the printer to print a label with the assigned TID and prompts the user on the display to affix the label to the cassette housing.

In yet another specific implementation, the microprocessor controller 31 prints upon user command the directory of any specified tapes stored in the RAM 33.

In an alternate embodiment, in place of the interface connector, an IR detector/emitter in the VCR functions as a data port which can be used to both receive remote control commands and to transmit the directory or other information from the RAM 33 to a printer or a second machine. For example, some VCRs can control cable boxes by transmitting commands to the cable box. These VCRs may also transmit directory data or other information to an external device 73 that can receive IR commands. Alternatively, the IR detector may also be used to receive directory information downloaded from the second machine.

In an alternate embodiment to FIG. 1, as shown in FIG. 18, the interface connector 72 may be the same connector as the bus interface connector 71. In this embodiment, a plurality of external devices 73, 73' may be connected to the bus 8004. The directory may be downloaded from the RAM 33 through a bus transfer to any or all of the plurality of external devices.

In a specific implementation, the directory is downloaded either over the bus 8004 or through the interface connector 72 for backup storage. For example, backup storage may be either a tape in a second VCR or a floppy disk in a disk drive.

In another specific implementation, the external device 73 is a nonvolatile memory such as a battery supported RAM. The external RAM 73 contains sufficient memory, e.g. one megabit, for storing the entire program directory of a plurality of indexing VCRs. The external RAM 73 provides a backup to the RAM 33 in each of the user's indexing VCR 10s to avoid loss of data during power interruptions. Further, the external RAM 73 combines the libraries of all indexing VCRs connected to the bus 8004. Consequently, each indexing VCR 10 provides indexing capability for each of the user's index tapes. The user may transfer directories between the indexing VCRs. The external RAM 73 also includes communication electronics for communicating with each device on the bus. In yet another embodiment, the external device 73 might also include a processor and a character generator. The indexing VCR 10 provides the electronic guide data over the I/O port. The external device 73 captures the data, formats it and stores it within the external RAM. At the appropriate times, the data is outputted via the character generator over the bus 8004 to the indexing VCR 10 for display on the television.

Alternatively, the bus may be an infrared link where the external device 73 has IR emitters and detectors for transmitting and receiving infrared codes to the indexing VCR 10 and television using the infrared detectors and emitters described above.

Similar to the bus interface, communication from the interface port may be either direct cable, radio transmission at UHF, infrared transmission, or modulation on an AC power line, or other memory or communication devices.

Automatic Back-up of the Library in the RAM 33

As noted above, the library is stored in a nonvolatile memory or a battery backed-up RAM 33. Although lithium batteries have a 5–7 year shelf life, this life may be shortened by power outages. In addition, catastrophic chip failures may occur. Consequently, the indexing VCR 10 periodically displays a prompt to the user to back-up the library by downloading the contents from the RAM 33 through the serial port to a magnetic tape, floppy disk or external memory device. Even with this prompt, some users are likely to not back-up the library. In addition, if a low battery warning is provided, the user may also ignore this warning. When the failure occurs, the user will have experienced a catastrophic loss of his entire library when the battery has been drained or the memory chip has failed. The library may be recreated as each tape is played for the first time after the loss in the indexing VCR 10. However, this approach is time consuming and limits the user's ability to perform search functions of the tape library.

The indexing VCR 10 may automatically provide back-up by writing the directory onto a tape while it is making another recording. In particular, the indexing VCR 10 may write the whole library onto a predetermined VBI line. For example, a 250 kbit library may be backed-up during one recording, e.g., assuming 16 bits per line and 1 line per field at 60 fields per second, it takes 273 seconds to complete this library back-up. Because most recordings are at least half an hour long, the backing-up is completed before the recording has been completed. A nonvolatile memory, such as an EEPROM, may be included as part or separate to the microprocessor controller 31 in the indexing VCR 10 for storing the location of the library copy, the TID, and the program number or address of the tape on which the directory is recorded. As a back-up to the tape being either defective or recorded over in a non-indexing VCR 10, the locations of the latest three copies of the library can be stored in the EEPROM. Upon the occurrence of a battery failure or a RAM chip failure, after the indexing VCR 10 is repaired, the indexing VCR 10 can display a prompt on screen to request the user to insert the tape containing the latest copy of the library by displaying the tape number corresponding to that tape. Upon insertion of the tape, the indexing VCR 10 verifies the TID of the tape and is able to advance or rewind to the location of the directory using the read program number and the destination program number read the EEPROM. As the tape is being read, the indexing VCR 10 uploads the library packet into the RAM 33.

Data Formats

For the data packets described below in conjunction with FIGS. 22–29, a byte refers to a seven bit data symbol plus an eighth bit which is reserved for a parity bit.

FIG. 22 is a schematic view showing the data format for the directory recorded on pre-recorded tapes. A data packet 9100 begins with a start code 9101 having a length of one byte. The start code 9101 preferably has a value of 01 hex. A type code 9102 follows the start code 9101. The type code has a length of one byte. The type code 9102 preferably has a value 0X01. The next two bytes are a number of titles symbol 9103. The number of titles symbol 9103 represents the binary number coded in seven bit ASCII for the number of titles in the directory. In the preferred embodiment, only ASCII symbols '0'–'9' and 'A'–'Z' are used. For example the ASCII string '1F' represents the number 1FX. Since two ASCII characters are used, the largest number of titles is FF hex (256). Following the number of titles symbol 9103, a first program entry 9104, a second program entry 9105, and an Nth program 9106 contain the information related to N programs (FIG. 22 shows only the first, second and Nth program entries for simplicity and clarity). Each program entry is a fixed length and contains a group of 37 byte long symbols. The first four bytes represent the binary address coded in seven bit ASCII, in a manner similar to that described above, for the number of titles symbol 9103. For example, the ASCII characters string "3F1A" represents the address of 3F1A hex. Since four ASCII characters are used, the largest number is FFFF hex (65535). The fifth byte of the program entry represents the recording mode. A value 0X00 is the Standard Play (SP) mode, a value 0X01 is the Long Play (LP) mode, a value 0X10 is the Super Long Play (SLP) mode, and the values 0X11-0X7F are reserved. The remaining 32 bytes of the program entry represent the program title code. The program title code is preferably coded in seven bit ASCII. An end code 9107 having a 1 byte long symbol follows the Nth program entry 9106. The end code 9107 preferably has a value 03 hex. The data packet 9100 ends with a checksum 9108 that is one byte long symbol. The checksum 9108 makes the modulo 128 sum of the whole data packet equal to zero, i.e., modulo 128 (start code 9101+type code 9102+number of titles 9103+program entries 9104, 9105, 9106+end code 9107+checksum 9108) equals zero. For prerecorded tapes, the directory is repeated as often as space allows in the VBI. Typically this means once every few seconds.

FIG. 23 is a schematic view showing the data packet format for the absolute address packet. An absolute address data packet 9110 is written at the start of each program, at the end of the tape, and periodically during each program. The data packet 9110 has a start code 9111 having a length of one byte. The start code 9111, preferably has a value of 01 hex. Following the start code, there is a type code 9112 having a one byte long symbol. The type code 9112 preferably has a value of 0X02 hex. An absolute address 9113 follows the type code 9112 and has a length of four bytes. The absolute address 9113 represents the address coded in seven bit ASCII. As with the program entries 9104 described above in FIG. 22, only ASCII symbols '0'–'9' 'A'–'Z' are used. For example, ASCII character string '3F1A' represents the absolute address of 3F1A hex. Since four ASCII characters are used, the largest number of absolute addresses is FFFF hex (65535). The address is measured as the number of take-up spool spindle revolution counts (typically at 8 counts per revolution) from the beginning of the tape. An end code 9114 having a length of one byte follows the absolute address 9113. The end code 9114 preferably has a value of 03 hex. The absolute address data packet 9110 ends with a checksum 9115 having a one byte long symbol. The checksum makes the modulo 128 sum of the absolute address packet equal to zero, i.e., modulo 128 (start code 9111+type code 9112+absolute address 9113+end code 91114+checksum 9115) equals zero. The absolute address packet 9110 is repeated as often as possible on a line of the VBI, but is interleaved with the tape I.D. packet to be described below in FIG. 24. In the case of pre-recorded tapes, the absolute address packet 9110 is also interleaved with the directory packet.

FIG. 24 is a schematic view showing the data packet format for the tape identification number (TID). For PR tapes, the tape I.D. is written repeatedly on one line of the VBI. For HR and RI tapes, the TID is written on the control track after the address mark at the beginning of each program and at the end of the last program. For HR tapes, the TID is also repeated as often as possible on the tape preferably once every few seconds. For RI tapes, during the first pass of re-indexing, these are no other TIDS. During the next play of the tape, additional TIDS are inserted as often as possible, preferably on the order of once every few seconds. In addition, the TIDS are interleaved with an address packet. As will be described below, the TID is a 48 bit number for HR and RI tapes. This number is composed of a header, a random machine identification number, and a tape number. Consequently, the danger of tapes having the same identification will be minimized. For PR tapes, the TID corresponds to the UPC code of the tape (a 12 digit number). This way city libraries, tape rental or retail stores can all adopt the TID of the indexing system.

A TID data packet 9120 is twelve bytes long. For the TID data packet, a byte refers to a seven bit data symbol plus an eighth bit which is reserved for a parity bit. The data packet 9120 begins with a start code 9121 having a length of one byte. The start code 9121 preferably has a value 01 hex. Following the start code 9121, a type code 9122 having a one byte long symbol and preferably has a value 0X04. A tape I.D. 9123 follows the type code 9122 and is eight bytes long. As noted above, the tape I.D. 9123 is determined differently for the type of tape. For a PR tape, the tape I.D. 9123 is a twelve digit UPC code which is a 48 bit number with most significant bit (MSB) of less than 0F0 hex. For HR and RI tapes, the tape identification 9123 is composed of three parts. The first part is an eight bit header in the MSB which is equal to 0FF hex. The next 24 bits are an identification generated by a random number sequence to generate a high probability of uniqueness for each VCR. The 24 bit machine I.D. is created as a random number which is seeded by some condition that will most likely be different between users. In a first implementation the 24 bits is broken into two twelve bit numbers. At the first power up of the VCR, the counter is initialized with counting pulses of less than 0.25 milliseconds duration. The counter is stopped by the user's first and second key pressing on the remote controller. These two twelve bit random numbers are then combined to form the machine identification. Because the counter is very fast and the key pressed by the user is very random, the machine identification should be sufficiently random so that two VCR's will have a chance of approximately one out of sixteen million to have identical machine I.D.'s. A 16 bit tape number follows the machine I.D. which allows for 65536 tapes in one VCR. An end code 9124 follows the tape I.D. 9123 and is one byte long. The end code 9124 preferably has a value of 03 hex. A checksum 9125 follows the end code 9124 and is one byte long. The checksum 9125 makes the modulo 128 sum of the whole directory packet zero, i.e., modulo 128 of (start code 9121+ type code 9122+tape I.D. 9123+end code 9124+checksum 9125) equals zero.

In an alternate embodiment, the machine identification portion of the 48 bits of the tape I.D. 9123 may be the Julien day, hour, and minute when the VCR is first put into use.

Second Embodiment of Data Format

FIG. 25 is a schematic view showing the format for the directory packet recorded in the VBI for prerecorded tapes. The directory preferably provides up to 32 characters per table. A D(N) packet 2601 has the following symbols: start code, type, N, start address, stop address, record speed, program category, version, language, title text, expand byte, stop code and checksum. Table VII shows the length in bytes and the value for each symbol. The N symbol represents the program number in the directory when N is greater than 0. Each byte is a coded text number from 30 hex to 3F hex which equates to 0 hex to F hex (when N equals 0, the packet described below in conjunction with FIG. 26 is used to represent the title of the tape). The start address symbol represents the number of minutes measured in the SLP mode from the beginning of the tape to the beginning of the program. The stop address symbol represents the number of minutes measured in the SLP mode from the beginning of the tape to the end of the program. Each byte of the start address and stop address symbols is a coded hexadecimal number from 30 hex to 3F hex which form a number having the largest possible value of FFF hex. A record speed symbol defines the recording speed of the program. The recording speed symbol represents the optimal tape speed at which the indexing VCR 10 should record the program. For example, a super long play speed may be transmitted for programs, such as sports or nature programs, where the user may want to use the freeze frame feature. As another example, a standard play speed may be transmitted for recording long programs so as to conserve tape. If the recording speed is defined to be blank, the length is defined based on SLP for better resolution. An "undefined" recording speed is used when the recording speed changes during a program. Undefined values are reserved for further expansion. A program category (PC) symbol is defined per the E.I.A. definition. The version symbol identifies the version of the program titled format. For versions other than 20 hex, the indexing VCR 10 ignores the following bytes up to a terminator code (which is preferably 1E hex) and displays the titled text as a blank line. A language symbol represents different languages. The title text symbol has a length of M bytes where M is a variable even number, preferably not greater than 40, including the 1E hex terminator code. The title text symbol represents the program title in ASCII and is terminated by the character 1E hex. If the character number is odd, one more null character is added before the terminator code. In addition, an attribute character can be added to the title text to enhance the indexing display. The attribute character starts with a value of 1D hex which is followed by a character in the range 20 hex to 7F hex. Attribute codes are defined below in conjunction with FIG. 55. The expand byte symbol has a length of N bytes where N is a variable even number from 0 to 6. The expand bytes are used for expansion code for the indexing VCR 10. The checksum symbol is defined as the modulo 128 sum of the packet from the start code to the stop code. As will be described below, the D(N) data packet 2601 is encrypted and must be decrypted by an algorithm in the microprocessor controller 31 (FIG. 1) or the chip 702 (FIG. 7) in the indexing VCR 10.

TABLE VII

| Symbol | Length (Bytes) | Value |
| --- | --- | --- |
| Start Code | 1 | 07 hex |
| Type | 1 | 7E hex |
| N | 3 | Each byte coded hex number. 30-3F hex |
| Start Address | 3 | Each byte coded hex number. 30 3F hex |
| Stop Address | 3 | Each byte coded hex number. 30-3F hex |
| Record Speed | 1 | 20 hex: LP 21 hex: SP 22 hex: SLP 23 hex: blank 24 hex: undefined Others: Reserved |
| Program category (PC) | 1 | Per E.I.A. definition. |
| PC Extension | 1 | 20 hex: non-broadcast indexed material. 21 hex: video magazine. 22 hex: sales catalog. |

TABLE VII-continued

| Symbol | Length (Bytes) | Value |
| --- | --- | --- |
|  |  | 23 hex: classified ads. 24 hex: 7F hex: reserved. |
| Version | 1 | 20 hex: first version |
| Language | 1 | 20 hex to 7F hex, 20 hex: English |
| Title text | m | Terminator code: 1E hex |
| Expand Byten | N | Even number 0 to 6; each byte 20 hex-7F hex. |
| Stop Code | 1 | 0F hex. |
| Checksum | 2 | 00 hex-7F hex |

FIG. 26 is a schematic view showing the format for the directory packet D(0) for the tape title recorded in the VBI for prerecorded tapes. A D(0) data packet 2602 has the following symbols in order: start code, type, N, length, reserve, reel diameter, reserved, version, language, title text, expand byte, stop code and checksum.

Table VIII shows the length in bytes and the value of each symbol. The D(0) data packet 2602 is similar to the D(N) data packet 2601 described below in FIG. 71 where the parameters, start address, stop address, PC, and record speed are redefined to denote the length of tape and the reel diameter. The D(0) data packet 2602 is predefined as the tape parameter packet for both HR and PR tapes. The length symbol indicates the length of the tape in minutes at the SLP speed. Each byte is a coded hexadecimal number which provides a value in the range of 000 hex to FFF hex. The reel diameter symbol indicates the physical diameter of the tape reel in millimeters. The version symbol indicates the version of the tape title format. For versions other than 20 hex (the first version), the indexing VCR 10 ignores the following bytes up to the terminator code contained within the title text symbol and displays the text title as a blank line. The language symbol represents the different languages around the world. Other values for the language symbol may be defined by the manufacturer of the indexing VCR 10. The length of the title text is in bytes where M is a variable even number including the terminator code. The title text symbol represents the tape title in ASCII and is terminated by the character 1E hex. If the character number is odd, one null character is added before the terminator code 1E hex. An attribute character can be added to the text at a later stage. The expand byte symbol has a length of N bytes where N is a variable odd number ranging from zero to five. The value of the check sum is the modulo 128 sum of the packet from the start code to the stop code.

TABLE VIII

| Symbol | Length (Bytes) | Value |
| --- | --- | --- |
| Start Code | 1 | 07 hex |
| Type | 1 | 7E hex |
| N | 3 | Byte 1, 2, 3: 30 hex, 30 hex, 30 hex |
| Length | 3 | Each byte coded hex number 03 hex to 3F hex |
| Reserve | 3 | 30 hex, 30 hex, 30 hex |
| Reel Diameter | 2 | Each byte coded hex number, 30 hex-3F hex |
| Reserved | 1 | 30 hex. |
| Version | 1 | 20 hex: first version |
| Language | 1 | 20 hex to 7F hex, 20 hex: English |
| Title text | m | Terminator code: 1E hex |
| Expand Byte | n | Odd number 0 to 5; each byte 20 hex-7F hex. |
| Stop Code | 1 | 0F hex. |
| Checksum | 2 | 00 hex 7F hex |

FIG. 27 is a schematic view showing the format for a TP packet recorded on the VBI for HR tapes and PR tapes. A TP packet 2603 contains both the TID 2604 and the program number. The TP packet has the following symbols: start code, type, TID, reserved, N, stop code and check sum.

Table IX shows the length in bytes and the value for each symbol. The TID symbol contains 10 bytes where each byte represents 4 bits, as will be described for the TID described in FIG. 28 for an HR tape and in FIG. 29 for a PR tape. The N symbol is defined to be the program number with each byte representing four bits for a total length of twelve bits. For communication between the indexing VCR 10 and the external device 73, the 12 bit item N may be used for other purposes. The checksum is the modulo 128 sum of the packet from the start code to the stop code.

TABLE IX

| | TP Packet on VBI | |
| --- | --- | --- |
| Symbol | Length (Bytes) | Value |
| Start code | 1 | 07 hex |
| Type | 1 | 7D hex |
| TID | 10 | Each byte is coded hex number 30 hex – 3F hex |
| Reserved | 1 | 30 hex |
| N | 3 | Each byte is coded hex number 30 hex – 3F hex |
| Stop Code | 1 | 0F hex |
| Checksum | 2 | 00-7F hex |

FIG. 28 is a schematic diagram showing the TID for an HR tape. The TID 2604 is a 5 byte number. Bit 39 and bits 38–31 are 0. Bits 30–16 are the machine ID. Bits 15–0 are the tape number. As described above, the 15 bit machine ID is a random number generated by the indexing VCR 10 at its first power up. This provides a 1 in 32,768 probability that two indexing VCRs have identical machine IDs. A 16 bit tape number allows each indexing VCR 10 to have 65,536 tapes stored in the RAM 33. Alternatively, the tape number may be composed of a different number of bits.

FIG. 29 is a schematic diagram showing the TID for a PR tape. As with the TID for an HR tape, the TID for a PR tape is a 5 byte number. Bit 39 is one, bits 38–0 are the eleven digit UPC number represented in binary form without the parity digit. By using the UPC number, businesses, such as libraries, tape rental stores, and retail outlets, can adopt the TID. Accordingly, usage of PR tapes can be monitored and analyzed. When the TID is stored into the RAM 33, 5 bytes is preferred. However, if only 4 bytes are recorded, bits 0–30 and bit 39 are stored in the RAM 33.

Operation

Figure 30:
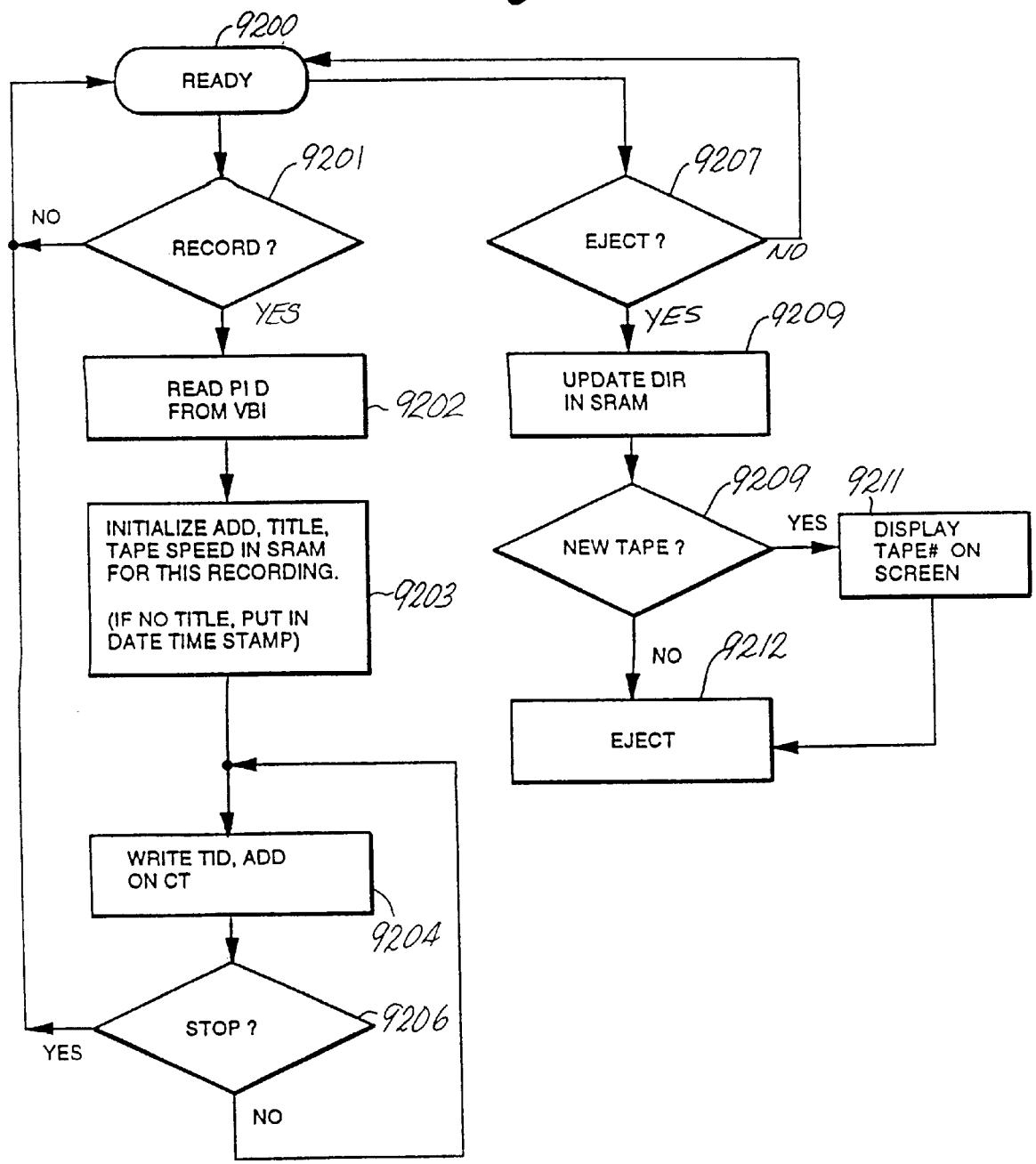
FIG. 30 is a flow chart showing the steps employed in the operation of an indexing VCR using a FMAS addressing system for writing a tape identification number, an address, and a directory to a home recorded tape (HR tape) during recording or ejection.

FIG. 30 is a flow chart showing the steps employed in the operation of an indexing VCR using a FMAS addressing system for writing a tape identification number, an address, and a directory to a home recorded tape (HR tape) during recording or ejection. When a tape is in the VCR and the directory controller 30 knows the present tape identification number and the current address, the VCR is ready for recording on the tape or ejecting the tape (step 9200). The microprocessor controller 31 reads the TID and the address from the control track 42c. For existing HR tapes, the TID and address are read from the control track 42c. For a new blank tape, the microprocessor controller 31 assigns a TID to the tape and resets the address to zero. The microprocessor controller 31 waits for either a record signal or an eject command. If a record signal is received (step 9201), the microprocessor controller 31 reads the program identification number from the VBI of the signal that is to be recorded (step 9202). It is assumed that the microprocessor controller 31 has already retrieved the directory for the inserted tape if the inserted tape is an existing HR tape. For a new blank tape, the microprocessor controller 31 creates a new directory in the RAM 33. For this recording, the microprocessor controller 31 initializes the address, the title and the tape speed in the RAM 33. If no title is read from the VBI (step 9202), the microprocessor controller 31 uses a date time stamp as the title (Step 9203). The microprocessor controller 31 then commands the VCR control logic circuit 21 and subsequently the control and audio track head logic circuit 11 to write the TID and the address on the control track 42c. (Step 9204) The microprocessor controller 31 continues to write the date and address on the control track 42c until a command to stop recording is received. (Step 9206) The microprocessor control 31 then returns to a ready state where it awaits a further command at step 9200.

On the other hand, if a command to eject the tape is received (Step 9207), the microprocessor controller 31 updates the directory that is stored in the RAM 33, including the current tape location (current LOC) flag 1049 (See FIG. 3) which indicates the absolute address of the location of the tape when the tape is ejected referenced to the beginning of the tape. If the tape is a new blank tape (Step 9209), the microprocessor controller 31 displays on the video display 50a the tape number of the tape, so that the user can then mark the housing of the cassette 40 with this new number for subsequent identification. The VCR control logic circuit 21 then commands the motor and mechanical control circuit 5 to eject the tape (Step 9212).

Figure 31:
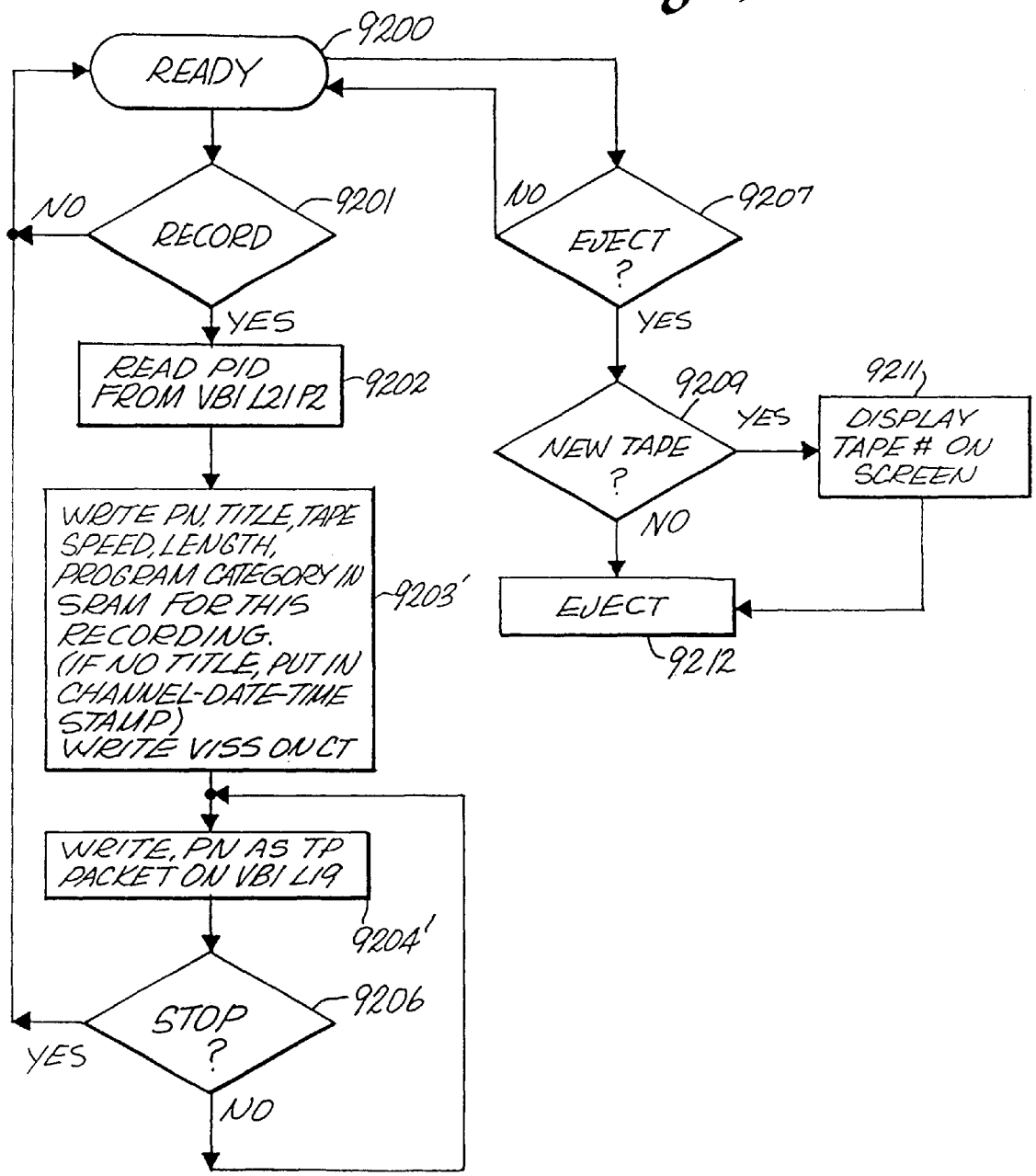
FIG. 31 is a flow chart showing the steps employed in the operation of an indexing VCR using a VISS PLUS TP addressing system of writing a tape identification and a program number to a home recorded tape (HR tape) during recording.

FIG. 31 is a flow chart showing the steps employed in the operation of an indexing VCR using a VISS PLUS TP addressing system of writing a tape identification and a program number to a home recorded tape (HR tape) during recording. Like steps to FIG. 30 have like numbers. When a tape is in the VCR and the directory controller 30 knows the present tape identification and the current program number, the indexing VCR 10 is ready for recording on the tape or ejecting the tape (step 9200). The microprocessor controller 31 reads the TID and the program number from the VBI. For a new blank tape, the microprocessor controller 31 assigns a TID to the tape and resets the program number to one. The microprocessor controller 31 waits for either a record signal or an eject command.

When a record signal is received (step 9201), the microprocessor controller 31 reads the program identification (Program I.D.) from line 21, field 2 of the VBI of the signal that is to be recorded (step 9202). It is assumed that the microprocessor controller 31 has already retrieved the directory for the inserted tape if the inserted tape is an existing HR tape. For a new blank tape, the microprocessor controller 31 creates a new directory in the RAM 33. For this recording, the microprocessor controller 31 initializes the program number (and address in VCRs having an absolute address system), the title, the tape speed, length, and the program category in the RAM 33. If no title is read from the VBI (step 9202), the microprocessor controller 31 uses a date-time stamp as the title. (Step 9203') The microprocessor 31 then commands the VCR control logic circuit 21 and subsequently the control and audio track head logic circuit 11 to continuously write the TID and the program number as a TP data packet on line 19 of the VBI (Step 9204'), until a command to stop recording is received. (Step 9206) The microprocessor control 31 then returns to a ready state where it awaits a further command at step 9200.

On the other hand, when a command to eject the tape is received (Step 9207), if the tape is a new blank tape (Step 9209), the microprocessor controller 31 displays on the video display 50a the tape number of the tape, so that the user can then mark the housing of the cassette 40 with this new number for subsequent identification. The VCR control logic circuit 21 then commands the motor and mechanical control circuit 5 to eject the tape (Step 9212).

After the indexing VCR 10 has started a recording, it reads line 21 field 2 to find the title of the show and write it into the directory in the RAM 33. If the clock of the indexing VCR 10 has not been set correctly or if the program starts slightly later than scheduled, the retrieved title may be that of the previous program. In one embodiment, the indexing VCR 10 waits a predetermined time, such as 30 seconds, after the recording starts before reading and storing the title. On the other hand, for the recording of broadcasted video magazines, the indexing VCR 10 may read and store the title right after receiving the VM packet, because the VM packet and the new section title are synchronized.

Retroactively Indexing a Previously Recorded Tape

Figure 32:
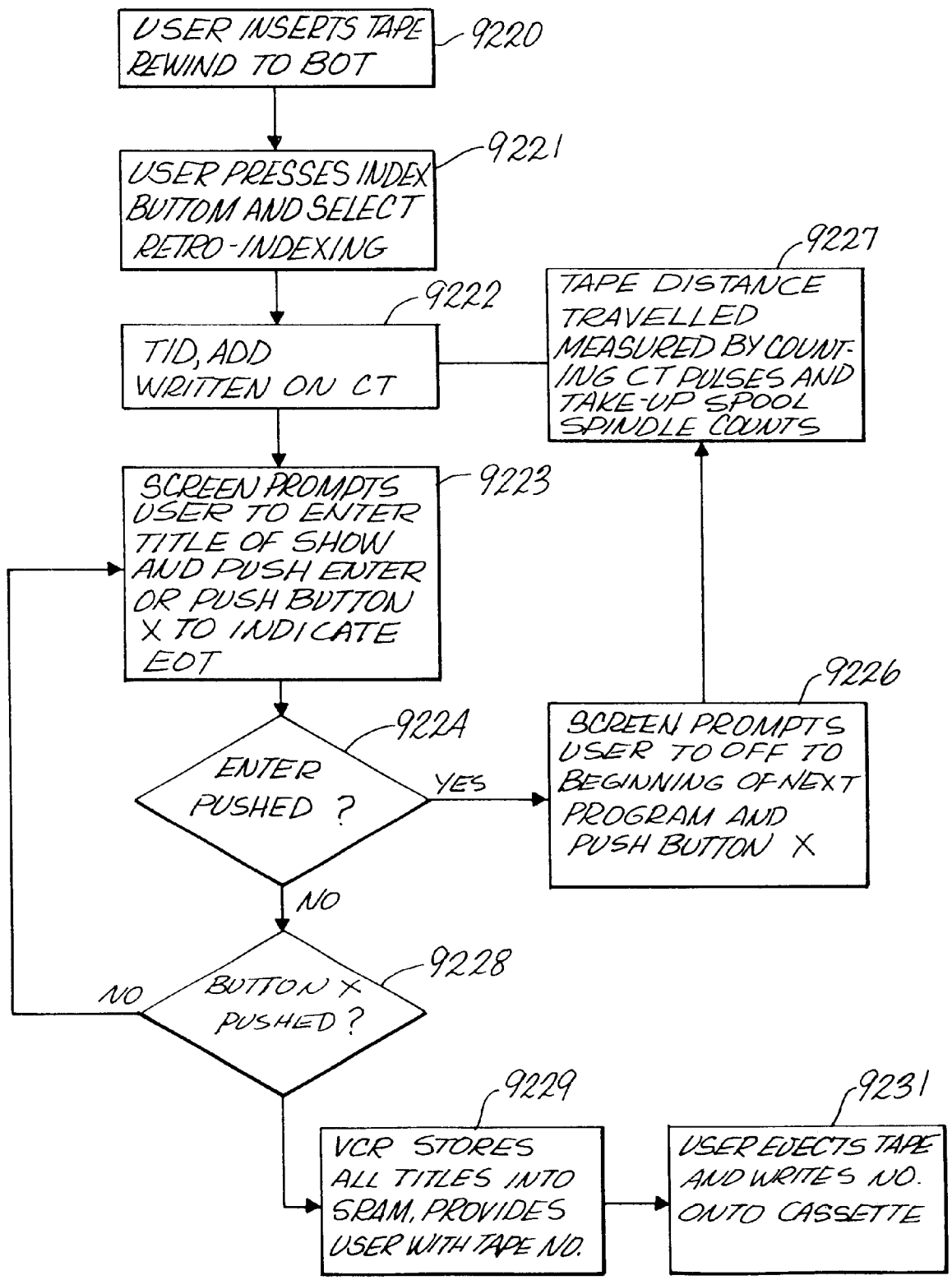
FIG. 32 is a flow chart showing the steps employed to write a tape identification, an absolute address and a directory to create a retroactively indexed tapes by an indexing VCR using a FMAS or LRAS addressing system.
Figure 346:
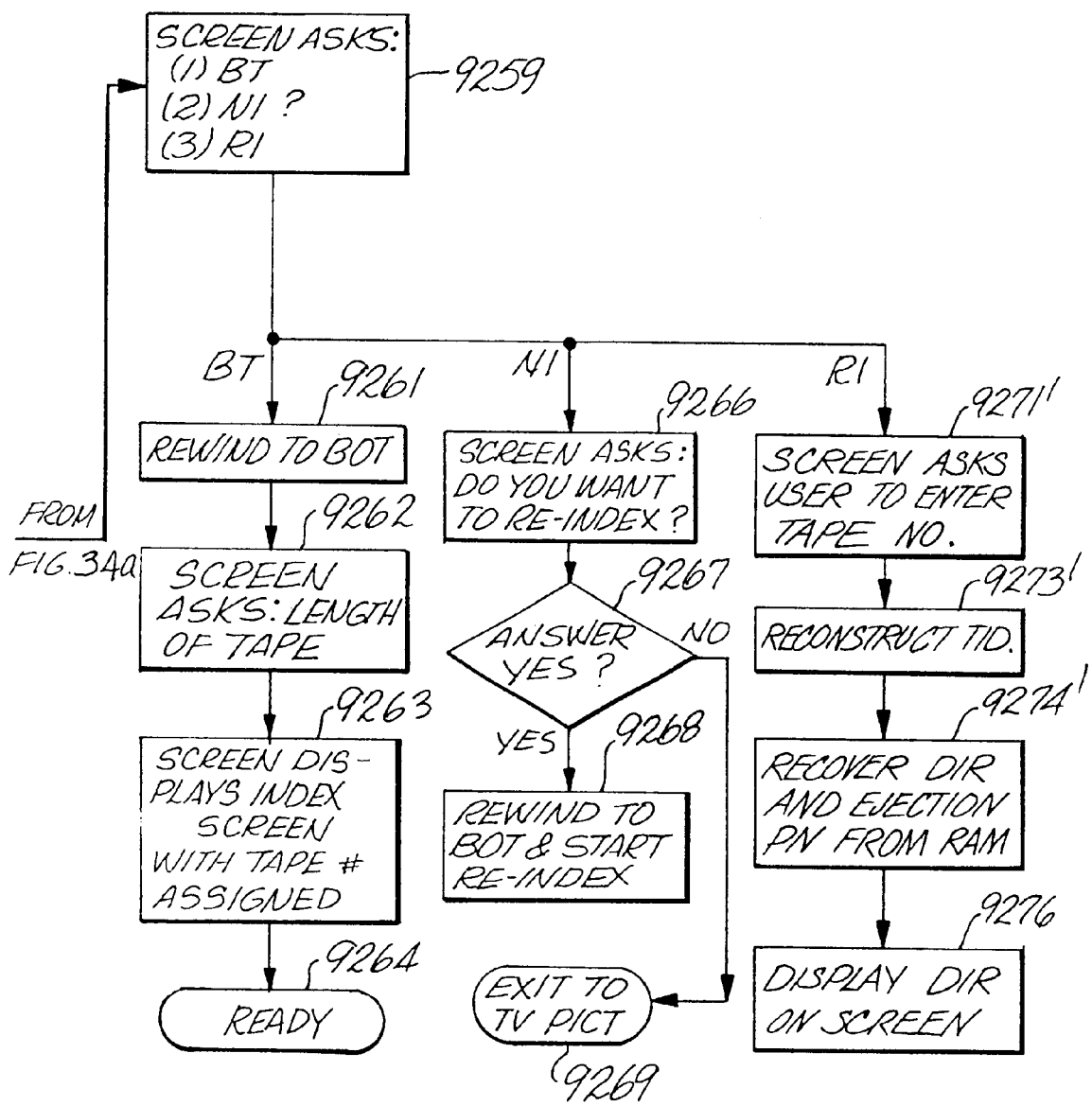

FIG. 32 is a flow chart showing the steps employed to write a tape identification, an absolute address and a directory to create a retroactively indexed tapes by an indexing VCR using a FMAS or LRAS addressing system. As described above, the retroactively indexed (RI) tape has a preexisting plurality of programs recorded thereon. A user who has a VCR or camcorder before owning an indexing VCR also has an existing collection of video tapes. The user may want to retroactively create an index of each tape to be able to utilize the indexing capabilities of the indexing VCR. Thus, in the preferred embodiment, the directory is created and stored in the RAM 33, and the TID and the absolute addresses are stored on the control track 42C of the RI tape.

The user inserts the un-indexed recorded tape (this tape is to become a retroactively indexed tape) into the VCR 1 and rewinds the tape to the beginning of the tape (BOT) (step 9220). The user then presses the index button on the remote controller 75 or 1300 and selects retro-indexing from the menu display on the screen 50a (step 9221). Alternatively, the remote controller 1300 may have a retroactively indexed button. Upon that selection, the microprocessor controller 31 then writes a TID and an absolute address on the control track 42C (step 9222). The TID is randomly created in the manner described above in FIG. 24. The microprocessor controller 31 then displays on the display 50a a prompt to the user to enter the title of the first program or show on the tape and to press the ENTER button on the remote controller 1300 or alternatively to push button X to indicate that it is at the end of the tape (EOT) (step 9223). Button X may be any button on the remote controller 1300 that is not used for entering a title, for example the VCR Plus+™ button. Alternatively, the title of programs may be entered after all programs have been numbered. If the ENTER button has been pushed (step 9224), the microprocessor controller 31 then prompts the user on the video display 50 to fast forward (FF) the tape to the beginning of the next program and push button X (step 9226). The microprocessor controller 31 uses the monitored signals from the tape movement sensor 22 and processed by the position logic and counter circuit 9 to calculate the tape distance traveled measured by counting the control track pulses and take-up spool spindle counts as described below (step 9227). Tape distance measuring methods are described below. The microprocessor controller 31 then repeats the process of writing the TID and the address on the control track 42C at step 9222 and prompts the user to enter the title of the show at step 9223. At subsequent passes through step 9222, the address now written on the control track 42C is the address calculated from the tape distance that has been traveled during the fast forward to the program at step 9227.

When button X has been pushed to indicate the end of tape (step 9228), the microprocessor controller 31 stores all the titles entered by the user at step 9223 into the RAM 33 in a memory location corresponding to the tape identification number (step 9229). The microprocessor controller 31 also displays the tape number to the user at step 9229 so that when the user ejects the tape he may write the tape number onto the cassette housing (step 9231). The tape has now been retroactively indexed so that the control track 42C contains the TID and address information and the directory information is stored in the RAM 33 of the VCR 1. The operation of the VCR when an RI tape is inserted therein is described below in connection with FIG. 33.

In an alternate embodiment to FIG. 32, at step 9222, the microprocessor controller 31 writes a VISS mark on the control track of the tape. In addition, a program number, such as 1 for the first program, 2 for the second program, and so forth, and a TID number are also written on the control track. The VISS marks are used for addressing when the tape is later played in the VCR. When the tape is inserted into the indexing VCR 10, the VCR reads the TID from the control track 42c. The microprocessor controller 31 then reads the directory associated with the tape from the RAM 33. Now knowing that the tape is a retroactively indexed tape, the microprocessor controller 31 searches the control track 42c for the VISS mark.

In embodiments where the TID is stored in the VBI for PR and HR tapes, when the RI tape is inserted into the VCR, the microprocessor controller 31 tries to read a TID from the VBI. After failing to find a TID in the VBI, the microprocessor controller 31 knows the tape is not a PR or a HR tape, and searches the control track for a VISS mark. When a VISS mark is found, the microprocessor controller 31 reads the TID recorded with the VISS mark and then retrieves the associated directory from the RAM 33.

Alternate Embodiment for Retroactively Indexing an Old Tape

In an alternate embodiment to FIG. 32 for indexing VCRs using the VISS+TP addressing system, at step 9222 the microprocessor controller 31 writes a VISS mark on the control track 42c of the tape. The microprocessor controller 31 also generates a program number as described above in conjunction with FIG. 28. The microprocessor controller 31 prompts the user to enter the title of the show and to fast forward to the next program as shown in steps 9223, 9224, 9226, and 9228. In a system without absolute addressing, step 9227 is not performed. However, in systems with absolute addressing (VISS+TP+AA), the microprocessor controller 31 calculates an absolute address at step 9227. After the user has indicated that the last program has been entered at step 9229, the microprocessor controller 31 stores all titles, program numbers and the ejection program number into the RAM 33 and provides the user with a tape number for marking the cassette housing.

When this tape is later inserted into the indexing VCR 10, the microprocessor controller 31 attempts to find a TID in the VBI and when it is unable to find it, it displays a prompt to the user to enter the tape number. From this tape number, the microprocessor controller 31 reconstructs the TID and recovers the directory as well as the ejection program number from the RAM 33. Using the ejection program number as the current program number, the indexing VCR 10 is able to perform the indexing functions.

If the tape has been played in a non-indexing VCR since being indexed, the ejection program number will be different than the tape program number. In systems with absolute addresses, the indexing VCR 10 is able to recalculate its program number by using the detected address to determine its location from the directory, using the recalibration method described below in conjunction with FIGS. 34a–34b.

Operation of Identifying Tape and Recovering Directory

FIGS. 33a–33b are flow charts showing the steps employed in the operation of the indexing VCR using a FMAS addressing system when a tape is inserted therein. When a tape is inserted into the VCR (step 9240), the microprocessor controller 31 commands the VCR control logic circuit 21 to play the tape for N seconds and read the control track for the TID and an address (step 9241: this step is referred to as step [A] in subsequent steps of FIGS. 33a–33b). N is preferably between 3 to 5 seconds. After reading a TID and an address from the tape, the microprocessor controller 31 commands the VCR control logic circuit 21 to stop the playing of the tape (step 9242). The microprocessor controller 31 waits until the INDEX button on the remote controller is pressed (step 9243). When the INDEX button is pressed, if a TID and an address were read at step 9241 (step 9244), the microprocessor controller 31 determines from the TID whether the tape is a (1) home recorded tape (HR), a (2) prerecorded tape (PR), or a (3) home recorded (HR) loaner (step 9246).

If at step 9246 the tape is a HR tape (step 9247), the microprocessor controller 31 recovers the directory 33a corresponding to the tape with that TID from the RAM 33 (step 9248). The microprocessor controller 31 then displays the recovered directory on the video display 58a (step 9249) and then enters a ready mode (step 9251). The ready mode is a mode in which the microprocessor controller 31 knows the current address and the TID.

If at step 9246 it is determined that the tape is a prerecorded tape (step 9252), the microprocessor controller 31 reads the directory to determine if the TID is stored in the RAM 33 (step 9253). If it is in the RAM 33, the microprocessor controller 31 recovers the directory from RAM 33 as described above in step 9248. On the other hand, if the TID is not in the RAM 33, the microprocessor controller 31 commands the VCR control logic circuit 21 to play the tape so that the microprocessor controller 31 can read the directory from the VBI on the tape (step 9254) and then displays the read directory on the screen at step 9249.

On the other hand, if the tape is determined to be a home recorded loaner tape (an HR tape that is indexed on a first indexing VCR that is played in a second indexed VCR that is not interconnected to the first VCR) at step 9246 (step 9256) the microprocessor controller 31 commands the VCR to fast forward (FF) to the end of tape (EOT) (step 9257) to read the directory from the VBI at step 9254.

However, if at step 9244 the VCR had not read a TID and address at step 9241, and referring now to FIG. 33*b*, the microprocessor controller 31 determines whether video was detected at step 9241 (step 9258). If no video was detected, the microprocessor controller 31 displays on the screen a query as to whether the tape is a blank tape, (BT), a non-indexed tape (NI), or a retroactively indexed tape (RI) (step 9259). If at step 9259 the tape is a blank tape, the microprocessor controller 31 commands the VCR control logic circuit 21 to rewind the tape to the beginning of tape (BOT) (step 9261) and display on the screen 50*a* a question asking the user to enter the length of the tape (step 9262). Alternatively, the microprocessor controller 31 may automatically determine the length of the tape using one of the length determination methods described below. The microprocessor controller 31 generates a new tape identification number for the blank tape in a manner described above in FIG. 23 and displays an index screen with the assigned TID (step 9263). The microprocessor controller 31 then enters a ready mode (step 9264).

On the other hand, if at step 9259 the tape is a non-indexed tape, the microprocessor controller 31 displays on the screen 50*a* the question "Do you want to re-index?" (step 9266). If the user answers yes (Step 9267), the microprocessor controller 31 commands the VCR to rewind the tape to the beginning of the tape and start re-indexing the tape as described above in FIG. 32. (Step 9268) If, however, the user does not want to re-index the tape, (Step 9267) the microprocessor controller 31 removes the screen and commands the VCR control logic circuit 21 to display the TV picture read from the videotape. (Step 9269).

If, however, the tape is a retroactively indexed tape at step 9259, the microprocessor controller 31 commands the VCR to rewind the tape and search for a TID mark on the control track. (Step 9271) The rewind and search continues until an address and TID are detected (Step 9272). The microprocessor controller 31 then searches the RAM 33 for a program with the detected TID, and if the microprocessor controller finds the TID in the RAM 33. (Step 9273), the controller 31 recovers the directory of the tapes associated with the TID on the RAM 33 (Step 9274) and displays the recovered directory on the screen 50*a* (Step 9276). On the other hand, if the microprocessor controller 31 does not find the TID in the RAM (Step 9273), it commands the VCR to fast forward to the end of tape (Step 9277) to read the directory from the VBI. (Step 9278) The read directory is then displayed on the screen at step 9276.

If video is detected at step 9241, the microprocessor controller 31 proceeds from step 9258 described above, to command the VCR to rewind the tape and look for a TID mark on the control track 42*c* (Step 9279) If the beginning of the tape is reached (Step 9281), the microprocessor controller 31 proceeds to treat the tape as a non-indexed tape at step 9266 described above. However, if the beginning of the tape has not been reached the VCR continues to rewind until an address mark and TID is detected in the control track 42*c* (Step 9282) and the microprocessor controller 31 determines whether to recover the directory from the RAM 33 or the VBI at step 9273 described above.

FIGS. 34*a*–34*b* are flow charts showing the steps employed in the operation of the indexing VCR, using the VISS PLUS TP addressing system, when a tape is inserted therein. Like steps to FIGS. 33*a*–33*b* have like numbers. When a tape is inserted into the VCR (step 9240), the microprocessor controller 31 commands the VCR control logic circuit 21 to play the tape for N seconds and read the VBI for a TID and program number (step 9241': this step is referred to as step [A'] in subsequent steps of FIGS. 34*a*–34*b*). The time N is preferably between 2 to 5 seconds. In an indexing VCR using a VISS PLUS TP addressing system and an absolute addressing system, the VCR also determines the absolute address. After reading a TID and program number from the tape, the indexing VCR 10 stops playing the tape (step 9242). After waiting for the INDEX button on the remote controller to be pressed (step 9243), if a TID and a program number were read at step 9241', the microprocessor controller 31 determines from the TID whether the tape is a home recorded tape (HR) or a prerecorded tape (PR) (step 9246'). The microprocessor controller 31 then operates as in FIGS. 33*a*–33*b* as described above for steps 9247 through 9254.

On the other hand, if at step 9244' the indexing VCR 10 had not read a TID and program number at step 9241', and referring now to FIG. 34*b*, the microprocessor controller 31 displays on the screen a query as to whether the tape is a blank tape, (BT), a non-indexed tape (NI), or a retroactively indexed tape (RI) (step 9259). If at step 9259 the tape is a blank tape, the microprocessor controller 31 operates as in FIGS. 33*a*–33*b* as described above for steps 9261 through 9264. On the other hand, if at step 9259 the tape is a non-indexed tape, the microprocessor controller 31 operates as in FIGS. 33*a*–33*b* as described above for steps 9266 through 9269.

If, however, the tape is a retroactively indexed tape at step 9259, the microprocessor controller 31 displays on the screen 50*a* a prompt to the user to enter the tape number of the inserted tape (step 9271'). From this number, the microprocessor controller 31 reconstructs the TID of the tape (step 9273') and recovers from the RAM 33 the directory of the tape associated with the TID (Step 9274') and displays the recovered directory on the screen 50*a* (Step 9276).

When a RI tape is inserted into the VCR, the program number calculated from the ejection program number may be verified and recalibrated in an indexing VCR having an absolute addressing system. At step 9241', the indexing VCR calculates the absolute address using one of the methods described below in conjunction with FIGS. 38–41. At step 9274' after recovering the directory, the microprocessor controller 31 determines the program number related to the measured absolute address. If the tape has been played in a non-indexing VCR or in an indexing VCR that is not coupled to the user's VCR, the ejection program number will differ from the calculated program number. The VCR then recalibrates itself by using the calculated program number instead of the ejection program number.

Figure 35:
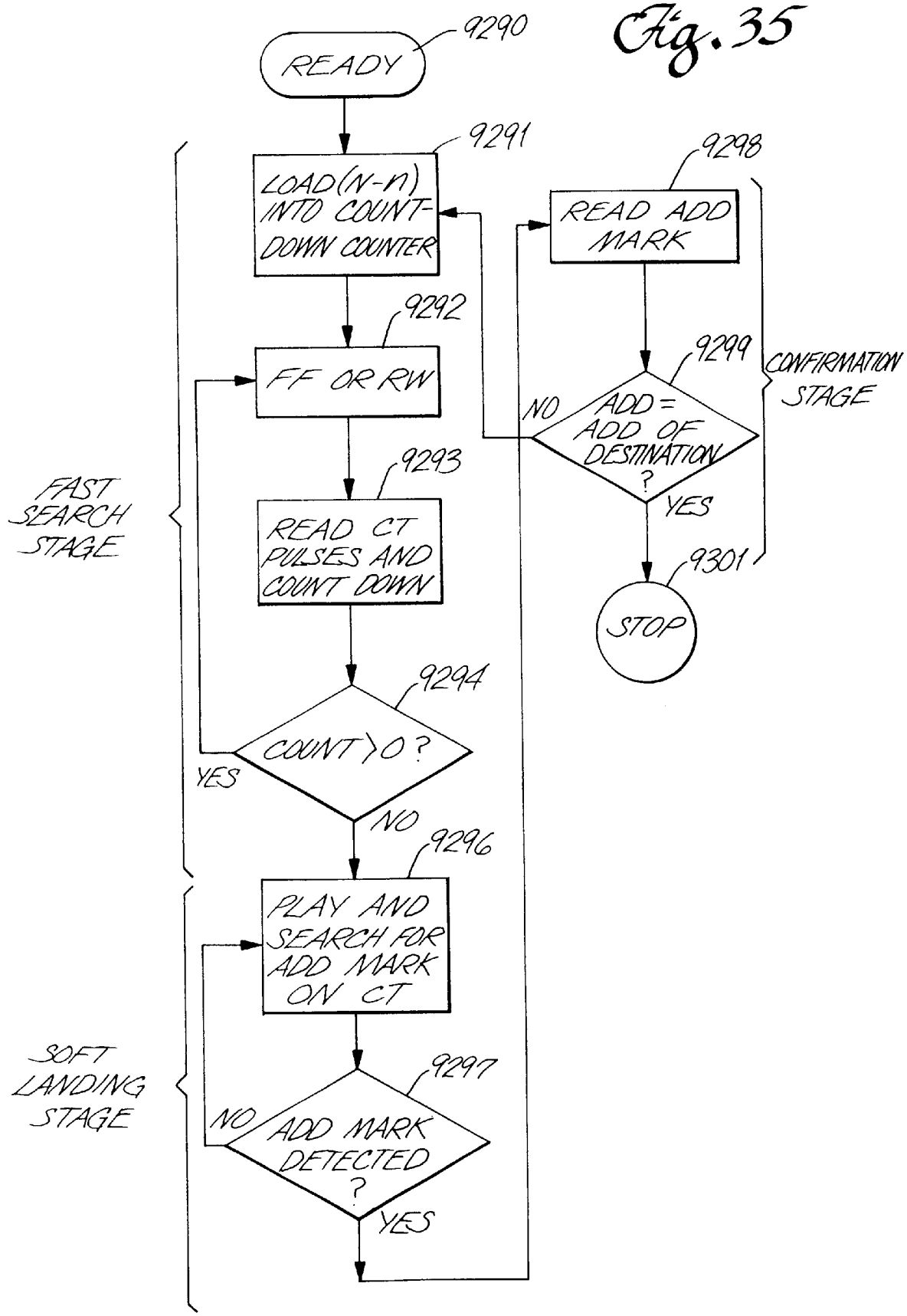
FIG. 35 is a flow chart showing the steps employed in the search for a program on an indexed tape using a FMAS addressing system.

FIG. 35 is a flow chart showing the steps employed in the search for a program on an indexed tape using a FMAS addressing system. The microprocessor controller 31 is in a ready mode by knowing the current address of the tape and the destination address of a user selected program entry from the directory. (Step 9290) The microprocessor controller 31 first enters a fast search stage. The microprocessor controller 31 loads into a count down counter the value of the number of control track pulses between the current position and the destination position (N) subtracted from the number of counts before the destination (n) (Step 9291). Based on the direction to the destination address, the microprocessor controller 31 commands the VCR to either fast forward or rewind the tape (step 9292), and during the fast forward or rewind, monitors the read control track pulses and counts down from the N value loaded at step 9291 (Step 9293). The fast forward or rewind continues until the count is not greater than zero. (Step 9294) The microprocessor controller 31 now enters a soft landing stage in which the VCR is commanded to play and search for the address marks on the control track. (Step 9296) This search continues until an address mark is detected. (Step 9297) Upon detection, the microprocessor controller 31 enters a confirmation stage. The address mark is read (Step 9298) and if the read address does not equal the address of the destination (Step 9299) the microprocessor controller 31 loads a new count into the countdown counter at step 9291 described above. Otherwise, when the address equals the address of the destination, the tape is at the requested location and the microprocessor controller 31 commands the VCR to stop (Step 9301).

The addressing system used in FIG. 35 may use any of the location determination methods described below, such as counting the number of control track pulses between the current address and the destination address or counting the take-up spool spindle revolution counts.

Figure 36:
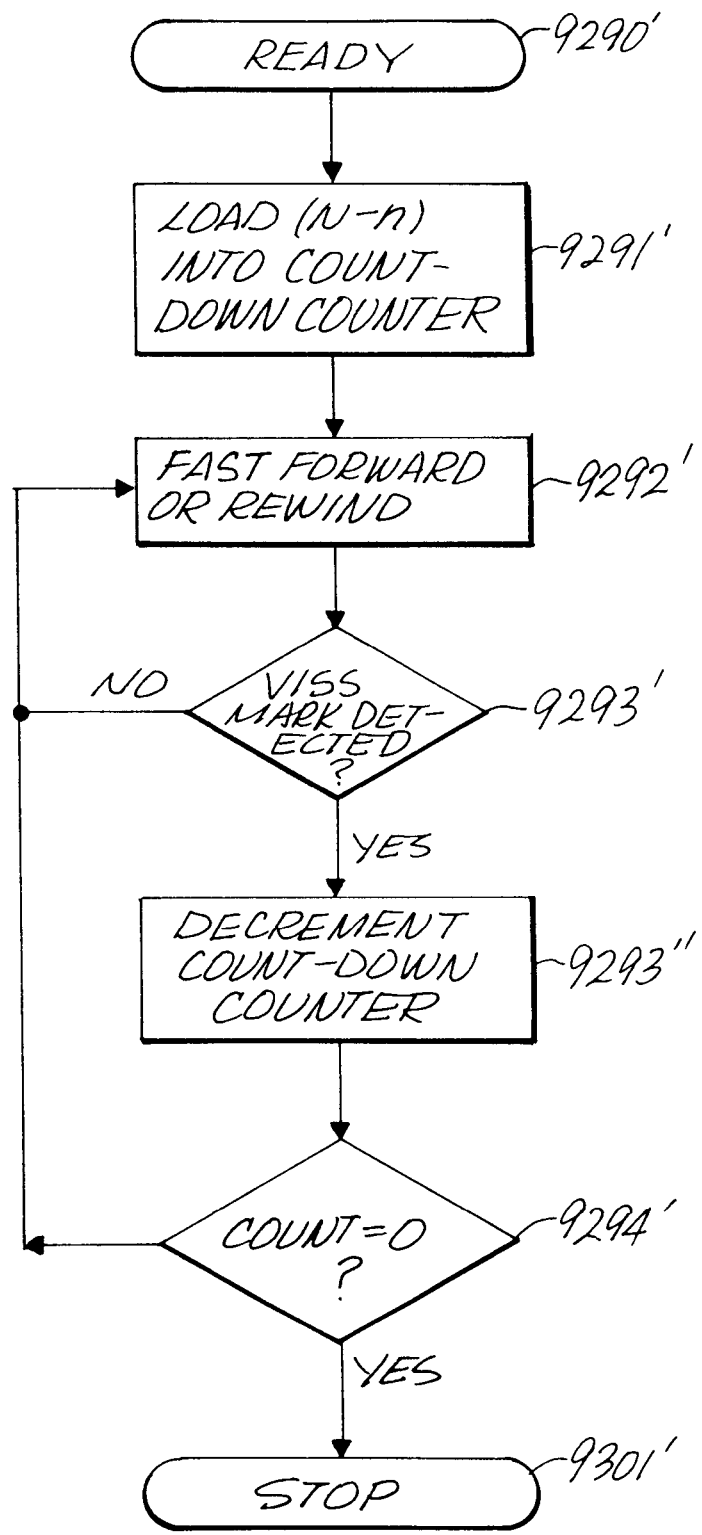
FIG. 36 is a flow chart showing the steps employed in the search for a program on an indexed tape using a VISS PLUS TP addressing system.

FIG. 36 is a flow chart showing the steps employed in the search for a program on an indexed tape using a VISS PLUS TP addressing system. The microprocessor controller 31 is in a ready mode by knowing the current program number (n in FIG. 36) of the tape and the destination program number (N in FIG. 36) of a user selected program entry from the directory. (Step 9290'). The microprocessor controller 31 loads into a count down counter the value of the number of VISS marks between the current position and the destination position (N-n) (Step 9291'). Based on the direction to the destination address, the microprocessor controller 31 commands the VCR to either fast forward or rewind the tape (step 9292'), and during the fast forward or rewind, monitors the read VISS marks on the control track 42c (Step 9393') and counts down from the N-n value loaded at step 9291' (Step 9293"). The fast forward or rewind continues until the count equals zero. (Step 9294'). The VCR then stops (Step 9301').

Figure 37:
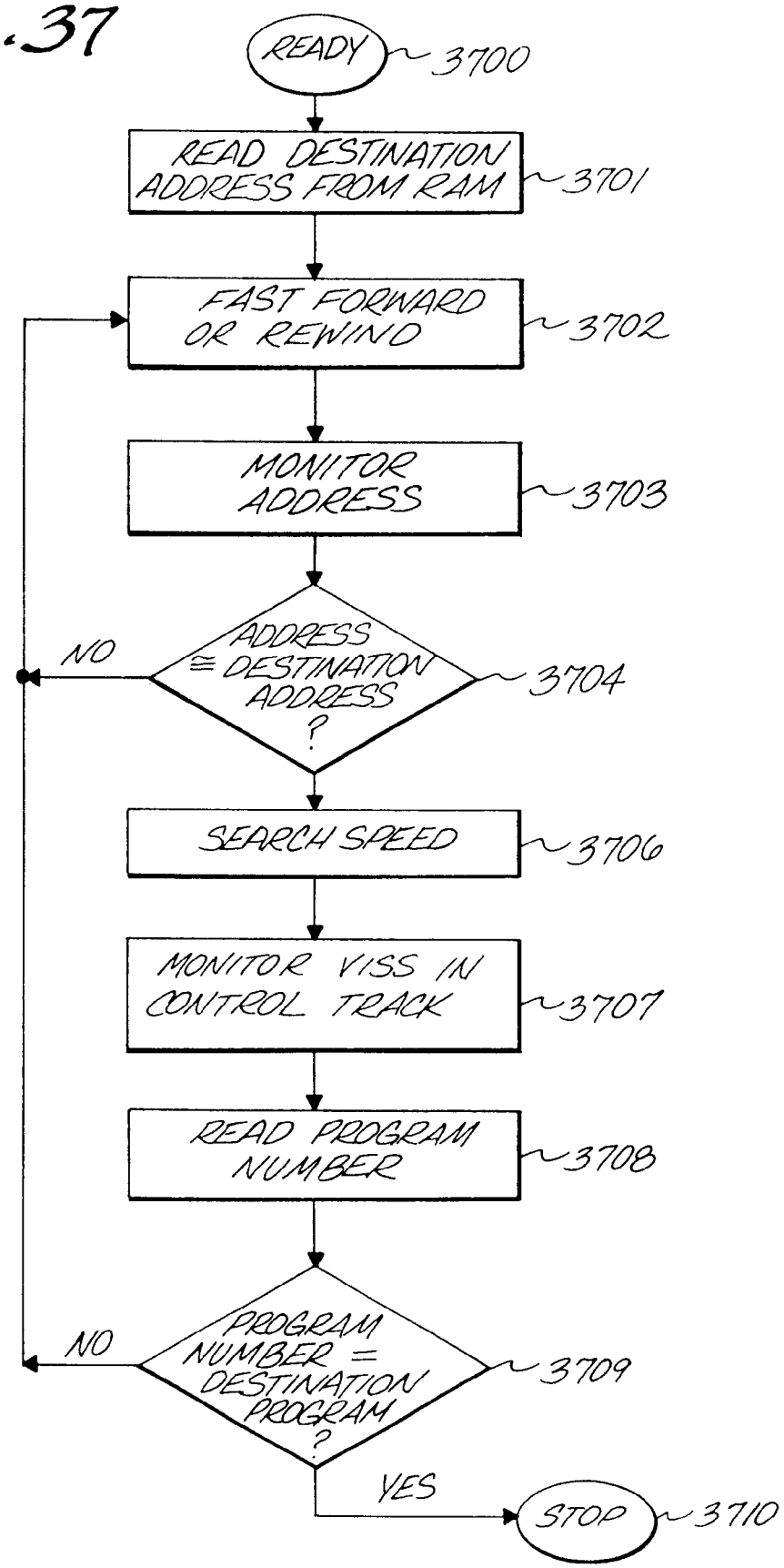
FIG. 37 is a flow chart showing the steps employed in the search for a program on an indexed tape using a VISS PLUS TP addressing system and an absolute addressing system.

FIG. 37 is a flow chart showing the steps employed in the search for a program on an indexed tape using a VISS PLUS TP addressing system and an absolute addressing system. As in FIG. 36, the microprocessor controller 31 is in a ready mode by knowing the current program number (n in FIG. 37) of the tape and the destination program number (N in FIG. 37) of a user selected program entry from the directory. (Step 3700). The microprocessor controller 31 first enters a fast search stage. The microprocessor controller reads the absolute address of the destination program from the RAM 33 (Step 3701). Based on the direction to the destination address, the microprocessor controller 31 commands the VCR to either fast forward or rewind the tape (step 3702), and during the fast forward or rewind, using the absolute addressing system, monitors the address of the tape (Step 3703). By using an absolute address system such as the reel ratio system, the fast search can be conducted at high speed. The fast forward or rewind continues until the present address equals the destination address. (Step 3704) The microprocessor controller 31 now enters a soft landing stage in which the VCR is commanded to a search speed (Step 3706) and searches for the VISS marks on the control track 42c (Step 3707). Upon detection of the VISS mark (Step 3707), the VCR confirms the program number by reading the VBI (Step 3708) and when the program number equals the destination program (Step 3709), the VCR stops (Step 3710). Otherwise, the VCR reenters the first search at step 3702.

LOCATION DETERMINATION

Figure 38:
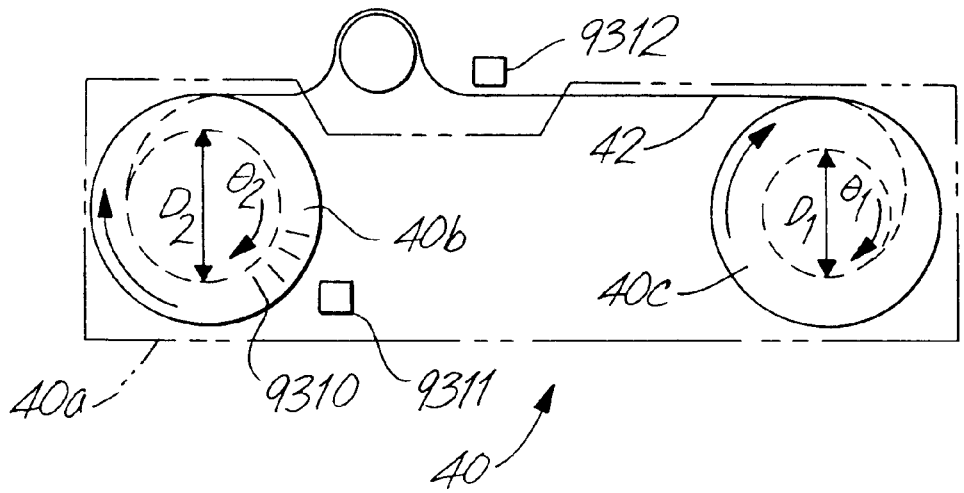
FIG. 38 is a schematic view of a system for determining the absolute program location of videotape without using address marks.

FIG. 38 is a schematic view of a system for determining the absolute program location of videotape without using address marks. To a degree of accuracy, the absolute position of the tape can be determined by measuring the amount of tape wound on either of the cassette reels 40b, 40C for the embodiment shown in FIG. 38. Two automatic methods are proposed for accomplishing the tape position measurement which do not require any additional hardware calibration or index marks over that currently found in conventional VCR's that is easy to implement in a VCR or a stand alone rewinder. As background, the amount of tape on a cassette spool is related to the diameter of the tape wound thereon. Errors occur in this relationship which are a function of the tape tension during fast forward and rewind which introduce a "zone of uncertainty" (ZOU) as to the absolute location. However, in some of the embodiments, the error is within acceptable limits.

A first method is now described for measuring the location on the tape. The diameter (D1) of the tape on a spool can be indirectly measured by measuring the length of tape (X) wound onto the spool for a given angular rotation ($\Theta 1$) of the spool or measuring the angular rotation $\Theta 1$ for a given tape length. In other words, X is approximately equal to $D1 \times \Theta 1/2$. For previously recorded tapes, the control track sync pulses represent a convenient and accurate measure of tape length and can be detected by the control track head in any mode such as fast forward, rewind or play.

By way of background, measurement of spool angular rotations presently accomplish the VCR's for purposes of driving a front panel index counter. Methods of these measurements include magnetic pulses and optical pulses where for example, eight pulses represent one spool revolution. In an alternate embodiment, greater angular resolution may be obtained by an optical system that includes a reflected light photo optical detector 9311 and a disc attached to the VCR spindle which has a plurality of reflective lines 9310 printed or etched thereon. In a typical embodiment, there are hundreds of reflective lines 9310. High resolution angular rotation measurement is achieved by counting reflective light pulses during spool rotation. Tape length is then accurately measured by counting sync pulses using the existing control track head.

Having described the method, the details of the system operation are described for a VCR with the address capability built therein. When a program is first recorded on the tape, the system in the record mode counts the number of reflective lines and thus angular rotation on the take-up spool for a given number of sync pulses which are being recorded. The microprocessor controller 31 stores this number in the directory for this program as the "start" absolute location. The system continues to monitor and store in a scratch pad location of the RAM 33, the angular pulses and group of sync pulses during recording. When the stop mode is initiated, the last angular rotation data in the scratch pad memory is also stored in the program directory as the "end" absolute location. Thus the directory for each program has stored in it data which brackets the absolute location range for that program. Alternatively, the number of sync pulses written for a given number of reflective lines may be stored.

With the directory now created, when the recorded tape is reinserted into the machine for a second play, the play mode is activated for typically less than one second and the angular rotation/sync pulse data is read by counting the sync pulses and the reflective lines and comparing it with the absolute location range data stored, either on the control track or in the RAM 33, in the directory for all the programs on the tape. From this comparison, a determination can be made as to which program is at the present tape location. It should be noted that, although the recording tape speed (e.g. EP, SP, SLP) effects the linear spacing along the tape between sync pulses, the VCR automatically plays the tape at the same speed as it was recorded so that tape speed is not a problem.

As noted above, there is a zone of uncertainty in positioning the tape as a result of tape tension variations. Because the absolute end number and start number stored in the directory are essentially the same for concurrently recorded programs, if the tape is positioned exactly at the start of the program, the system cannot accurately determine if it just passed or just before the start of this program. In these cases, if it is detected that the present location is within the zone of uncertainty of the stored start/end location, the system rewinds the tape, for preferably less than one second, and now knows without any ambiguity that it is in the previous program. Once this information is known the system can fast forward or rewind to the user selected programs simply by counting a bookmark which is a VISS type mark placed on the control track to mark the starting point of each recorded program. This system no longer has a need to encode a program number into the bookmark.

This first method is now described with respect to a stand alone rewinder. When the user is creating the directory by manually locating in his VCR the start of each program, then transferring the tape to the rewinder. The rewinder first goes into the fast forward mode, rewind or play modes and collects the angular rotation/sync pulse data using the reflective disc and the control track head and stores this information in the RAM 33 for each program in a manner similar to that described above. This data is used during playback as above to locate the present position of the tape. Note however, that for this implementation to work for programs recorded at different recording speeds, the rewinder must have the ability to detect the recording speed which then is used to calculate a new location.

In an alternate embodiment, the second automatic method is described. As an overview of this method, the absolute location of the tape is found by measuring the diameter of tape on each of the two spools D1, D2 and using the ratio of these measurements to approximate the absolute tape location. This method eliminates the need for linear tape measurements using sync pulses, and hence can be used to determine absolute tape position, even if the tape location has never been recorded upon the tape (because no recording has been done, there are no sync pulses to be counted). The ratio of the spool diameters (D1/D2) is proportional to the ratio of angular displacement of the spools, ($\Theta 1/\Theta 2$) with errors introduced by uneven tape tensioning. By incorporating a reflective disk and a reflective light sensor 9311, each of the two spindles the relative displacements of each being measured in a ratio determined using suitable software.

The use of this method for a built-in VCR is now described. When a program is first recorded on the tape, the system in the record mode, fast forward or rewind mode counts the number of reflective lines 9310 (angular rotation) on the take-up and unwind spools for a given number of reflected pulses. The microprocessor controller 31 stores these numbers or the ratio in the directory for this program as the start absolute location. The system continues to monitor and store a scratch pad memory, the angular pulses/ratio during recording. When the stop mode is activated, the last angular rotation data in the scratch pad memory is also stored in the program directory as the "end" absolute location. The directory now has for each program stored in it, data which brackets the absolute location range for that program.

To resolve the zone of uncertainty caused by the tape tension variations, method 2 can also use the rewind to the previous program method described above for method 1.

Method 2 is applied to a stand alone rewinder in a similar manner to that described above for method 1.

Figure 39:
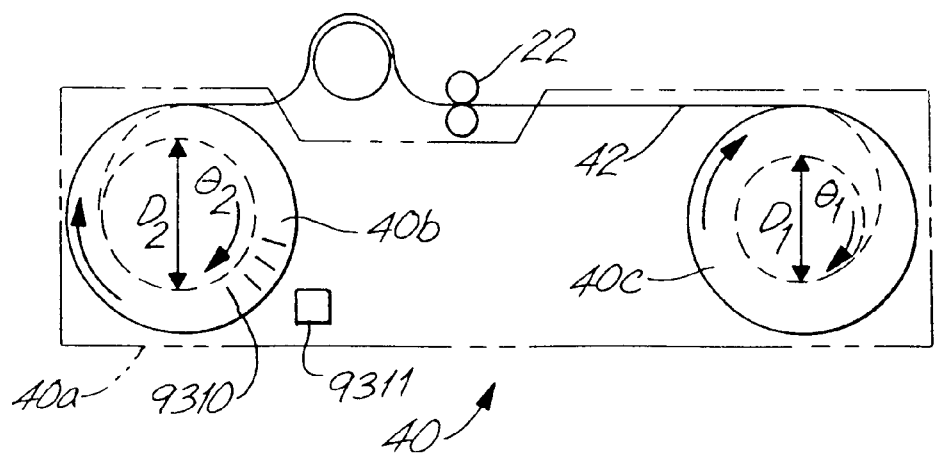
FIG. 39 shows an alternate embodiment for determining tape length.

FIG. 39 shows an alternate embodiment for determining tape length. This embodiment is based on the assumption that a measurement of the full spool diameter of tape is sufficient to unambiguously determine the tape length. In this embodiment no mechanical components need to be added to a conventional VCR.

As described above, the diameter D2 tape on a spool can be indirectly measured by measuring a length of tape X wound onto the spool for given angular rotation $\Theta 2$ of the spool or measuring the angular rotation $\Theta 2$ for a given tape length X, because X is approximately equal to $D2 \times \Theta 2/2$.

When the VCR is in the play mode, the linear movement of the tape as a function of time is accurately controlled. Thus the amount of tape X wound onto or off of the spool in the play mode can be accurately measured by measuring time. The angular rotation of at least one tape spool is already measured using either a magnetic or optical system as described above. In measuring the time it tapes for a full spool (fully rewound tape) to rotate a specific number of degrees, for example, one or two revolutions in the play mode, the full spool tape diameter is determined and from the relationship noted above, the tape length is also determined. By starting a timer, when the rotation sensor generates a first pulse, and stopping the timer after the sensor has generated a pre-determined number of pulses corresponding to a known angle of rotation. The elapsed time is proportional to the tape length.

In an alternate embodiment, the tape length can be measured at other than the fully rewound position by measuring the diameter of tape on each of the two tape spools. In this embodiment, each spool has angular rotation sensors. Two timers can be used, each start and stop by angular sensor pulses and the two spools while in the play mode comparing the two elapsed time yields data on the tape diameters for both spools. By using a look up table, the tape length of any point along the tape can be determined without rewind.

Figure 40:
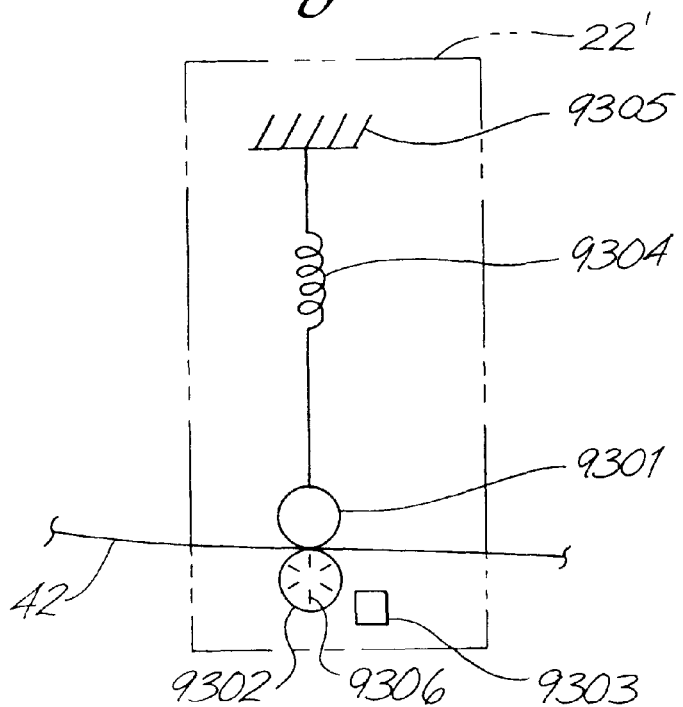
FIG. 40 is a schematic view of an alternate embodiment for the tape movement sensor.

FIG. 40 is a schematic view of an alternate embodiment for the tape movement sensor. In the embodiments of FIGS. 38-39, the address is determined by either counting sync pulses on the control track 42c or counting spindle rotation. However, the accuracy of these systems depends on uncontrolled variables such as tape winding tension, which is related to the start, stop, play, rewind and fast forward history of the tape. The embodiment of FIG. 40 determines tape position by measuring linear tape travel during play, record, fast forward, and rewind.

A tape movement sensor 22' has a fixed roller 9302 in contact with one side of the tape 42. The fixed roller 9302 has a plurality of reflective lines 9306 that reflect light from a revolution counter 9303 that counts the number of detected pulses reflected from the fixed roller 9302 as the tape is advanced. A biasing roller 9301 is mounted to a first end of a spring 9304 whose second end is mounted to a frame 9305. The biasing roller 9301 is in spring biased contact with the other side of the tape 42 so that the movement of the tape between the biasing roller 9301 and the fixed roller 9302 causes both rollers to rotate. The revolution counter 9303 counts the number of reflected pulses and provides this count to the position logic and counter circuit 9 which communicates the count through the VCR control logic circuit 21 to the microprocessor controller 31. The microprocessor controller 31 then converts the angular rotation pulse count into distance travelled by the distance traveled=diameter of roller X pulse count X angular spacing between pulses.

This distance travelled is then used as an address for the location of the tape.

Figure 41:
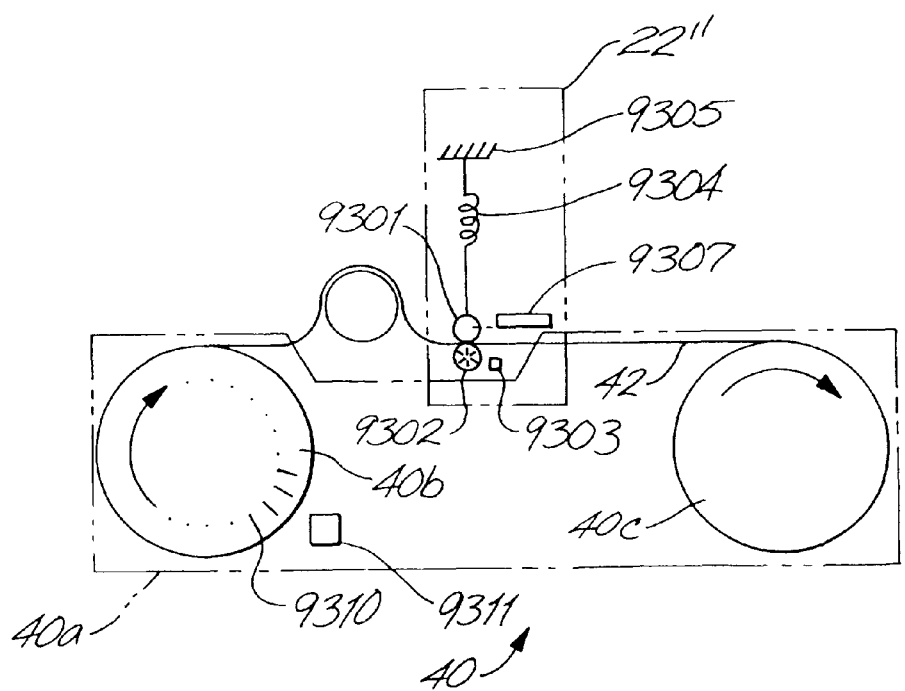
FIG. 41 is a schematic view of an another alternate embodiment determining the location on the tape using a tape movement sensor.

FIG. 41 is a schematic view of an another alternate embodiment determining the location on the tape using a tape movement sensor in conjunction with a spindle revolution counter. A tape movement sensor 22" is similar to the tape sensor 22' in FIG. 40, except the tape movement sensor 22" contains a linear position sensor 9307 which detects the distance between the biasing roller 9301 and the fixed roller 9302. When the tape 42 contacts both rollers, the distance between the rollers is the thickness of the tape 42. A revolution counter 9311 counts the number of pulses reflected from a plurality of reflective lines 9310 on the tape reel 40b in a manner similar to that described above for the revolution counter 9303. In a manner similar to that described above in FIG. 39, with the tape fully rewound, the tape diameter is measured by measuring the linear motion/angular ratio as indicated by the two revolution counters 9303, 9311. Given the full reel tape diameter and the measured tape thickness, the overall tape length can be determined.

In another embodiment to those described above, the TID may be entered manually either in addition to or in lieu of recording the TID on the tape.

Title Downloading

Program titles are broadcasted by TV stations on line 21 field 2 of the VBI. These are decoded and inserted into the directory. For programs without program title information, a channel-date-time stamp is inserted automatically.

Playing Indexed Tape in Non-Interconnected VCRs

To play using indexing functions an indexed tape in a second VCR where the original directory information resides in a RAM of a first VCR requires the transfers of the directory. The directory is first downloaded onto the tape in the first VCR. The second VCR then reads the downloaded directory from the tape in order to utilize the indexing capability. If the tape is changed by recording additional programs or erasing existing programs, a new directory must be created on the tape if the tape is to be played in the first VCR or in yet another VCR.

Figure 42A:
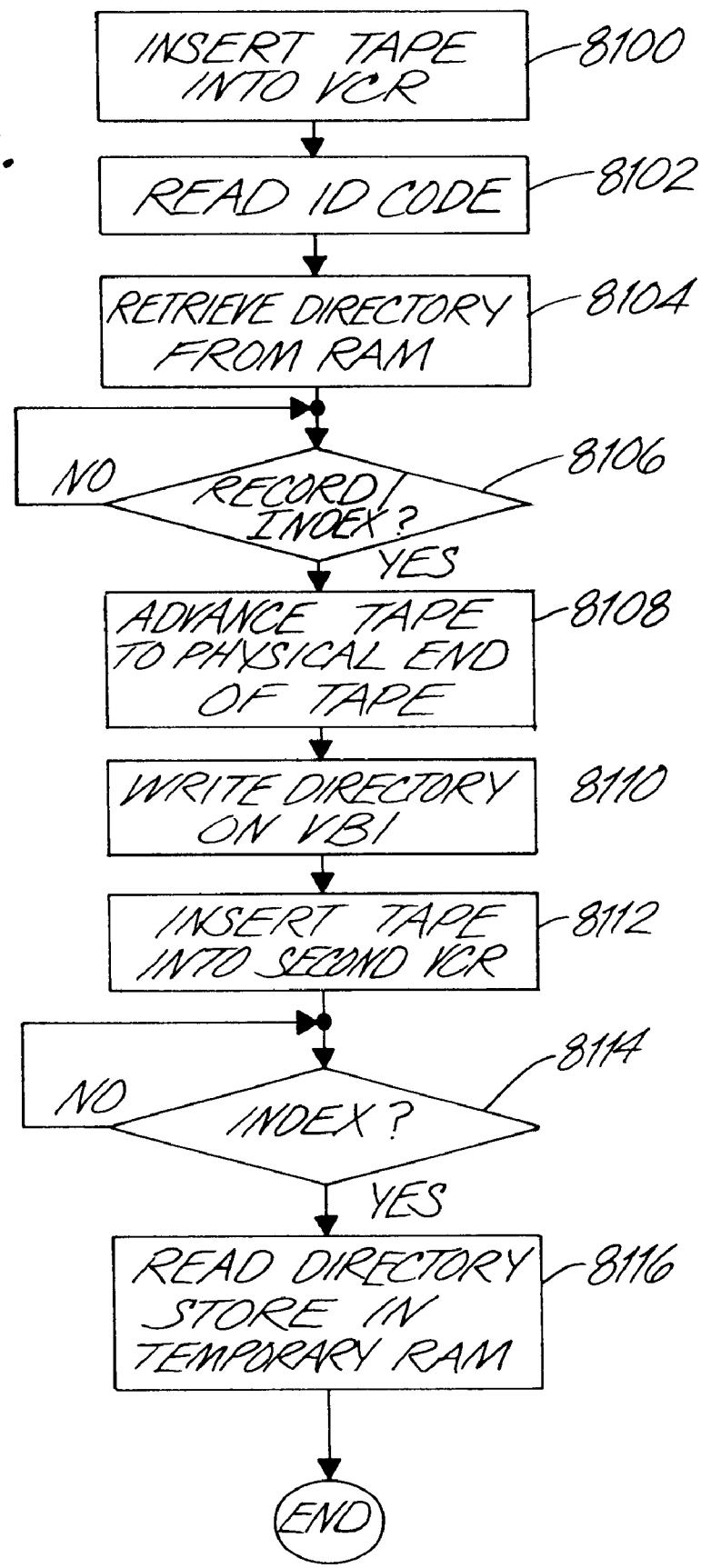
FIGS. 42a–42b are flow charts showing the steps employed in the operation of transferring a directory along with the tape to a second VCR that is not connected to the first VCR.
Figure 42B:
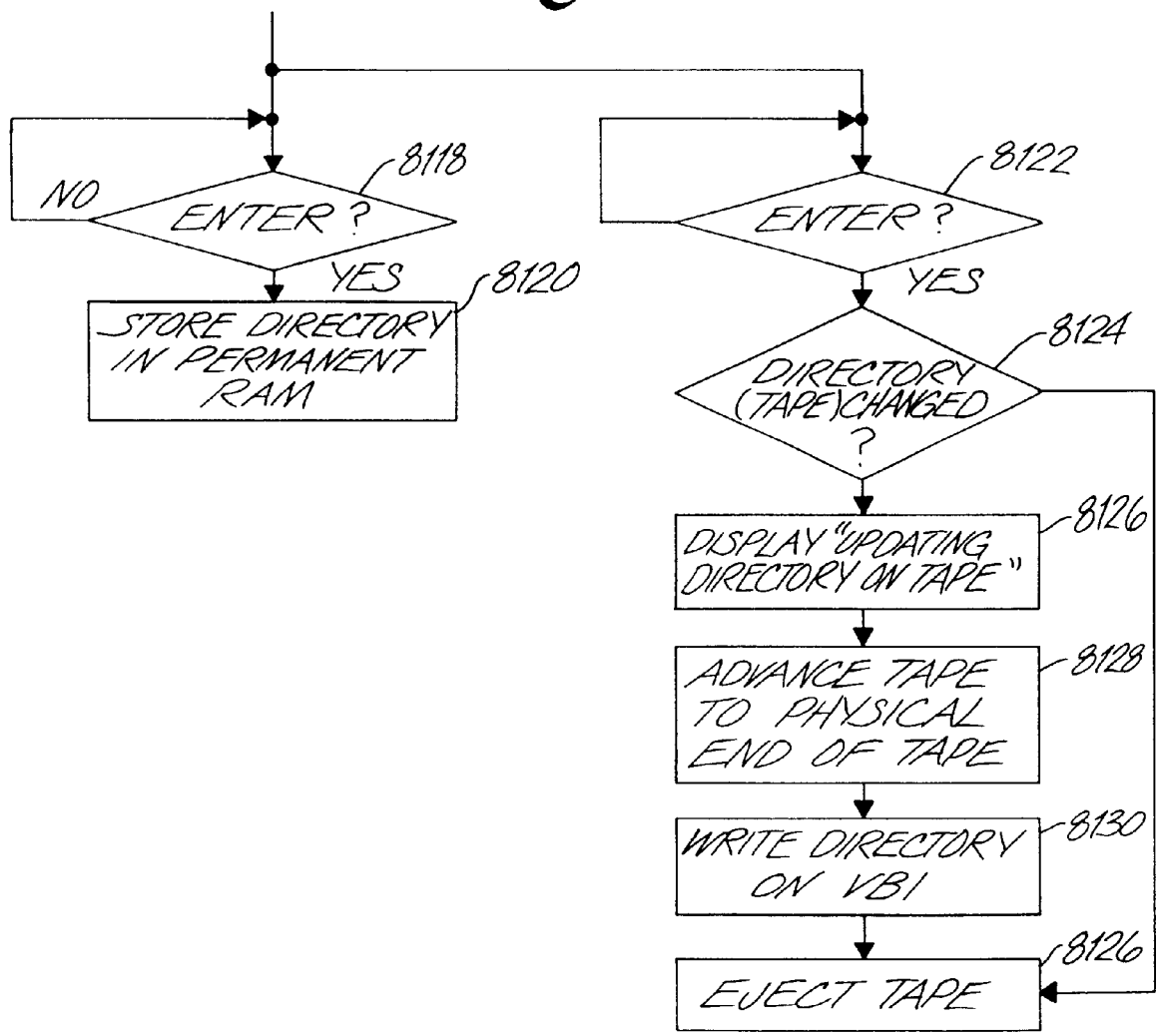

FIGS. 42a–42b are flow charts showing the steps employed in the operation of transferring a directory along with the tape to a second VCR that is not connected to the first VCR.

Referring specifically to FIG. 42a, the user inserts the tape 40 into the VCR 1 (step 8100). The VCR reads the identification code from the tape (step 8102) and retrieves the corresponding directory from the RAM 33 (step 8104). Because the user intends to give or lend the tape 40 to a second user for use in a second indexing VCR when the user presses the record and index keys on his remote controller (step 8106), the VCR 1 initiates a routine to write at a predetermined location, such as the end of the tape, the directory from the RAM 33 onto the tape 42. The microprocessor controller 31 commands the VCR 1 to advance the tape 42 to the physical end of the tape (step 8108). Upon reaching the end of the tape, the microprocessor controller 31 writes the directory onto the VBI of the tape 42 in the format of a prerecorded tape (step 8110). The user removes the tape from his VCR and provides the tape to the second user who inserts the tape 40 into a second VCR 1 (step 8112). When the user wants to operate in the indexing mode, he presses the index key on his remote controller (step 8114) and the second VCR 1 reads the directory from the VBI and stores the directory in temporary RAM (step 8116). Because the machine id in the tape identification is different, the second VCR knows that the tape has been indexed in another VCR. The VCR asks the user to enter the tape number. If the user enters a zero, the VCR knows the tape is a loaner tape and advances to the end of the tape and reads the directory.

Referring now to FIG. 42b, the second user may store the directory in permanent memory by pressing the enter key on the remote controller (step 8118). In response to the enter command, the microprocessor controller 31 of the second VCR 1 stores the directory in permanent RAM 33 (8120). When the second user has finished playing the tape and wishes to remove it, he presses the eject button on the VCR (step 8122). The microprocessor controller 31 determines whether the tape, and consequently the directory, has changed (step 8124). If it has not changed, the VCR ejects the tape (step 8126). On the other hand, if the directory has been changed at step 8124, the microprocessor controller 31 displays on the display 50 "updating directory on tape" (step 8126). The microprocessor controller 31 advances the tape to the physical end of the tape (step 8128) and writes the directory on the VBI (step 8130). The VCR then ejects the tape (step 8126).

In an alternate embodiment, when the user ejects the tape from the second VCR, steps 8124 through step 8130 may be performed only if the user requests the recording of the directory in a manner similar to that described above in step 8106 of FIG. 42a.

In yet another alternate embodiment, the second user may be warned not to record on the loaner tape.

Auxiliary Information Display

Referring back to FIG. 1, as described above, by using the VBI decoder and the RAM 33, the indexing VCR 10 can capture data broadcasted on the VBI and display it either concurrently with or at a later time to the data transmission. The broadcasted data may be transmitted on a plurality of lines of the VBI including line 21. Per the E.I.A. specifications, Extended Data Services provide for pointers on line 21 (supplemental data location) to point to lines other than line 21. By using data on these other lines in the same format as data on line 21, the VBI decoder 60a can decode the other line data. The auxiliary information is preferably broadcasted in a 35 characters×15 rows format to match the display 50a (see FIG. 1) format. In the preferred embodiment, three types of auxiliary information data are transmitted: program identification (program ID or PID), channel specific program guide (CSPG) and program related information (PRI).

The viewer is alerted to the existence of the auxiliary information in several ways. In a first method, before the program is transmitted, the indexing VCR 10 displays on the screen a prompt to the user that the information is forthcoming. The prompt may be a flashing icon, such as the letter "i," or a new screen, such as a blue background with white text. The indexing VCR 10 requests the user to enter a command, for example by pressing the "i" button, to store in the RAM 33 the auxiliary information, or in some embodiments, to record in the record stack the "PLUS-CODE™" number corresponding to the program that is to be recorded. As will be described below, the user may later recall this information. To indicate that the command was received, the indexing VCR 10 may either stop flashing the icon display, display an acknowledgement, such as "stored"

or "saved," or display separate screen. The user may request the information before, during, or after the broadcast. Alternatively, the auxiliary information may be transmitted and stored in a temporary buffer in the RAM 33 before the viewer is prompted to enter a command. In this embodiment, the indexing VCR 10 transfers the auxiliary information from the temporary buffer to a permanent buffer in response to the user's commands.

Alternatively, in a second method, the indexing VCR 10 may provide the prompt after the program is viewed. In this embodiment, the auxiliary information may be transmitted before the program, during the program, or after the prompt. In a third method, the prompt is displayed concurrently with the program.

For each method, the user has a predetermined amount of time after the prompt to request the auxiliary information. When the auxiliary information is requested, the indexing VCR 10 displays it for either a predetermined time, until the user cancels it (for example, by pressing the program ID button a second time), until the next auxiliary information is requested, or until the broadcaster transmits a cancel command in the VBI.

Because the auxiliary information is normally used for advertising, it is desirable to not alert the user to stop recording a program when a commercial occurs. Thus, the time that the auxiliary information is transmitted is preferably adjusted so that the user cannot generate in response to the auxiliary information a signal for shutting off the VCR. For example, if the auxiliary information is always transmitted 30 seconds before the commercial (i.e. 30 seconds is always the lead time), the user may program his VCR to stop recording 30 seconds after the detection of the auxiliary information and start recording again 60 seconds after the VCR stops recording. But if, the lead time is variable, the user misses recording a portion of the program. For example, if the next commercial uses a 60 second lead time, the viewer shuts off the VCR 30 seconds early if the user is using a 30 second lead time. Furthermore, the auxiliary information may also be transmitted after the commercial so that the viewer cannot shut off the VCR in advance.

Alternatively, the prompt may be a number that the user enters to indicate which group of auxiliary information is to be recorded.

Describing the program ID first, the broadcast station preferably broadcasts the program identification information on line 21, field 2 of the VBI according to EIA specifications.

This information may include:
Title of program
Program length in minutes
Today's day and date (when viewing TV broadcasts) or day and date of recording (when viewing taped shows)
Station call letters (e.g. KCET or KCAL) or 4-letter abbreviation of station name (e.g. SHOW for Showtime)
Channel number In a preferred mode of operation, when the user changes the channel or when recording or playback of a tape begins, the program ID is automatically displayed for a predetermined length of time, e.g., five seconds, and then disappears. Alternatively, when the user presses a program ID button on the remote controller, the indexing VCR 10 displays the program ID.

When a program is recorded, the program title is stored in the directory and also inserted in the VBI portion of the recorded program. A viewer can access the title of the program being shown by pressing the "Program ID" key. When the key is pressed, the microprocessor controller 31 sets the VBI decoder to decode selected field and lines of the VBI either from the broadcasted signals or from the reproduced signals depending upon its mode of operation.

The program I.D. information for a plurality of viewed channels is stored in the RAM 33. Although some of the program I.D. information changes with the program (e.g., program title, start time, length, program category), this information is quickly retrievable from the memory when the user switches channels and requests the program I.D. to be displayed. Using the start time and length of the program, the indexing VCR 10 checks, periodically or in response to a Program I.D. command, whether the information is still within the valid time before displaying it on screen.

The channel specific program guide is the combination of the program IDs for a plurality of programs that will be broadcasted in an upcoming predetermined time. In addition to the information included in the program ID, the channel specific program guide may also include the start times, the titles, the "PLUSCODE™" numbers and a description of the programs. In addition, the information that is displayed may be controlled by attribute codes, which are described below in conjunction with FIG. 55 contained within the program guide. For example, the "PLUSCODE™" numbers may be printable on screen, but if it is preceded by a "non-print" attribute, the indexing VCR 10 does not display it. As a second example, special events may be highlighted by using a character attribute.

A broadcasting station broadcasts on a periodic basis the channel specific program guide in the VBI of the broadcast. The VBI decoder in the indexing VCR 10 continuously decodes the channel specific program guide from the VBI and stores it in the RAM 33. Because of unexpected events, such as sport programs that overrun their scheduled broadcast time or news breaks that shift programs, the broadcaster may update the program guide and transmit the new guide. Accordingly, as the new guide is read, the indexing VCR 10 stores it in the RAM 33.

The program guide may also include a video program guide of special programs such as video magazines, video sales catalogs, video classified ads, and infomercials. The program guide allows the user access to a television program listing for those who do not have a periodical listing or newspaper listing, or those who misplaced their listings.

The format of the channel specific program guide data packet is described below in conjunction with FIG. 55. As the data is decoded, the data stored in the RAM 33 is updated by each subsequent CSPG data packet. The quantity of information supplied in the CSPG data packet is determined by the broadcaster. For example, the broadcaster may provide program schedules for the subsequent eight hours but provide only the description of the programs for the first two hours. In addition, the guide may also include special events for the upcoming few days. By viewing the listing before the viewer goes to work or goes to sleep, the user may program his indexing VCR 10 using the program guide for recording shows during his absence or sleep.

When the viewer switches to a different channel, the indexing VCR 10 will begin reading and storing the CSPG data for the new channel. However, because many viewers switch between channels, sufficient memory may be provided so that the program guides for at least two channels may be stored in the RAM 33.

The stored program guide may be used to implement timer programming of the VCR. The user programs the indexing VCR 10 to record the desired program by moving the cursor to this program pressing the Record button. In embodiments in which the "PLUSCODE™" numbers are displayed on the screen, the viewer may also program the indexing VCR 10 by entering on the remote controller the "PLUSCODE™" number for the program he would like to record. In response thereto, the indexing VCR 10 stores the "PLUSCODE™" number into its programming stack for execution as described above.

Figure 43:
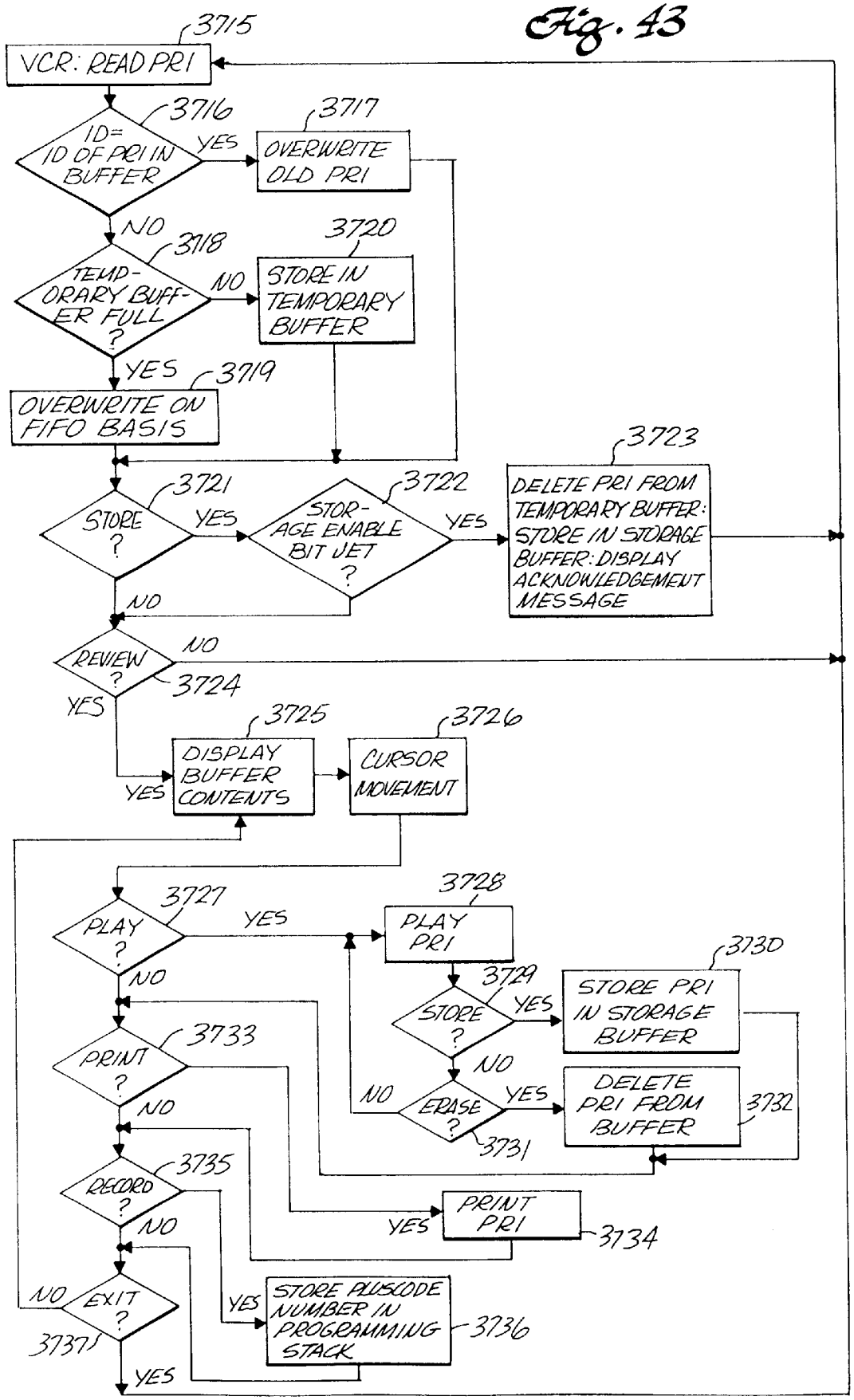
FIG. 43 is a flow chart showing the steps employed in the processing of program related information.

FIG. 43 is a flow chart showing the steps employed in the processing of program related information. Program related information (PRI) is information broadcasted in the VBI that is related to a program being aired which is available upon user command either concurrently with the program or at a later time. The use of PRI extends the time of an advertisement because the viewer is able to view the information at a later time at a pace selected by the viewer. Examples of PRI include statistics of baseball players during a baseball game, recipes given out during a cooking lesson, and problem assignments and answers after an educational program. In other examples, many commercials have a message during the program urging the viewer to call a toll free number to get further information or to place an order or giving details about an upcoming sales event or promotion. Under existing systems, such information which is conveyed in the video is fleeting because most viewers are either not disposed to take any action on the spur of the moment or are unprepared to take such action. The information transmitted as part of the PRI in the VBI may be captured and displayed on screen at the command of the user. Thus, the information may repeat the information provided during the commercial or program or may contain additional information. For example, the commercial may be a promotion about an upcoming movie while the PRI for this commercial may provide additional details of the cast or plot of the movie. Further, a "PLUSCODE™" number may be provided so that at the press of a single button the "PLUSCODE™" number is used to program the indexing VCR 10 to record the requested program. Alternatively, the commercial may be a short commercial which is a promotion for a long commercial such as an infomercial aired in the middle of the night. In yet another embodiment, the PRI may be an electronic coupon that is outputted through the serial data link to a printer or other devices to print or store the coupon which may then be later redeemed at participating retailers or stores for the promoted discounts. In another embodiment, a prerecorded tape may have a PRI recorded thereon.

Referring now in particular to FIG. 43, the broadcast station broadcasts the PRI in a time window during which it is related to the program or commercial being broadcasted. Alternatively, the PRI may be broadcast offset in time from the program or commercial. The PRI is typically repeated throughout the time window. For example, the PRI for a 30 second commercial is broadcasted during the commercial. For a PRI message that is 8 seconds long, the PRI is transmitted four times wherein the first three times are the complete PRI and the fourth time is an incomplete message. The PRI is preferably sent on one or more VBI lines referenced by pointers on line 21, field 2, as described below. The indexing VCR 10 continuously reads the VBI for the PRIs (Step 3715). Each PRI has a ID number so that the indexing VCR 10 may recognize when the PRI is repeated during a commercial or in a rerun of the commercial. When the ID number of the present PRI equals the ID number of a PRI in either the temporary or the storage buffers (Step 3716), the indexing VCR 10 overwrites the old PRI in the buffer (Step 3717). Otherwise, if there is not a match of ID numbers, the indexing VCR 10 determines whether the temporary buffer is full (Step 3718). If it is full, it overwrites previously stored PRIs on a first-in-first-out (FIFO) basis (Step 3719). Otherwise, the indexing VCR 10 stores the new PRI in the temporary buffer (Step 3720). In addition to monitoring the VBI for detected PRIs, the indexing VCR 10 also monitors for user selected commands. If a store command is detected (Step 3721), the indexing VCR 10 determines whether a storage enable bit is set (Step 3722), which if it is not set during the broadcast then the PRI is not storable (i.e., the PRI can be stored only in the temporary buffer and not in the storage buffer). If the storage enable bit is set, the indexing VCR 10 deletes the PRI from the temporary buffer and stores it in a storage buffer. The indexing VCR 10 then displays an acknowledgement message such as "stored" on the TV screen, if an acknowledgement bit is set (Step 3723). The indexing VCR 10 then continues monitoring the PRI at step 3715.

If, however, a store command has not been set or the storage enable bit is not set, if a review command is not detected (Step 3724) the indexing VCR 10 returns to reading the PRI. Otherwise, the indexing VCR 10 displays the titles of the PRIs (the first line of the PRI) stored in the buffers in a display such as that shown in FIG. 44 (Step 3725). The viewer is able to move through the displayed PRIs using the cursor keys on the remote controller (Step 3726). The PRI that is pointed to is highlighted by reverse video or by other methods well known in the art. If a play command is sent (Step 3727), the indexing VCR 10 plays the PRI (Step 3728). If the PRI is being read from a recorded tape, the VCR enters a pause mode and suspends motion of the tape when the PRI is displayed. After the PRI is displayed, the VCR resumes playing the tape. When the PRI is displayed, the user must either store the PRI in the storage buffer, by pressing the store button (Steps 3729–3730), or delete the PRI from either temporary or storage buffer by pressing the erase button (Steps 3731–3732). By pressing the print button (Step 3733), the user can print the PRI (Step 3734). Printing may be done either to a printer or another device connected to the serial port by pressing the record or send button. As shown in FIG. 44, PRI B and PRI D are stored from earlier broadcasts. The PRIs E, F, G, H are from later broadcasts and are stored in the temporary buffer. At a later time when the user presses the Review button again, the PRIs E, F, G, H may be replaced by new PRIs, while PRIs B and D remain in the storage buffer. Alternatively, the displayed PRI, in FIG. 44 may be in a single list with a notation of which PRI's are stored.

For PRIs that contain "PLUSCODE™" numbers referring to other related programs that are to be broadcasted later, when the user presses the second button (Step 3735) the indexing VCR 10 stores the "PLUSCODE™" number in its programming stack for subsequent recording (Step 3736). The indexing VCR 10 continues to display the buffer content until the user presses the exit key (Step 3737).

The embodiment discussed above uses the STORE button and the REVIEW button for storing and reviewing PRIs. Alternatively, these functions may be done by a single button, such as the i button. Pressing the i button one time may invoke the storage function while pressing it twice in a row may invoke the review function.

Video Publishing through Broadcast

As described above, a PR tape has a directory recorded on the VBI throughout the tape. However, a single video program that is being broadcasted may similarly have a plurality of video segments that are each separate video programs. For example, one airing of the television show "60 Minutes" typically has three news segments and one segment with commentary by Andy Rooney. Other examples include video magazines, video sales catalogs and video classified ads. Another example are video books such as karaoke or how to books, e.g. on exercise or cooking. The user normally wants to watch portions of the video magazine at later times. Under the standard recording method described above, the indexing VCR 10 reads only one program title in the VBI of the broadcasted program, since the recording is in one continuous session. (The resultant recording will have a single constant program number in the TP packet on line 19. In addition, only one VISS mark is recorded which is at the beginning of the recording.) However, many users want each video segment to be indexed. Accordingly, extra control signals are broadcast to provide additional indexing to each individual section.

A pointer, described below in conjunction with FIG. 54, in line 21 points to a VBI line which contains a video magazine (VM) packet. The VM packet is broadcast in the VBI line at the starting point of the second section and of each section thereafter. As described below in conjunction with FIG. 56, the VM packet contains the encrypted title of the section. At the same time, the directory is broadcasted repeatedly on line 20 of the VBI. The format of the directory is identical to the format of directories for prerecorded tapes.

Figure 45:
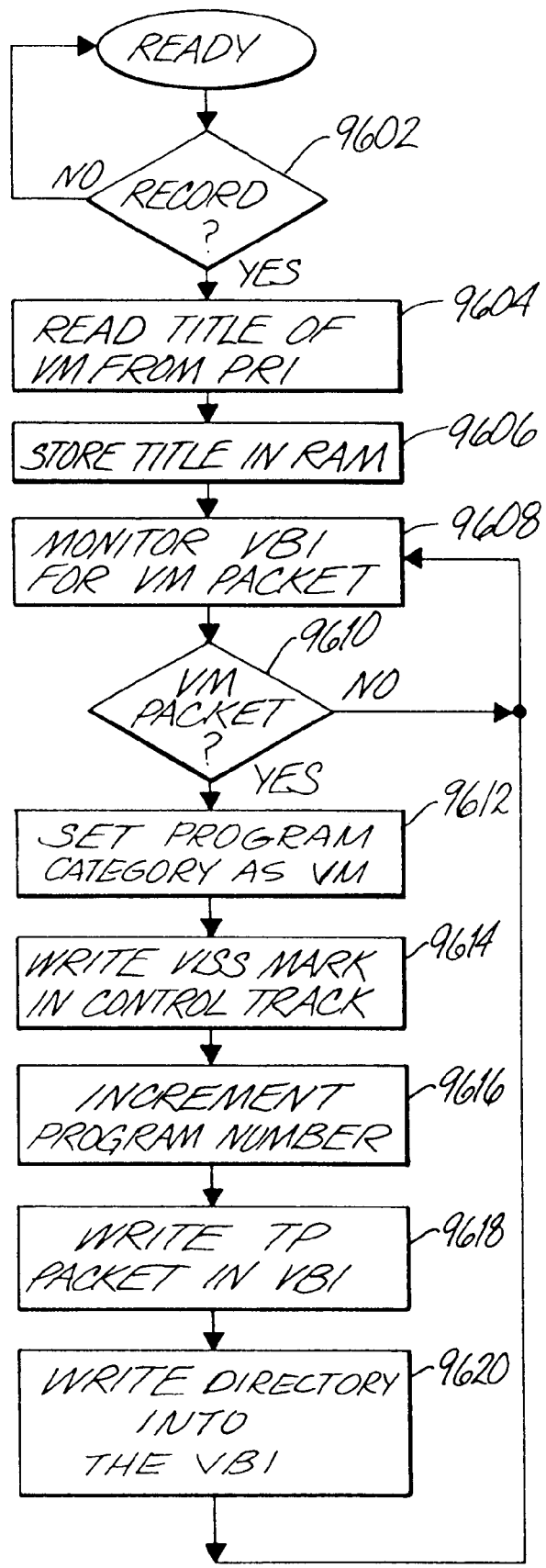
FIG. 45 is a flow chart showing the steps employed in the operation of the indexing VCR 10 for video magazines.

FIG. 45 is a flow chart showing the steps employed in the operation of the indexing VCR 10 for video magazines. FIG. 45 is discussed in light of an illustrative example in which a tape has two regular programs and one video magazine, which is recorded after the two programs, on the tape. After the user presses the Record button, (Step 9602), the indexing VCR 10 reads the title of the video magazine from the PRI (step 9604) and stores it in the RAM 33 (step 9606). (When recording is started, the indexing VCR 10 uses the existing TID if the tape has one, or otherwise, the indexing VCR 10 creates a TID if the tape is a blank tape.) In the illustrative example, the title is stored as the third program. The indexing VCR 10 monitors the VBI for VM packets (step 9608). Upon detection of a VM packet in the VBI (step 9610), the microprocessor controller 31 sets the program category in the directory to indicate that the program is a video magazine (step 9612). In an embodiment where a pointer is used to note the line on the VBI, upon detection of the pointer, the indexing VCR 10 monitors the designated line of the VBI for the occurrence of a VM packet.

In response to receiving the VM packet, The microprocessor controller 31 writes a VISS mark on the control track 42c to identify the start of the next section (Step 9614). The microprocessor controller 31 then increments the previous program number by one (step 9616) and writes it as the program number in the TP packet on line 19 of the VBI (Step 9618). The indexing VCR 10 reads and decrypts the directory from line 20 of the VBI of the broadcast signal and writes it onto the VBI of the tape (step 9620).

For the illustrative example, if the tape is somewhere in a program, such as program 2, other than the video magazine when the user later inserts the tape, the directory will appear as:

| Program | Length |
|---|---|
| Cheers | 60 |
| →Eyewitness news | 30 |
| Entertainment Week (VM) | 60 |

The sectional titles of the video magazine "Entertainment Week" do not appear. When the user is in program 3 and presses the Index button, because the indexing VCR 10 reads the VM flag indicating that the current tape location is a video magazine, it reads the directory of the magazine from line 20 of the VBI. The VCR then displays a directory as follows:

| Program | Length |
|---|---|
| Cheers | 60 |
| Eyewitness news | 30 |
| →Entertainment Week (VM) | 60 |
| Dining out | |
| Music | |
| Plays, musicals | |
| Sports | |
| Chess | |
| Museums | |
| Life entertainment | |
| Special events | |

This directory does not show the length of the individual sections of the magazine. In other illustrations, the individual lengths may be shown. A section of the video magazine may have subsections, such as illustrated where chess is a subsection of sports.

The VM packet and subsequently the directory recorded on the tape for the video magazine includes the program numbers, the start address, and the stop address of the video magazine. In a first embodiment, the first program of the magazine has a program number 1. As in the illustrative example, "Entertainment Week" has a program number 1, "Dining out" has a program number 2, and so forth. The start address of "Entertainment Week" is 0. The microprocessor controller 31 adjusts these numbers to reflect the relative position of the video magazine in the index. As per the illustration, "Entertainment Week" is adjusted to be program 3 with a start address corresponding to the end of program 2.

In an alternate embodiment, the directory of the video magazine is stored in the RAM 33 instead of the tape. By storing the directory in the VBI, less RAM memory space is used for storage.

The created tape is structurally the same as an HR tape with VISS marks on the control track, and TP packets written on the VBI of the tape and directory packets for the video magazine written on the VBI and section titles stored in the RAM 33.

Electronic Program Guide with Video Clips

In another implementation of the video magazine, an electronic program guide having a plurality of video clips is broadcast as a video magazine. The electronic program guide may include video clips for the following day or several days. The guide may also include shows and other broadcasted programs such as movies and sports. Each video clip represents an upcoming show and includes a teaser for that show. Each video clip corresponds to a chapter or segment in the video magazine. The corresponding video data packet includes the title of the magazine which is the channel number/name, the date and the words "program guide". The subtitle of each chapter is the name of the show and the time and date of the broadcast. In addition, the "PLUSCODE™" number for each show is also broadcast in the VM data packet.

Figure 46:
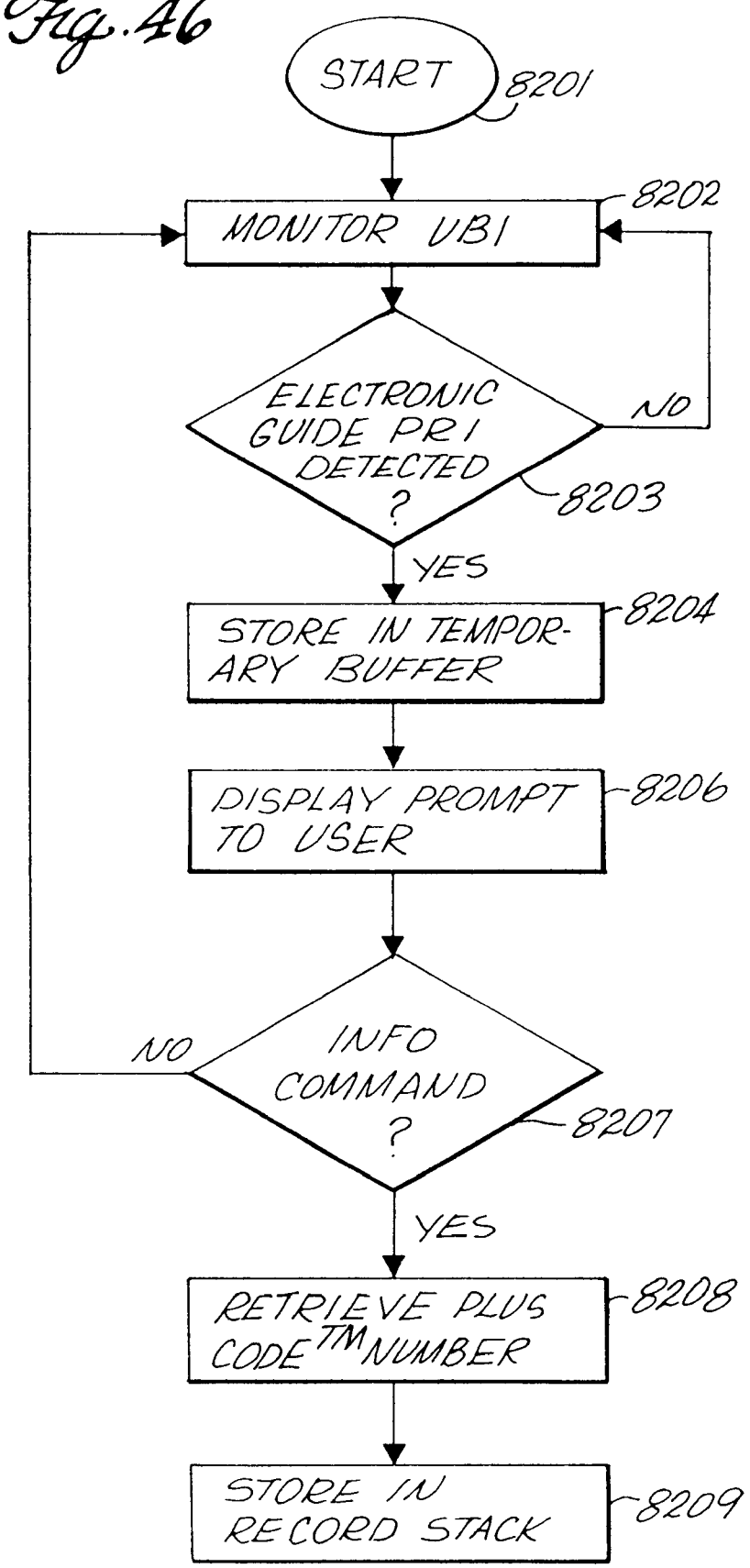
FIG. 46 is a flow chart showing the steps employed in the operation of recording an electronic program guide.

FIG. 46 is a flow chart showing the steps employed in the operation of recording an electronic program guide. At the start of normal system operations (step 8201), the indexing VCR 10 monitors the VBI for the program related information (PRI) (step 8202) until a program guide PRI is detected (step 8203). The microprocessor controller 31 stores the program guide PRI, which includes the "PLUSCODE™" number corresponding to the electronic guide which is broadcasted at a later time, and, in some implementations, on a different channel, in the temporary buffer (step 8204). The indexing VCR 10 displays a prompt to the user to alert him that he may capture the "PLUSCODE™" number to record the electronic program guide at a later time (8026). If the info button is pressed (step 8207), the microprocessor controller 31 retrieves the "PLUSCODE™" number from the temporary buffer (step 8208) and decodes it to generate the channel-date-time-length information which is stored in the VCR record stack as described above (step 8209).

Figure 47:
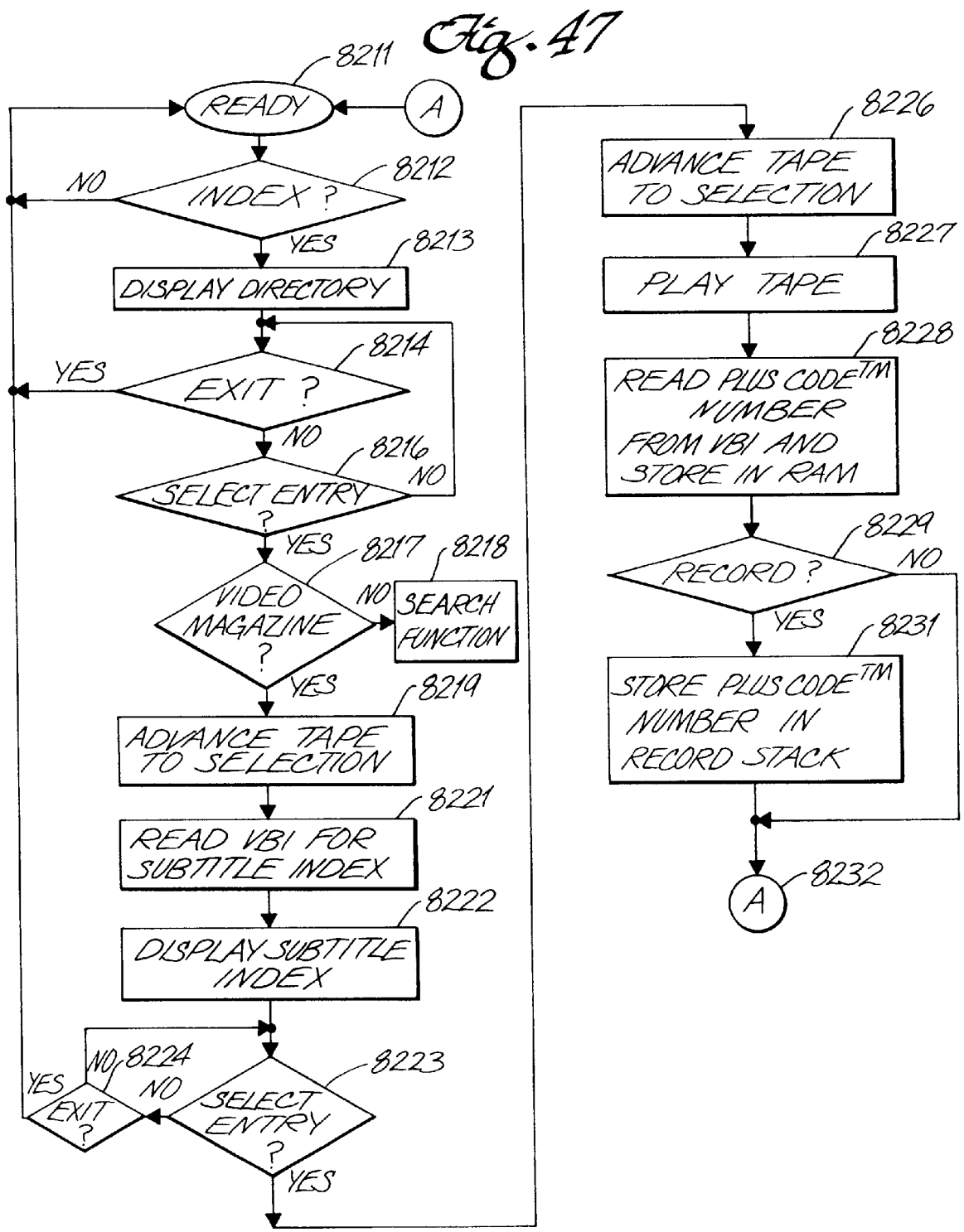
FIG. 47 is a flow chart showing the steps employed in the operation of the index functions for an electronic guide using the indexing VCR.

FIG. 47 is a flow chart showing the steps employed in the operation of the index functions for an electronic guide using the indexing VCR. While the indexing VCR is in a ready mode (step 8211), it monitors whether an index command has been transmitted (step 8212). When it has, the indexing VCR 10 displays a directory as shown in FIG. 48 (step 8213). If an exit command has been sent (step 8214), the VCR enters a ready mode at step 8211. Otherwise, the VCR waits for the user to exit or select an entry from the displayed index (step 8216). If the selected entry is not "video magazine" (step 8217), the indexing VCR 10 performs a search function in accordance to that described above in conjunction with FIG. 35 (step 8218). The count of VISS marks for programs on the tape after the video magazine is adjusted to include the number of VISS marks within the video magazine. On the other hand, if video magazine has been selected at step 8217, the indexing VCR 10 advances the tape to the selected video magazine (step 8219) and reads the subtitle index from the VBI (step 8221). The indexing VCR 10 then displays the subtitle index as shown in FIG. 49 (step 8222). The indexing VCR then waits for either the user to select an entry (step 8223) or for the user to exit (step 8224). If the user has entered a selection from the subtitle index, the indexing VCR 10 advances the tape to the selection (step 8226) and begins playing the tape (step 8227). The VCR then reads the "PLUSCODE™" number from the VBI and stores it in the RAM 33 (step 8228). If the user presses the record button (step 8229), the indexing VCR 10 decodes the "PLUSCODE™" number and stores the corresponding channel-date-time-length information in the record stack for timer programming of the VCR (step 8231) and returns to the ready mode at step 8211 (step 8232).

In an alternate embodiment to FIG. 47, at step 8221, the indexing VCR 10 also reads the "PLUSCODE™" numbers associated with the programs and stores them in the RAM 33 when the subtitle index information is transferred from the VBI to the RAM for display. Further, at step 8223 the user can record an entry while looking at the display subtitle index of FIG. 49 by pressing the record button on the remote controller. The indexing VCR 10 then retrieves the "PLUSCODE™" number from the RAM, decodes it into the channel, date, time and length information and stores it in the record stack at step 8231. This embodiment allows the user the option of selecting shows from the directory screen for recording without viewing the corresponding video clip.

Electronic Program Guide with a Video Grid and Video Clips

In yet another embodiment of the video magazine, the broadcaster broadcasts an electronic program guide wherein the electronic guide includes the program title, channel, date, and time of upcoming programs as well as an associated video clip which is identical to the video clips previously described above in the Electronic Program Guide With Video Clips embodiment. In that embodiment, the electronic guide is transmitted in the form of VBI text data. Unlike that embodiment, this electronic program guide transmits both the menus and the video clips as full frame video. Accordingly, all the information displayed on the screen is transmitted as video. The display is not limited by the character generator in the VCR.

To produce an electronic guide, the broadcaster or guide producer creates graphics by computer or other electronic devices or by hand. The broadcaster then generates video images of the graphics by filming or recording. The video images are then broadcasted as a video magazine. Along with the video images, the broadcaster transmits addressing information for correlating the images on the screen with other video images, "PLUSCODE™" number or channel-date-length-time corresponding to a program depicted in the guide with a future broadcast, and position information for correlating positions on the screen with the program and the other information broadcasted in the VBI.

Figure 50:
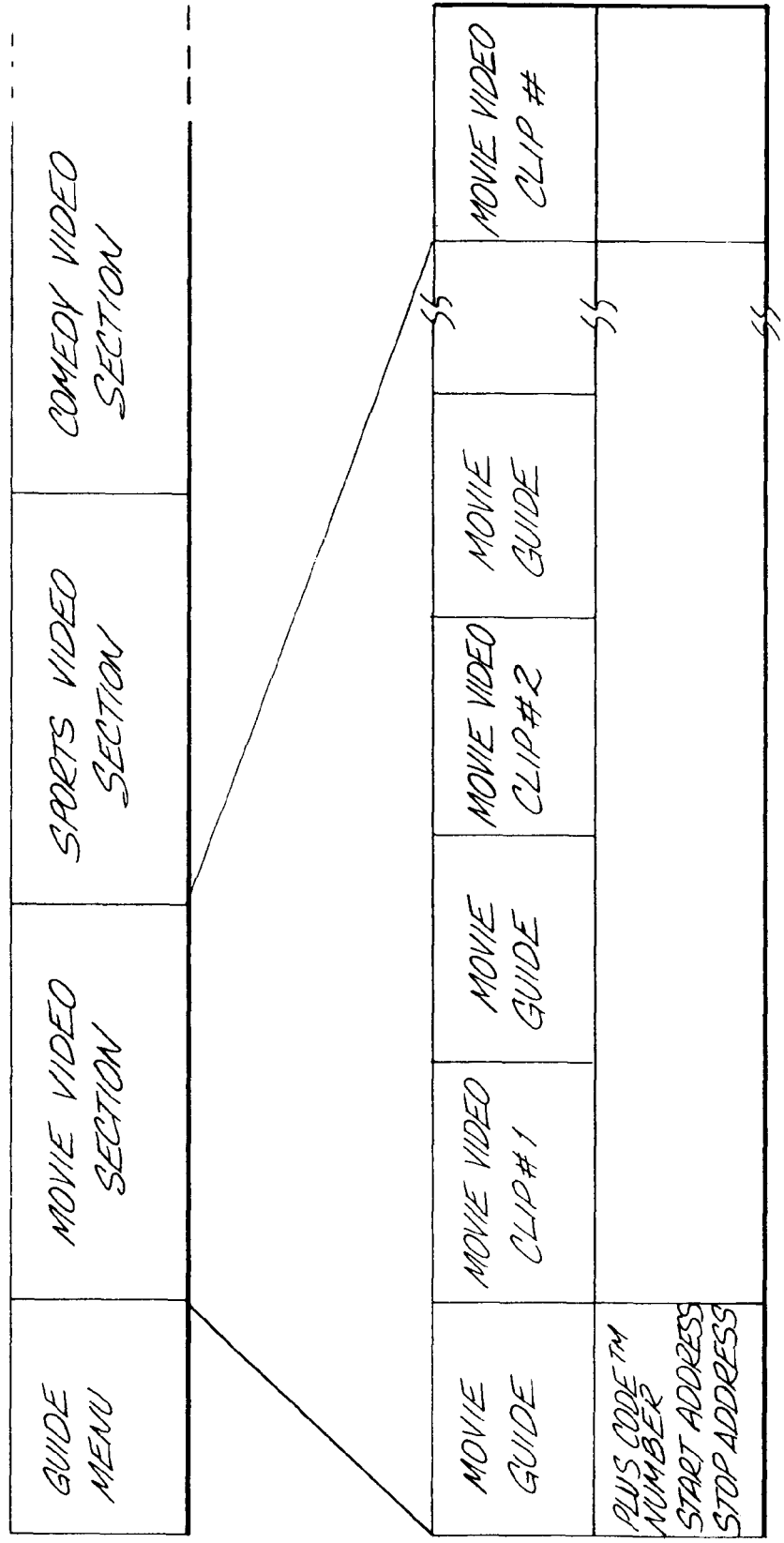
FIG. 50 is a schematic diagram illustrating the electronic program guide with a video grid and video clips with an exploded view of a movie guide portion of the guide.

FIG. 50 is a schematic diagram illustrating the electronic program guide with a video grid and video clips with an exploded view of a movie guide portion of the guide. An electronic program guide 3740 has a guide menu and a plurality of video sections (also called video chapters). The guide menu contains information for the title and descriptions of the video sections displayed in locations (or cells) arranged in a grid pattern on the screen. Along with the guide menu, the broadcaster transmits in the VBI the location of each cell of the grid and the start address and the stop address for the corresponding video section. Each video section represents the program listings for one of a plurality of categories of programs, such as movies, sports or comedy. Furthermore, each video section has a plurality of chapter menus spaced apart in time in the broadcasted guide or along the tape after recording and a plurality of movie video clip sections between the video menus. As part of the video menu, part of the information related to the upcoming programs for the associated broadcaster is transmitted or recorded as a video image. This information is arranged so that when the associated video is displayed, the information for each program of the menu is displayed in cells arranged in a grid on the screen. This information may be in different fonts and colors. It may also include pictures of actors or scenes of the show or advertiser or show logos. Information relating to the position of each cell, the start and stop addresses, and the "PLUSCODE™" numbers for the corresponding video clip is transmitted in the VBI of the first video menu of the video section. The addresses may be timed at a particular tape speed or length.

Within each grid, a plurality of programs and associated information is displayed in a respective location on the grid. The character generator in the VCR provides a cursor which is superimposed over the video grid displayed on the screen. The user controls the position of the cursor using the remote controller. The microprocessor controller 31 tracks the cursor position and correlates it to the associated program and video clip for that position stored in the VBI.

Although shown pictorially in FIG. 50 as being along side the movie guide, the information associated with each cell in the grid is transmitted in the vertical blanking interval along with each of the video sections. After reading the VBI, the microprocessor controller 31 stores this information in the RAM 33. Alternatively, the information in the VBI may be broadcasted with each subsequent video guide and read from the VBI as each subsequent guide is displayed.

Figure 51:
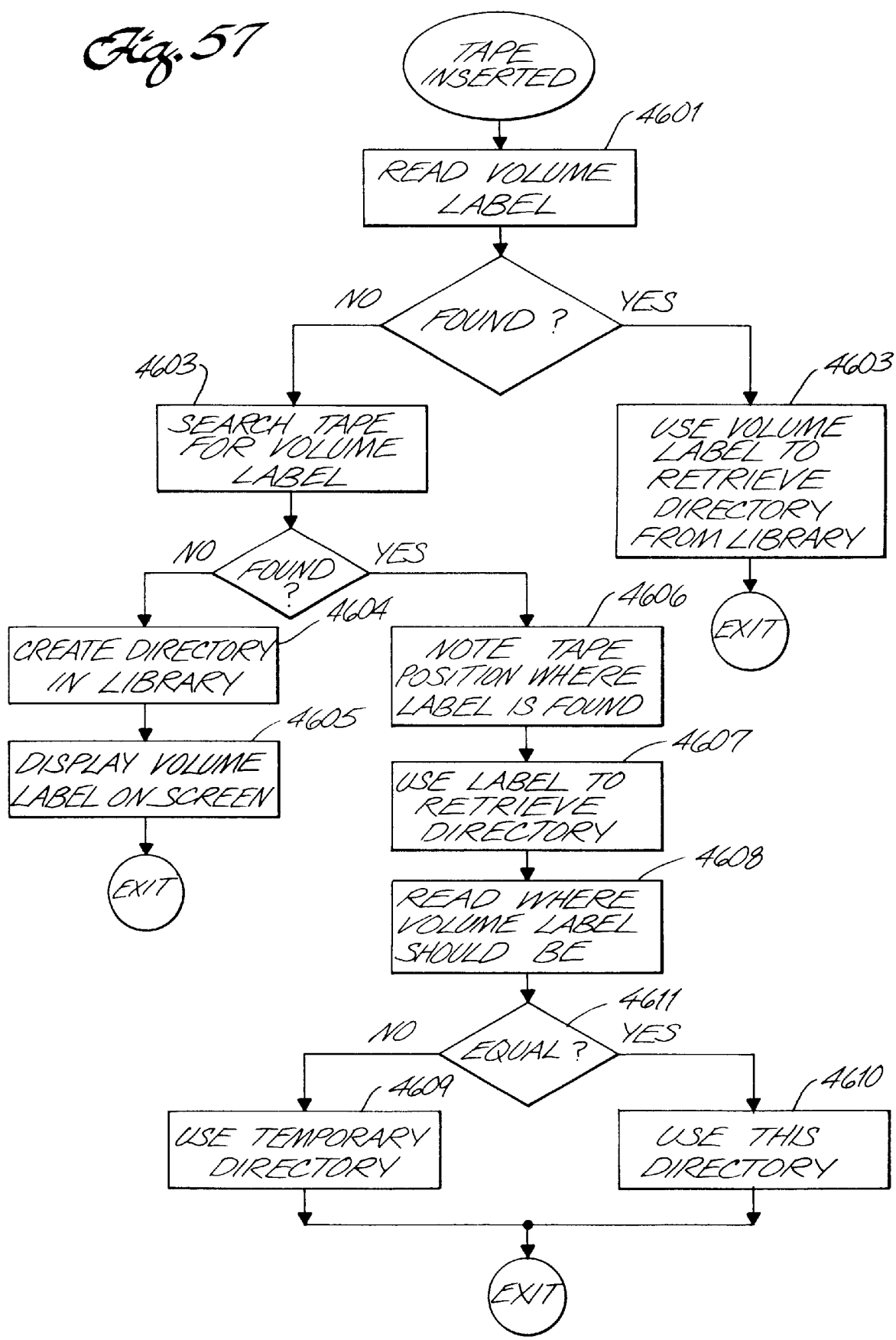
FIG. 51 is a flow chart showing the steps employed in the operation of the indexing VCR for an electronic program guide using a video grid and video clips.
Figure 58A:
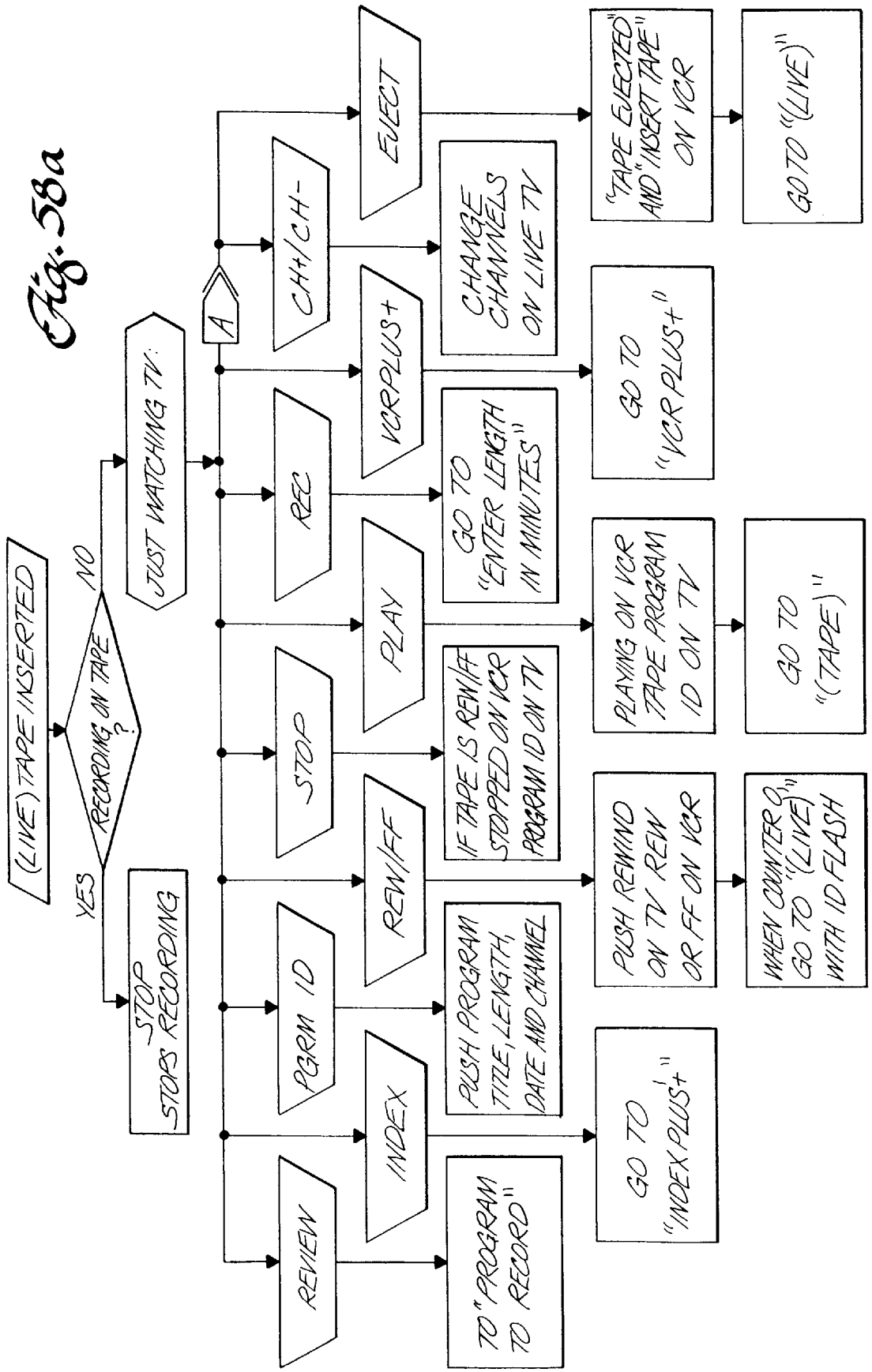
Figure 58C:
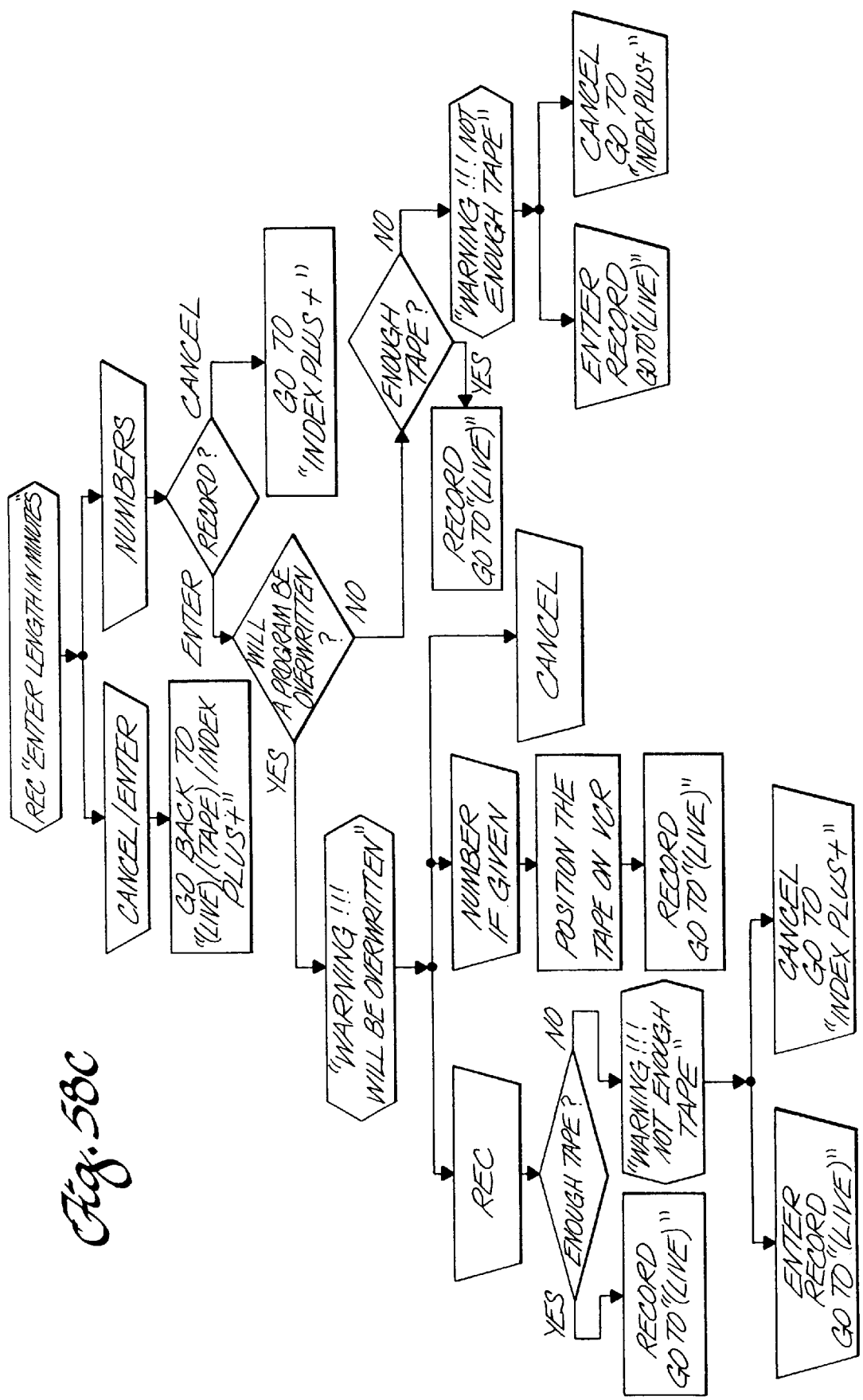
Figure 5B:
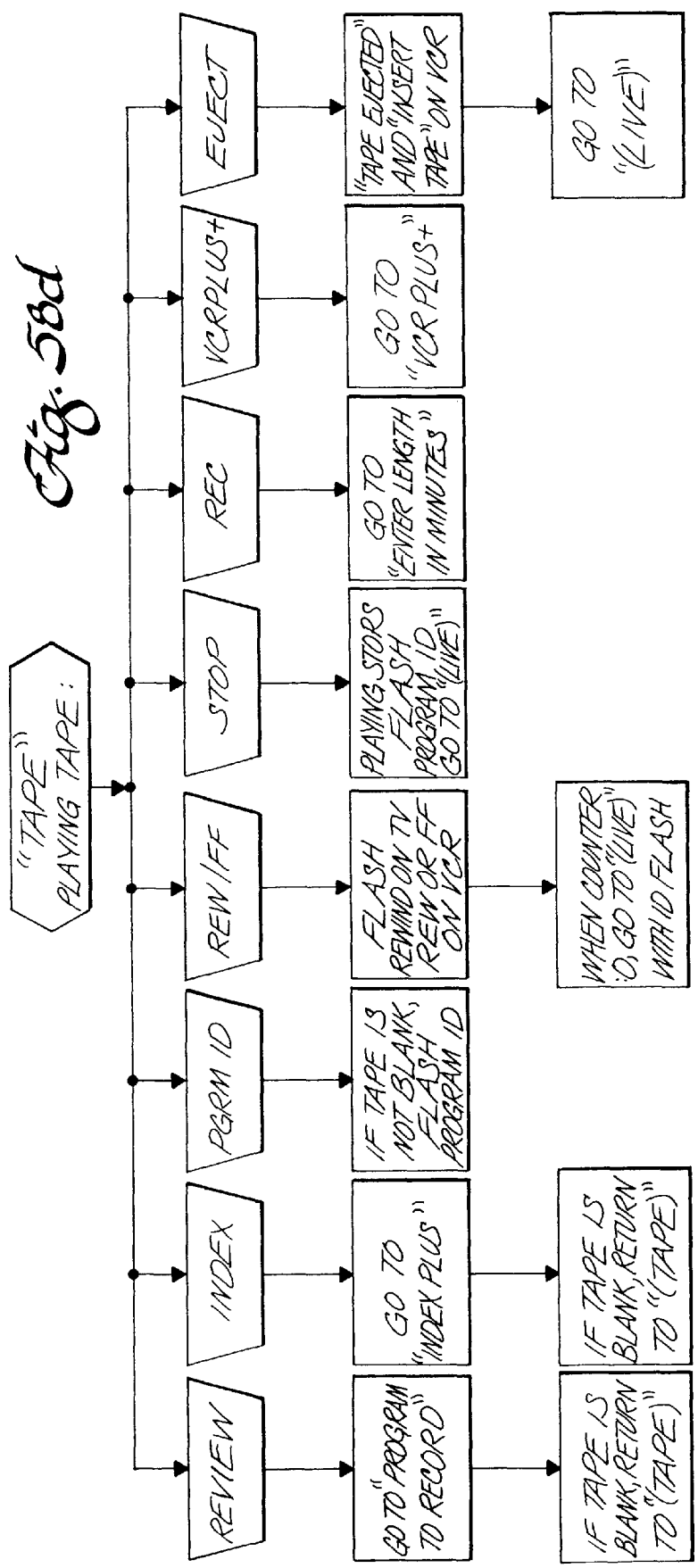
Figure 58E:
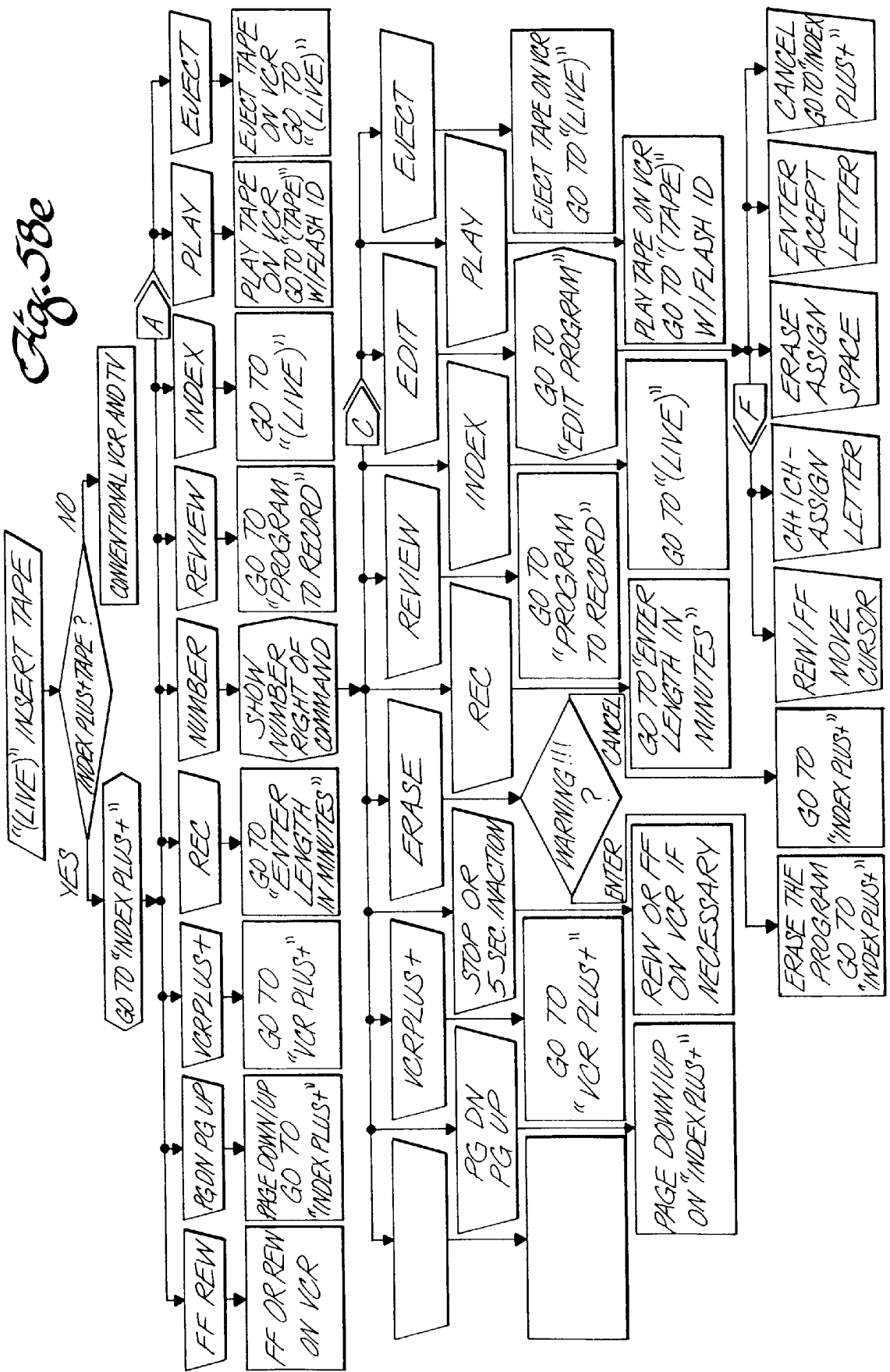
Figure 58F:
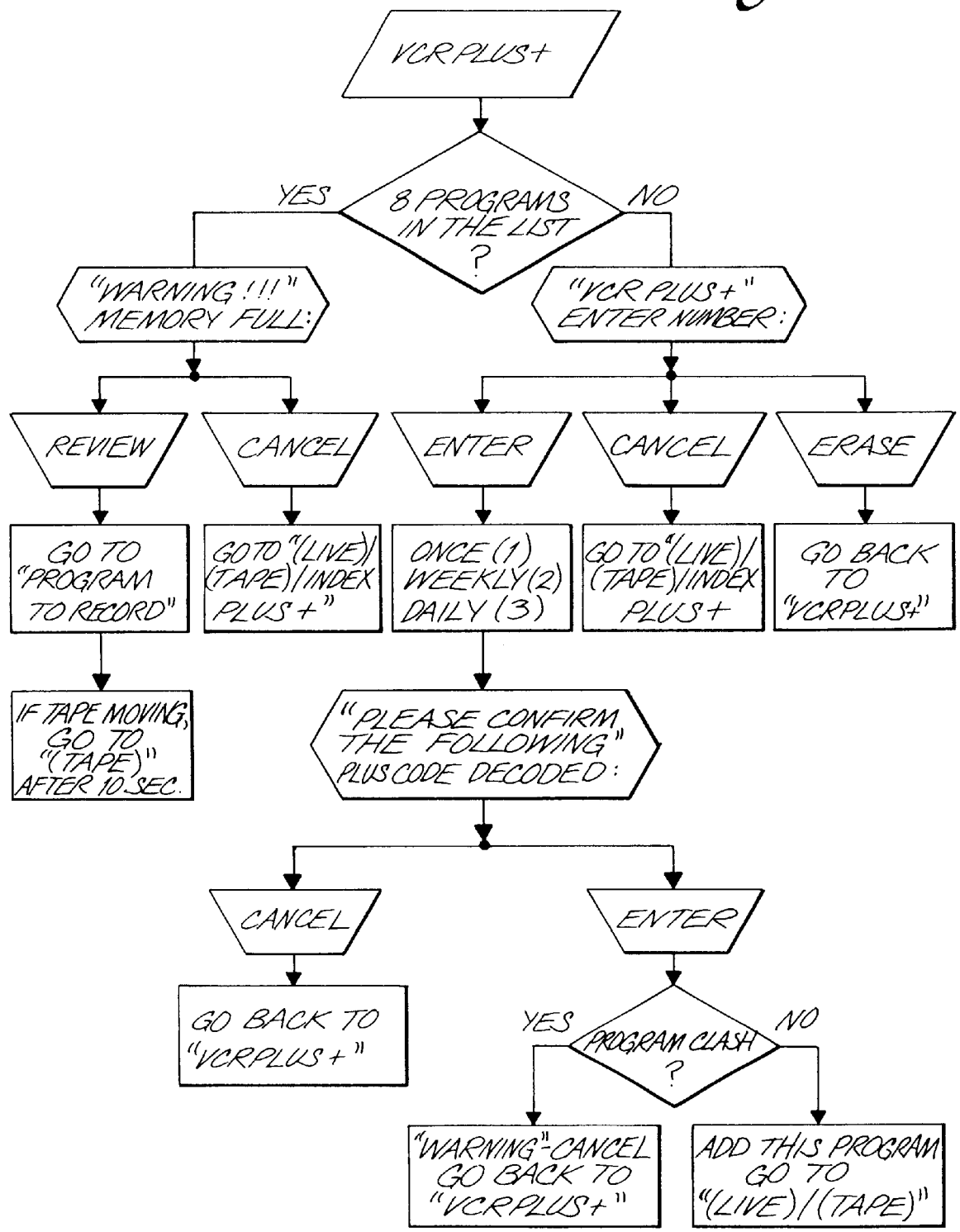

FIG. 51 is a flow chart showing the steps employed in the operation of the indexing VCR for an electronic program guide using a video grid and video clips. As a precursor to beginning the operation in FIG. 51, in a manner similar to steps 8211–8217 of FIG. 47, the user has selected the indexing function of the VCR and from the displayed directory selected the entry on the directory corresponding to the electronic program guide with video grids and video clips. In response to the user having selected the electronic program guide, the indexing VCR advances the tape to the beginning of the program guide, using the tape directory (step 3741). The VCR reads the vertical blanking interval for the guide information and stores it in the RAM 33 (step 3742). The guide information includes the start and stop addresses and the cursor location for each of the video sections. The guide information functions as the directory information. The indexing VCR reads the category guide menu from the video tape and displays it on the screen (step 3743). The length of the guide menu on the tape may be a single frame or frames covering several minutes. For guide menus having a few frames, the VCR is in the play and still frame mode allowing the user to browse the guide menu. Alternatively, the images of the still frame may be stored digitally and then displayed. If the guide menu contains multiple pages, the user advances pages by commanding the VCR to advance by using the frame advance button, or alternatively, a page button. In this mode, the VCR responds to a page command as it would a frame advance command. By using the cursor buttons on the remote controller (step 3744), the user can move the cursor on the screen (step 3745). By pressing the exit button (step 3746), the user may return to the directory of the entire video tape (step 3747). Otherwise, the user selects from the category guide menu using the enter button to select the highlighted menu entry (step 3748). As an illustrative example, the selected entry will be described in view of the movie guide shown in FIG. 50. While discussed as a movie guide, this description also pertains to the other guides. After the user selects the movie guide, using the addressing information, the VCR fast forwards the tape to the position for the movie guide grid which it knows from the information read from the VBI after the tape advances to the program guide (step 3749). The VCR reads the chapter information from the VBI where the chapter corresponds to the information for the movie video section (step 3750). As noted above, this information relates the position of each cell, the start and stop addresses, and the "PLUSCODE™" numbers for the corresponding video clip to the title of the program. The VCR stores this information in the RAM 33. As described above for the displaying the category guide menu, the VCR similarly displays the chapter guide for the movie video section (step 3751). As with the guide menu, by using the cursor keys (step 3752), the user moves the cursor through the chapter guide (steps 3753). Alternatively, the user may exit the chapter guide and return to the guide menu as described above (step 3754). If the user elects to view an entry from the movie guide (step 3755), the VCR reads from the RAM 33 the start address for the selected program and advances the tape to the video clip (step 3759). The VCR then enters the play mode and plays the video clip (step 3760). If the viewer wishes to record the program associated with the clip that he is viewing, the user presses the record button (step 3761). In response thereto, the VCR reads from the RAM 33 the "PLUSCODE™" number associated with the video clip and stores the number in the record stack for later recording (step 3757). The VCR then advances to the guide chapter. If the viewer does not record a selection after the video clip, the video clip ends and by detecting the stop address of the video clip (step 3762), the VCR knows the detected video from the video tape is a movie guide and displays the guide chapter at step 3751.

From the guide chapter menu, the viewer may record the program without viewing the video tape (step 3756). In response to a record command, the VCR reads from the RAM 33 the corresponding "PLUSCODE™" number, stores it in the record stack (step 3757), and continues to display the guide chapter at step 3751.

In various alternate embodiments, the number of grid cells displayed for the program guide or the guide chapter may be variable with the number of grid cells transmitted in the VBI data. In other embodiments, the layout of the video tape may have one movie guide section with video clips following serially on the tape. Upon the end of each video clip the VCR having detected the stop address then advances the tape to the corresponding movie guide. In yet another embodiment, several chapter guide menus may be dispersed throughout the tape so that access time of these menus is reduced.

Other Features

Figure 52:
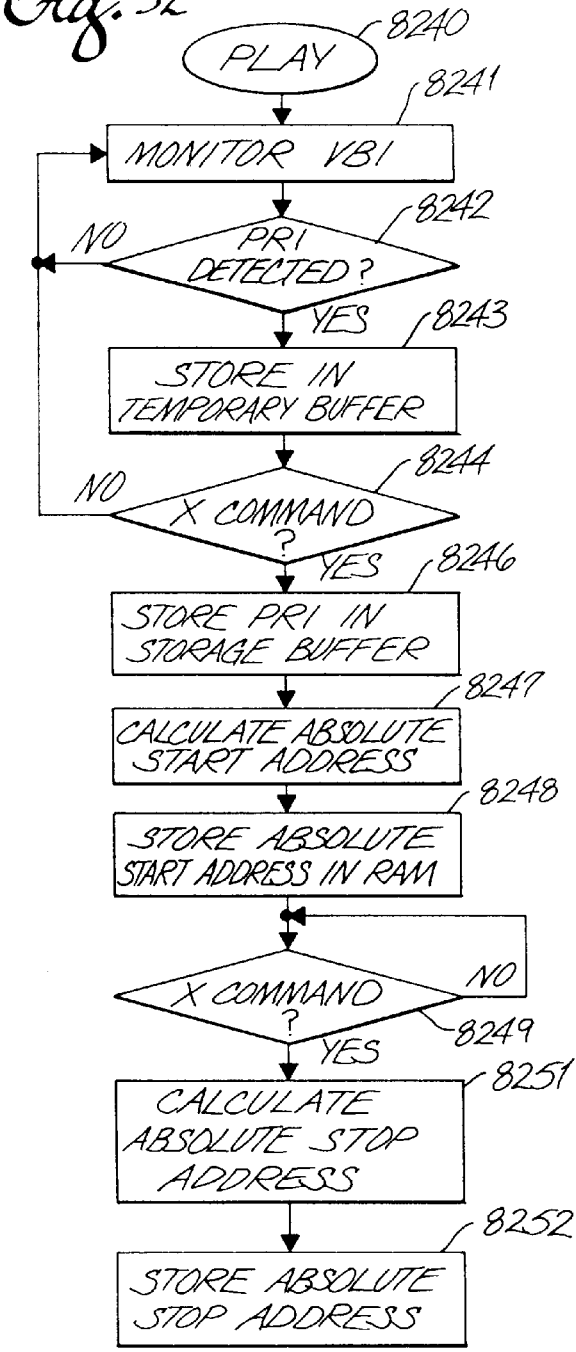
FIG. 52 is a flow chart showing the steps employed in the operation of temporarily indexing portions of a video tape between VISS marks.
Figure 53:
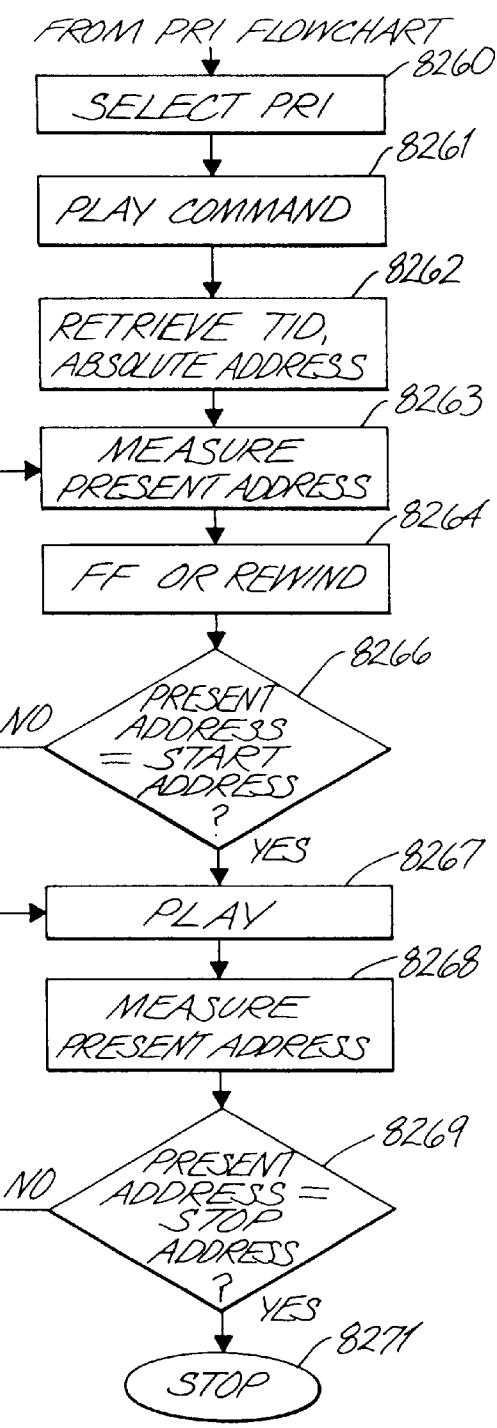
FIG. 53 is a flow chart showing the steps employed in the operation of playing temporarily indexed portions of a video tape between VISS marks.

FIG. 52 is a flow chart showing the steps employed in the operation of temporarily indexing portions of a video tape between VISS marks. FIG. 53 is a flow chart showing the steps employed in the operation of playing temporarily indexed portions of a video tape between VISS marks. As an overview, a user may wish to access video information recorded between VISS marks. As an alternative to marking the selected portion with an additional VISS mark or another type of mark, the indexing VCR 10 stores the absolute addresses of the selected video portion in response to user selected commands. This feature may be used for example when one VISS mark in a real estate magazine designates the start of homes for sale in Pasadena, while the next VISS mark designates the start of homes in La Canada. After viewing the recording of the houses in Pasadena and the PRI accompanying the video, the user may want to show his wife one particular house at a later time. Referring now to FIG. 52, while the user is playing a tape (step 8240), the indexing VCR 10 monitors the VBI for the presence of a PRI (step 8241). When a PRI is detected (step 8242), the PRI is stored in the temporary buffer (step 8243). Steps 8241–8243 correspond to the monitoring steps described above for the PRI. When the user wants to mark the video for later viewing, he presses button X on the remote controller. Button X may be any button, such as the VCRPLUS+™ button, on the remote controller that is not used in the PRI processing routine. When button X is pressed (step 8244), the indexing VCR 10 stores the current PRI in the storage buffer (8246). The indexing VCR calculates the absolute start address of the location of the tape indicated (step 8247) and stores the absolute start address in the RAM 33 (step 8248). The indexing VCR 10 then waits for a second X command to indicate the end of the selected video portion (step 8249). In response to the X command, the indexing VCR 10 calculates the absolute stop address (step 8251) and stores it in the RAM 33 (step 8252).

When the user wishes to later find the temporary indexed video portion, referring now to FIG. 53, the user pulls up the stored PRI menu as described above in connection with FIG. 43. The user selects the PRI (step 8260) and transmits a play command (step 8261). The indexing VCR 10 retrieves the TID and the absolute addresses from the memory (step 8262). The indexing VCR 10 measures the present address of the tape (step 8262) and depending on the direction to the selected video portion, fast forwards or rewinds the tape (step 8264) until the measured present address equals the start address retrieved from memory (step 8266). The indexing VCR 10 then starts playing the tape (step 8267) and measures the present address of the tape (step 8268), and when the present address equals the stop address (step 8269), the VCR stops the tape (step 8271).

A portion of the auxiliary information changes infrequently. For example, in the program ID, the broadcast channel call letters may change only as often as every several years. By storing these relatively time independent variables in the RAM 33, the access time to this portion of the auxiliary information is reduced.

With the channel call letters stored in memory, the indexing VCR 10 retrieves the call letters when the user changes the television to a new channel and displays the new channel call letters on the television without retrieving or having to wait to retrieve the new program ID information from the VBI. The channel call letter library may be collected either during an initial set-up procedure of the indexing VCR 10 by scanning all channels and reading the program ID from line 21 for each channel or, alternatively, the program ID may be read during the first use of each channel and the channel call letters stored in the RAM 33.

By way of background, the VCR PLUS+™ video programmer uses a channel mapping system in which the channel numbers are assigned to certain cable channels in each area of the country which differ from the received channel number. For example, the cable channel HBO may be assigned channel 33. Further broadcast channel frequencies are often mapped to different cable channel frequencies by the local cable operators, for example, the broadcast channel 28 for station KCET may appear as cable channel 6. The channel map relates the guide channel numbers to the received channel numbers. Similar to channel call letters, the channel mapping numbers are changed infrequently. Thus, in a similar manner, the indexing VCR 10 can automatically collect a channel map data, either after first use of each channel or during an initial set-up routine in which all channels are scanned. The "PLUSCODE™" numbers used by a VCR PLUS+™ video programmer inherently include the guide channel numbers as part of the encode channel-date-time-length data. The broadcast stations, as part of the program related information or the channel specific program guide, may broadcast the "PLUSCODE™" numbers. The indexing VCR 10 reads these numbers, decodes them, and establishes the relationship of the decoded channel numbers with the received channel numbers.

Another parameter that changes infrequently are the pointer attributes, such as line number, data rate, error correction, and encryption, of VBI lines for CSPG. Although CSPG may be transmitted more or less continuously on one or more VBI lines, the pointers to such lines may not be repeated at a high rate on line 21, because other fields of data are present. As a result, when a user switches to a new channel and requests the CSPG, he may have to wait until the next CSPG pointer appears on line 21. By storing the pointer attributes for the CSPG lines in memory, the indexing VCR 10 can reads those lines immediately after the user has switched the channel.

Format for Data Received on the VBI

The auxiliary information (program ID, CSPG, PRI) described above is broadcasted on line 21, field 2 of the VBI, according to the specification proposed by the EIA. This information shall be decoded by the indexing VCR 10 according to the specifications.

The channel specific program guide and the program related information are broadcast as text data on some VBI lines, which are referenced by pointers on line 1, field 2. The recording waveform is identical to the E.I.A., line 21, field 1–2 waveform. The text data format is similar to the E.I.A., line 21 Text Mode Data Services and the Extended Data Services. However, the data is encrypted before being sent. The following data format allows for future expansion.

Pointer

FIG. 54 is a schematic view showing the format for the pointer packet data broadcasted in the VBI for auxiliary information. The pointer packet is similar to the E.I.A. line 21 field 2 Supplemental Data Location packet. It is used as a pointer to point to another VBI line. Four to thirty-two informational characters are used to indicate the line number where the information is located. A pointer packet data packet 2605 has the following symbols: start code, type, additional ID, pointer description (1) and pointer (1) through pointer description (m) and pointer (m), stop code and check sum.

Table X shows the length in bytes and the value for each symbol. The start code indicates the packet is either a new pointer packet (by the value 07 hex) or a continuation packet of the prior packet (by the value 08 hex). The pointer description and the pointer for each of the m pointers have the same data format. The additional number ID symbol further identifies that the packet is an indexing pointer packet to further distinguish it from other data service systems that may co-exist on line 21, field 2. For multiple line application, the sequence of the Pointers within a given kind of packet indicates the VBI data sequence to be used to re-assemble the data at the receiving end. The checksum is the modulo 128 sum of the packet from the start code to the stop code.

TABLE X

| Symbol | Length (Bytes) | Value |
|---|---|---|
| Start Code | 1 | 07 hex |
|  |  | 08 hex (continuation packet) |
| Type | 1 | 7C hex |
| Additional ID | 2 | ASCII 'G'; ASCII 'S' |
| Pointer Description (1) | 1 | 61 hex D(N) |
|  |  | 62 hex TP |
|  |  | 63 hex PRI |
|  |  | 64 hex CSPG |
|  |  | 65 hex VM |
| Pointer (1) | 1 | bits 6-5 (Field): 01 odd field 10 even field 11 both fields bits 4-0 (Line Number) Lines 10-25 |
| * | * | * |
| * | * | * |
| * | * | * |
| Pointer Description (m) | 1 | Same as pointer description (1) |
| Pointer (m) | 1 | Same as pointer (1) |
| Stop code | 1 | 0F hex |
| Checksum | 2 | 00 hex-7F hex |

CSPG/PRI Packet Data Format

FIG. 55 is a schematic view showing the format for the CSPG/PRI packet data recorded in the VBI as pointed to by the pointer in line 21 of the VBI. The CSPG and PRI packets are similar in structure and are differentiated by the type code. The packet 2606 comprises the symbols: start code, type, usage, information, stop code and check sum. Table XI shows the length in bytes and the values for the symbols.

The CSPG and PRI packets are encrypted before they are encoded onto the VBI. The data stream contains an even number of bytes. An error correction code assures data integrity at the receiving end. A 4 byte long lead-in code on two consecutive VBI lines signifies the start of an encrypted data stream. The decryption circuitry may use it to either reset all or synchronize its decode circuitry or decode algorithm as necessary. Multiple packets may be cascaded back to back for encryption. The encrypted data stream is concluded by a 4 byte long termination code on two consecutive VBI lines. For the encrypted and error correction coded data stream, all 8 data bits may be used. The data slicer/decoder ignores the parity check error detected on the encrypted data.

The CSPG and PRI packets contain displayable text information. When received, these packets are stored according to their types in different locations of the memory. As described above in conjunction with FIG. 27, the RAM 33 contains a PRI packet data temporary buffer and a PRI packet data storage buffer. In addition, the RAM 33 has a CSPG buffer. The CSPG buffer preferably has at least 9600 bits of memory. The PRI storage buffer preferably has at least 7680 bits of memory. The PRI temporary buffer preferably has at least 15,360 bits of memory. As described above, both buffers operate as temporary buffers in a circular mode in which the old data packet data is overwritten by new packet data that is received. Similarly, the CSPG packet data buffer is also a temporary buffer wherein the old packet data is overwritten by new packet data received. Referring again to FIG. 55, the information field contains displayable text characters, non-displayable control characters and non-displayable attribute characters. The control characters and attribute characters are executed immediately upon receipt. A control character or an attribute character remain effective until it is overwritten by the same control character or an attribute character of a different value.

A default mode is defined for each type of control code and attribute. The default is effective at the start of a new data stream. Within the data stream, the default remains effective until it is overwritten by a control character or an attribute character.

The general form of the information field is as follows:
   CRTL ATTR displayable . . . displayable ATTR displayable. . . .

Table XII shows the control codes and attributes. The basis embodiment includes the default control codes and attributes. The control codes and attributes for the default mode are the basic types and preferably at least these types that are implemented. Alternately, the indexing VCR 10 may use the optional control codes and attributes.

Alternatively to Table XI, the character generator may determine the number of rows and columns in the full page and half page mode.

The telephone number attribute indicates that the data is a telephone number. The microprocessor controller 31 transmits this number to a remote controller that has telephone capability. The user may press dial on the remote controller and automatically call the goods or service provider. The product description attribute indicates that the associated text is a description of the product including a phone number that may be used to describe the product when calling a provider of the product. The question number attribute indicates that the associated text is a number for the question of a game show. The number is in a coded format. The VCR stores in the RAM the question number with the user's answer. This information is transferred at a later time to a contest coordinator who determines from the user's answer the user's score or prize.

Other miscellaneous text display related control codes include a Tab code for causing the cursor to shift right three spaces until it reaches the right most column. An indent control code causes the cursor to shift three spaces from the beginning of a new line. A new line control code causes the cursor to go to the beginning of the next line. A CSPGEra control code causes the CSPG packet to be erased from the memory buffer. A PRIEra control code causes the last received PRI packet to be erased from the memory buffer.

TABLE XI

CSPG/PRI packet data format

| Symbol | Length (bytes) | Value |
|---|---|---|
| Start Code | 1 | 0D hex |
| | | 0E hex for continuation packets. |
| Type | 1 | 7B hex CSPG |
| | | 7A hex PRI |
| Usage | 2 | Byte 1 |
| | | bit 0: 0 storable |
| | |       1 non-storable |
| | | bit 1: 0 store in |
| | |       temporary buffer. |
| | |       1 store in external |
| | |       RAM |
| | | bit 2: 0 print to printer |
| | |       1 print to IR |
| | | bits 3–5: expansion |
| | | bit 6: 1 |
| | | Byte 2 |
| | | bits 0–5: expansion |
| | | bit 6: 1 |
| Information | 2-128 | 00 hex: no-operation byte |
| Stop Code | 1 | 0F hex |
| Checksum | 2 | 00 hex-7F hex |

TABLE XII

Control and attribute codes

Control codes

Text display size

| | |
|---|---|
| 10r × 24c (Default) | 1D 5C |
| 15r × 32c | 1D 5D |
| don't care | 1D 5E |

Text page size

| | |
|---|---|
| Full page (Default) | 1D 40 |
| Half page | 1D 42 |

Text display mode

| | |
|---|---|
| Pop-on style (Default) | 1D 43 |
| Scroll up style | 1D 44 |
| Single line "crawl" style | 1D 45 |

Character set:

| | |
|---|---|
| Standard line 21 character set (default) | 1D 46 |
| Extended character set (as defined in the Draft EIA-60B) | 1D 47 |
| Japanese Character set I. | 1D 48 |
| Japanese Character set II. | 1D 49 |
| PRC Character set GB 2312-80. | 1D 4A |
| Korean Standard Character set: KSC 5601-1987 | 1D 4B |

Print Destination

| | |
|---|---|
| Disable (Default) | 1D 4E |
| Print to IR port. | 1D 4F |
| Print to serial port. | 1D 50 |
| Print to IR and serial port. | 1D 51 |

Miscellaneous

| | |
|---|---|
| Tab (3 spaces) | 1D 52 |
| Indent (3 spaces) | 1D 53 |
| Newline | 1D 54 |
| CSPGEra | 1D 55 |
| PRIEra | 1D 56 |

TABLE XII-continued

Control and attribute codes

| Attribute codes | |
|---|---|
| Color | |
| Blue background white characters. (Default) | 1C 40 |
| Optional background and foreground color (color combination: broadcaster selectable) | 1C 41 **** 1C 4A |
| Character set | |
| Normal size (Default) | 1C 4B |
| Double size | 1C 4C |
| Printable | |
| Printable (Default) | 1C 4D |
| Non-printable (hidden) | 1C 4E |
| "PLUSCODE ™" Number | |
| Non-"PLUSCODE ™" Number (Default) | 1C 4F |
| "PLUSCODE ™" Number | 1C 50 |
| Telephone Number | |
| Non-telephone number (Default) | 1C 51 |
| Telephone number | 1C 52 |
| Product description | |
| Non-product description (default) | 1C 53 |
| Product description | 1C 54 |
| Question number | |
| Non-question number (Default) | 1C 55 |
| Question number | 1C 56 |
| Electronic coupon | |
| Non-electronic coupon (Default) | 1C 57 |
| Electronic coupon | 1C 58 |
| Keyword | |
| Not keyword (Default) | 1C 59 |
| Keyword | 1C 5A |
| Others | |
| Reserved | |

VM Packet

FIG. 56 is a schematic view showing the VM packet used for video magazines. A VM packet 2607 comprises the symbols: start code, type, PID, stop code, and check sum. Table XIII shows the length in bytes and values for the symbols. As described above, in connection with FIG. 45, during the broadcast of video magazines, a set of VM packets are transmitted in the VBI within the program to trigger the indexing VCR 10 to record VISS marks on the control track and TP packets on line 19 of the VBI and create a corresponding directory that is stored in the RAM 33. The VM packets are located on at least one VBI line which is referenced by a pointer on line 21, field 2 of the VBI. The pointer packet data format is described above in connection with FIG. 54 where the pointer description equals 65 hex, which indicates a VM packet. The checksum is the modulo 128 sum of the packet from the start code to the stop code.

TABLE XIII

| | VM Packet | |
|---|---|---|
| Symbol | Length (Bytes) | Value |
| Start Code | 1 | 0D hex |
| Type | 1 | 79 |
| PID | | same as line 21, field 2 ID packet less start code, type code, end code and checksum |
| Stop Code | 1 | 0F hex |
| Checksum | 2 | 00 hex-7F hex |

In an alternate embodiment, the VM packet does not include a PID symbol. Instead, the directory is transmitted as a D(N) data packet in the VBI. Consequently, the video magazine is transmitted as a PR tape except that the indexing VCR adds the VISS marks in response to the detection of the VM packet.

Encryption and Scrambling of Data

The data transmitted within the auxiliary information data packets (VM packet, program I.D., CSPG, PRI) is both encrypted and scrambled.

The data is encrypted using a secret key encrypto-system such as the data encryption standard (DES) proposed by IBM and adopted by NBS in 1978.

After encryption, the data is scrambled by using a scrambling key to swap the bits of the encrypted data. The scrambling key is preferably a predetermined set of numbers that are selected from a number that is associated with the data transmitted in the VBI or on tape. For example, for prerecorded tapes, a predetermined number of bits of the tape identification number are used as a key. For example, seven bits, such as bits 22–28, of the tape identification number may be used. The tape manufacturer uses these bits to scramble the data recorded on the tape. In the indexing VCR 10, the tape identification number is read from the VBI and the predetermined set of bits are used to de-scramble the encrypted data. As a second example, for broadcasted information, a predetermined number of bits of the data type symbol are used as a key. For example, four bits of the data type symbol may be used. The manufacturer of a master tape used by the broadcaster or the broadcaster itself may use these bits to scramble the data. The indexing VCR 10 reads the type symbol from the broadcasted VBI and retrieves the predetermined set of bits as a key. The indexing VCR 10 then uses this key to descramble the broadcasted data.

One example of scrambling and de-scrambling is to apply the 7 bits to pairs of alpha numeric characters in the data and depending upon whether the bit is one or a zero, swap the characters. For example, where a one digit appears the characters of the pair are swapped, where a zero appears, the characters are not swapped. For example, for a seven bit sequence of 1011001, the phrase CHRISTIE PARKER HALE becomes scrambled by switching the C and H of the first character pair to read HC for the first one in the seven bit sequence. The RI is not swapped because the second bit is a zero; the ST is swapped to TS because the third bit is a 1; the IE is swapped to read EI because the fourth bit is 1; and so forth. In addition, the pattern is repeated for each set of seven pairs. Spaces are included as a character. Thus, CHRISTIE PARKER HALE becomes HCRITSEI PAREK RHAEL. By applying the same seven bit sequence 1011001, the character sequence can be de-scrambled.

RECOVERING AND DISPLAYING OF DIRECTORY ON-SCREEN

The general preference is that, when a tape is inserted into the indexing VCR 10, the directory is displayed on the screen as soon as possible after the user presses the Index button. However, several methods exist for displaying the directory.

In the first embodiment, the TID, program number, and directory are automatically read when the tape is inserted. In this method, when the tape is inserted, even without the Index button being pressed, the indexing VCR 10 automatically reads the TID and program number from line 19 of the VBI. After determining the type of tape, the indexing VCR 10 then recovers the directory from either the RAM 33 (for HR tapes) or line 20 of the VBI (for PR tapes). The indexing VCR 10 is then in a ready state for any user command. When the user presses the Index button at any later time, the indexing VCR 10 displays the directory on screen instantaneously. However, if the user requests non-indexing functions right after he inserts the tape, the indexing VCR 10 will not be ready until after the indexing VCR 10 has read the TID, address and directory.

In the second embodiment, the TID and program number are automatically read at tape insertion and the directory is read when the Index button is pressed. In this method, after the indexing VCR 10 reads the TID and program number at tape insertion, the indexing VCR 10 is then ready for user commands. When the user presses the Index button, the indexing VCR 10 recovers, having previously identified the type of tape, the directory from the RAM 33 or the VBI. By reaching the ready state sooner, the user is able to control the indexing VCR 10 sooner.

In an alternate embodiment to the second embodiment, the indexing VCR 10 reads and displays a portion of the directory, e.g., the first page, after the Index button is pushed. This takes less time than reading the entire directory. As the user is reading the displayed directory, the indexing VCR 10 recovers the remainder of the directory. Alternatively, the indexing VCR 10 recovers the remainder of the directory only in response to a user command, such as next page.

In the third embodiment, the indexing VCR 10 takes no action upon tape insertion. After the tape is inserted, the indexing VCR 10 is ready for user commands. When the user presses the index button, the indexing VCR 10 reads the TID, program number, and directory.

Directory in VCR RAM

As described above, a library memory (LIBMEM) can be set up in the VCR, either as part of the RAM or separate from the RAM. In a specific embodiment, instead of storing directory information on a secondary memory (e.g. magnetic strip or semiconductor) or on the control track or video track of the tape, they are stored in the library memory LIBMEM.

In accordance with this specific embodiment, each tape for which a directory is stored in the LIBMEM is assigned a volume label (e.g. a volume number). When the tape is inserted into the VCR, the volume label is used to access the corresponding directory from the library.

It is anticipated that a tape, for which a directory is created in the LIBMEM of one machine, may be transported to another VCR. Such transportation poses several problems. First, if a machine wherein the above-described functions are not implemented, the tape position may be disturbed so that when the tape is returned, the current tape position is incorrect and the value of VOLNO as well as the value of the tape reel counter at the eject point are lost. Second, even if the machine to which the tape is transported is capable of providing the above described functions, it may not have stored the directory of the tape.

According to the above implementation, a counter, VOLCNTR, is kept in a non-volatile memory. The counter provides a count of the number of tapes of which a corresponding directory is already kept in the LIBMEM (hereinafter called an "indexed tape"). The value VOLNO 1016 (see FIG. 2) of VOLCNTR can therefore be used for assigning a unique volume number to an unindexed tape (i.e. one which does not have a directory stored in the LIBMEM).

Refer to the flow chart shown in FIG. 57. When a tape 40 is inserted into the VCR 1, the microprocessor controller 31 checks whether the tape is indexed by reading the tape, at the point of insertion, for a volume number (step 4601). If a volume number is present, the tape is an indexed tape and the volume is used to retrieve a directory from the library (step 4602).

If a volume number is not present, the tape is searched for a volume number (step 4603). If a volume number is not found, the microprocessor controller 31 creates a directory for the tape in the library (step 4604). The creation includes the steps of retrieving the value of VOLCNTR from the memory, assigning that value to the tape (the VOLCNTR is also updated) and based upon the value of VOLNO allocating a space in the library to the tape. The space may be allocated based upon the value of VOLNO, such as by using the formula:

$$ADDR(\text{new directory}) = BASE + VOLNO * volsize$$

That is, the address of the directory for the inserted tape is equal to a base number (which may be equal to the starting address of LIBMEM plus a constant) plus VOLNO times the size of a directory.

The value of VOLNO is also displayed on a screen (step 4605). Preferably, numbered stickers are provided by the cassette manufactures and packaged with a new cassette. The user can then use the appropriate sticker(s) to label the cassette and/or its case or jacket.

Although not performed in this implementation, the microprocessor controller 31 may also write the value of VOLNO at this step to a predefined position of the tape (e,g, the beginning), using one of the methods described above. For example, the value of VOLNO may be written on a predefined location (such as the beginning) of the control track, or in a predefined VBI portion. It needs to be pointed out that if VOLNO is written on the control track, existing sensing and electronic components can be used in reading its value and it can be accessed at fast forward or rewind speed, whereas if VOLNO is written on the VBI of the video track, a VBI encoder, such as the one disclosed above, is required and the value of VOLNO can be accessed only at PLAY speed.

Instead of writing it at the beginning of the tape, the value of VOLNO is written when the tape is ejected.

When the tape is ejected, the value of VOLNO is written and the tape is rewound to the original stopping point (the "eject point"). The address of the eject point (e.g. the tape reel counter value) is also stored in a predefined field in the corresponding directory.

If a VOLNO is found on the tape, the tape position where the volume label is found is noted (step 4606). The volume label is then used to retrieve a directory from the memory (step 4607). The tape is then rewound to the beginning and the tape counter is reset. From the directory, the tape counter value of where the VOLNO should be found is also noted (step 4608). If these numbers match the tape position as noted in step 4606 (step 4611), the directory is assumed to be the right directory and the directory is used (step 4610). If the two numbers do not match, a directory is created in a temporary memory space; and when the tape is ejected, this directory will be deleted (i.e. not stored into the library) (step 4609).

In the above described embodiment, the contents of LIBMEM and VOLCNTR must not be lost due to a power failure of the VCR. In one implementation, the memory space of LIBMEM and VOLCNTR is provided by non-volatile memory devices such as electrically erasable programmable read only memory (EEPROM). In another implementation, battery backup is provided for the memory which form the two memory spaces. In another implementation, the directory of a tape is written back to the tape itself (either on the control track or in the VBI portion of the video track) at the point of ejection, so that the directory can be used, if necessary for recovery. In still another implementation, the content store in LIBMEM is periodically backed up to a "directory backup tape", which can then be used to recover the library after a power failure.

In another implementation, if the VCR fails to read the VOLNO when a tape is inserted, the microprocessor controller 31 sends a message to the screen to prompt the user for the value of VOLNO. The user can enter the VOLNO based upon the value shown on the sticker carried on the cassette housing. Based upon the inputted value of the VOLNO, the directory of the tape is accessed.

Enhanced Functions

The functions provided by the VCR in one specific embodiment of the present invention are shown in the flow charts of FIGS. 58.

Referring to the flow-chart shown in FIG. 59, when a cassette tape 40 is loaded into the VCR 1, the microprocessor controller 31 is interrupted (step 2710). The microprocessor controller 31 then performs a check to see whether the inserted cassette tape is an enhanced cassette or a standard cassette (step 2711). An enhanced cassette is a cassette provided with a secondary memory for storing directory information; however, if the VCR is implemented in such a way that directory information is stored on the cassette tape (e.g. control track or VBI), step 2711 can be skipped. Depending upon the implementation, the secondary memory can either be a semiconductor memory or a magnetic strip carried by the cassette. The test can be performed in any one of many techniques, including the techniques described above, i.e. detecting for presence of an electrical conductor or a light-reflective material on the cassette, or reading a predefined code on the magnetic strip.

If the cassette is an enhanced cassette, the feature control field FTCNTL 1013 in the operation flags of the RAM 33 is filled. Other control parameters, such as the length of the cassette tape 1012, and access parameters (e.g. bit density of a magnetic strip) of the secondary memory is read and stored in appropriate fields in the operation flags (step 2712).

The microprocessor controller 31 then locates a directory from the secondary memory (step 2713). If the VCR is implemented in such a way that directory information is stored on the cassette tape, or in a library stored in the RAM indexed by a volume number stored on the cassette tape, as previously described, the microprocessor controller 31 may have to activate the motor and mechanical control logic circuit 5 as well as the control and audio track head logic circuit 11 to search for the directory. If the directory information is found (step 2714), it is read into the in-use directory area 1021 (see FIG. 2) in the RAM 33 (step 2715). The directory information is used to fill a screen such as the one shown in FIG. 40*a* (step 2716). If the cassette is not an enhanced cassette, a screen, showing the conventional functions of a VCR is displayed (step 2717). If the directory is not found, a blank screen or a warning screen may be shown.

Referring to FIG. 60*a*, the enhanced screen contains a listing of the titles and lengths of the programs recorded on the cassette. In one implementation, six programs are displayed each time. The programs not shown can be accessed by scrolling or paging, using either the "PG DN" key for scrolling or paging forward or the "PG UP" key for scrolling or paging backward. The enhanced directory screen 1101 comprises several columns. The first column contains the indexes of the displayed programs, each represented by a number of 1–2 digits, with no leading zeros.

In a first embodiment, the index number (or program number) is generated by the microprocessor controller 31. In a second embodiment, the indexing VCR 10 does not generate the index number. The index number is part of the text title. For PR tapes or video magazines, the program or section numbers are included as part of the text. This allows the publisher to control the layout of the display. In a third embodiment, the indexing VCR 10 generates the index number for HR tapes and the broadcaster/publisher generates them for video magazines and PR tapes. Alternatively, a "bullet" symbol may be used instead of a program number.

The second column contains the titles of the programs. A title can have a length of up to 32 characters. Valid characters are alphabets from A–Z in upper case, numerals 0–9, and punctuation marks such as

| | |
|---|---|
| comma (",") | period (".") |
| semicolon (";") | colon (":") |
| exclamation mark ("!") | at/each ("@") |
| pound sign ("#") | slash ("/") |
| question mark ("?") | space (" ") |

The title may be obtained from the VBI. Optionally, it may be input by the user (e.g. entry #3). If a recorded program has no accompanying title information broadcasted in the VBI, the broadcast date and time of the program are used as the title (e.g. entry #4). When a tape segment has no program recorded thereon, the corresponding second column shows the word "BLANK" (e.g. entry #2). The last entry of the second column has an entry with the word "END" in the title field (entry #5). If the tape is a blank tape, "END" would be the only entry on the screen.

The third column contains the lengths of the corresponding programs, each represented by a number (1–3 digits long) indicating the number of minutes of the corresponding program. If the cassette is blank, the screen would show a single "END" entry and the corresponding length field would equal the total length of the cassette. If there is no blank space between the last program on the tape and the end of the tape, a zero will be displayed in the length field of the "END" entry.

Optionally but advantageously, the screen also shows the current operating speed of the VCR; that is, whether the VCR is set at SP, LP, SLP, etc. Moreover, in one implementation of the present invention, if the operating speed of the VCR is changed, respective lengths of the programs will be recalculated and displayed with the recalculated value.

Identifying a Recorded Program

The enhanced tape allows a user to select a program from the directory screen for playback by entering the corresponding number of the program as displayed on the first column of the enhanced screen and then press the "PLAY"

key. For example, to watch program number #3, the "3" key and the "PLAY" key are pressed in sequence.

Referring to FIG. 59b, when the microprocessor controller 31 receives a number key (step 2720), it retrieves a variable ("NO.") and adds the entered number by concatenating it to that variable (step 2721). The microprocessor controller 31 then waits for another key input (step 2722). When a key is entered, the microprocessor controller checks to see if the newly-entered key is another number key (step 2723). If the newly-entered key is another input key, its value is again added to the variable "NO." Typically, the number is added by shifting "NO." by one digit and adds the newly-entered number thereto (step 2721). The microprocessor controller 31 waits for a non-number key (e.g. "PLAY", "RECORD") to be entered (step 2722). When a non-number key is received, the microprocessor controller 31 checks to see if the tape is positioned at the program with the input number. If the tape is not positioned at the selected program, either a rewind or a fast forward operation is performed, depending on the current position of the tape, to move the tape to the beginning of the program having the input number, and a screen, such as FIG. 60b, is displayed (step 2724).

After the tape is moved to the selected program, the function specified by the non-number key is then performed (step 2725).

Playing a Recorded Program

Figure 59C:
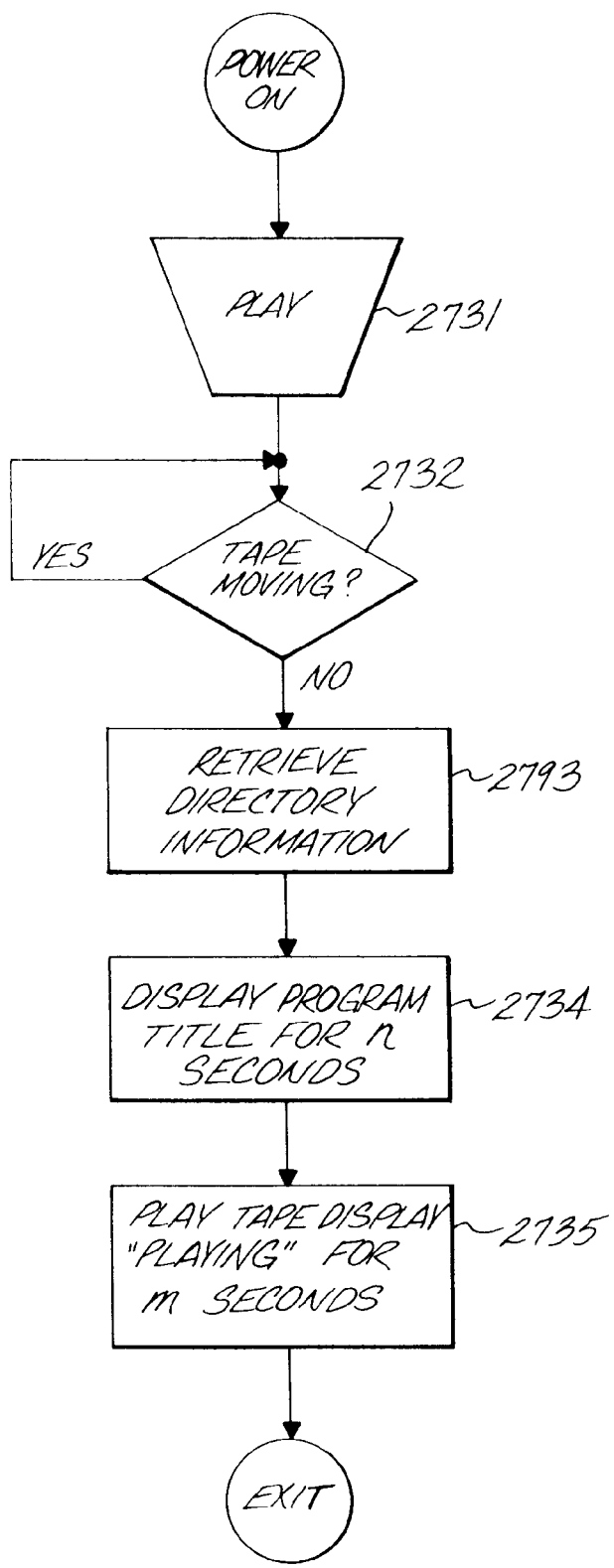
Figure 59D:
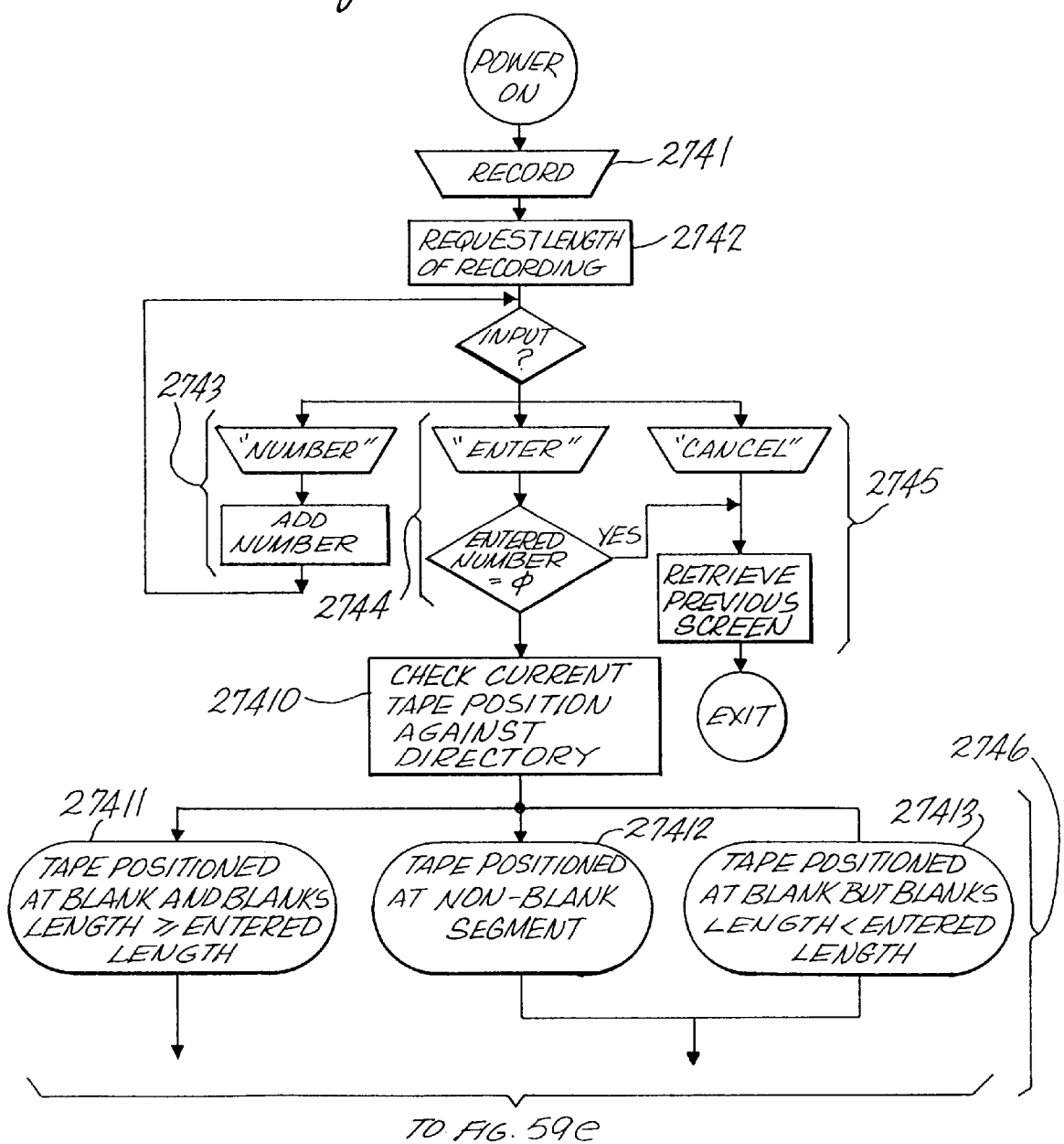

Referring to FIG. 59c, when the "PLAY" key is pressed (step 2731), the microprocessor controller 31 waits until the tape stops moving (step 2732). When the tape stops, the microprocessor controller 31 retrieves directory information of the program (step 2733) and displays it on a screen (step 2734) as shown in FIG. 60c for a few seconds. Thereafter, the microprocessor controller 31 initiates the VCR to play the cassette (step 2735). Optionally, in the first few seconds after the tape is started, the word "PLAYING" is displayed on the screen (step 2735). The VCR continues to play the tape until it reaches the end or until it receives a STOP command.

Instant Recording

Instant recording is an option which allows a user to record a program for a selected length of time. The option can be initiated at any time instant, whether the user is watching a television broadcast or a taped program. Referring to the flow-chart shown in FIG. 59d, when the microprocessor controller 31 is interrupted by the RECORD key (step 2741), it displays a screen, such as FIG. 60d, to prompt the user to enter the length of recording desired (step 2742). The length can be entered as a three-digit number representing the number of minutes desired (step 2743). Numbers with less than three digits are appended by leading zeros, either automatically or manual, depending on the implementation. The entered numbers are confirmed by the "ENTER" key (step 2744). If three zeros are entered, they are interpreted as a "CANCEL" command (step 2745).

Instant recording may be initiated when the tape is positioned within a recorded program, within a blank space, or at the end of the tape (step 2746). When the microprocessor controller 31 receives the "ENTER" key, it checks the current tape position against the tape directory (step 27410).

Figure 59E:
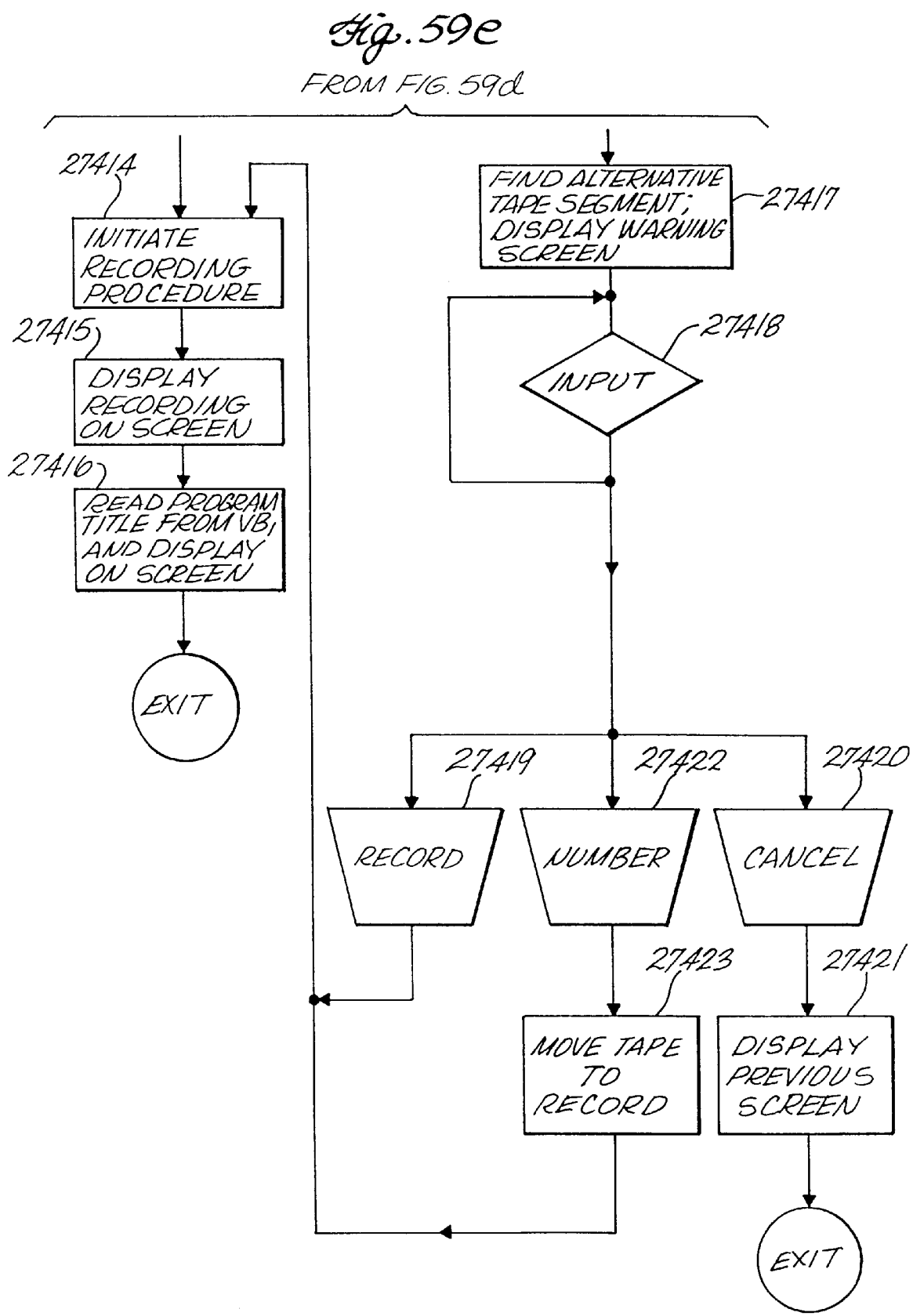

If the current tape position is at a blank area which has a length equal to or longer than the entered length of the recording (step 27411), the microprocessor controller 31 initiates a Recording Procedure to record the program (see FIG. 59e).

Referring now to FIG. 41a, there is shown a flow chart illustrating the general steps of the Recording Procedure.

When an appropriate tape segment is found, the address of the segment is passed to the Recording Procedure. In step 3000, the microprocessor controller 31 stores the current value of the tape counter. In step 3001, the microprocessor controller 31 calls a VBI Decode Procedure to set up the VBI decoder 60a in order to obtain program information (e.g. title) from the VBI.

Referring now to FIG. 61b, there is shown a flow chart illustrating the general steps of the VBI Decode Procedure. The VBI Decode Procedure has two parameters, a VBI line number (LINE#) and a VBI field number (FIELD#). The microprocessor controller 31, in response to these parameters, sets the VBI decoder 60a to decode line 21 and field 2 of the VBI (step 3101).

When the VBI decoder 60a detects VBI line 21 and field 2, it interrupts the microprocessor controller 31 (step 3102) and passes the value of line 21 and field 2 of the VBI to it.

Referring back to FIG. 61a, after the microprocessor controller 31 initiates the VBI Decode Procedure, it sets the VCR 1 to record (step 3002). When the microprocessor controller 31 is interrupted by the VBI decoder 60a, it receives the output from the VBI decoder and checks the control code and type code of the output (steps 3003 and 3004). If the control code is "01" and the type code is "03", the microprocessor controller 31 reads the VBI output and puts it into the "program title" field of the corresponding directory entry (step 3005). If the control code is "01" and the type code is "04", the microprocessor controller 31 reads the VBI output and puts it into the "program type" field of the corresponding entry (step 3006). If the control code is "01" and the type code is "05", the microprocessor controller 31 reads the VBI output and puts it into the "program audience" field of the corresponding entry (step 3008). If the control code is "07" and the type code is "01", the microprocessor controller 31 reads the VBI output and stores it in a temporary time-of-day variable (step 3007).

The microprocessor controller 31 then checks to see if the program title from the VBI is a blank (step 3009). If so, then it puts the time-of-day value into the program title field of the directory entry (step 3010).

Figure 61C:
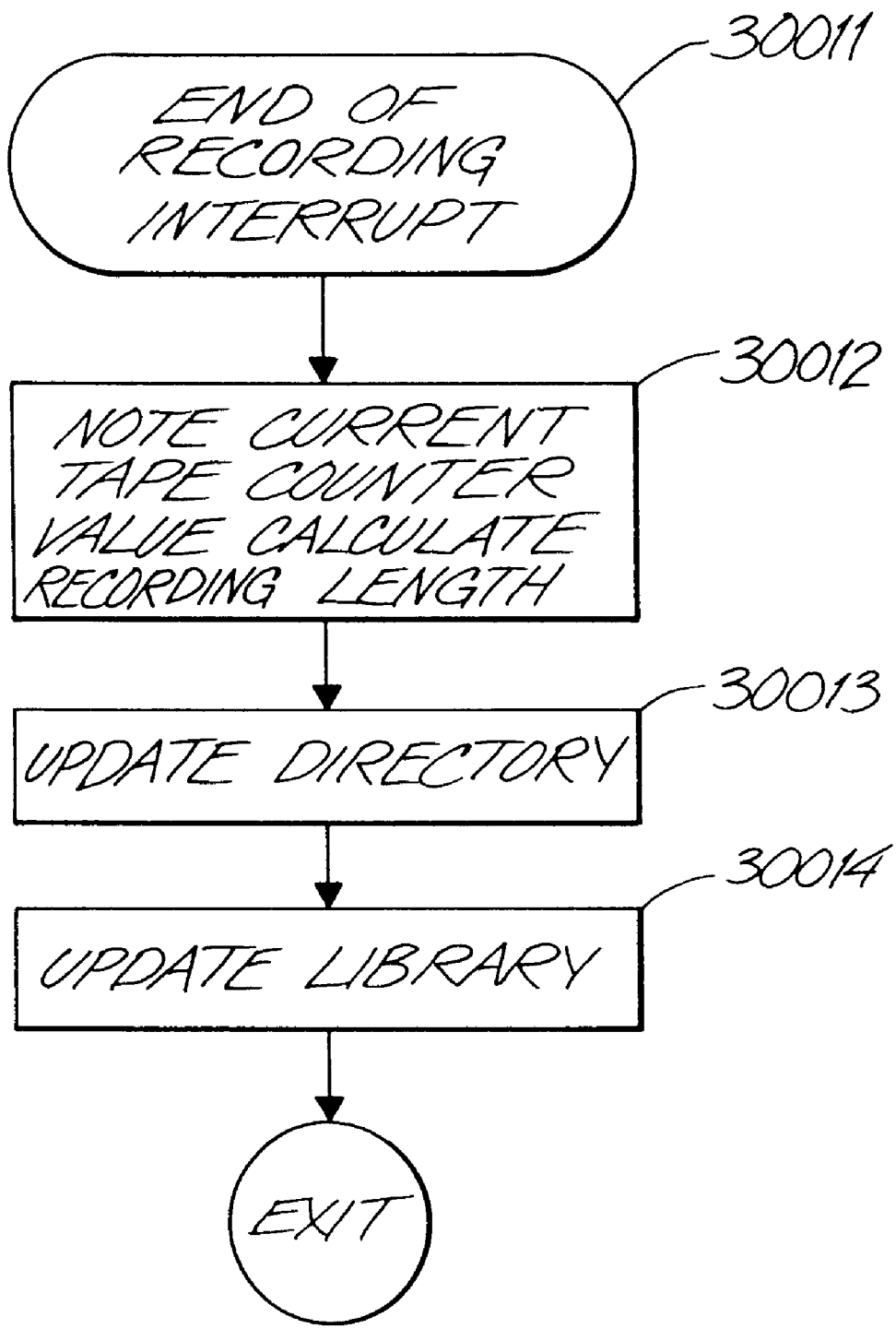

Referring to FIG. 61c, when the recording finishes, the microprocessor controller 31 is interrupted (step 30011). It then notes the current value of the tape counter and subtracts it from the value stored at the beginning of the recording to find the length of the recorded program (step 30012). In step 30013, the directory of the cassette is updated if it is stored in a magnetic strip and accessed by a movable head or if it is stored in a semiconductor memory. In step 30014, if there is an entry in the VCR library for the tape (as will be described below), the library is updated.

Referring now to FIG. 59e, optionally, when the screen is showing a broadcast program, the microprocessor controller 31 indicates the recording procedure (step 27414) and displays the word "RECORDING" (step 27415) on the lower part of the screen. Moreover, if the program title is transmitted, it is read and displayed on the screen (step 27416) next to the word "RECORDING".

Referring back to FIG. 59d, if the current position of the tape is at a non-blank segment (step 27412) or if the current position is at a blank segment but the blank's length is shorter than the length of the desired recording (step 27413), the microprocessor controller 31 performs a search procedure to select the directory for an appropriate segment for performing the recording. The appropriate segment can be selected in several ways. One way is to search, starting from the beginning of the directory, for the first blank segment whose length is longer or equal to the requested length of the recording. If the programs recorded on the tape are as shown in FIG. 60f and the required length of the recording is 20 minutes, segment #4 (length=120 minutes) will be selected. However, such selection would cause inefficient use of the tape. Therefore, another way is to search the directory for the shortest blank segment whose length is longer or equal to the required length of the recording. Using the example of FIG. 60f, segment #6 (length=24 minutes) will be used. In this way, segment #4 can be used for recording a longer program.

Returning to FIG. 59e, after the microprocessor controller 31 searches for an appropriate segment, it displays a warning screen, such as the screen shown in FIG. 60e, on the screen (step 27417), suggesting to the user to perform the recording on segment #6.

After the warning screen of FIG. 60e is displayed, the microprocessor controller 31 monitors for an input from the user (step 27418). If the user presses the RECORD key (step 27419), the microprocessor controller 31 then performs operations described in steps 27414, 27415 and 27416 described above. If the user presses the CANCEL key (step 27420), the recording is cancelled and the previous screen is displayed (step 27421). If the user presses the number key that corresponds to the number shown on the screen (step 27422), the microprocessor controller 31 moves the tape to the position corresponding to the entered number (step 27423) and starts recording. When the tape is moved, a screen such as FIG. 60b is shown.

VCR PLUS+™ RECORDING

The VCR can optionally be initiated to perform a "PLUSCODE™" number recording, in a similar way as a VCR PLUS+™ remote controller from Gemstar Development Corporation of California. "PLUSCODE™" number recording is also described in U.S. patent application Ser. No. 07/676,934 filed Mar. 27, 1991 and is incorporated herein by reference. "PLUSCODE™" and VCR PLUS+™ are trademarks of Gemstar Development Corporation. "PLUSCODE™" number recording is initiated by a "VCR PLUS+™" key, which can be performed at any time, even when a broadcast or a recording is being watched, or when a rewind or fast forward operation is in progress, or when there is no cassette tape loaded in the VCR.

Figure 59F:
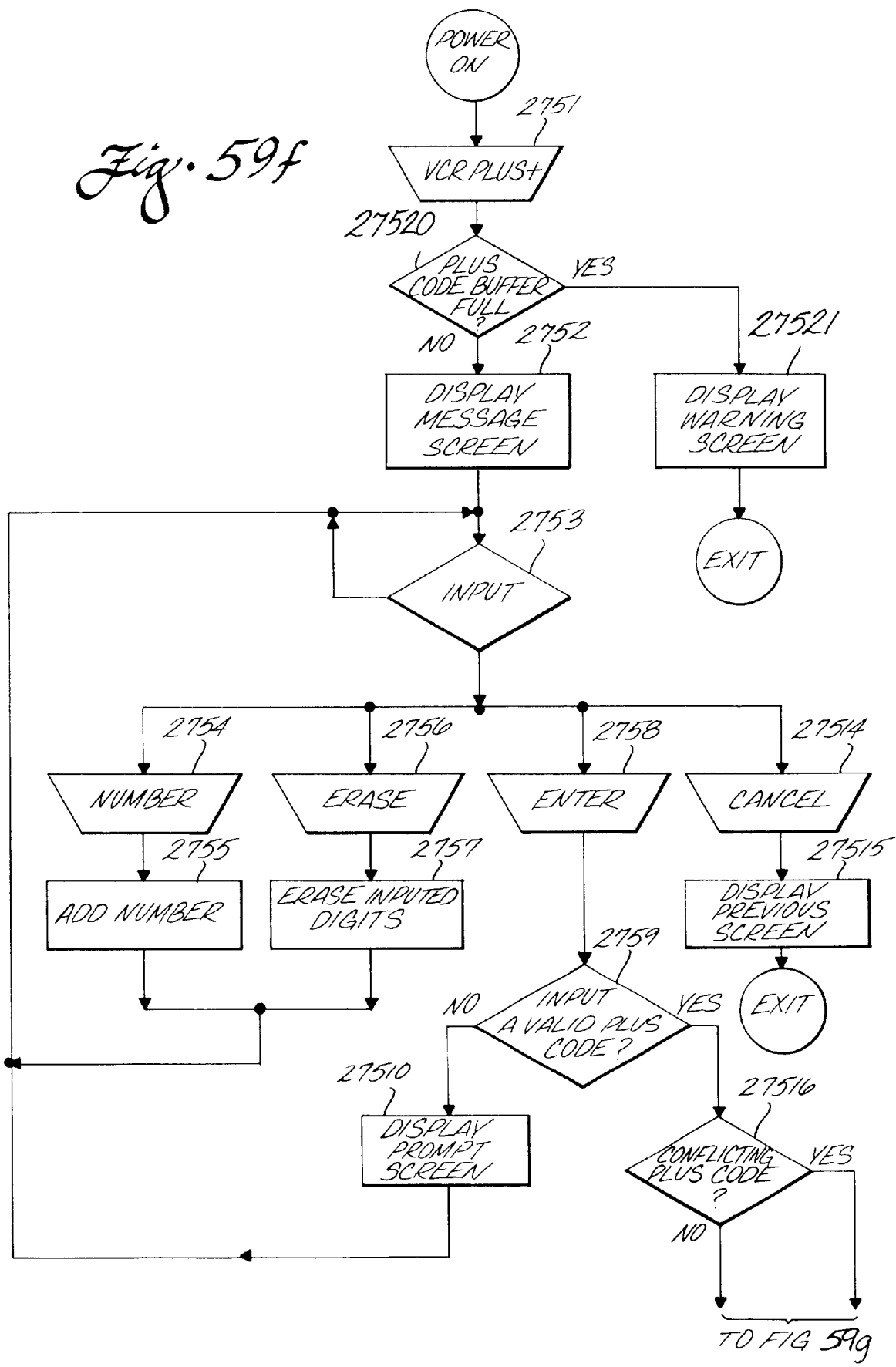

In a specific implementation, enough memory space is provided in the CDTL buffer 1024 for storing eight "PLUSCODE™" number settings. Referring to FIG. 59f, when the microprocessor controller 31 is interrupted by the VCR PLUS+™ key (step 2751), it first checks whether the CDTL buffer 1024 is full (step 27520). If the buffer is not full, the microprocessor controller 31 displays a screen, such as FIG. 60g, on the television screen (step 2752). The microprocessor controller 31 then waits for an input from the user (step 2753). If the input is a number key (step 2754), it is added to the entered digits (step 2755). If the input is the ERASE key (step 2756), the already-received digits are erased (step 2757). If the input is the ENTER key (step 2758), the microprocessor controller 31 checks whether the input is a valid "PLUSCODE™" number (step 2759).

If the input is an invalid "PLUSCODE™" number, a screen such as FIG. 60h is displayed to prompt the user to re-enter the "PLUSCODE™" number (step 27510). If the "CANCEL" key is pressed (step 27514) under that screen, the "PLUSCODE™" number recording is cancelled (step 27515).

If the "PLUSCODE™" number is valid at step 2759, a check is made to determine whether there is a "PLUSCODE™" number conflicts (step 27516). A conflict occurs when the "PLUSCODE™" number setting is for a recording which will occur at the same time as another scheduled recording. Referring to FIG. 59g, if there is no conflict, a prompt screen such as FIG. 60i is displayed (step 27511). The user can then press:

"1" to set the recording for once only;

"2" to set the recording weekly;

"3" to set the recording every weekday.

Pressing any key other than these three keys would have no effect (step 27512).

Upon receiving one of these three keys, the input is saved (step 27513), a confirmation screen is displayed for confirming the recording data, such as channel number Date (MM/DD/YR)

Start Time (in either 24-hour or in 12-hour AM/PM format)

Stop Time (in either 24-hour or in 12-hour AM/PM format)

Recording option, that is, whether the recording is to be performed once, weekly or daily.

If the data on the confirming screen is correct, the user presses the "ENTER" key and the recording is set. If the data is incorrect, the user can press the "CANCEL" key to re-enter the "PLUSCODE™" number.

If the CDTL buffer 1024 is already full when the "VCR Plus+™" key is pressed, a warning screen such as FIG. 60j is displayed (step 27521). The warning screen advises the user that the buffer is full and that he needs to delete a program from the buffer before another program can be added. Under FIG. 60j, the user is advised that he review the list of programs stored in the CDTL buffer 1024 so that he/she can delete one or more setting to make room for the new setting. The user is also advised that he can press the "CANCEL" key to exit "PLUSCODE™" number recording.

"PLUSCODE™" number settings can be reviewed by pressing the "REVIEW" key. A review operation can be performed at any time and can even be performed when there is no tape in the video player. With reference to FIG. 59k, when the microprocessor controller 31 is interrupted by the REVIEW key (step 2761), it retrieves all the "PLUSCODE™" number settings (step 2762) from the CDTL buffer 1024. Based upon the data, a screen such as FIG. 60k is displayed (step 2763).

If the REVIEW option is entered as a result of a full CDTL buffer 1024 during the VCR Plus+™ operation, the screen of FIG. 60k would list eight programs.

On a review screen, each entry would comprise the following columns:

Number of the entry. This number is used for ordering and reference. "PLUSCODE™" number settings are listed in chronological order so that the program to be recorded first will appear at the top of the screen and the programs to be recorded last will appear at the bottom of the screen.

Channel number of the program to be recorded.

Date of the program, expressed in MM-DD format. If the program is to be recorded daily (i.e. Monday to Friday), the letter "D" would appear immediately to the right of the date. If the program is to be recorded weekly, a letter "W" would appear immediately to the right of the date.

Time of the program. This information is expressed in 24-hour clock and in HH:MM format. Alternatively, the information may be expressed in 12-hour AM/PM clock format.

Length of the set recording. This information is expressed in number of minutes.

Tape status. This information is displayed when a tape having the enhanced features is used. The microprocessor controller 31 checks the feature control field (FTCNTL) to see if an enhanced tape is inserted (step 2764). If the inserted tape is an enhanced tape, the microprocessor controller 31 searches the directory to see if there is a blank segment for each setting (step 2765). If there is enough blank space on the tape to accommodate a setting, the word "OK" is written in the sixth column of the corresponding entry (step 2766). If there is not enough blank space on the inserted tape for the corresponding setting, the word "NO" will appear in this field. The value in this field may change if a different tape is inserted for the new tape has different amount of blank space. The field will disappear if the inserted tape is not an enhanced tape.

After the review screen is displayed, the microprocessor controller 31 waits for an input from the user (step 2767). Referring now to FIG. 59*l*, when the user enters a number key (1–8 in the example of a full CDTL buffer noted above) (step 2768), the corresponding entry is selected (step 2769). If the user then presses the ERASE key (step 27610), the selected entry is deleted from the CDTL buffer 1024 (step 27611). If the "REVIEW" key is pressed again under the review screen (step 27612) or if the tape is ejected from the VCR, the review operation is terminated.

Referring back to step 27516 of FIGS. 59*f* and 59*g*, if the newly-entered "PLUSCODE™" number conflicts with an existing "PLUSCODE™" number, a screen such as FIG. 601 is displayed which shows such data as the channel, date, start time and stop time of both the new setting and the existing setting (step 27517). The microprocessor controller 31 then waits for the user to press the CANCEL key (steps 27518 and 27519). If the "CANCEL" is entered, the new "PLUSCODE™" number is erased and the VCR Plus+™ operation is re-started (by going back to step 2753).

A timer is kept in the VCR. Whenever the timer is empty, the microprocessor controller 31 puts the starting time of the first "PLUSCODE™" number entry (if one exists) into the timer. When the timer equals to the time-of-day clock, the microprocessor controller 31 is interrupted, which will then execute the Recording Procedure described above.

Library

In the specific embodiment of the present invention, a user is given the option to create a library of the directories for a set of selected tapes. Storage space is created in the RAM 33 for storing the library. The storage space of the library is divided into more than one group of entries, each for storing the directory of a tape (or a volume). A volume ID of the corresponding tape is stored in a predetermined location of each entry.

The library option is initiated when the "LIBRARY" key is pressed. The key can be pressed at anytime, such as when the user is recording a broadcast program or watching a recorded program from a cassette. Moreover, the key can be pressed when there is no cassette in the VCR.

Figure 59H:
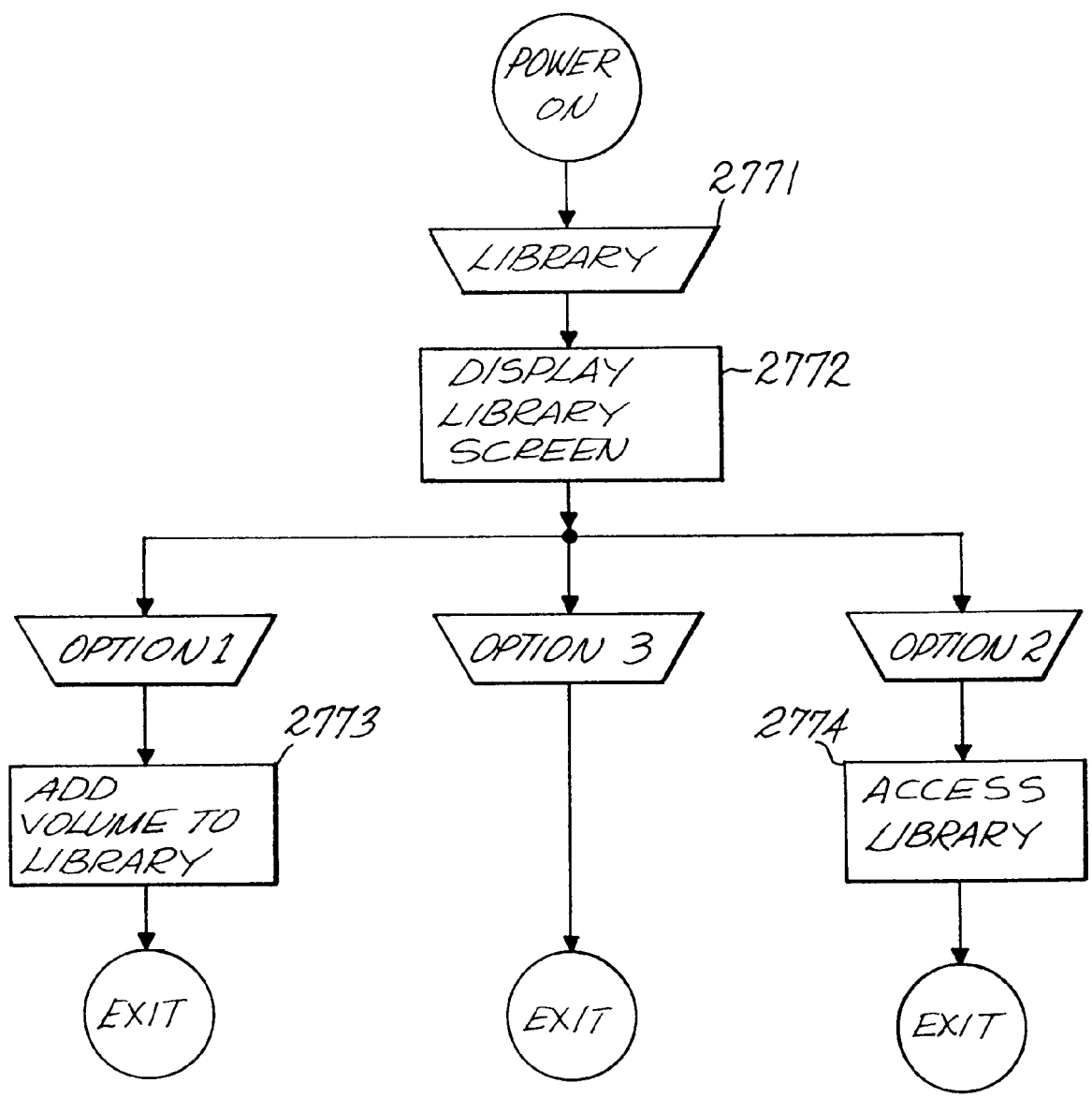

Refer to FIG. 59*h*, when the microprocessor controller 31 is interrupted by the LIBRARY key (step 2771), it displays a screen such as FIG. 60*o* to prompt the user to enter one of two options (step 2772). Option 1 is an option to add a tape directory into the library, it can be selected only when a enhanced cassette is loaded in the VCR (step 2773). Option 2 is an option which allows the user to access content of the library and is typically selected by the user to search for a special program or a special type of program (step 2774).

Figure 59I:
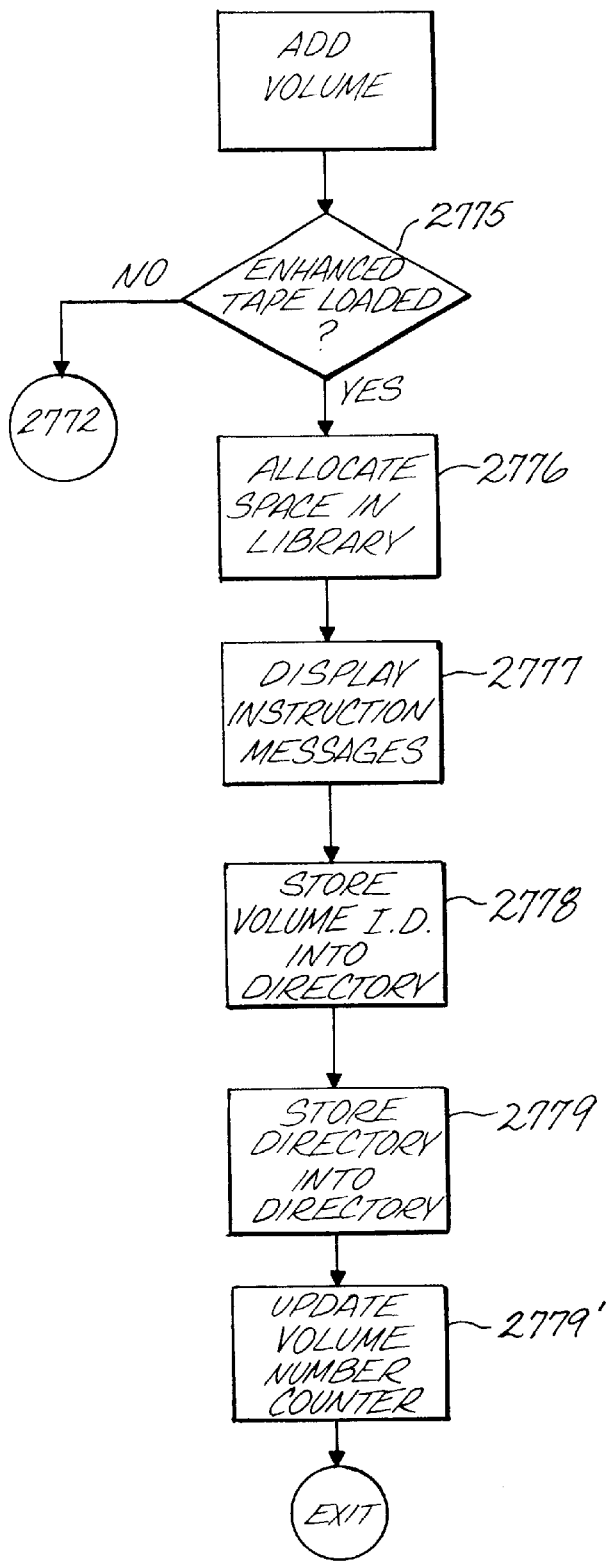

With reference to FIG. 59*i*. When Option 1 is selected, the microprocessor controller 31 detects whether a cassette is loaded in the VCR (step 2775). If no cassette is loaded, the microprocessor controller 31 displays a message, such as:

"THIS OPTION NEEDS AN INDEXED TAPE"

on the screen and returns to step 2772 of FIG. 59*h*. If an enhanced cassette is loaded in the VCR, the microprocessor controller 31 will allocate space in the library area for adding the directory (step 2776). In one implementation, the microprocessor controller 31 then prompts the user to enter an volume label. In a preferred implementation, a Volume Number Counter 1016 is kept in the RAM 33, (e.g. inside the operation flags area). This counter 1016 stores the next volume number to be assigned to a newly-added tape. When execution of the add option begins, the microprocessor controller 31 takes the next volume number (assuming for purposes of illustration that it is 59) from the Volume Number Counter and assigns this volume number to the tape. Advantageously, if the library is implemented in such a way that each directory has a fixed amount of memory space, the volume number of a tape can be used as index to address the corresponding directory from the library.

In step 2777, the assigned volume number is displayed on the screen, accompanied by a message such as:

"THE VOLUME NUMBER ASSIGNED TO THIS TAPE IS 59"

"PLEASE AFFIX LABEL TO CASSETTE WITH THIS NUMBER"

For convenience, numbered stickers are provided from cassette manufactures and packaged with a new cassette. The user can then use the appropriate sticker(s) to label the cassette and/or its case.

The microprocessor controller 31 then stores the assigned volume number into a predetermined location (VOL ID) of the cassette's directory (step 2778). The VOL ID field in a directory can be used as an indication to the microprocessor controller 31 that such directory is stored in the library, so that the library can be updated if the directory is changed (e.g. when a recording is performed). The microprocessor controller 31 then writes the directory into the allocated library area (step 2779) and increments the volume number counter as the directory is successfully added to the library (step 2779).

Figure 59J:
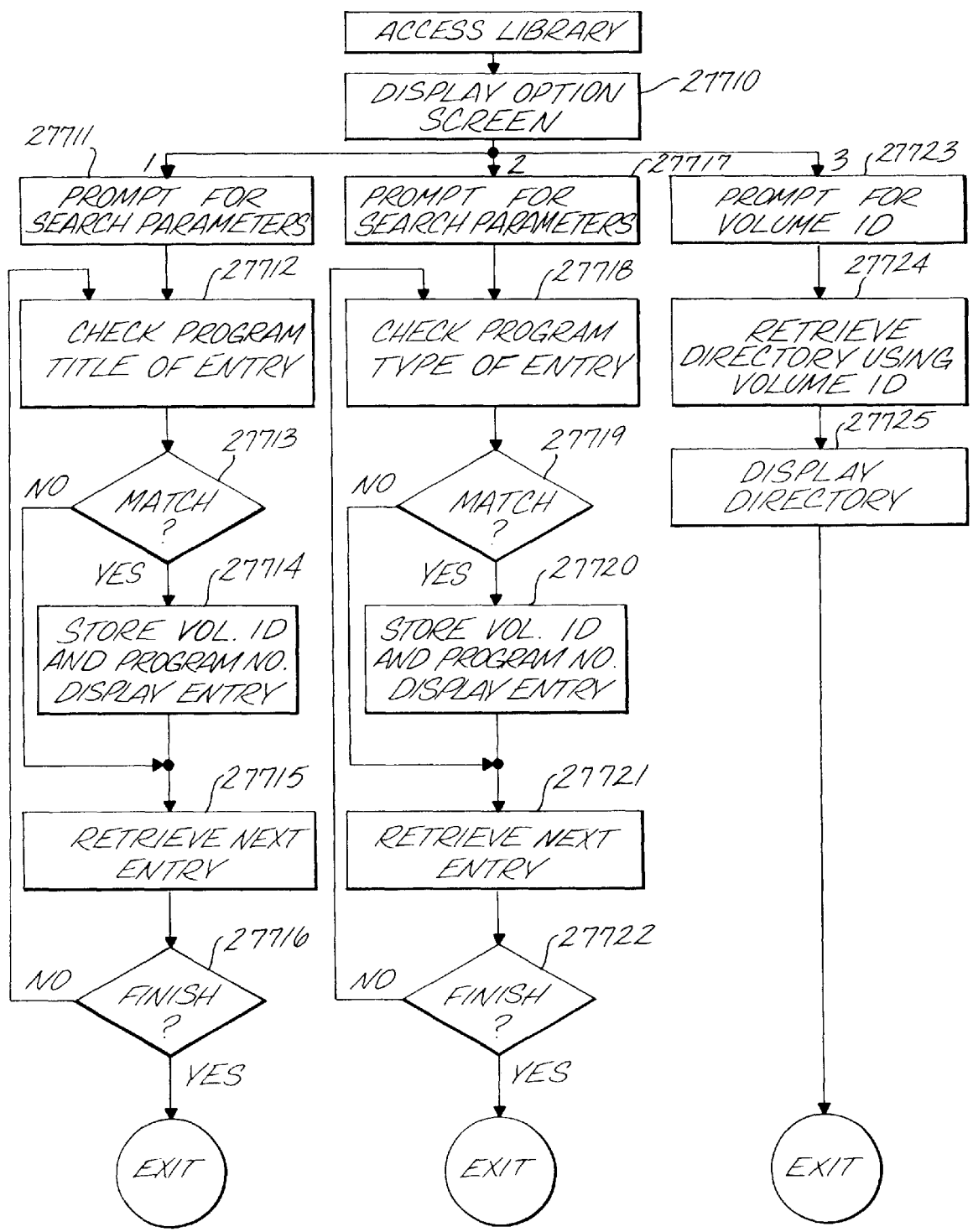
Figure 59K:
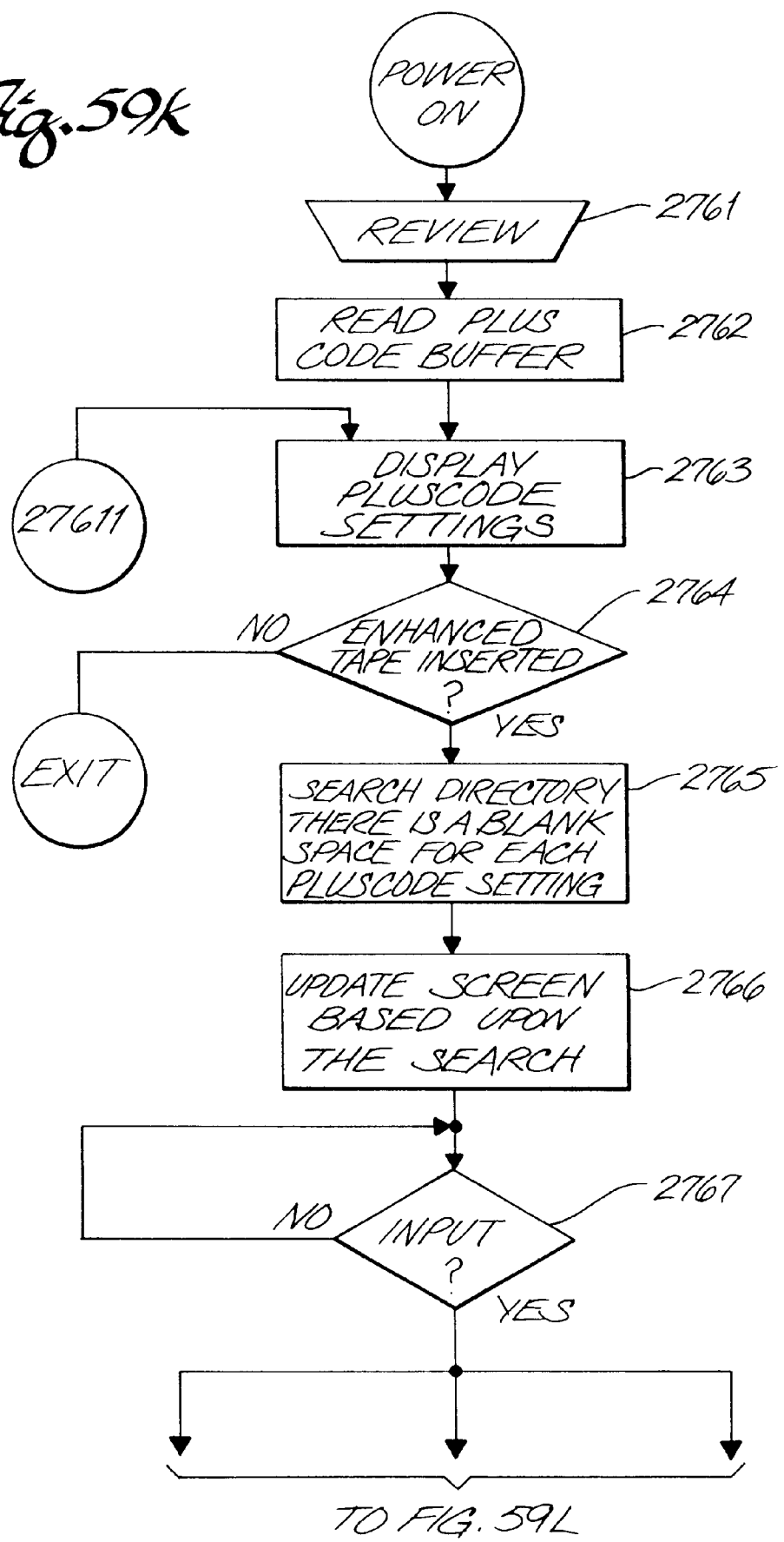

When Option 2 is selected at step 2774 and referring now to FIG. 59*j*, a screen such as FIG. 60*p* is displayed (step 27710). The user is given three options. Under the first option of FIG. 60*p*, the user can search for programs with specific program titles or subtitles (for example, programs which have a title containing the word "Yankee" or which has a letter "Z", "CA", etc.) (step 27711). Under the second option of FIG. 60*p*, the user can search a specific type of programs (e.g. a sports program) (step 27717). Under the third option of FIG. 60*p*, the user can display the directory of a particular tape volume (step 27723).

When option 1 of FIG. 60*p* is selected, the microprocessor controller 31 prompts the user for the search parameters by displaying the following message on the screen:

"PLEASE ENTER THE SEARCH TITLE/ CHARACTERS"

Upon receiving the input, the microprocessor controller 31 searches through the directories of the library (step 27712). For each entry that matches the search request (step 27713), the microprocessor controller 31 displays the entry's program title and volume number (step 27714). The entry's volume number and program number within the directory are stored in a search buffer. The microprocessor controller 31 retrieves the next entry (step 27715) until it finishes (step 27716)

When option 2 of FIG. 60p is selected, the microprocessor controller 31 prompts the user for search parameters by displaying the following message on the screen:
"PLEASE ENTER THE TYPE OF PROGRAMS FOR THE SEARCH"

Advantageously, if the user does not remember the type classification, he can press a HELP key and all the available types are listed on the screen. When the user enters the type, the microprocessor controller 31 searches through the directories of the library. For each entry which matches the search request (step 27719), the microprocessor controller 31 displays the entry's program title and volume number (step 27720). The entry's volume number and program number are stored in a search buffer. The microprocessor controller 31 retrieves the next entry (step 27721) until it finishes (step 27722).

Option 1 and option 2 can be combined. When an option is finished, the user can press the "C" key before he selects the next option. The microprocessor controller 31, in response to such key sequence, performs the search using the content in the search buffer, removing from the search buffer those entries that do not match the parameters of the second search. For example, if the first search is for sports programs and results in filling the search buffer with address of entries that have a program type of "sports". If the user then press the "C" key and then selects option (1) to search of the word "YANKEE" in the program titles, the entries stored in the search buffer that do not have the word "Yankee" in the program title field are deleted. The user can continue the search for several times. When the second search is completed, the entries that remain in the search buffer are displayed.

When option 3 of FIG. 60p is selected, the microprocessor controller 31 prompts the user for the volume number by displaying the following message on the screen:
"PLEASE ENTER THE VOLUME NUMBER"

When the volume number is entered, the microprocessor controller 31 uses the volume number as index to retrieve the corresponding directory (step 27724). When the directory is retrieved, its entries are displayed on the screen (step 27725).

Auxiliary Information

The VBI can be utilized to provide other functions to further enhance operation of a VCR. In one specific implementation of the present invention, the VBI is used to transmit auxiliary information relating to a program being broadcasted. one example of the auxiliary information is the channel-date-time-length (CDTL) information or "PLUSCODE™" number information of a related program. Another example of the auxiliary information is ordering information and/or more detail description of a product shown in a commercial.

The use of the auxiliary information is now illustrated with reference to FIG. 62. Assume that a network 3201 is broadcasting a prime time movie. At certain intermissions of the movie, the network introduces an upcoming program (e.g. a miniseries). Assuming that the upcoming show will be broadcasted for three consecutive days starting two weeks later (say, January 1) and will be broadcast at 9:00 pm for two hours each day. Normally, excerpts of miniseries are shown during the intermissions. When the excerpts 3202 are broadcasted, the VBI 3203 of the broadcasted signals would contain the CDTL or "PLUSCODE™" number information of the miniseries. The CDTL information or the "PLUSCODE™" number can be put, for example, in the composite packet-1 (i.e. line 21, field 2, control code=01, type code= 0C). A mark, such as a character "I" 3204 flashing at the lower right hand corner of the screen 3205, is shown when the excerpts are shown. The flashing "I" 3204 informs a user that, if the user is interested in recording the miniseries, he can press an I-key and the VCR will be automatically set to record the miniseries using the information broadcasted in the VBI. The VCR indicates to the user that the information has been stored by either stopping the flashing of the "I" or by displaying a message, such as "SAVED" on the screen. Other prompts and the variations in the timing relationship with the program may be used as described above for auxiliary information.

Figure 59M:
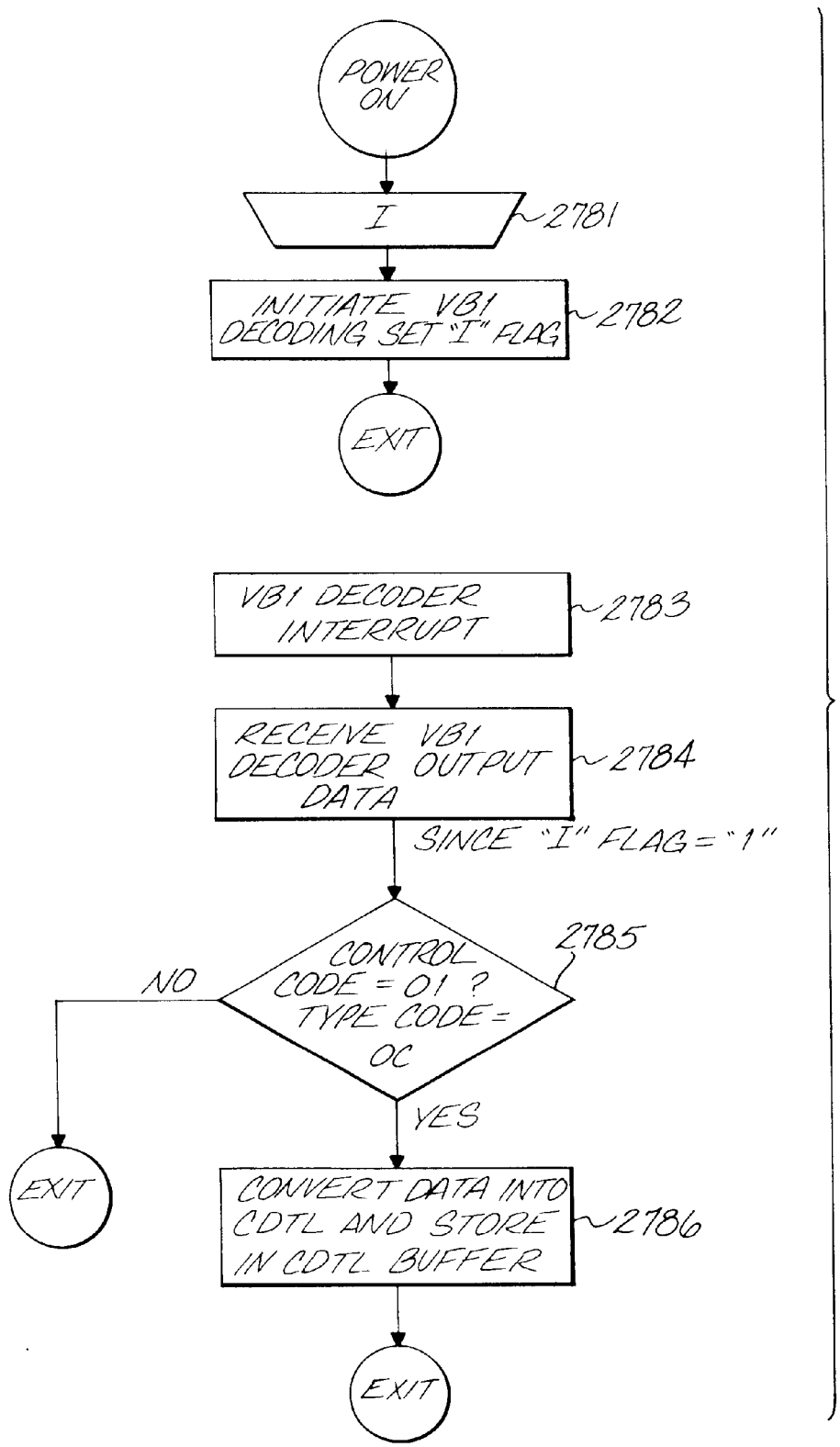

Referring to the flow chart of FIG. 59m, the microprocessor controller 31, upon interruption by the I-key (step 2781), executes the VBI Decode procedure to set the VBI decoder to decode the VBI (step 2782). When the VBI decoder detects VBI line 21, field 2, it interrupts the microprocessor controller 31.

When the microprocessor controller 31 is interrupted (step 2783), it receives the VBI data (step 2784). Since the I-key was pressed. the microprocessor controller checks to see if the control code is equal to 01 and the type code is equal to 0C (step 2785). If so, the VBI decoder output is converted into CDTL data and stored into the CDTL buffer (step 2786).

As another example of the use of the VBI, assume an advertiser would like to present 30 minutes of commercial, including one minute of introductory information and 29 minutes of auxiliary information (e.g. such as ordering instructions) to the audience. While prime time airing may be more effective, its cost is usually high. The present invention allows the advertiser to air the one minute of introductory information at prime time, but provides easy access of the auxiliary information at a less expensive time slot. In the specific implementation of the present invention, the CDTL of the less expensive time slot in which the auxiliary information will be shown is broadcasted in the VBI. When the introductory information is aired at prime time, a flashing "E" is shown on the screen. Responsive to the flashing "E", an interested user can press the E-key and the VCR will be automatically set to record the auxiliary information in the RAM. At a later time, the user can retrieve the auxiliary information and display it on the television.

Figure 59N:
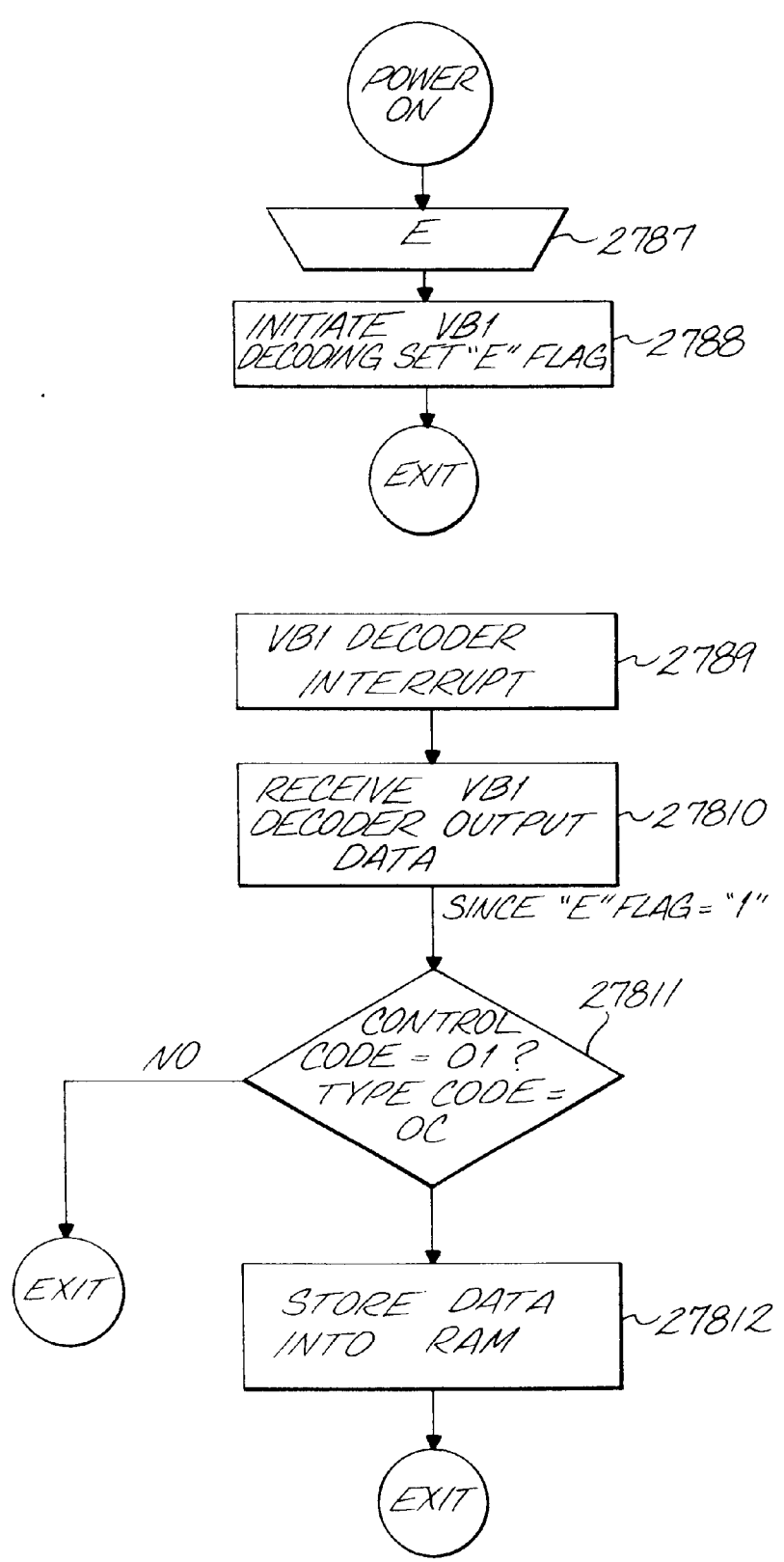

Referring to the flow chart of FIG. 59n, the microprocessor controller 31, upon interruption by the E-key (step 2787), executes the VBI Decode procedure to set the VBI decoder 60a to decode the VBI (step 2788). When the VBI decoder 60a detects VBI line 21 field 2, it interrupts the microprocessor controller 31.

When the microprocessor controller 31 is interrupted (step 2789), it receives the VBI data (step 27810). Since the E-key was received, the microprocessor controller 31 checks to see if the control code is equal to 01 and the type code is equal to 0C (step 27811). If so, the VBI decoder output is stored into the RAM 33 (step 27812). In one implementation, the text information is put in the composite packets 1 and/or 2 of line 21, field 2 of the VBI. In another implementation, the text information is put in the composite packet 1. However, when the text is too long for the packet, a pointer is set in composite packet 2 pointing to the location of the other parts of the text.

Timer Programming

Timer programming allows a show to be recorded on any channel at a later time using the traditional recording features built into the video player. Before programming the VCR with its traditional programming functions, the directory information can be used to set the tape at a specific blank segment. This is accomplished by entering the number corresponding to the blank space and then pressing the "STOP" key. After the user enters the segment number, he can also wait for a time-out, the effects of which is the same as though the STOP key is pressed. In response to the key sequences, the microprocessor controller 31 sets the VCR to rewind or fast forward the tape to the selected position. The user can then set the VCR to conventional timer recording.

Erasing Programs from the Tape

A program can be erased by deleting its entry from the directory. When the tape directory is displayed on the screen, the user can enter the number of the program to be erased and then presses "ERASE". The key sequence causes the microprocessor controller 31 to display a screen as shown in FIG. 60*m*. A confirmation screen, such as the one shown in FIG. 60*n* is displayed whereby the user is asked to confirm the erasure. The user can press "ENTER" to confirm the erasure or "CANCEL" to cancel the erasure. After the program entry is deleted from the directory, the word "BLANK" is filled into the title field. If the newly erased program is preceded and/or followed by a blank segment, the length of this segment will be merged into the newly created blank segment, and the corresponding entry or entries will be merged into one.

Positioning the Tape

From the directory screen, the position of the tape can be set in several ways. One way is to enter the number corresponding to the desired position of the tape and then press "STOP". Another way is to enter the number corresponding to the desired position of the tape. If no input is made in a predetermined time interval (e.g. 5 seconds), a timeout will occur and the results are the same as if the user has pressed "STOP". The words "XX STOP" will be displayed on the screen next to the word "COMMAND:". The words "MOVING TO XX" are also displayed (where XX is the number of the selected program). The tape will either rewind or fast forward, depending upon its current position relative the selected position. If the tape is already at the selected position, only the word "XX STOP" will be displayed.

Editing a Program Title

The title of a recorded program can be edited under the directory screen. To edit a program title, the corresponding number of the program is first entered and the "EDIT" key is then pressed. An edit screen, is displayed, in which the title of the selected program is displayed at the top of the edit screen. Underneath the title are a cursor (represented by a "+" sign) and one or more underscore characters representing the new title. The cursor can be moved backward within the title by pressing the "REWIND" key and forward by pressing the "FF" key. A character in the title can be changed by pressing a key such as the "CH UP" key to scroll the current character forward, for example, from "R" to "S", then to "T", or by pressing a key such as the "CH DN" key to scroll the current character backward, for example, from "Q" to "P" and then to "O". A blank space can be inserted into the title at the cursor position by pressing the "ERASE" key. A character or a character can be deleted from the title by pressing the " " key. When the editing is complete, the "ENTER" key can be pressed so that the new title is stored. After the "ENTER" key is pressed, the directory screen is re-displayed and the new title is displayed in the corresponding entry. To cancel any changes in the program title, the "CANCEL" key can be pressed, whereby the directory screen re-appears and the title of the corresponding program remains unchanged.

RECORDING EXTENSION

When the VCR is recording a program, there is a possibility that duration of the program may be extended. One obvious example is when the broadcast program is a sports event (e.g. a football game) which goes into overtime. According to one optional improvement of the present invention, when the time of recording, as set by the user, is reached, the VBI is checked to see if the show is extended. The check can be performed in several ways.

Figure 63:
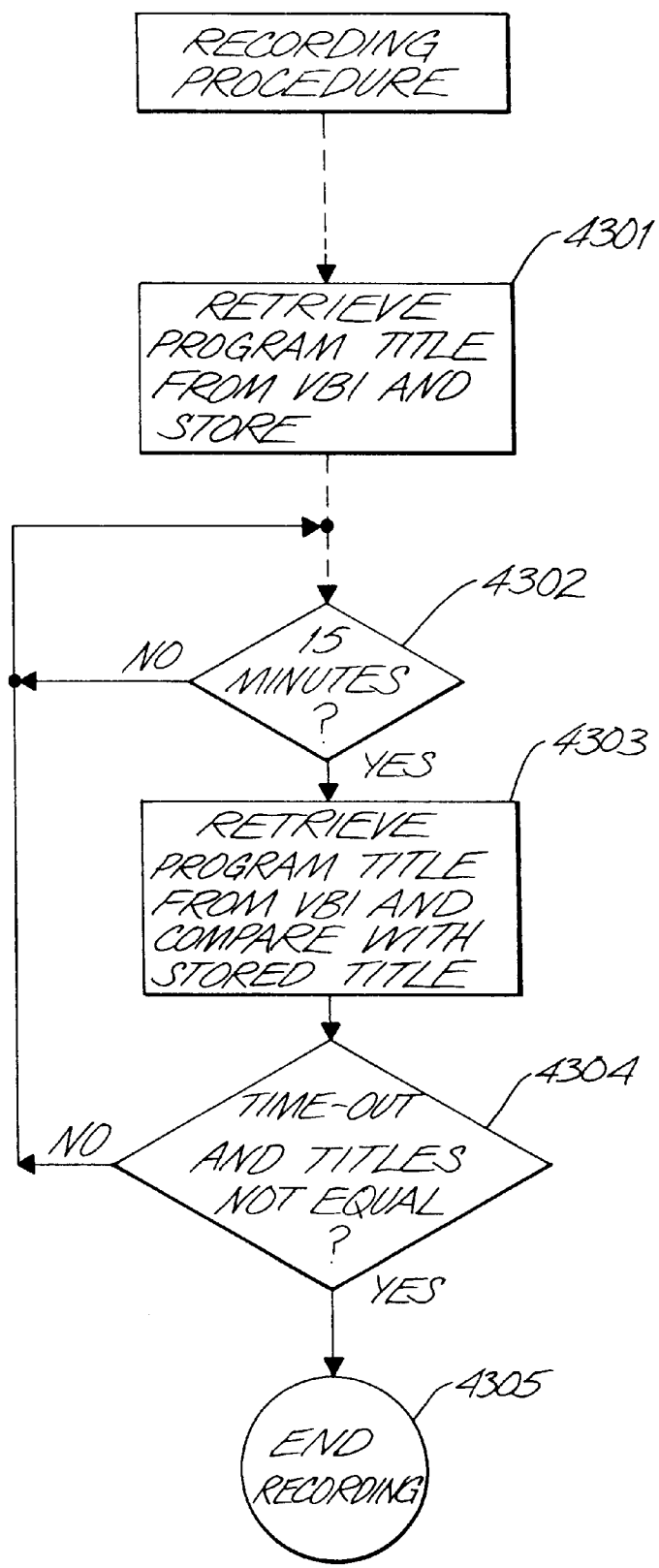
FIG. 63 is a flowchart showing the steps for extending the recording of a broadcasted.

By way of example, refer to FIG. 63, when the VCR is recording a program as set, the content of the program title field in the VBI is registered by the microprocessor controller 31 (step 4301). The program title of the program being received is retrieved from the VBI at predefined time intervals (e.g. 15 minutes) (step 4302) and compared against the title previously registered (step 4303). If the scheduled termination time of recording is reached and if the title received from the VBI is not the same as the registered title (step 4304), recording is terminated (step 4305). Otherwise recording continues.

In another implementation, a special code, used for representing whether a show is extended is added to the VBI along with the newly scheduled ending time. These data can then be monitored to detect an extension of the program being recorded.

In yet another implementation, the VCR constantly monitors the program I.D. which contains the program length. The broadcaster updates the program length which the VCR then uses to automatically extend the recording.

Advantageously, the user is provided with an option of whether to use the extension feature.

Most modern video players provides a user with an option of selecting a tape speed for recording and playing operations. The speeds commonly provided are Standard Play (SP), Long Play (LP) and Super Long Play (SLP). A higher speed may provide better recording quality but uses up more tape space. According to another feature of the present invention, the recording speed of the VCR is automatically changed to a lower value when the length of the recording space is less than the length of the desired program. Specifically, when a recording is assigned to a designated tape location, a determination is made on the lengths which the assigned space can record under different speed, as follows:

Length of selected segment/speed(SP)=available time (SP)

Length of selected segment/speed(LP)=available time (LP)

Length of selected segment/speed(SLP)=available time (SLP)

Recording of a program will then be performed in a speed at which the available time is greater than the specified time of recording. If more than one speed is possible, the user is notified and allowed to select the speed of recording. Under another implementation, the highest speed in which complete recording is possible is automatically selected so as to achieve the best recording quality. In another optional implementation, a list of the available blank segments is displayed and the user can then select the segment he wants for recording a program.

Parental Control

Figure 64:
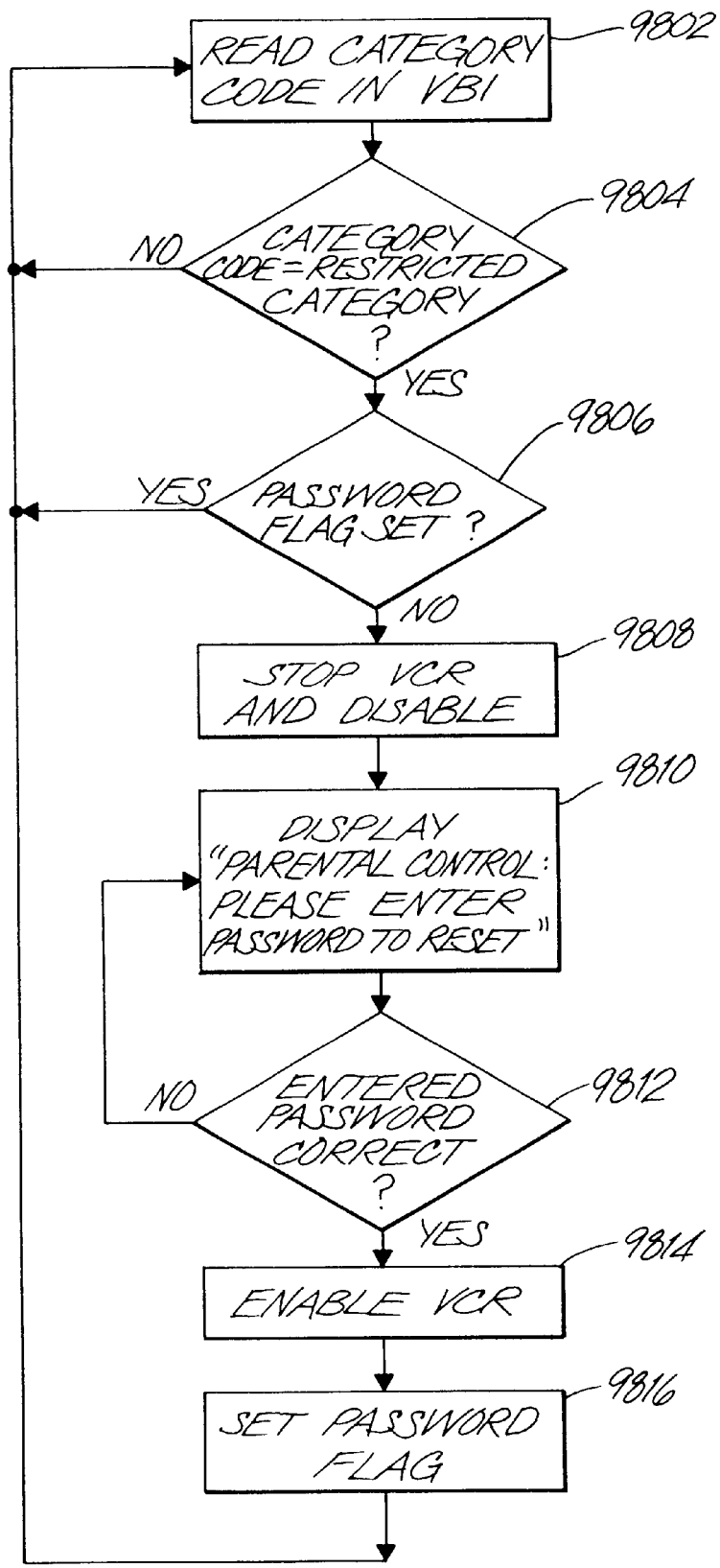
FIG. 64 is a flowchart showing the steps employed in the operation of the parental control feature of the indexing VCR.
Figure 65A:
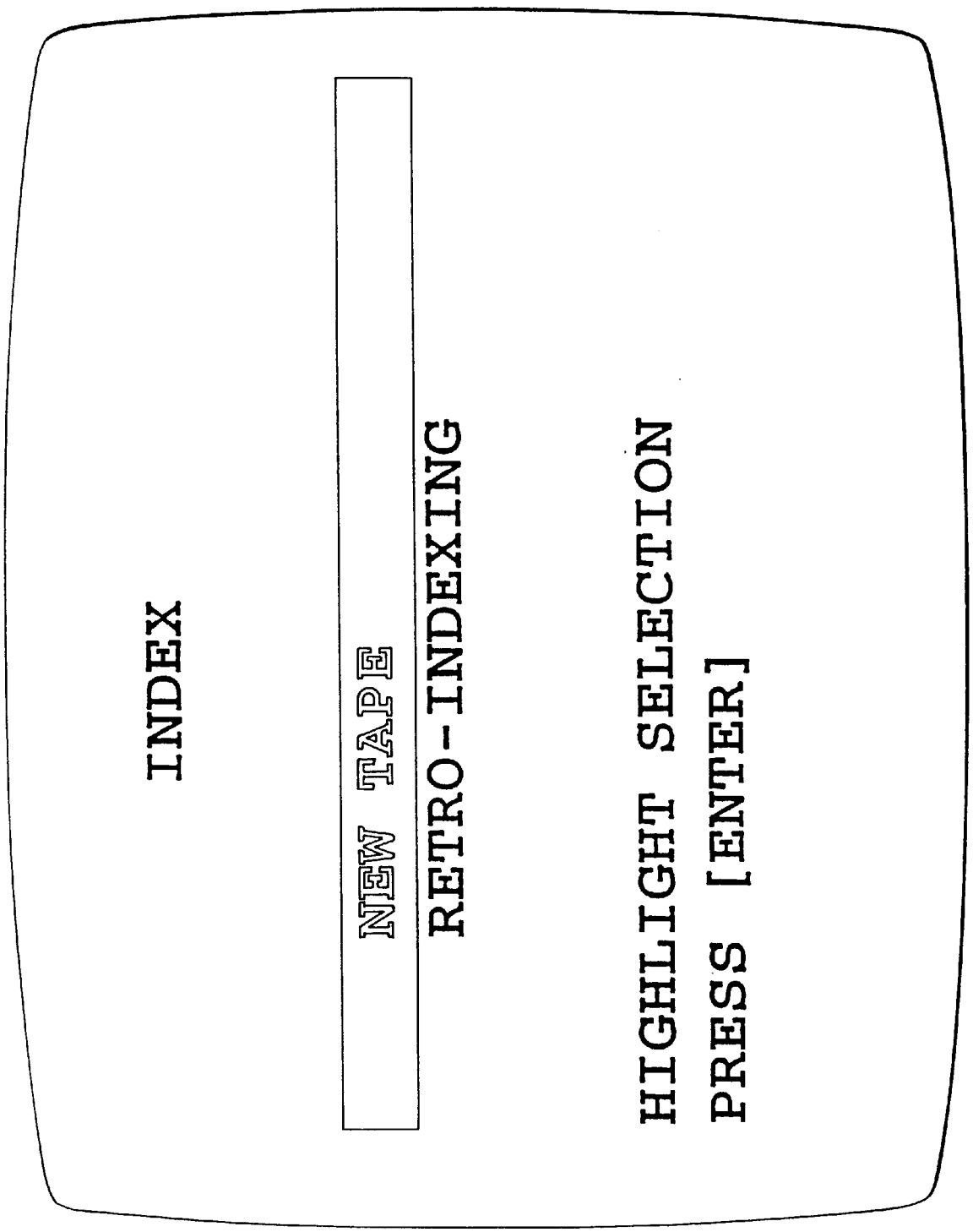
FIGS. 65a–65l' are schematic views of displays for an indexing system according to a specific implementation of the invention.
Figure 65D:
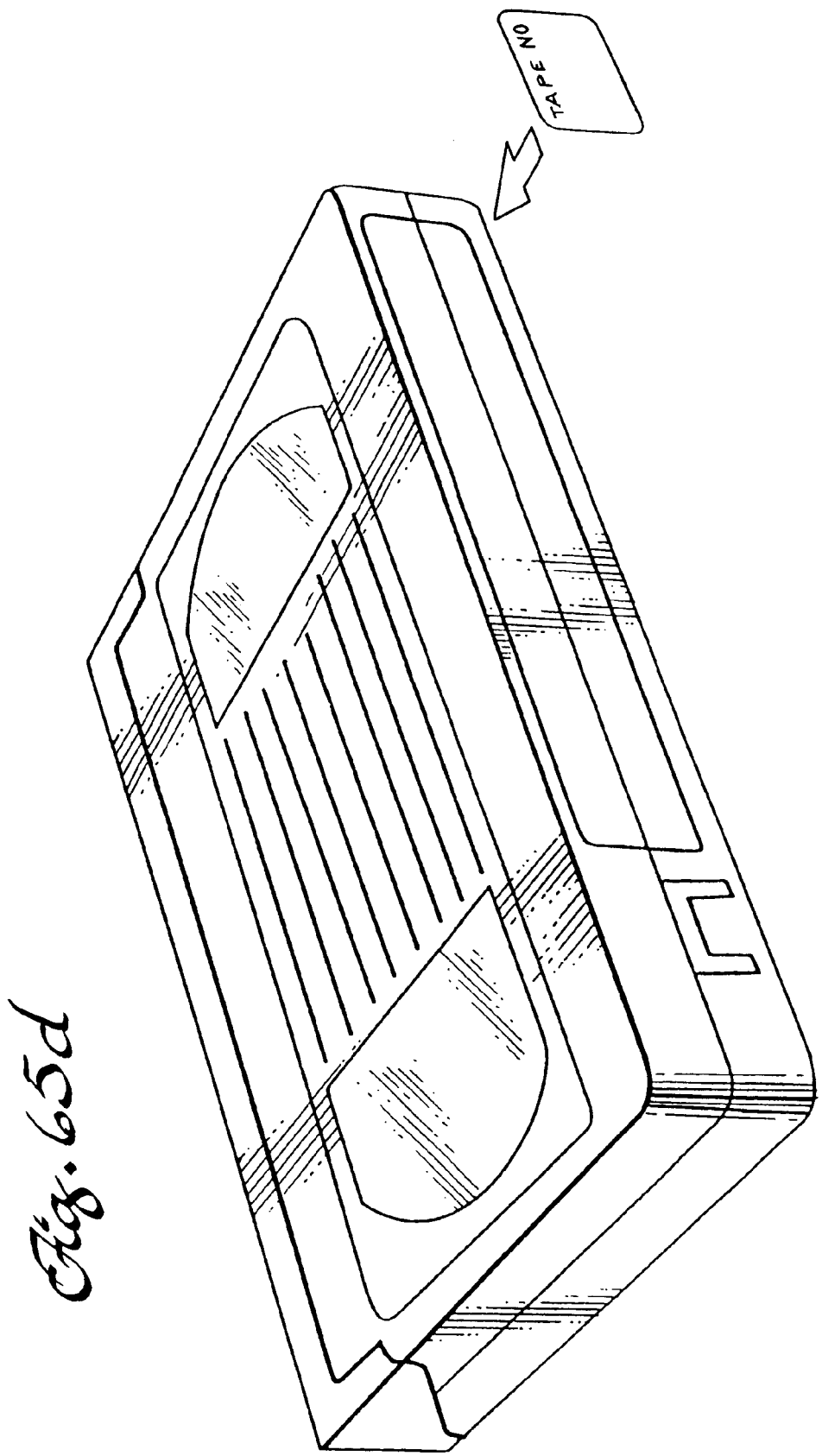
Figure 65G:
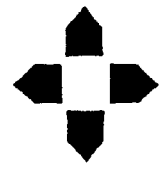
Figure 65H:
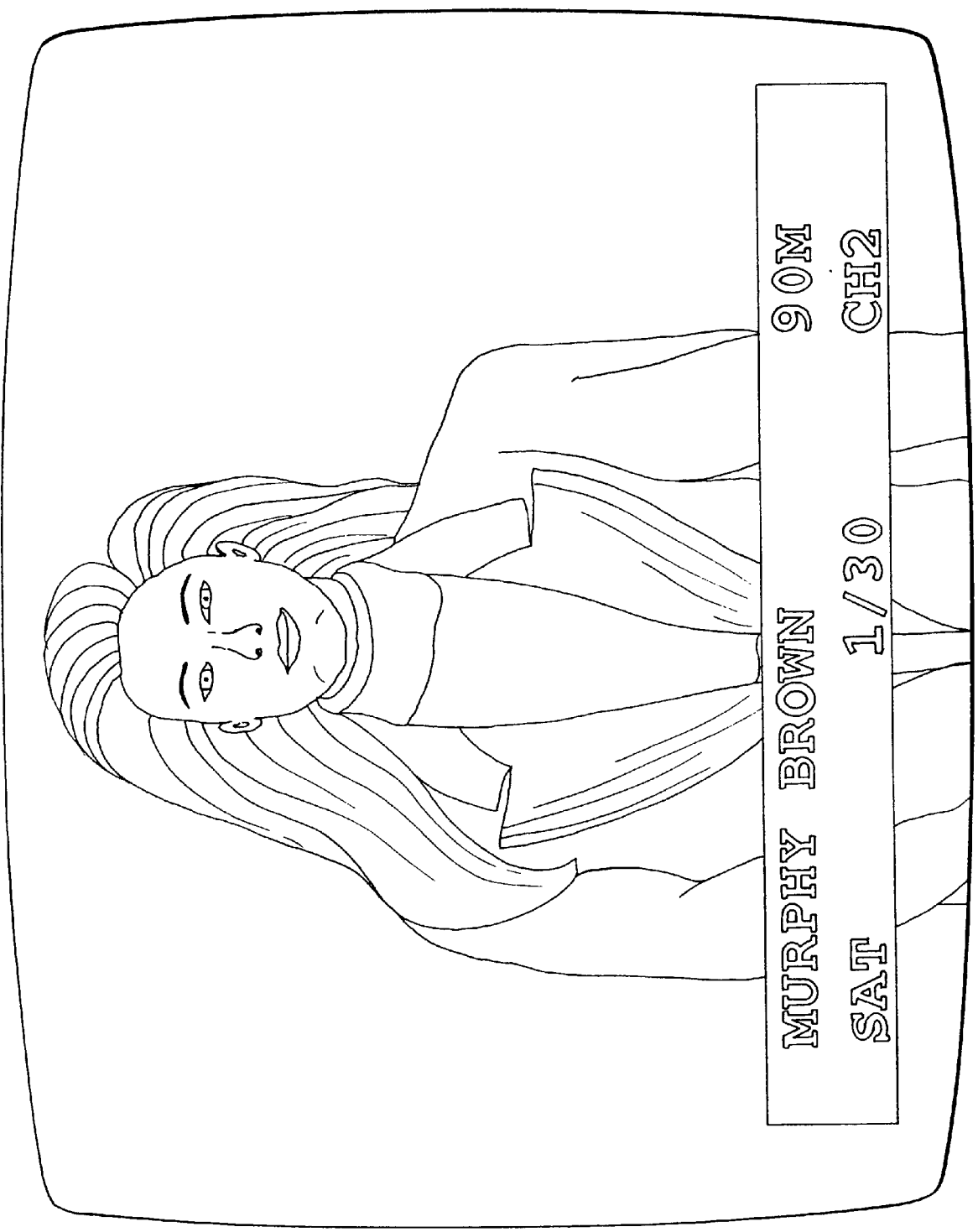
Figure 65I:
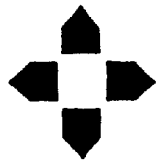
Figure 65K:
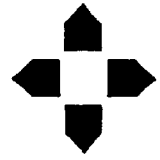
Figure 65M:
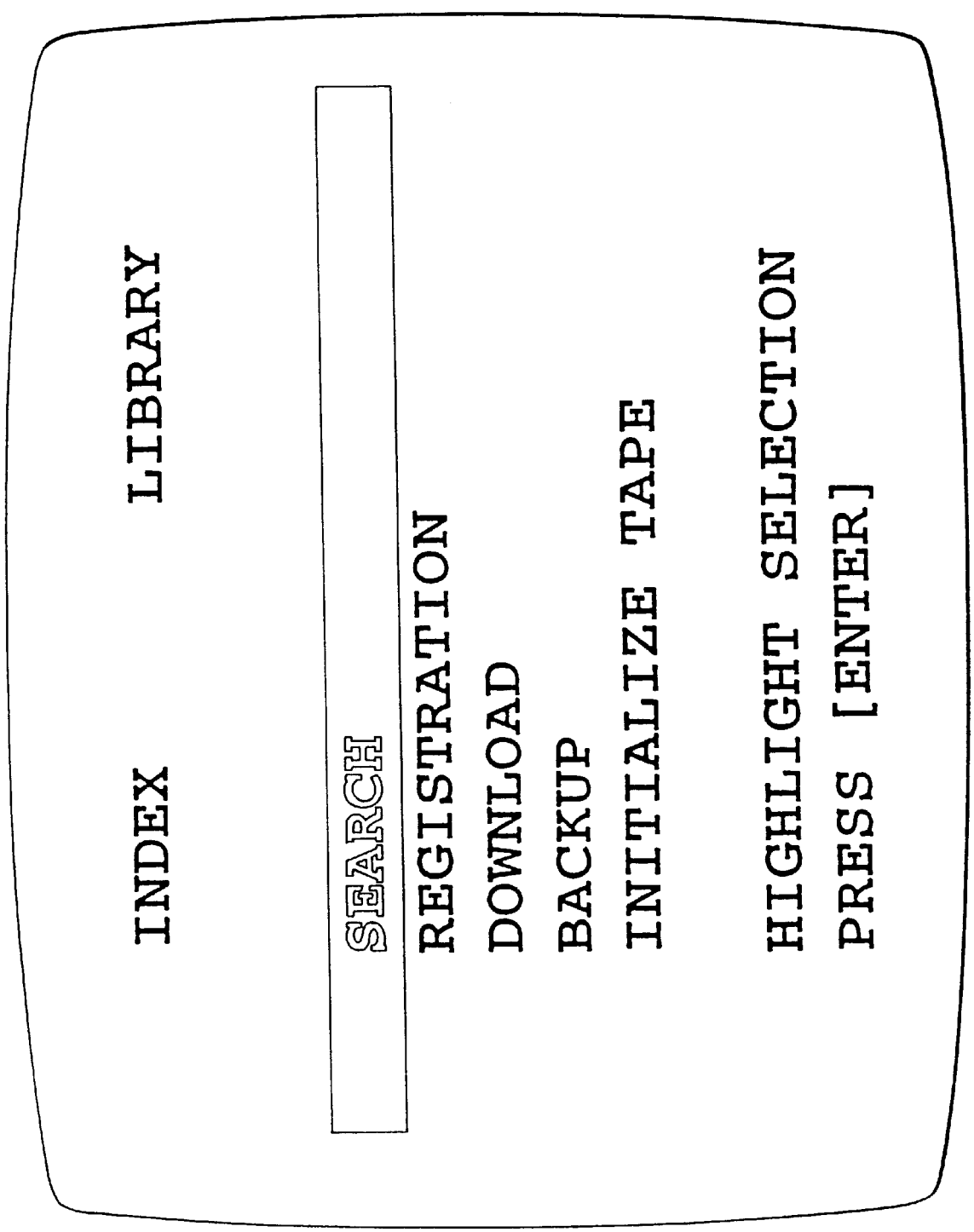
Figure 65Q:
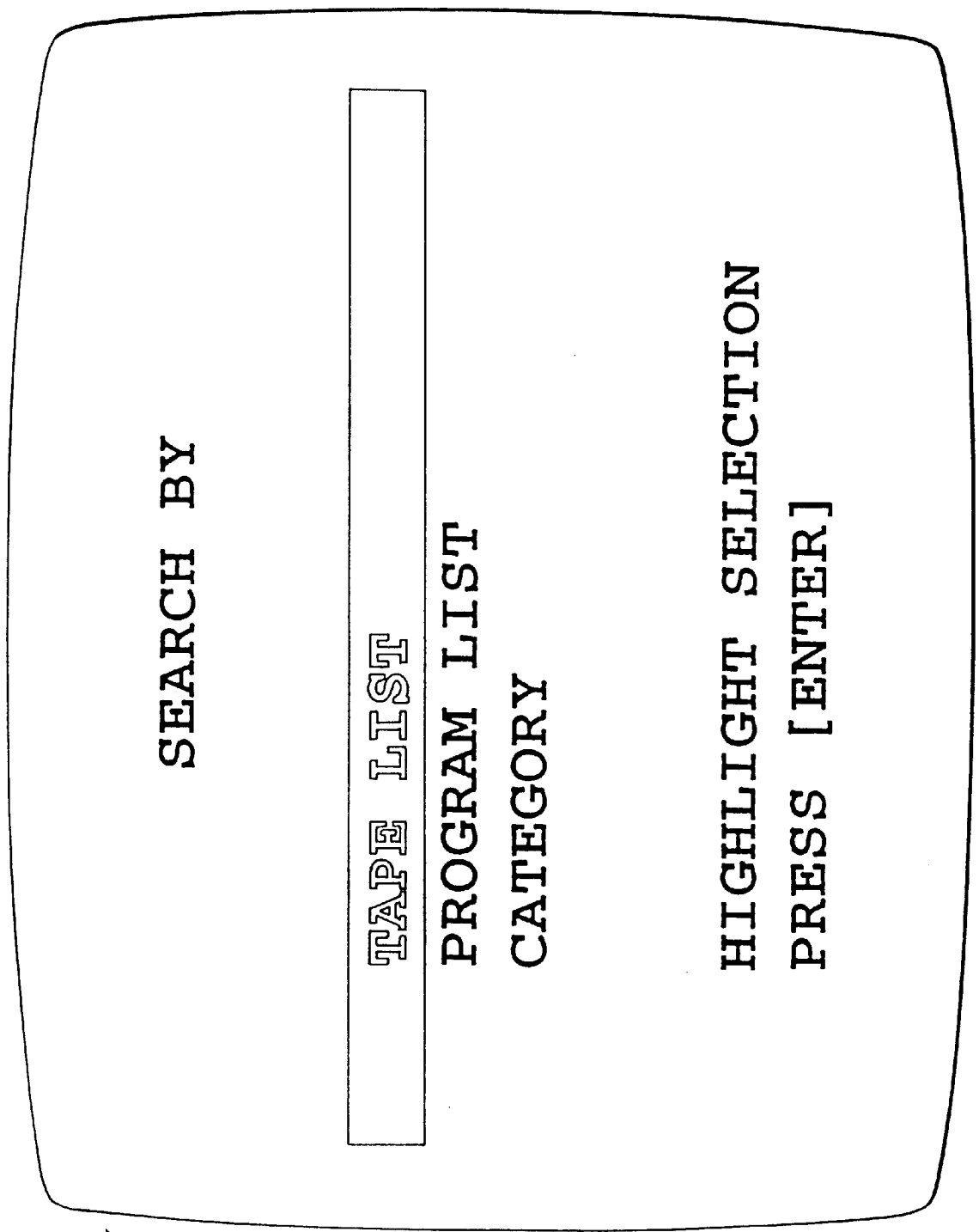
Figure 656:
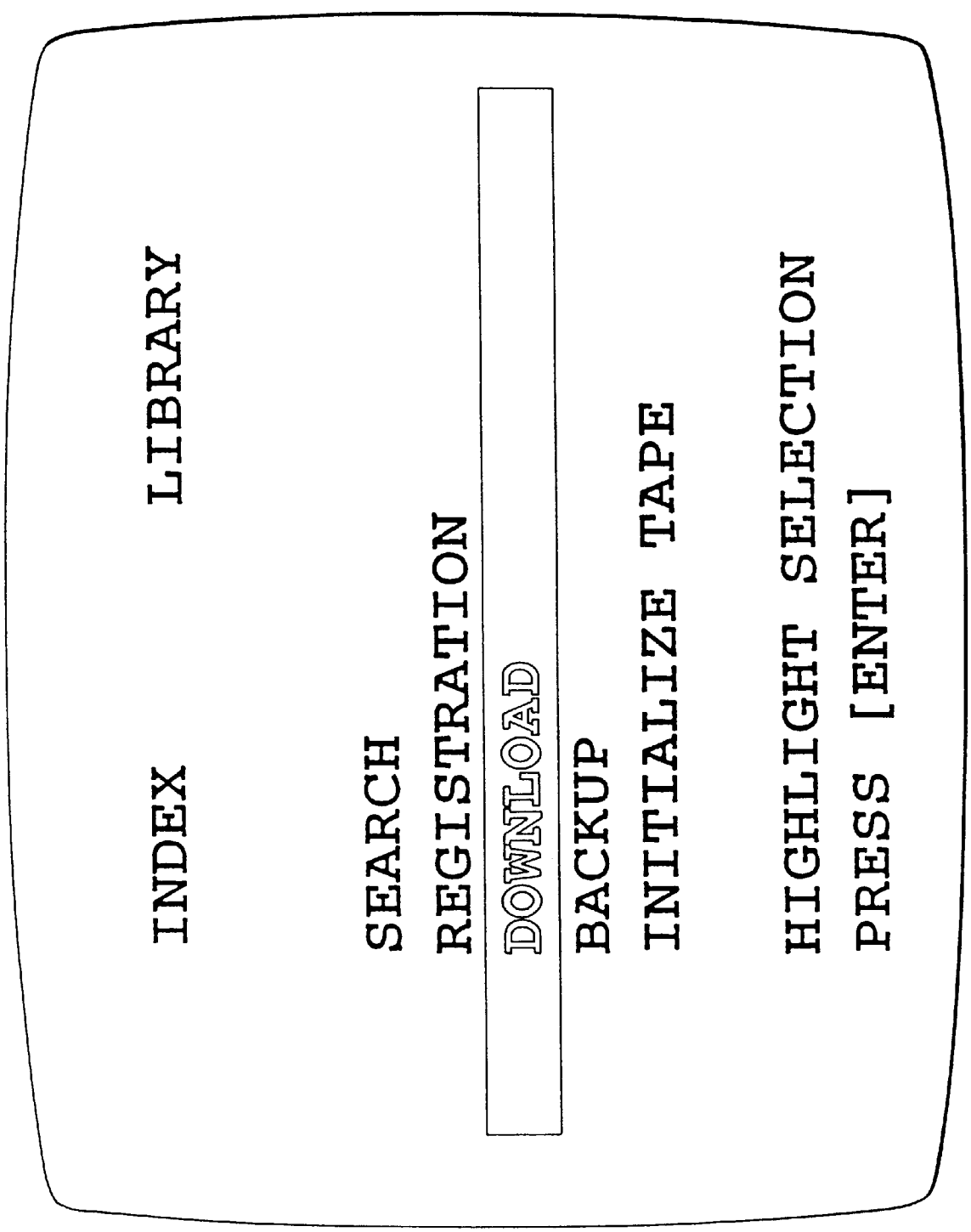
Figure 65C:
Figure 65E:
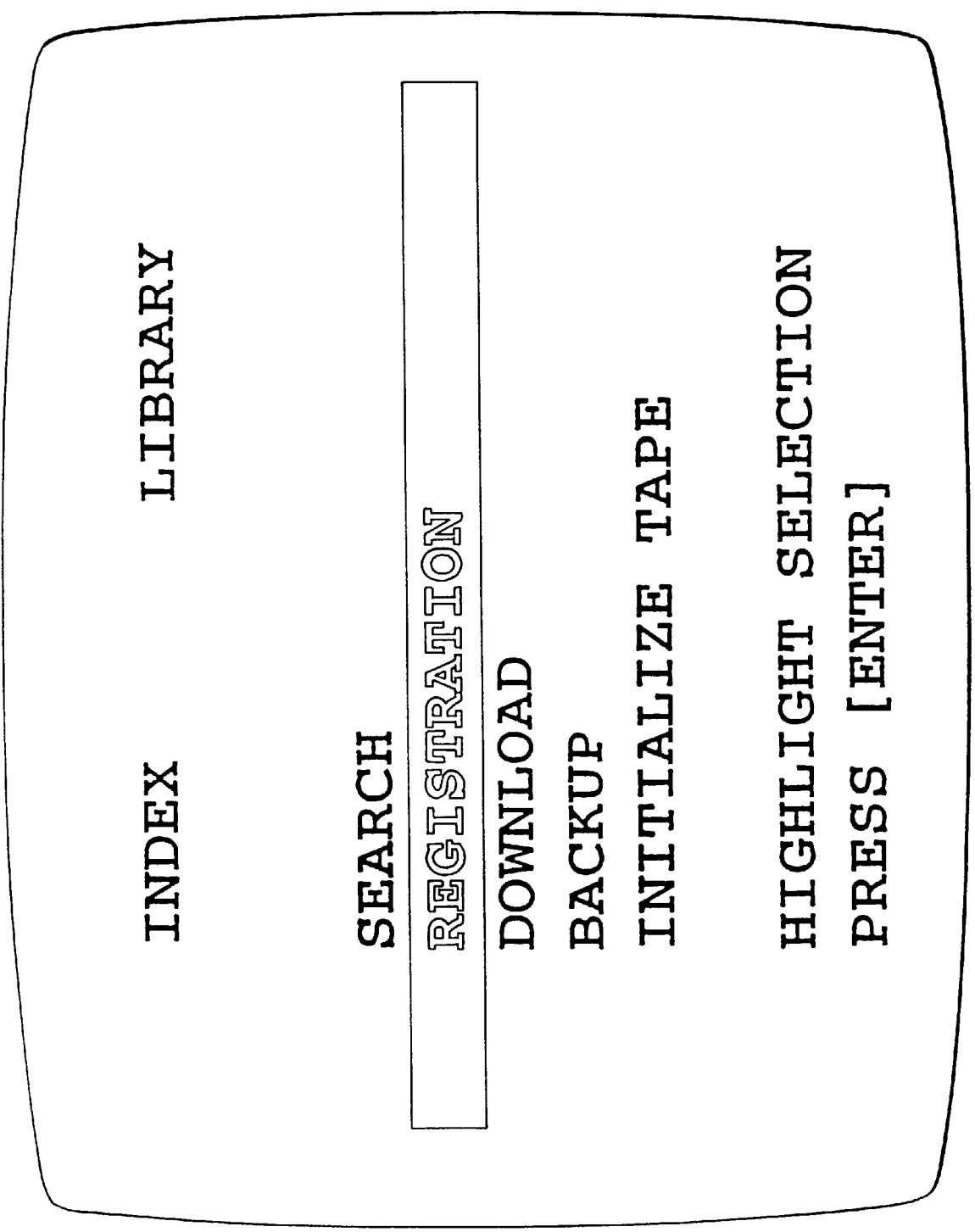
Figure 65G:
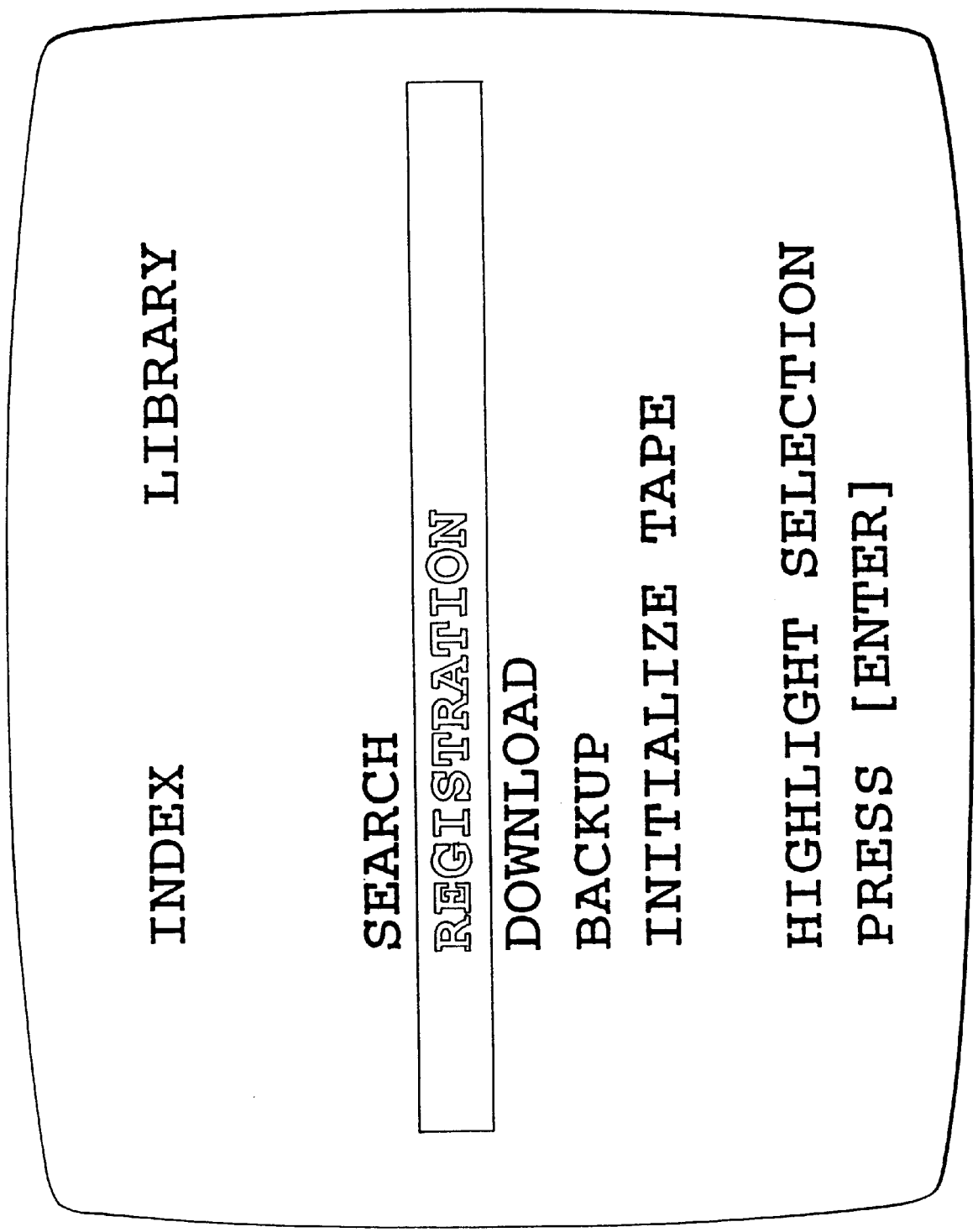

FIG. 64 is a flowchart showing the steps employed in the operation of the parental control feature of the indexing VCR. Because programs may be broadcasted that parents do not want their children to view or record, the indexing VCR 10 uses the program category information in the VBI to institute a Parental Control Program for screening out program categories not deemed desirable for the children in the household. The program category may include categories, such as adult shows, that parents do not want their children to view or record. By selecting these categories, the indexing VCR 10 prevents children from viewing or recording these shows. Alternatively, the program category may be recorded in the VBI of a prerecorded tape which when selected by parental control prevents the tape from being played in the VCR. Alternatively, the TID of the PR tape may be flagged in the RAM 33 as being restricted.

During a set up mode of the indexing VCR, the user may impose parental control to prevent a viewer from watching or recording particular television programs or a selected channel. This mode may be entered by selecting from a menu display on the screen 50*a*, or, alternatively, by pressing a Parental Control Key on the remote controller. As part of the initial set up of the indexing VCR 10, the parent sets a unique password to allow access to setting parental control commands. When the user presses the Parental Control Key and enters the correct password, the indexing VCR 10 displays a list of categories. As the user scrolls through the list, the indexing VCR 10 highlights the selection. By pressing the Parental Control key, the user toggles the category as being restricted (i.e. under parental control) or unrestricted. A restricted program requires the user to enter a password to gain access to the program.

Referring in particular to FIG. 64, the indexing VCR periodically monitors the program being viewed or recorded to prevent access to the restricted categories of shows. The microprocessor controller 31 periodically reads the category code in the program I.D. (step 9802) and compares it to the stored parental control category list. If there is not a match between the category of the program being watched or recorded and the restricted list, the VCR returns to step 9802 to continue monitoring the VBI (step 9804). Otherwise, if the category is restricted, the VCR checks to see if the password flag allows access to the program (step 9806). The password flag is set when the proper password is entered by the user. If the flag allows access, the VCR returns to step 9802 to continue monitoring the VBI (step 9806). The compare between the program being viewed and the parental control flag is done periodically, for example every minute, to prevent long periods of unauthorized viewing before the next comparison.

If the program is restricted, the microprocessor controller 31 stops and disables the VCR (step 9808) and displays on the screen 50*a* the message "parental control: please enter password to reset" (step 9810). The microprocessor controller 31 ignores VCR control commands and channel number commands. The VCR continuously requests the password to be entered until a proper password is entered (step 9812). Alternatively, the VCR may allow a fixed number of incorrect passwords before ignoring all passwords for a predetermined time. When the correct password has been entered, the VCR restores control to the user (step 9814) and sets the password flag (step 9816). Setting the password flag allows the authorized viewer to continue watching the show or recording it without being periodically interrupted for a password request.

In an alternate embodiment, the controller 31 allows the user to select channels other than those that are forbidden. Alternatively, different passwords allow television shows to be blocked for some viewers such as children under age 13 but allows others, such as children above age 13, to view the shows, while restricting the children above age 13 from watching another show.

Specific Implementation

Figure 65Z:
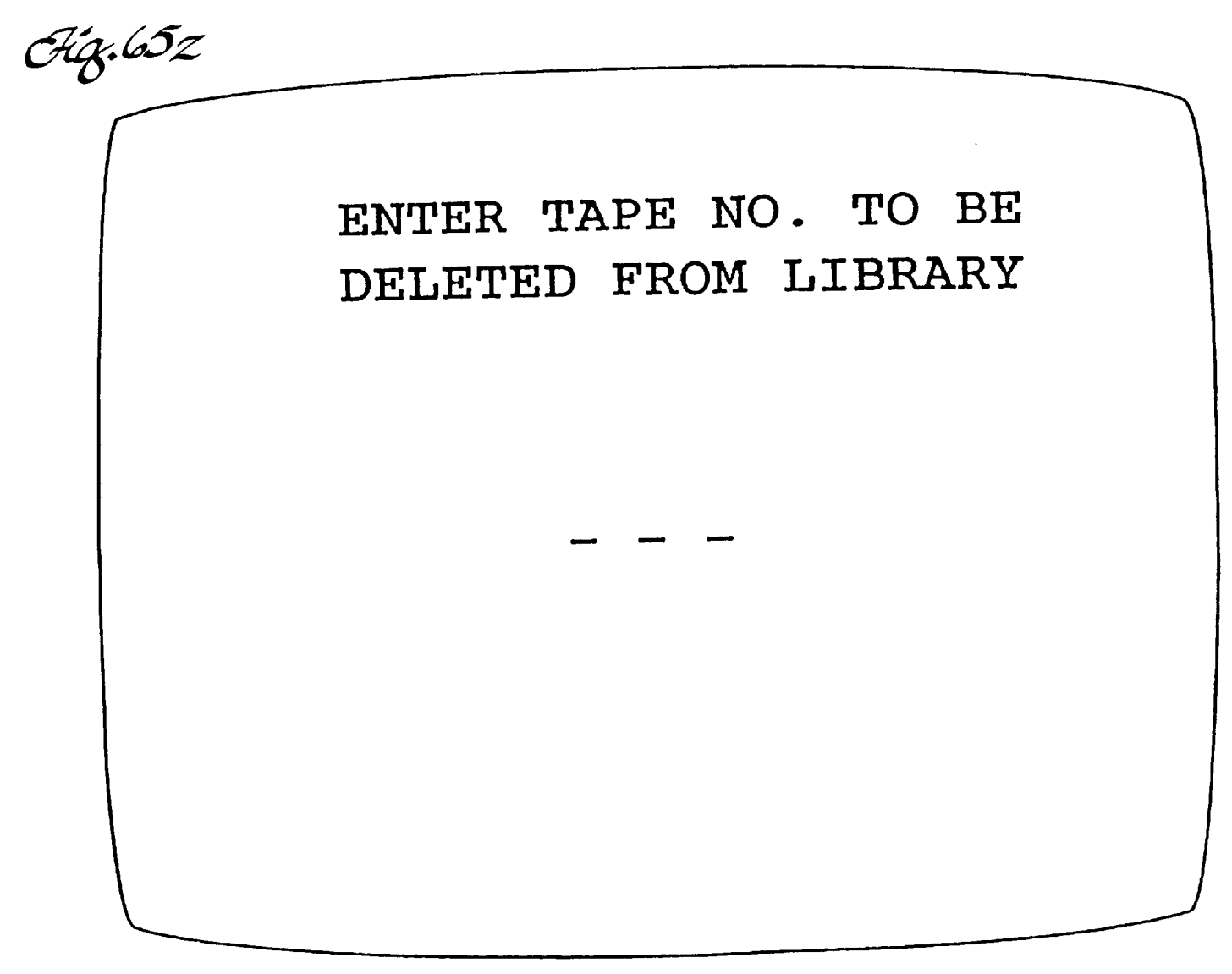

FIGS. 65*a*–65*l*' are schematic views of displays according to a specific implementation of the invention.

A new blank tape is prepared for indexing by inserting the blank tape into the VCR and pressing the index button 9712 on the remote controller 9700. By using the cursor buttons 9725, the user highlights "Blank Tape" on the screen shown in FIG. 67*k*' and presses the enter button 9709 and selects new tape from the menu (FIG. 67*a*). The microprocessor controller 31 displays the display shown in FIG. 67*b* and prompts the user to enter the length of the tape. Using the keypad 9708 the user enters the length of the tape, e.g. 120 is entered for a 2 hour tape. The user presses the enter button 9709 if he has entered the correct time in minutes or the cancel button 9706 if he has made an error and then reenters the correct number. When the tape is ejected, the microprocessor controller 31 displays the tape number and requests the user mark the housing as shown in FIG. 67*c*–*d*.

When recording either in conjunction with VCRPlus+™, on-screen time programming or instant programming using the indexing VCR, the VCR reads the program identification from the VBI. If no program title is being broadcasted, the microprocessor uses the date, time, and channel of the program as the title. When recording a program, the indexing VCR informs the user whether sufficient space is available on time for the recording. The user first inserts the tape into the VCR and programs the VCR to record a program. The user then presses the review button 9714 and reads the display shown in FIG. 67*e* as to whether the tape has sufficient capacity. If the user is recording using instant recording (i.e. recording at that moment by pressing the record button 9718), he first presses the index button 9712 to get a program directory as shown in FIG. 67*g*. The current location on the tape is marked by an arrow. If the user wants to move to a different location on the tape, he uses the cursor keys 9725 and the record button 9718 to change the location. The user is prompted to enter the length of the program to be recorded (FIG. 67*f*). If sufficient blank space is available at the location on the tape, the VCR begins to record for the specified time. Otherwise, a warning is displayed (FIG. 67*i*). Pressing the enter button 9709 overrides the warning. Pressing the cancel button 9706 cancels the recording request.

An indexed tape is viewed by inserting the tape into the VCR and pressing the index button 9712. A directory is displayed (FIG. 67*i*) and the user makes a selection by highlighting the desired program using the cursor keys 9725 and pressing the play button 9717. The VCR then fast forwards or rewinds to the highlighted program. Alternatively, an arrow in reverse video pointing to the destination program may be displayed on the directory during the search. The arrow on the directory moves according to the location on the tape and the selected program is played automatically. During play, the directory can be viewed by pressing the index button 9712.

A program may be erased from tape by pressing the index button 9712 and using the cursor to highlight the program to be erased (FIG. 67*i*). The erase button 9715 is pressed, and, as shown in FIG. 67*i*, the user presses the enter button 9709 to confirm the erasure or the cancel button 9706 to cancel the request. Once enter is pressed, the title in the directory is replaced with "BLANK." If two consecutive blank periods occur after the erasure, the microprocessor controller 31 combines them into one entry in the directory. The program is not actually erased from the tape, but only removed from the directory.

A program title is edited by pressing the index button 9712 and highlighting the title of the program to be changed (FIG. 67*k*). The edit button 9713 is pressed and using the cursor keys 9725 the title is changed (FIG. 67*l*) and the new title entered by pressing the enter button 9709. Pressing the cancel button 9706 cancels the new title.

A program is searched in the library with or without a tape in the VCR by pressing the library button 9710 and selecting search using the cursor keys 9725 and the enter button 9709 (FIG. 67*m*). Highlighting program list and pressing the enter button 9709 allows a search by program title (FIG. 67*n*). Using the cursor keys 9725 and the enter button 9709 to select the first letter of the program title, a list of program titles starting with the letter selected is displayed. (FIG. 67*o*) The page up button 9704 and the page down button 9705 are used to review the list of program titles (FIG. 67*p*). Highlighting tape list and pressing the enter button 9709 allows the user to search by tape number (FIG. 67*q*). The keypad 9708 and the enter button 9709 are used to select the tape number to be searched (FIG. 67*r*) and displayed (FIG. 67*s*). Highlighting category and pressing the enter key 9709 allows searches by category (FIG. 67*t*). The cursor keys 9725 are used to select the category (FIG. 67*u*–*v*) and the page up button 9704 and the page down button 9705 are used to review the list of program titles in the selected category (FIG. 67*w*).

A tape may be deleted from the library or the RAM 33 by pressing the library button 9710 and selecting using the cursor keys 9725 and the enter button 9709 registration from the menu of FIG. 67*x* and delete from the subsequent menu of FIG. 67*y*. The user then enters the tape number assigned to the tape to be deleted (FIG. 67*z*). The user may review the program before erasing it from the directory. By pressing the enter button 9709, the microprocessor controller 31 erases the tape number from the RAM 33 (FIG. 67*a*'). In the preferred embodiment, the program is not erased from the tape, but only the index of it is erased from the RAM 33.

When a tape is loaned to a friend, the directory is downloaded from the VBI at the end of the tape into the RAM 33 by pressing the library button 9710 and selecting, using the cursor keys 9725 and the enter button 9709, download from the menu on the screen shown in FIGS. 65*b*', *c*', *d*'.

A person may adopt a tape indexed in another's VCR by adding the contents of the new tape to the RAM 33 of their VCR. The tape is inserted into the VCR and the library button 9710 is pressed. Using the cursor keys 9725 and the enter button 9709, the user selects registration from the screen shown in FIG. 67*e*' and selects add from the subsequent screen shown in FIG. 67*f*'. The VCR reads the directory from the VBI at the end of the tape. The microprocessor controller 31 assigns a new tape number which is displayed on the screen. This adopt feature may also be used to add the directory from a PR tape to the RAM 33.

Tape identification numbers may be changed by pressing the library button 9710 and using the cursor keys 9725 to highlight registration as shown in FIG. 67*g*'. The cursor keys are then used to select Change from the display shown in FIG. 67*h*'. Using the keypad 9708 the user can change the tape number (FIG. 67*i*'). Overwriting of numbers previously used is avoided (FIG. 67*j*'). This number is preferably changed before recording the program. This feature is useful when multiple tapes are required for a single show, such as a 3 part mini-series that is recorded on different tapes.

Tapes may be retroactively indexed by selecting retroindex in FIG. 67*l*' and following the steps of FIG. 58. By pressing the "i" button 9721 in response to a flashing icon on the TV screen such as a flashing "i," the user is able to obtain additional information on products or services offered in TV commercials or on regular programs. This additional information may be detailed weather, traffic, sport scores, or financial information. Pressing the "i" button 9721 automatically programs the VCR using the "PLUSCODE™" numbers by transferring the numbers from temporary RAM to non-volatile RAM. By pressing the "R" button, the user can later review and manipulate a directory of the text information stored. The cursor buttons 9725 and the enter button 9709 are used to select information.

The user may identify the program while he is viewing a current broadcast or a recorded program by pressing the PGM ID button 9724 which then displays the program title, its length, the day and date of the broadcast (or recording) and the station name or call letters as shown in FIG. 67*h*. If a program is being recorded that overruns its scheduled time (e.g. a sporting event), the VCR automatically extends the recording time of the preprogrammed recordings for programs broadcasted by a TV station that participates in broadcasting program identification. The TV station broadcasts changes in programming which are detected by the VCR.

When a printer is connected to the VCR, the user can press the "R" button 9722 to recall the particular information text, such as a coupon, onto the TV screen. The user then presses the print button 9702 to print the information on the printer.

Various methods of combining steps of key strokes may be used. For example, pressing the "i" button twice in rapid succession may be used to review information stored. Pressing the "i" button three times in rapid succession may be used to cancel a selection.

Copying of Prerecorded Tapes

In a first method, a master tape is made of the prerecorded tape. The destination, target, or slave tape is a blank tape on which the information on the master tape is to be copied. In a manner well known in the art, the master tape is placed in physical contact with the slave tape, along its entire length, and a copy is made by applying the suitable magnetic fields. This allows all information from the master tape to be copied on the slave tape.

In a second method, a copying system comprises a master VCR and a plurality of slave VCRs for copying information from a master tape to a plurality of slave tapes. The master VCR is an indexing VCR identical to that described above. The master VCR provides video signals representative of the video signals detected from the master tape. Because the indexing VCR does not normally provide control track signals, other than sync pulses, from its video output, the master VCR is an indexing VCR 10 that is modified to include an internal VISS sensor circuit for providing an indexing signal to the slave VCR in response to a detected VISS mark on the control track of the master tape. The plurality of slave VCRs record the video signals provided from the master VCR. In addition, the index signal is provided to each slave VCR, which, in response thereto, writes a VISS mark on a control track of the slave tape.

Camcorder Applications

In an alternate embodiment, a camcorder which is a portable video tape recorder for recording video images received through a lens has a microphone for recording voice and audio track. A clock in the camcorder records a date/time stamp on the tape along with the recorded voice information. The voice information is preferably an announcement by the user of the title of the particular scene he is about to shoot. When the tape is played in the indexing VCR, the voice announcements are read and digitized and stored in the RAM together with the date/time stamp. Later, the user can cursor down on the directory screen to the desired date/time entry and the digitized voice announcement is then recalled from the SRAM memory. The user can create a directory by title by changing the title from the date/time stamp entry with the corresponding digitized voice announcement to an alpha numeric title in a manner similar to that described in connection with FIG. 60.

Alternatively, the camcorder could incorporate the features of recording directory information by using a directory input/output keyboard and display device 32 that is either attachable to or entered along with the camcorder. However, because the user is usually occupied when using the camcorder, he does not have time to enter the title by this method at the time of filming.

Automatic Time Setting

Because broadcast stations broadcast the date and time as part of the Extended Data Services on Line 21 field 2 of the VBI, this information can be captured by the indexing VCR 10 to set the clock automatically and periodically. Even summer time can be set automatically. The indexing VCR 10 constantly monitors line 21 field 2 of the VBI for the date and time broadcasted therein. Alternatively, the monitoring does not have to be constant, but can be done periodically, such as once a day, once a week, or once a month. The indexing VCR 10 then resets its date and time clock to correspond to the broadcasted time. The indexing VCR 10 also detects power interruptions. After the occurrence of a power interruption, the indexing VCR 10 also resets the clock.

Automatic Mute when Index Key is Pressed

When the Index key is pressed, the microprocessor controller transmits a mute command to the television to shut off the volume. This prevents the user from hearing the hissing when the tape is being fast-forwarded or rewound which the user otherwise find annoying. When the user transmits a play command or when the indexing VCR 10 stops its search, the indexing VCR 10 transmits an override to the mute command to turn the volume of the television back on.

Chain Commands

When selecting programs for viewing from a directory, the user may chain commands by concatenating the selections and entering the command. For example, if the tape is a Karaoke tape, he may want to play song number 2, 7, and 4 in sequence. The user enters the command by pressing the 0, 2, 0, 7, 0, 4 buttons and then the Play button. In response thereto, the indexing VCR 10 plays program 2, program 7 and then program 4.

Exterior Magnetic Strip

In two other specific embodiments, directory information are recorded on a secondary memory carried by the cassette. The secondary memory can be a magnetic strip carried on the exterior of the cassette housing. In one such embodiment, the content of the magnetic strip is read/written by a magnetic head that is stationary. In another such embodiment, the magnetic strip is read/written by a magnetic head that is movable over the magnetic track(s) on the strip.

Movable Head

Figure 66A:
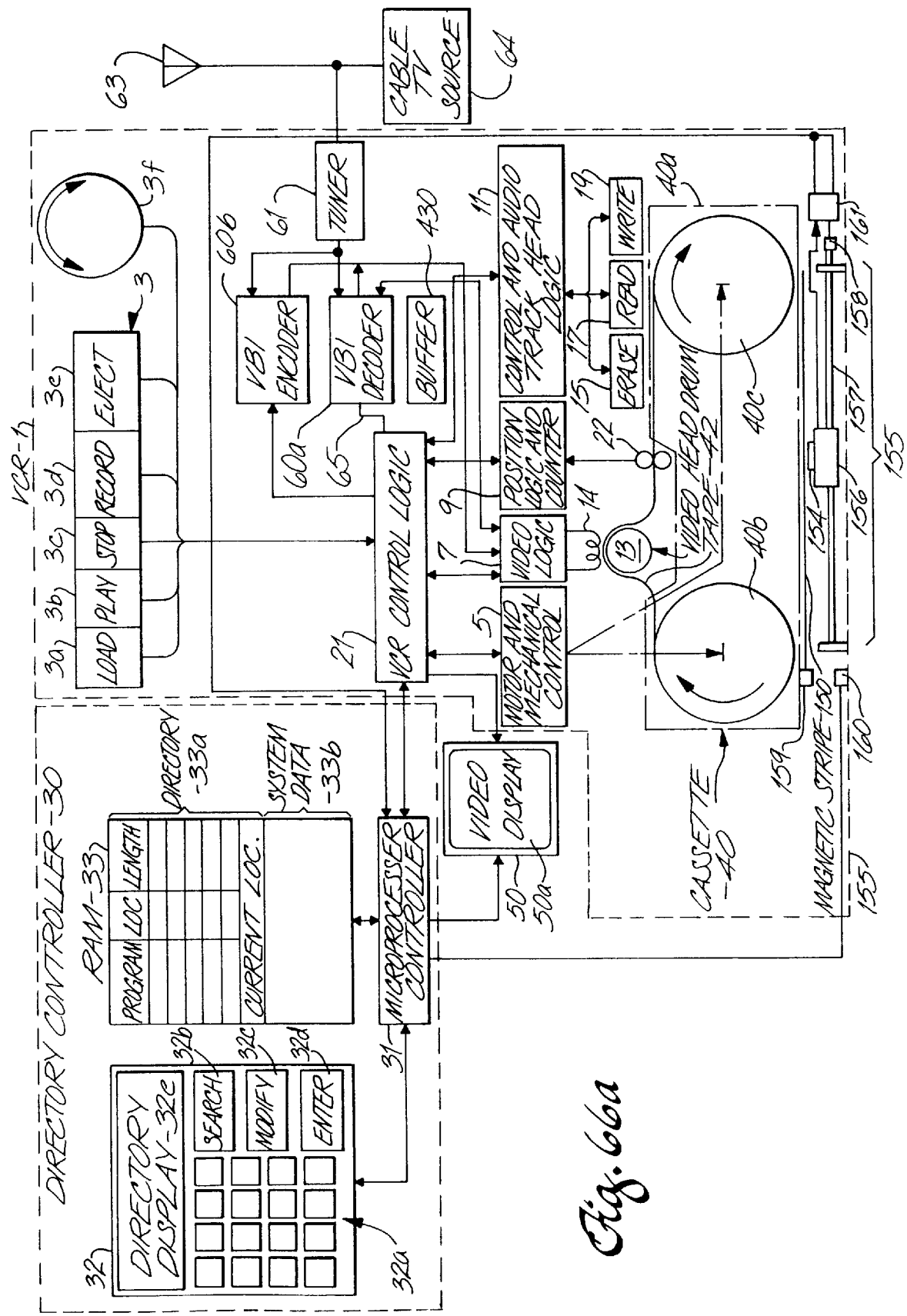
FIG. 66a is a block diagram of a video cassette recorder with a directory controller and a movable magnetic write and sensing system for information recorded on the back wall of the cassette and depicts an alternate embodiment of the present invention.
Figure 666:
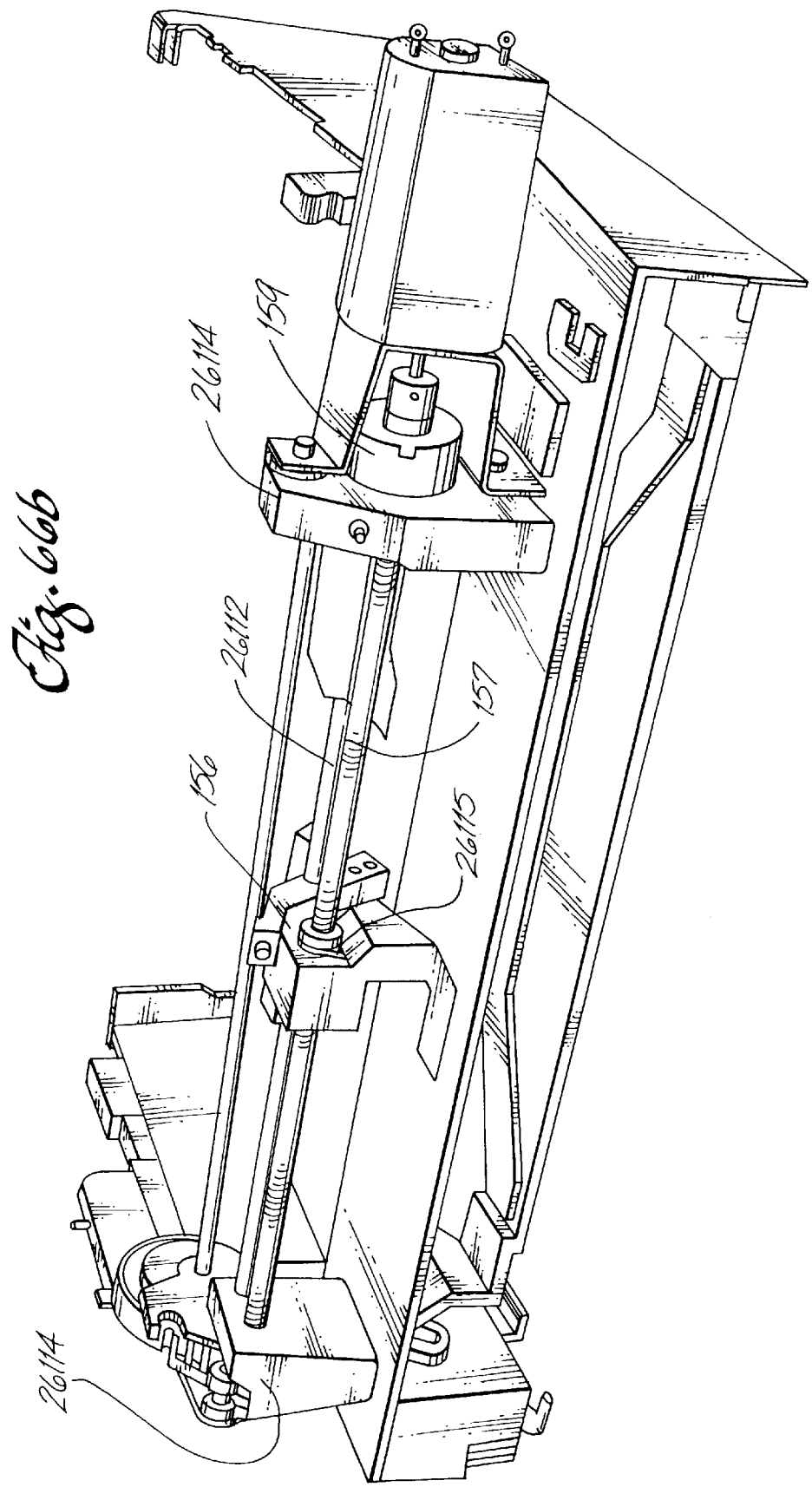

Instead of a stationary head, directory information or the tape identification number may be read/written by a magnetic head which can move over a magnetic strip 150 on the cassette housing, as shown in the recording system of FIG. 66. The recording system of FIG. 66 is similar to the recording system of FIG. 1 with the exceptions that a movable head assembly 155 in which a magnetic sensor 154 is coupled to a transport mechanism 156 so that it can move along a line parallel to track(s) on the magnetic strip 150.

Refer to FIG. 66*b*. The movable head assembly 155 comprises a magnetic head/sensor 154 affixed to a head assembly 156, a drive screw 157, and a guide beam 26112. Two holes are provided in the magnetic head assembly 156. The first hole has spiral grooves for coupling the threads of the drive screw 157 as depicted in FIG. 66*d*. The second hole has an axis parallel to the first hole and is provided for the guide beam 26112 to pass through. The drive screw 157 is coupled to a motor 159. As the motor 159 rotates, the drive screw 157 also rotates. Because rotation freedom of the head assembly 156 is restricted by the guide beam 26112 which passes through the second hole, as the drive screw 157 rotates, the head assembly 156 is pushed along a line parallel to the drive screw 157 and the guide beam 26112. The direction of the movement is dependent upon the direction of rotation of the motor 159.

The guide beam 26112 also serves to maintain a fixed distance between the magnetic sensor and the magnetic strip.

The head assembly 156 has a spring 26115 disposed in such a way that it exerts, using the guide beam as a fulcrum, a force pushing the head assembly 156 against the drive screw 157 to ensure that the grooves in the first hole would always engage with the threads of the drive screw 157 even if the drive screw 157 is not straight.

The magnetic sensor in the specific embodiment is a magnetic head of model number SK-12426 from Nortronics, Dassel, Minn. The motor in the specific embodiment is a D.C. motor with part number FK-130RH from Mabuchi.

Operation of the motor 159 is controlled by a control circuit 2610 schematically illustrated in FIG. 67. Movement of the head assembly 156 is dependent upon the rotational speed of the motor 159 which in turn is dependent upon the voltage output from circuit 2611 of the circuit 2610. This voltage can be adjusted by changing the variable resistor within the circuit 2611.

Operation of the motor 2624 is controlled by a stop/go signal applied to the input of circuit 2612 of the circuit 2610. When a high voltage level signal is applied at the input of block 2612, a transistor 2612*a* conducts which then turns on a transistor 2612*b* and provides a conduction path from the motor.

Direction of movement of the magnetic head is controlled by a signal applied to the input of circuit 2610. When the input signal is low (FWD), both transistors 2613 and 2614 are shutoff. When transistor 2613 shuts off, transistor 2615 conducts, which then turns on transistor 2616 and thereby shuts off transistor 2618. When transistor 2615 conducts, it also shuts off transistor 2617 and thereby turns on transistor 2623. On the other hand, when transistor 2614 is shutoff, it causes transistor 2619 to shutoff and transistor 2620 to turn on. When transistor 2620 turns on, it causes transistor 2622 to shut off. Thus, a current passes from Vm (circuit 2611) through transistor 2621 into the right-hand side of the motor and exits 2624 from its left-hand side through transistor 2623, causing the motor 2624 to rotate in one direction.

Similarly, when the input signal is high (REV), a current is passed through the motor 2624 in a left-to-right direction, causing the motor 2624 to rotate in the opposite direction.

Figure 68:
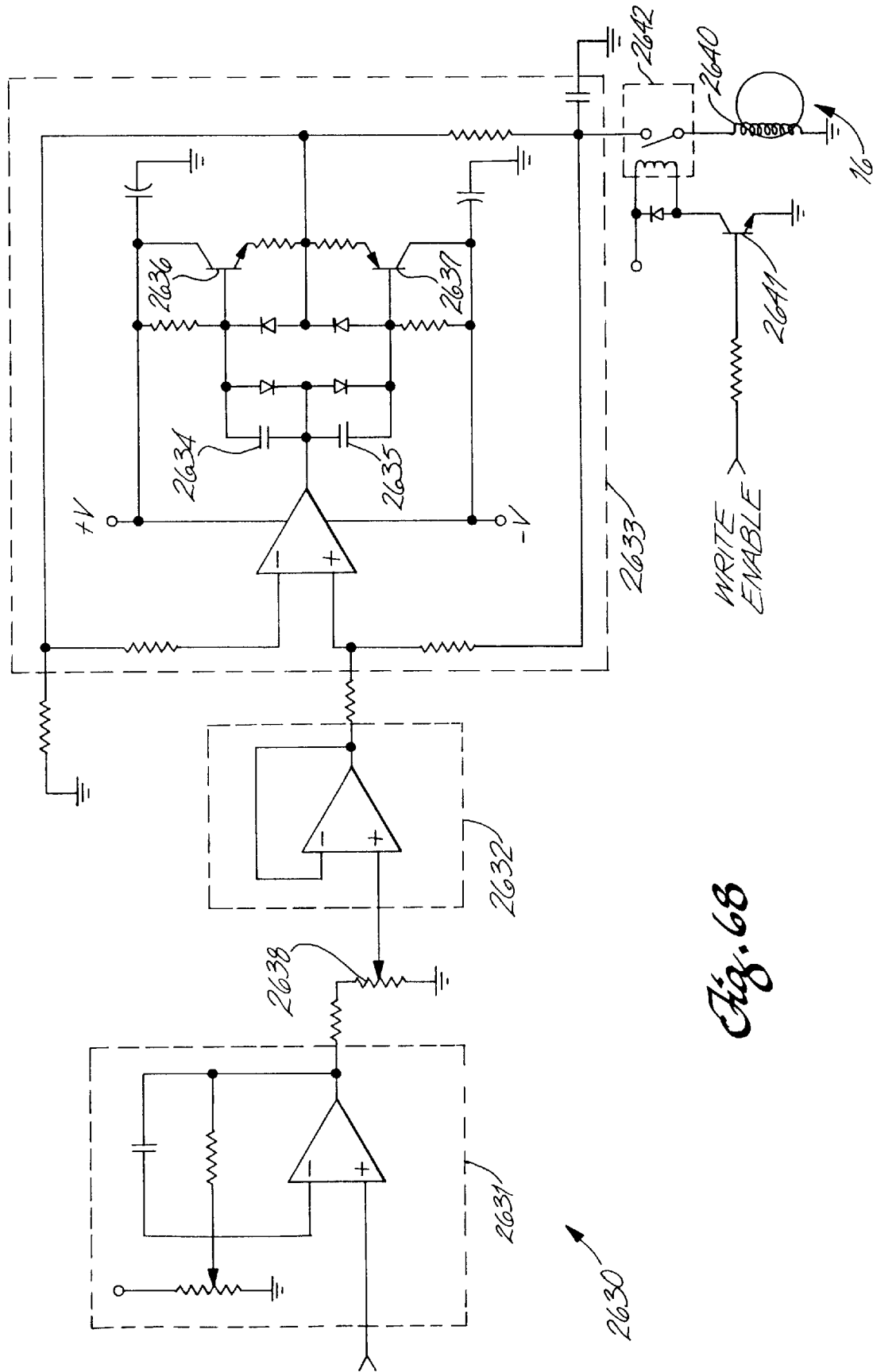
FIG. 68 is a schematic circuit diagram of a circuit for writing onto a magnetic strip.

Data is written onto the magnetic strip by a write circuit 2630 schematically illustrated in FIG. 68. The write circuit 2630 comprises a first amplifier circuit 2631 for amplifying the input signal. The amplifier circuit 2631 has an R-C feedback for improving response. A block 2632 is a second amplifier circuit coupled to the first amplifier circuit through a variable resistor 2638. The variable resistor 2638 is provided to adjust the magnitude of the write current. The output of the second amplifier circuit 2632 drives a current source circuit 2633. The current source circuit 2633 has two capacitors 2634, 2635. When the input voltage to the circuit 2633 changes, these capacitors help to pull/push the voltage received at the respective inputs of transistors 2636, 2637, thereby improving the response time of the circuit. The four diodes within the circuit 2633 are provided to equalize the base voltage of the transistors 2636, 2637.

When data is applied to the input of circuit 2630, it causes the current source 2633 to output a current through write winding 2640 of a write head 16 when enabled through a transistor 2641 and a switch 2642. Depending on the value of the write enable signal, the current from the current source 2633 flows to the write head 16 to cause magnetization of the magnetic strip 150. The direction of magnetization is dependent upon the direction of the current from the current source 2633, which in turn is dependent upon the voltage level of the data input.

Figure 69:
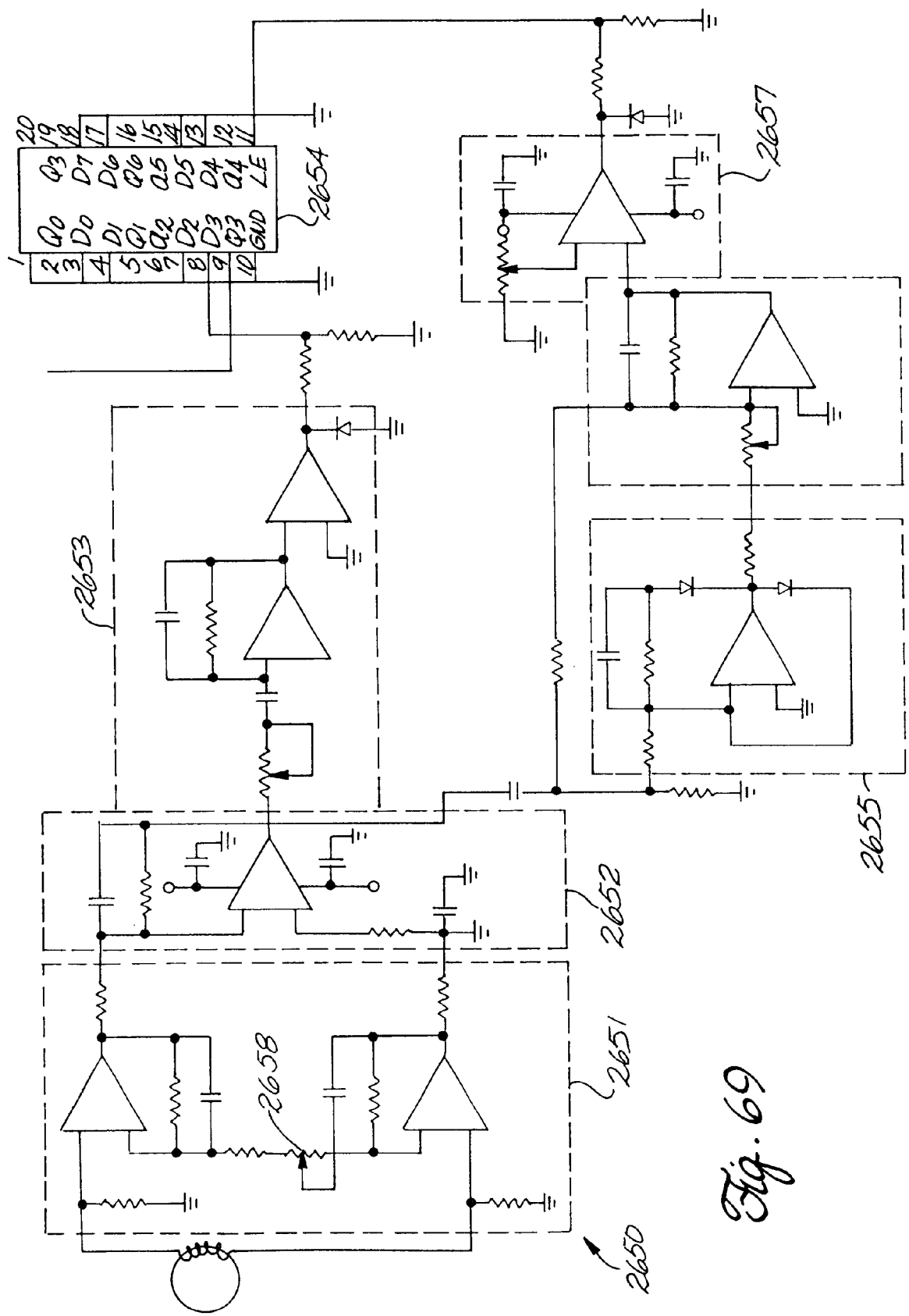
FIG. 69 is a schematic circuit diagram of a circuit for reading data from a magnetic strip.

Data recorded on the magnetic strip 150 can be read by a read circuit implemented in accordance with read circuits commonly known to the art. FIG. 69 is a schematic circuit diagram of an exemplary read circuit. The figure shows a peak detection circuit 2650 coupled to the magnetic sensor 154 for reading signals recorded on the magnetic strip 150. Signals produced by the magnetic sensor 154 are inputted into a differential band amplifier 2651. Each side of the differential amplifier 2561 has a capacitor for adjusting the pass band for the input signal. Amplification of the circuit 2651 is adjustable by a variable resistor 2658.

The differential outputs from the differential amplifier 2651 are received by a second amplifier 2652 which converts them to a single-ended output. The output from amplifier 2652 is received by a differentiator circuit 2653 which operates to detect the peaks of the signals from the magnetic sensor 154. The output of the differentiator circuit 2653 is applied to a digital buffer 2654.

The output from the amplifier 2652 is also received by a circuit 2655 which converts negative portions of the output signals into positive value. In other words, the circuit 2655 outputs the absolute value of signal received from the circuit 2652. The circuit provides an envelope from which level change of the sensed signal is detected. The output from the circuit 2655 is symmetrically adjusted by a symmetry circuit 2656. The output of the symmetry circuit 2656 is applied to a mask circuit 2657 which masks off signals that are lower than a predetermined value. The output from the circuit 2657 is applied to the enable input of the digital buffer 2654 to enable signals from the circuit 2653 to be registered by the buffer 2654.

One advantage of a movable head is that directory information on the strip can be updated without requiring a movement of the cassette, and can therefore be performed more freely and frequently, such as at each time when the directory information is changed. As a result, the directory information can be preserved even when power to the recorder is lost before the cassette is ejected. Moreover, if one attempt to read/write data from the magnetic strip fails, other attempts can be made. Furthermore, after a write operation, accuracy of the data can be confirmed by performing a subsequent read operation.

Another advantage of using a movable head is that directory information can be recorded at lower bit density. For example, if the magnetic strip is placed on the long edge (back) of the cassette, it can have a recording length of about four to five inches and the directory information can then be recorded at a bit density of between 500 to 600 bits per inch (BPI). Furthermore, if a two-track magnetic head is used for the same total data capacity, the record density can be further reduced to between 250 and 300 BPI.

Another advantage of a movable head is that since movement of the magnetic head is under a control logic separate from the motor and mechanical control logic, its speed and speed variation can be better controlled.

After a video cassette is inserted into a VCR, it is solidly clamped inside the VCR. Therefore, another advantage of a movable head is that, unlike the stationary head which requires movement of the cassette, the movable head can read directory information from the magnetic strip when the cassette is settled. The track position thus becomes more accurately reproducible and hence alignment of read/write tracks is more easily attainable.

Another advantage of the movable head approach is that, in contrast to the stationary head approach where read operation is performed in one direction (i.e. when the tape cassette is inserted) and write operation is performed in an opposite direction (i.e. when the tape cassette is ejected), read and write operations with a movable head can be performed in the same direction, thus providing better data reliability.

Referring to FIG. 70*a*, in the specific embodiment of the present invention, directory data are recorded on a magnetic strip 3650 affixed to the back wall 3651 of a cassette. The strip 3650 is a tape with part number 8156 from 3M Corporation. Construction of the magnetic strip is illustrated more clearly in FIG. 70*b*. The magnetic strip has a magnetic area of 0.4 inch wide to provide two recording tracks 3652 each of which has a width of approximately 0.12 inch and a length of 4.9 inch. The center-to-center separation between the two tracks is approximately 0.14 inch. The strip 3650 has a plastic base 3654 approximately 0.825 inch wide and 5.9 inch long. A foam adhesive tape 3655 of 0.015 inch thick is used to adhere the base to the cassette (see FIG. 70*c*).

Advantageously, a mark hereinafter referred to as the "feature control mark", is provided on the cassette or on the magnetic strip for enabling the VCR to perform predefined functions, such as one or more of the enhanced functions described hereinbelow. One implementation of the feature control mark is to have a mark 150 made of light-reactive material so that it is recognizable by a device 159 such as a photo-diode on the recorder.

Another implementation of the feature control mark is to pre-record or pre-format a predefined bit pattern (for example, a bit string of "101010") at a predetermined location (hereinafter referred to as the "header") of the magnetic strip. When the cassette is loaded into the VCR, the directory controller first reads the bit pattern from the header area. The bit pattern is read into the feature control field FTCNTL 1013 (FIG. 2) of the RAM 33 which is used to enable predefined functions of the VCR. It will be understood that the bit pattern may be modified as new models of VCR, with different functions or enhancements, are introduced.

Figure 70E:
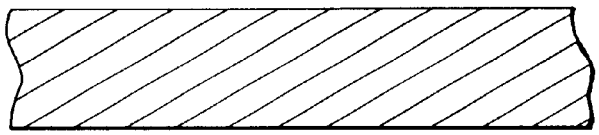
FIGS. 70e–70j illustrate different ways of putting a function code on a magnetic strip.
Figure 70F:
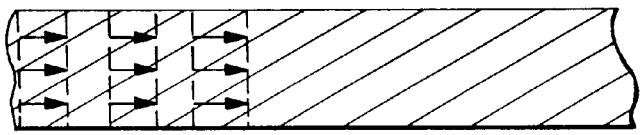

The bit pattern on the magnetic strip can be pre-formatted as part of the manufacturing process of the magnetic strip. One method of pre-formatting the magnetic strip is to first provide a uniform coating of magnetic material along the header as illustrated in FIG. 70*e*. The coating may be accomplished by such mass production methods as offset printing or roller coating. After the coating is completed, the header is subject to a pulsed magnetic field so that the predefined bit pattern, as shown in FIG. 70*f* is produced thereon. The disadvantage of this technique is that the code may be erased or modified, either intentionally, or unintentionally especially when the stationary head approach is used, because the position where the head may read/write the strip under this approach is dependent upon mechanism of the VCR and is therefore relatively more difficult to ascertain.

Figure 70G:
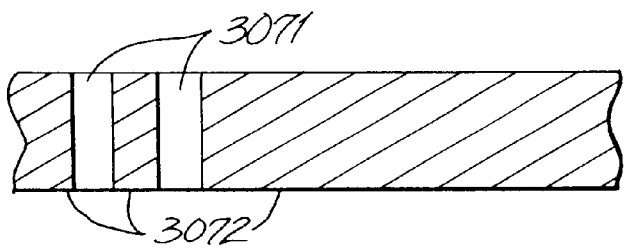
Figure 70H:
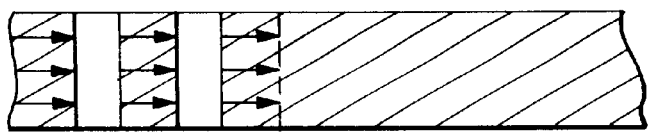

Another method of preformatting the feature mark is to selectively coat portions 3072 of the header which contain a "1" with magnetizable material as shown in FIG. 70g. The portions 3071 of the header which contain a "0" are not coated. The selective coating can be accomplished using a mask of printing plate containing the desired pattern. When the cassette is inserted into the VCR, a write operation is performed on the header. After the write operation is completed, those portions which are coated with magnetizable material are magnetized, as shown in FIG. 70h). The header is then read into FTCNTL 1013 field 1013.

Figure 70I:
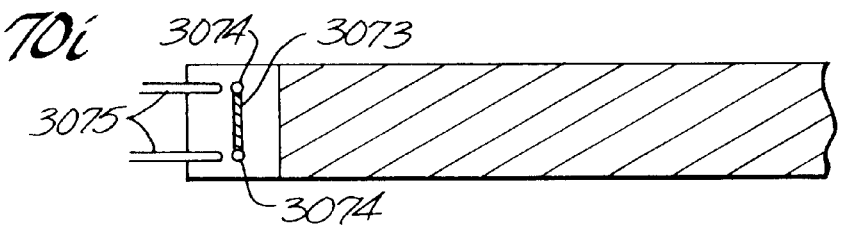
Figure 70J:
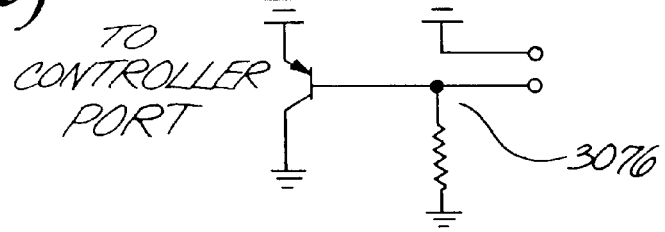

FIG. 70i illustrates another implementation of the feature control mark. According to this implementation, one or more electrically conductive path is provided on the cassette casing, such as by printing one or more strip 3073 on a designated area with conductive ink. At each end of the conductive path is a pad 3074. Two electrical contacts 3075 are provided from the VCR such that when the cassette is seated in the VCR, the two contacts 3075 would press against and contact the two pads 3074 respectively. The contacts 3075 are coupled to an electrical circuit 3076 such as the one illustrated in FIG. 70j. If the conductive path 3073 is present on a cassette, the two contacts 3075 are shorted and the output of circuit 3076 is at one voltage level. If a cassette does not have the conductive path, the two contacts are open and the output of the circuit 3076 is at another voltage level. The voltage is read by the microprocessor controller 31 to set FTCNTL 1013 in the RAM 33.

Semiconductor Memory

Figure 71:
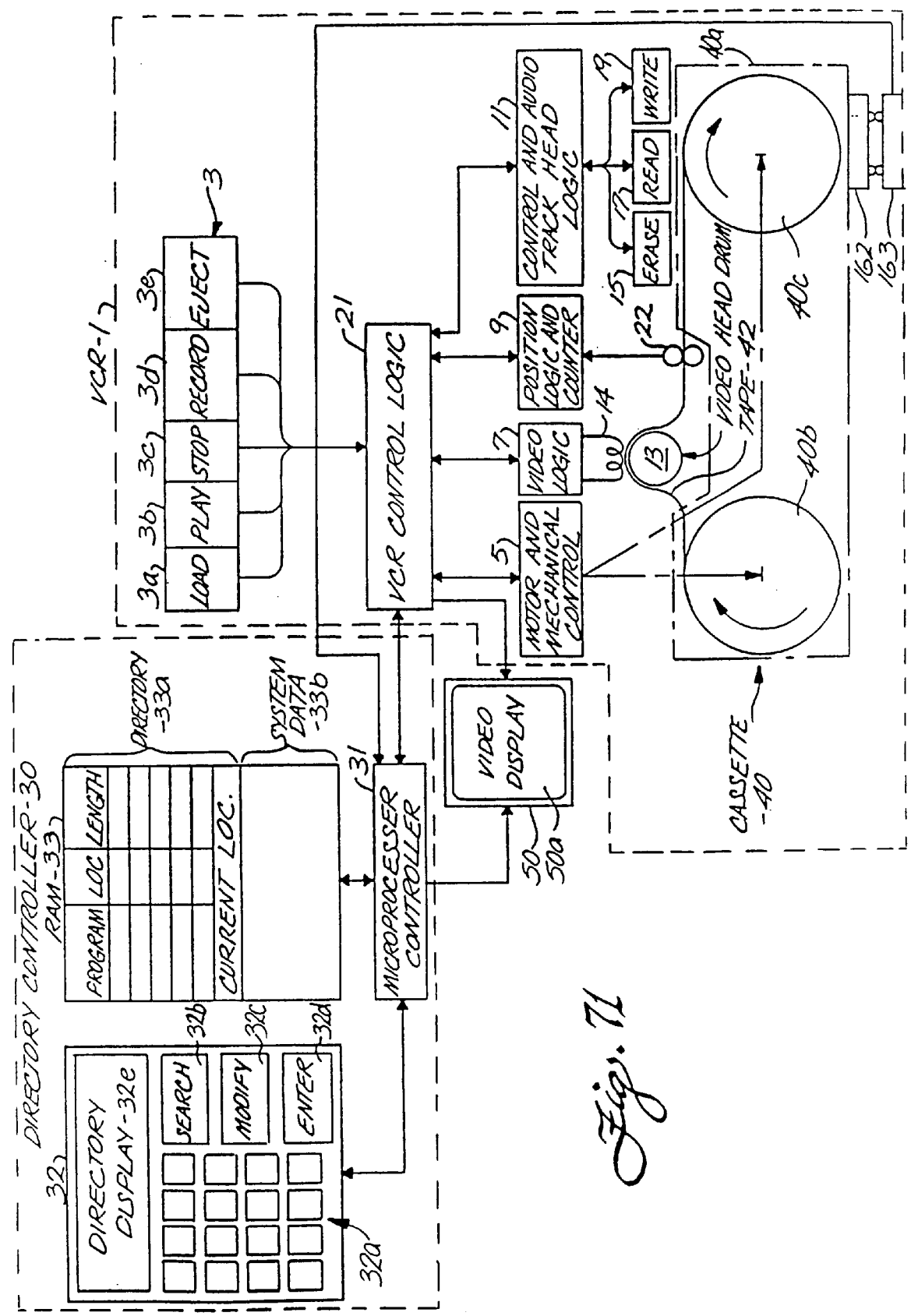
FIG. 71 is a block diagram of a video cassette recorder with a directory controller and a semiconductor memory as an alternate embodiment of the present invention.

In another implementation, the directory information is stored in a semiconductor memory device as shown in FIG. 71. A semiconductor memory 162 is carried by the cassette. When the cassette is inserted into the VCR, the semiconductor memory will be connected to the microprocessor controller 31 through contacts 163.

Figure 72A:
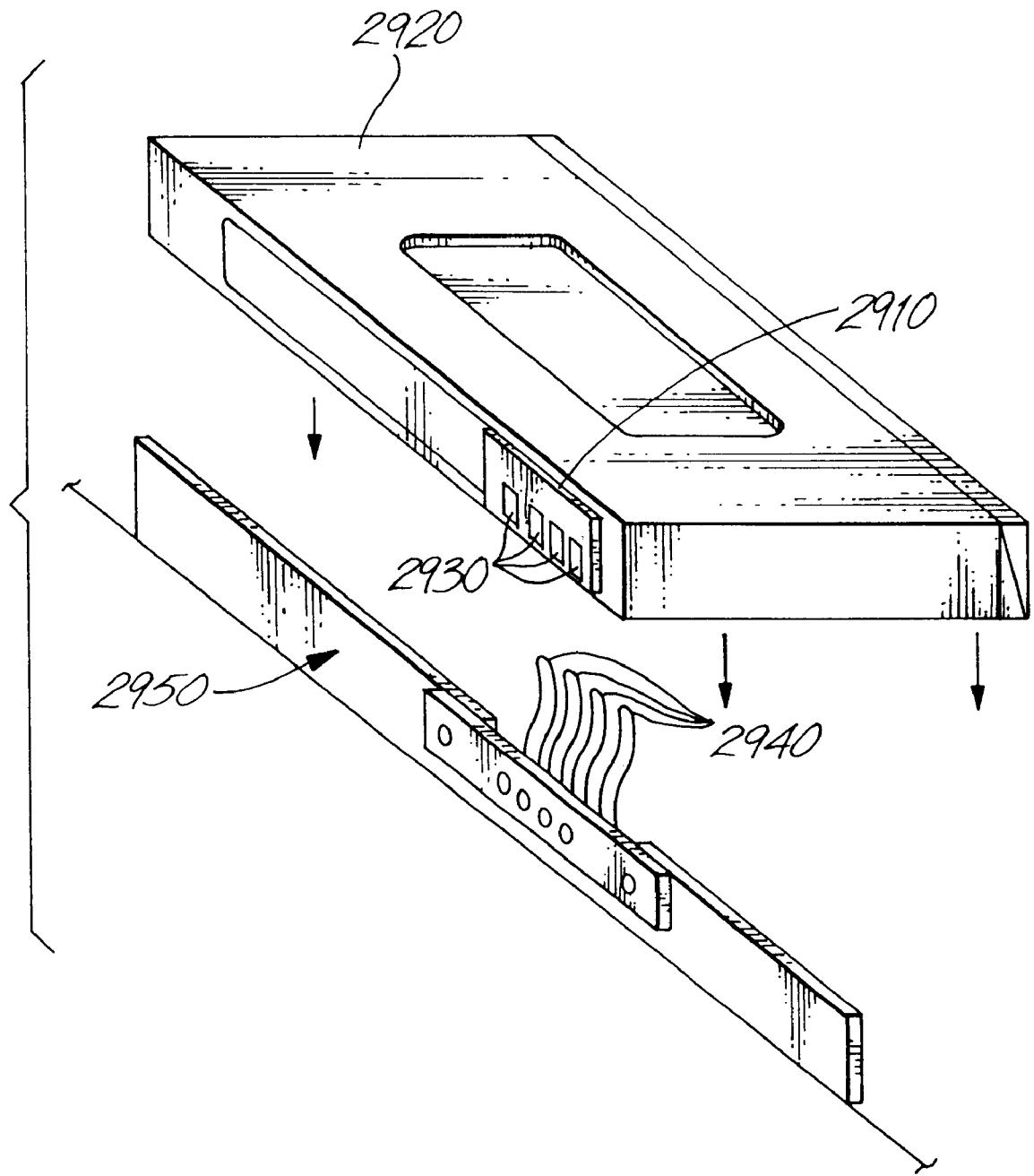
FIGS. 72a–72b show the construction of the semiconductor memory of FIG. 71.
Figure 72B:
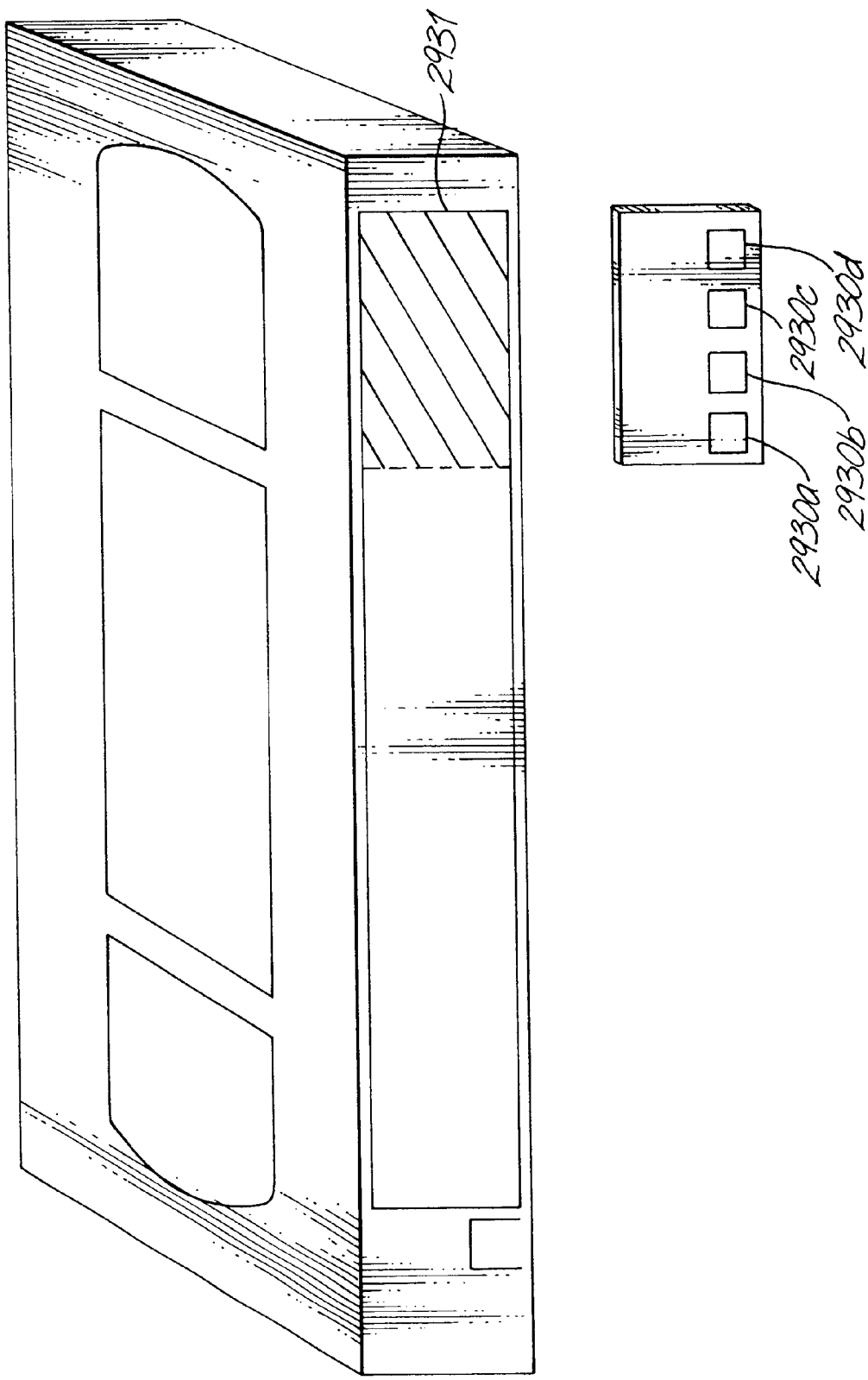

Referring to FIG. 72a, there is shown a semiconductor memory 2910 carried on the back panel of the cassette 2920. A plurality of contacts 2930 are provided on the surface of the semiconductor memory device 2910 for coupling to the microprocessor controller 31 of the directory controller 30. Desirably, the number of contacts between the semiconductor memory device and the VCR is minimized. This is accomplished by using a serial memory, such as a EEPROM from Microchip with part number 24C04-P. By using a serial memory, only one bit is required to input/output address and data. According to a specific implementation, the semiconductor memory 2910 is a serial memory and has four pads for coupling to the microprocessor controller 31, as shown in FIG. 72b. The pads include a pad 2930a for coupling to a 5 volt voltage supply, a pad 2930d for coupling to ground, a pad 2930b for communicating serial address/data signals (SDA) and a pad 2930c for inputting a serial clock signal (SCL).

To provide appropriate tolerance for possible misalignment due to variance in construction of different cassettes and tape recorder/players, as well as to provide tolerance between a cassette in tape player/recorder, each of the pads 2930 in the specific implantation is substantially square with dimensions of about 0.25"×0.25". Center-to-center separation between adjacent pads is about 0.35".

The connectors 2940 on the back panel of the VCR for coupling to the semiconductor memory device 2910 are spring-loaded contact pins so as to allow for movement of the cassette during loading and unloading. Preferably, the springs are chosen such that they assert about 50 grams onto the cassette and would not cause the cassette to be pushed out of its resting plate. The contact area of each pin is substantially equal to 0.05"×0.05", with a tolerance of 0.01" for each dimension.

As illustrated in FIGS. 72a and 72b, the memory device 2910 is placed in the specific implementation in the recessed label area 2931 on the back panel of the cassettes, which has an area of 0.08"×1.5". In the specific implementation, the thickness of the memory device is 0.062". The separation between the bottom edges of the conductor pads 2930 and the bottom edge of the memory device 2910 is 0.1". A separation of 0.1" is provided between the left edge of the memory device 2910 and the left edge of the left-most conductor pad 2930a. A separation of 0.1" is provided between the right edge of the memory device 2910 and the right edge of the right-most conductor pad 2930d.

In the specific implementation, the first 64 addressable bits (8 bytes) of the memory device are reserved for housekeeping purposes. Referring to FIG. 73, the first byte 2961 of the housekeeping data is an identification pattern, such as a ASCII character "I", for controlling operation of the VCR and also information for enabling or disabling certain enhanced functions of the VCR. Upon being loaded into a VCR, this data will be read into the FNCNTL field in the RAM.

The second byte 2962 stores the size of the memory, as a number representing the number of 256-byte segments of the memory. Bit 15 is used to provide a parity check for bits 8 through 14. For example:

| bit15 | bit8 | |
|---|---|---|
| 0 0 0 0 0 0 1 0 | | 512 bytes x 8 = 4096 bits |
| 0 1 0 0 0 0 0 0 | | 16384 bytes x 8 = 131072 bits |

If, upon reading an invalid bit pattern or a bad parity from bits 8 to 15, the microprocessor controller 31 would perform an autosizing procedure to reestablish the valid memory size. The autosizing procedure is also performed on a new memory.

The third and fourth bytes 2963 are used as a pointer to the last byte of the directory. For example, a bit pattern of (MSB) (LSB)
0000 0001 0000 0011 represents that the last byte of the directory is recorded on the 259th byte of the memory device.

The fifth byte 2964 is used for storing the tape label for accessing the library, if such feature is installed in the VCR. Bytes 6 to 8 of the housekeeping data are reserved for future use.

Directory data are recorded starting from the 9th byte 2965. The directory consists of various number of records, each storing information of a recorded program on the cassette tape including an index field, a program name and the length of the program.

A byte is also provided in each record for storing control information. One bit in the 21st byte is used to represent whether the corresponding program has been overwritten. Two bits in the 21st byte are used to indicate the speed at which the corresponding program is recorded. For example

| | | |
|---|---|---|
| 0 | 0: | recorded at SP |
| 0 | 1: | recorded at LP |
| 1 | 0: | recorded at SLP |
| 1 | 1: | reserved |

An eight-bit checksum 2968 is recorded after the last record of the directory for data integrity verification.

When the tape in inserted into the VCR, the directory is read from the semiconductor memory serially and stored in the in-use directory area of the RAM. When the in-use directory in the RAM is changed, as a result of either one or more modification to its content or addition/deletion of programs recorded on the tape, its content can be written immediately back to the semiconductor memory. In writing the directory to the semiconductor memory, the microprocessor controller retrieves the content of the in-use directory one byte at a time, shifts the byte to an output register and sends the content of the output register to the semiconductor. Data transfer to the semiconductor memory 2910 is described in the product specification of the 24C04A from Microchip Technology.

Figure 74:
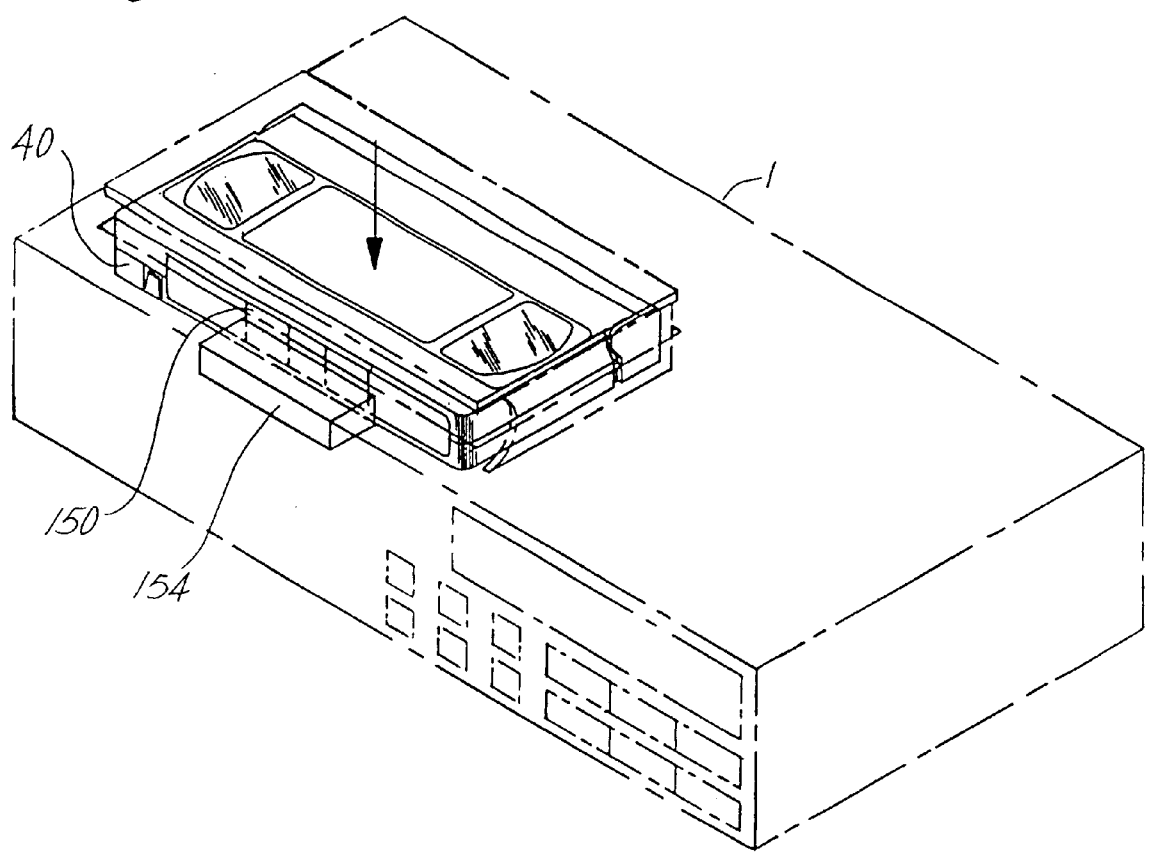
FIG. 74 is a schematic and pictorial view of a video cassette recorder having a front load for the magnetic tape cassette in which the recorder has a reader and writer for a directory and/or directory locations on a magnetic strip along the edge of the magnetic tape cassette.

FIG. 74 is a pictorial view of a video cassette recorder having a front load mechanism for the tape cassette 40. The recorder 1 has located therein a stationary magnetic read/write head 154 designed to read from and record on the magnetic strip 150 as the cassette 40 is inserted and ejected, respectively.

Figure 75:
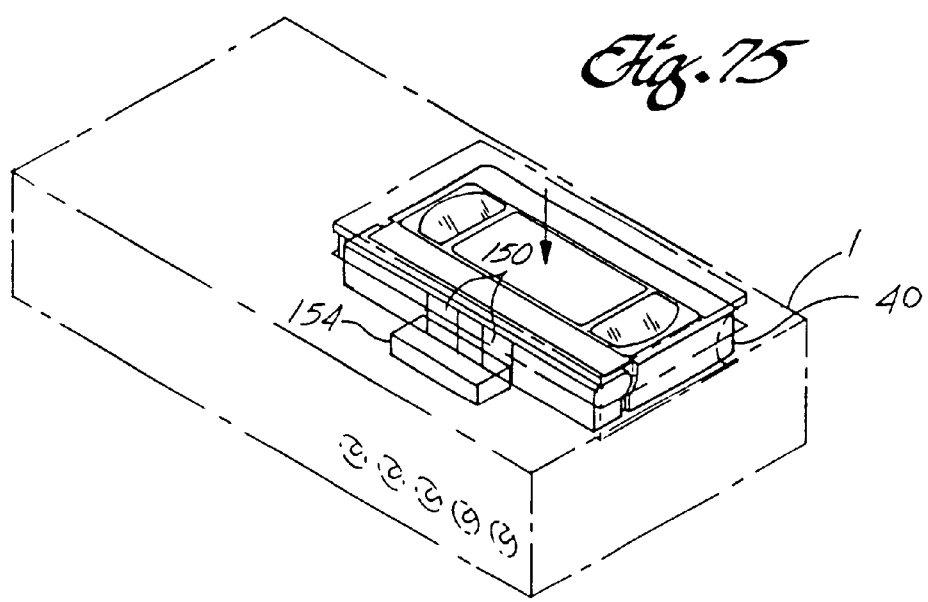
FIG. 75 is a schematic and pictorial view of a video cassette recorder having a top load for a magnetic tape cassette in which the recorder has a reader and writer for a directory and/or directory locations on a magnetic strip along the edge of the magnetic tape cassette.

FIG. 75 is a pictorial view of a video cassette recorder having a top load mechanism for the cassette 40. A stationary magnetic read/write head 154 is positioned in the VCR 1 to read from and record on the magnetic strip 150 as the cassette 40 is respectively lowered into and ejected from the recorder.

Figure 76:
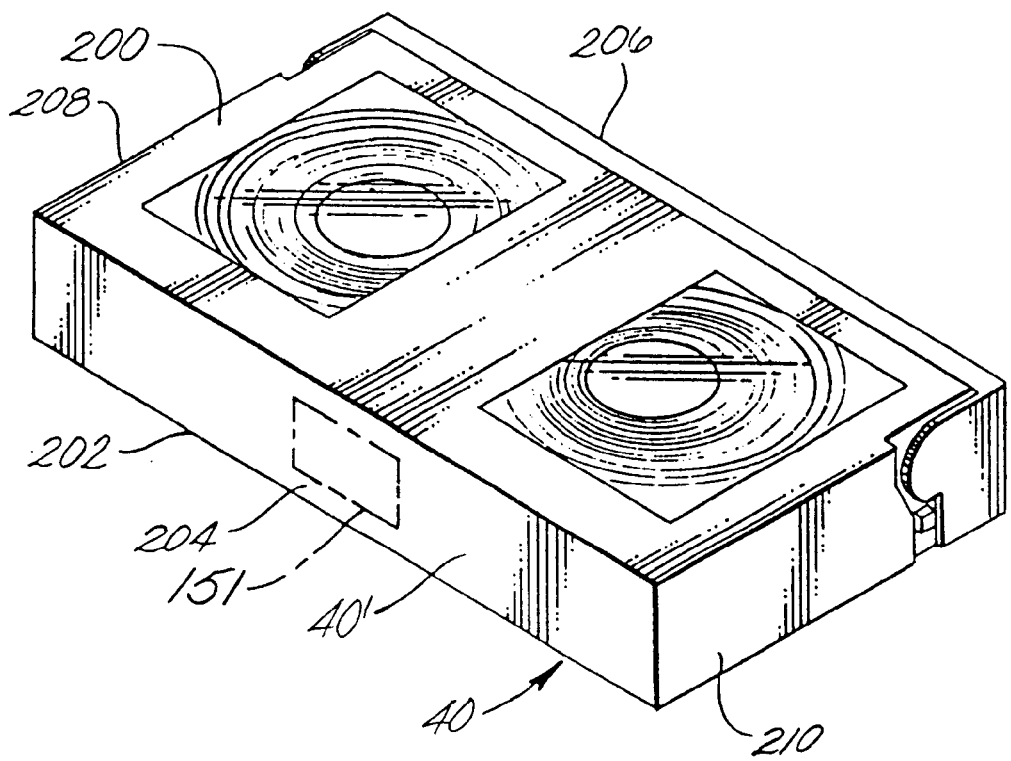
FIG. 76 is a perspective view of a videocassette using a magnetic strip for the VCRs of FIGS. 74–75.

FIG. 76 is a perspective view of a video cassette using a magnetic strip for the VCRs of FIGS. 74–75.

Figure 77:
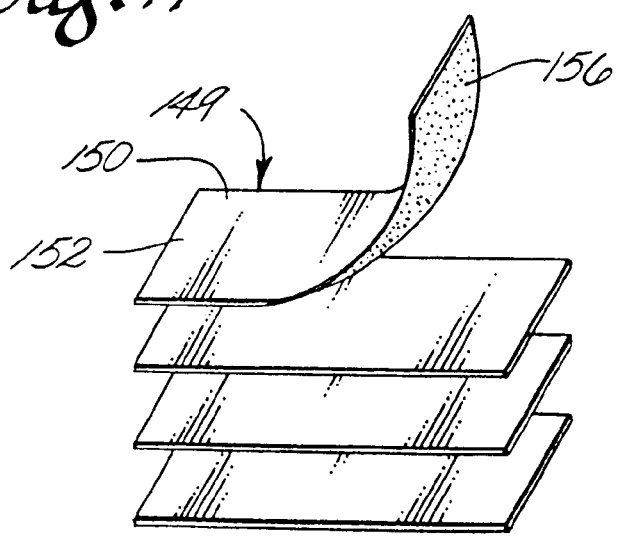
FIG. 77 is a diagram of a stack of adhesive-backed magnetic strips.

Magnetic strips 150 can be manufactured and distributed in stacks 149 as shown in FIG. 77 or in rolls or sheets (not shown) cut to size by the user. As shown in FIG. 76, a standard videocassette 40, such as a VHS type videocassette, comprises a housing 40' having top and bottom walls 200, 202 and four side walls 204, 206, 208, 210. Usually the housing 40' is constructed as a relatively flat parallelpiped wherein the vertical separation of top and bottom walls 200, 202 is much less than the width or length of the top or bottom walls. The magnetic strip 150 (not shown in FIG. 76) can be placed in an affixation zone 151 on the back wall 204 of the housing, or on the top of the housing 200. Each strip 150 comprises a magnetic recording layer 152 and an adhesive layer 156 for affixation to the zone 151. The magnetic layer 152, by way of example, can be constructed of the same materials as the magnetic tape 42 and may be affixed to any standard tape cassette by the user or pre-attached by the cassette manufacturer. A strip of video tape approximately one-half inch in length and one-half inch wide can be used as layer 152 in the configurations of FIGS. 74–75 to store approximately 4 kilobits of coded digital data. The adhesive layer 156 is applied to the non-magnetic backing of the magnetic layer 152. The adhesive can comprise a pressure-sensitive adhesive, or any of a variety of natural or synthetic organic adhesives suitable for bonding magnetic tape to the housing of a videocassette. In an alternative embodiment, strips 150 are formed with double-backed tape self-adhesion to zone 151. Thus, the strips 150 can be affixed to any standard cassette, thereby enabling an owner of cassettes to add directory storage capability to any existing cassette.

Figure 78:
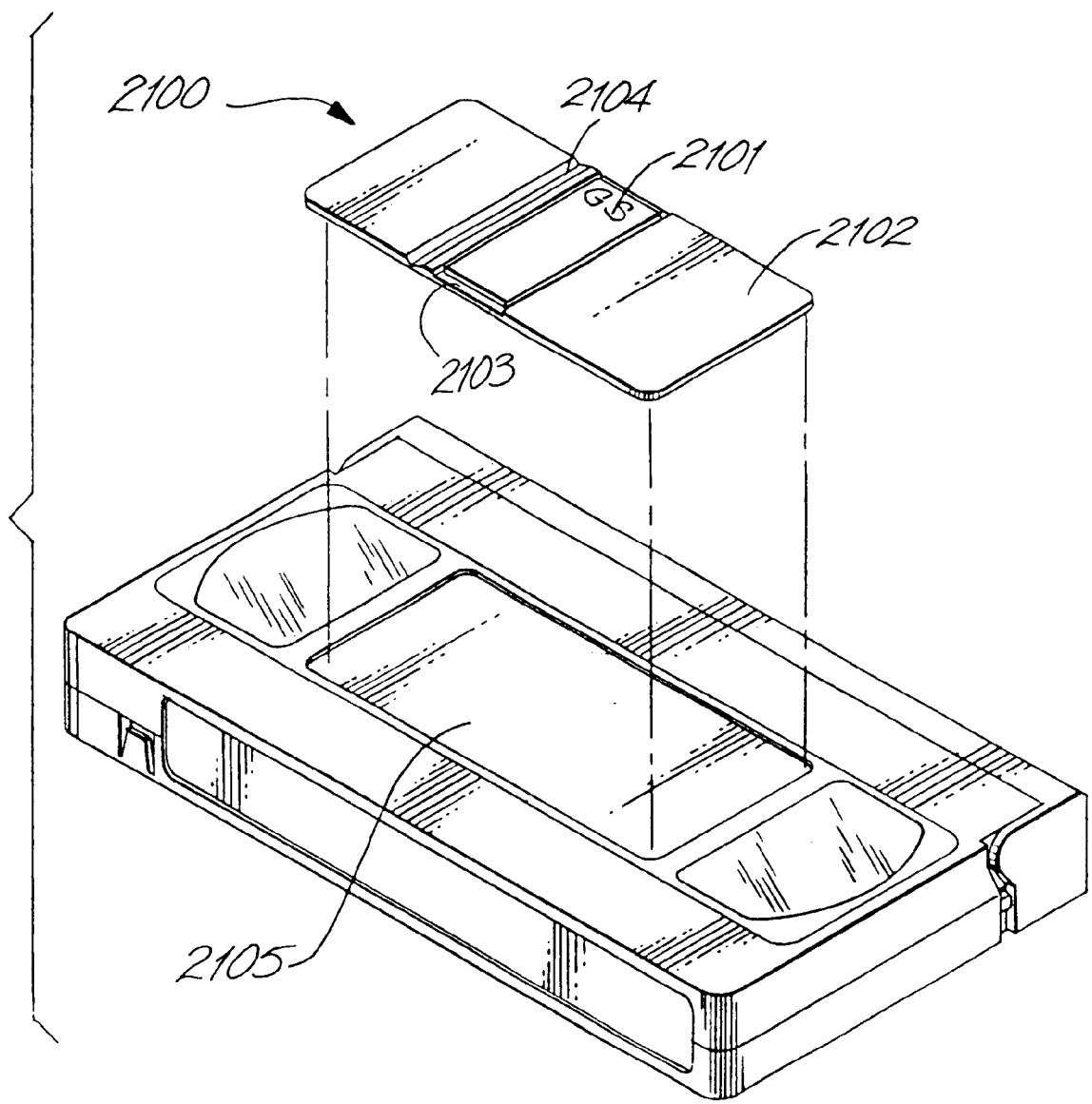
FIG. 78 shows schematically an alternate embodiment of a videocassette having a memory comprising a magnetic strip for storing directory information.

FIG. 78 shows another embodiment of a videocassette having a magnetic strip. A magnetic strip assembly 2100 comprises a magnetic strip 2101, according to this implementation, which is attached to a base, such as a card 2102. The card 2102 preferably has a depressed area 2103 in which the magnetic strip 2101 is placed. The magnetic strip can store several hundred bits of data per inch.

A strip of resilient material (not shown) is placed between the card 2102 and the magnetic strip 2101 to improve its contact with a magnetic write/sensor head. A guide, such as a groove 2104, is provided on the card 2101 to guide a magnetic write/sensor head to ensure that it moves over the magnetic strip in a read/write operation. The groove 2104 will be used to engage a pin on the magnetic head. Also, each end of the groove may be widened to assist the pin of a magnetic head to engage to the groove 2104. On the other side of the card, adhesive substance is provided for adhering the card to the cassette. A sliding cover (not shown) may optionally be provided to protect the magnetic tape.

Figure 79:
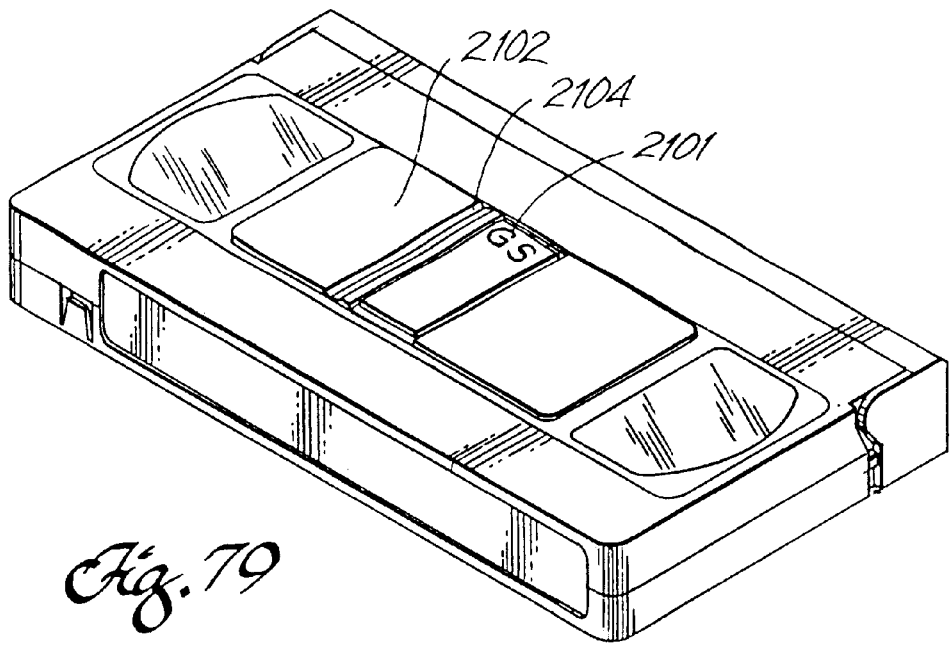
FIG. 79 shows a magnetic strip attached to the top of a cassette and also a mark provided on the magnetic strip.

The card 2102 according to this implementation can be placed on the top of the cassette in a recess 2105 as shown in FIGS. 78–79 to reduce its exposure and the exposure of the magnetic strip.

Figure 80:
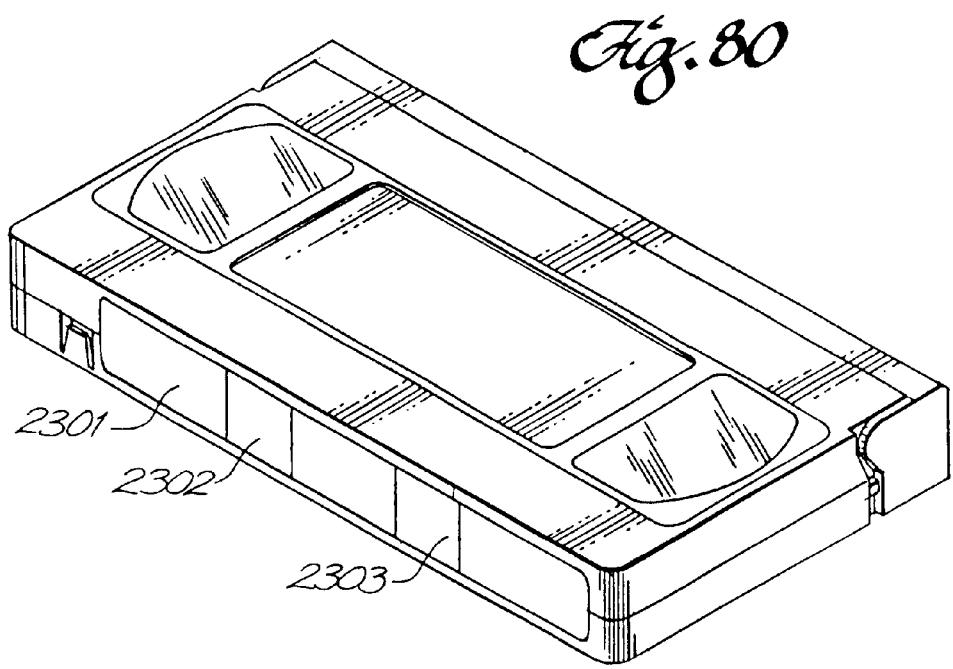
FIG. 80 shows two magnetic strips attached to the back wall of a cassette.

Alternatively, the card with the magnetic strip may be placed on the back of the cassette casing as shown FIG. 80, and preferably in a recess thereon. If the thickness of the cassette is not long enough, then the magnetic strip can be divided into two portions, 2302 and 2303, to be read with two magnetic heads. The card for carrying the magnetic strip is depicted in FIG. 80 as 2301.

Stationary Head

Figure 81:
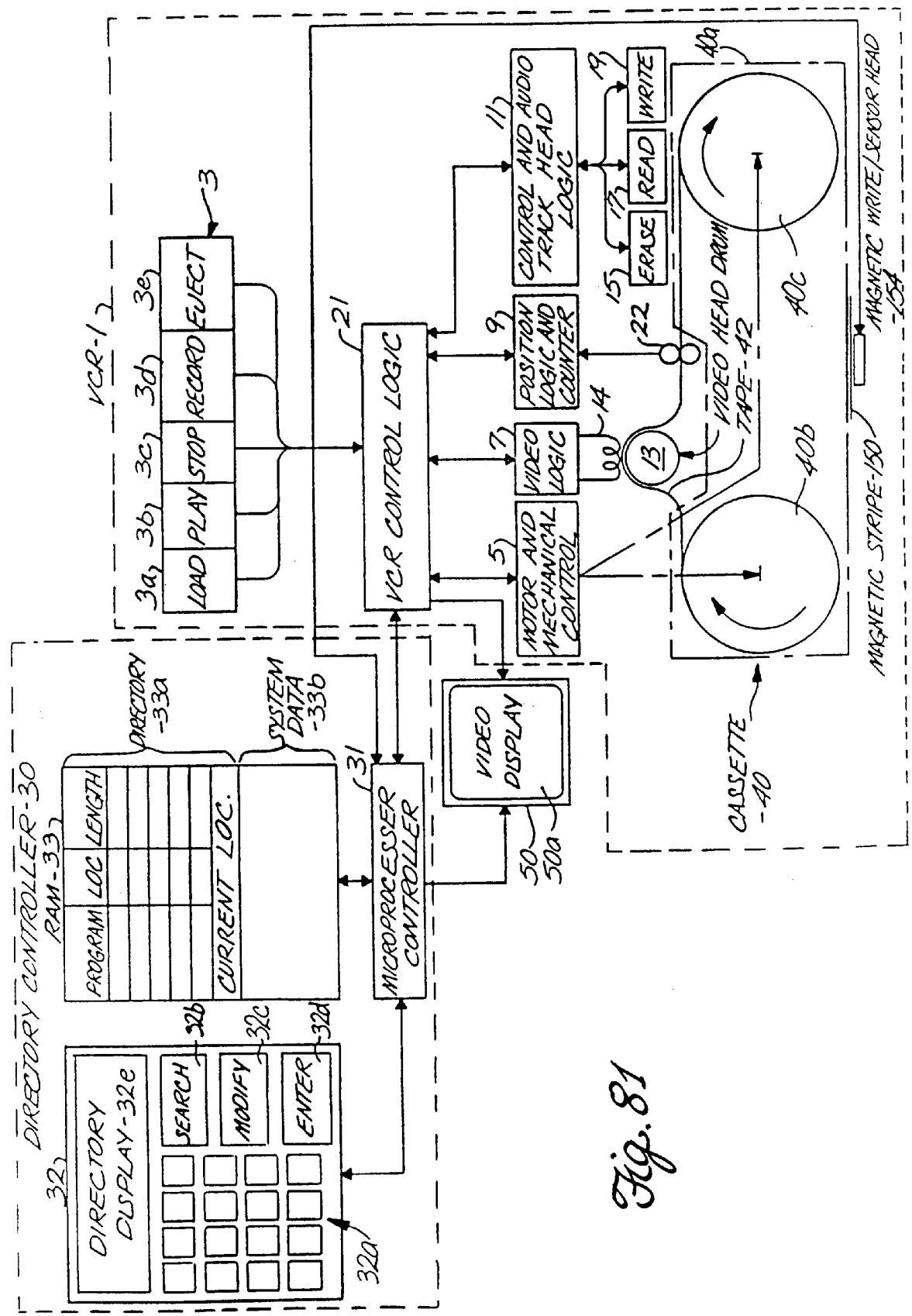
FIG. 81 is a block diagram of a video cassette recorder with a directory controller and a magnetic write and sensing system for information recorded on the back wall of the cassette and depicts an alternate embodiment of the present invention.

FIG. 81 is a block diagram of a video cassette recorder with a directory controller and a magnetic write and sensing system for information recorded on the back wall of the cassette and depicts an alternate embodiment of the present invention.

Figure 82A:
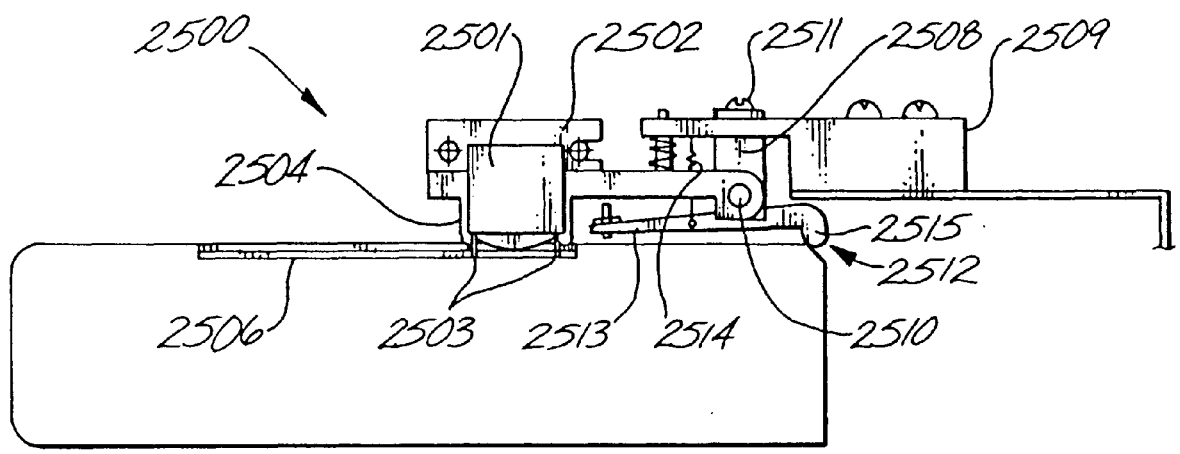
FIGS. 82a and 82b are side and top views of a magnetic write/sensor head unit for reading a magnetic strip.
Figure 82B:
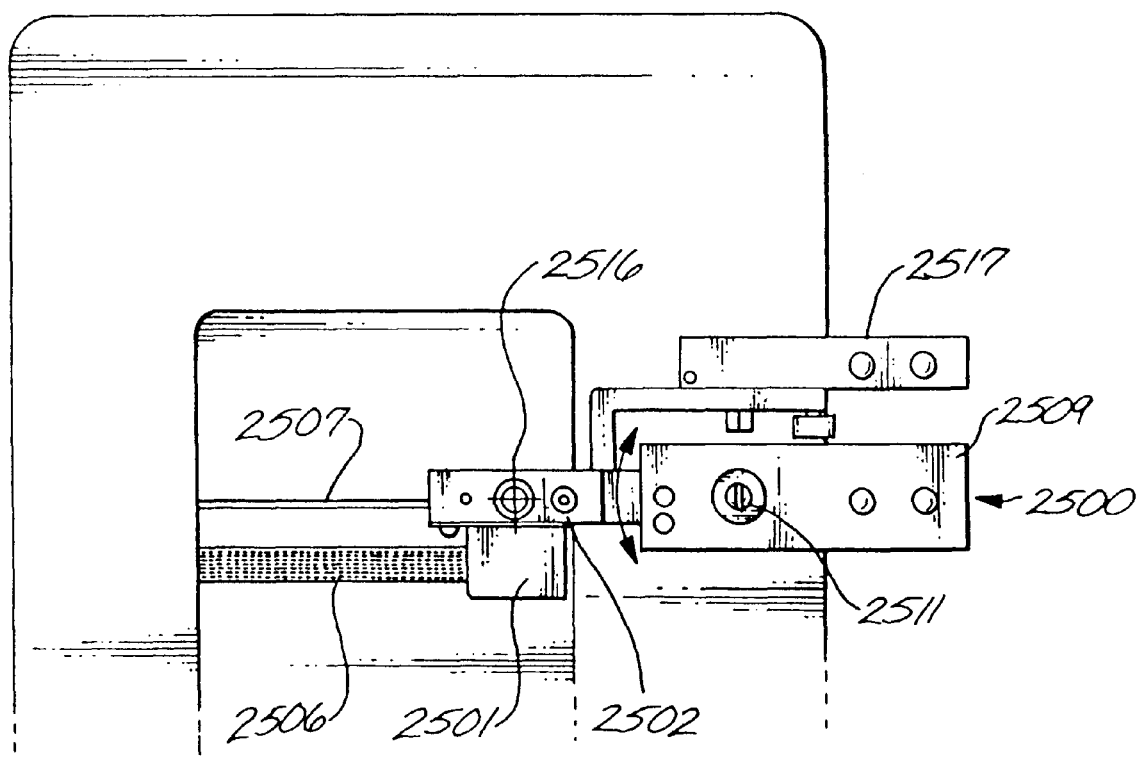

FIGS. 82a and 82b are side and top views of a magnetic write/sensor head unit 2500 implemented for reading data from and writing data to a magnetic strip.

The magnetic write/sensor unit 2500 comprises a magnetic write/sensor head 2501 pivotally mounted on an arm 2502. The head 2501 has guides 2503, such as U-shape guides, for confining a magnetic strip 2506 beneath it as the magnetic strip 2506 passes under.

The arm 2502 has means or guides 2503, such as a ball-point finger, for engaging to a guide 2507, such as a groove, which guides the head 2501 along over the magnetic strip 2506.

The arm 2502 is mounted to a member 2508 by a pivot 2510 which gives it a freedom of vertical movement. The member 2508 is in turn mounted to a cantilever 2509 by another pivot 2511 which gives it a freedom of horizontal movement to adjust for the small displacement of the tape 2506. The head 2501 is mounted onto the arm by a pivot 2516 to provide azimuth alignment, that is, to enable the head 2501 to move in parallel with the tape 2506 even when the arm 2502 shifts in adjusting for a displaced tape.

A lift cam 2512 is pivotally mounted to the member 2508. One arm 2513 of the cam 2512 is coupled by a spring 2514 to the cantilever 2509. In the absence of a cassette, the spring 2514 pulls the arm 2513 of the cam 2512 up, thereby lifting the head 2501. When a cassette is inserted, it pushes the other arm 2515 of the cam 2512, thereby lowering the arm 2513 and allowing the head 2501 to drop onto the magnetic strip on the cassette.

For a stationary magnetic head, the length of the magnetic strip 150 that can be used for storing information is limited by the distance of movement of the cassette when it is ejected and inserted. Since data storage and retrieval for a movable head do not require movement of the cassette, therefore, another advantage of a movable head system is that the length of the magnetic strip 150 can be longer.

With the structure of the cassette 40, the VCR 1, and the magnetic strip 150 defined, the operation of the VCR 1 with a cassette 40 is now described. To facilitate its use with a stationary magnetic head, the magnetic strip 150 has two parallel tracks of magnetizable material. The first track is a control track pre-recorded with uniformly-spaced clock signals as illustrated in FIG. 83*a*. These clock signals are provided for synchronizing read/write operations of data to the second data track. The rising and falling edges of the clock signals indicate the boundary of cells.

Data can be recorded on the second track in many ways. In a specific embodiment, the data is recorded on the second track using the modified non-return-to-zero (NRZ-M) method. Under this method, a bit "0" is represented by a no-change in magnetic field on the second track within two consecutive transitions on magnetic field on the control track; and a bit "1" is represented by a change in magnetic field within two consecutive transitions of magnetic field on the control track as can be seen in FIG. 83B.

Figure 84A:
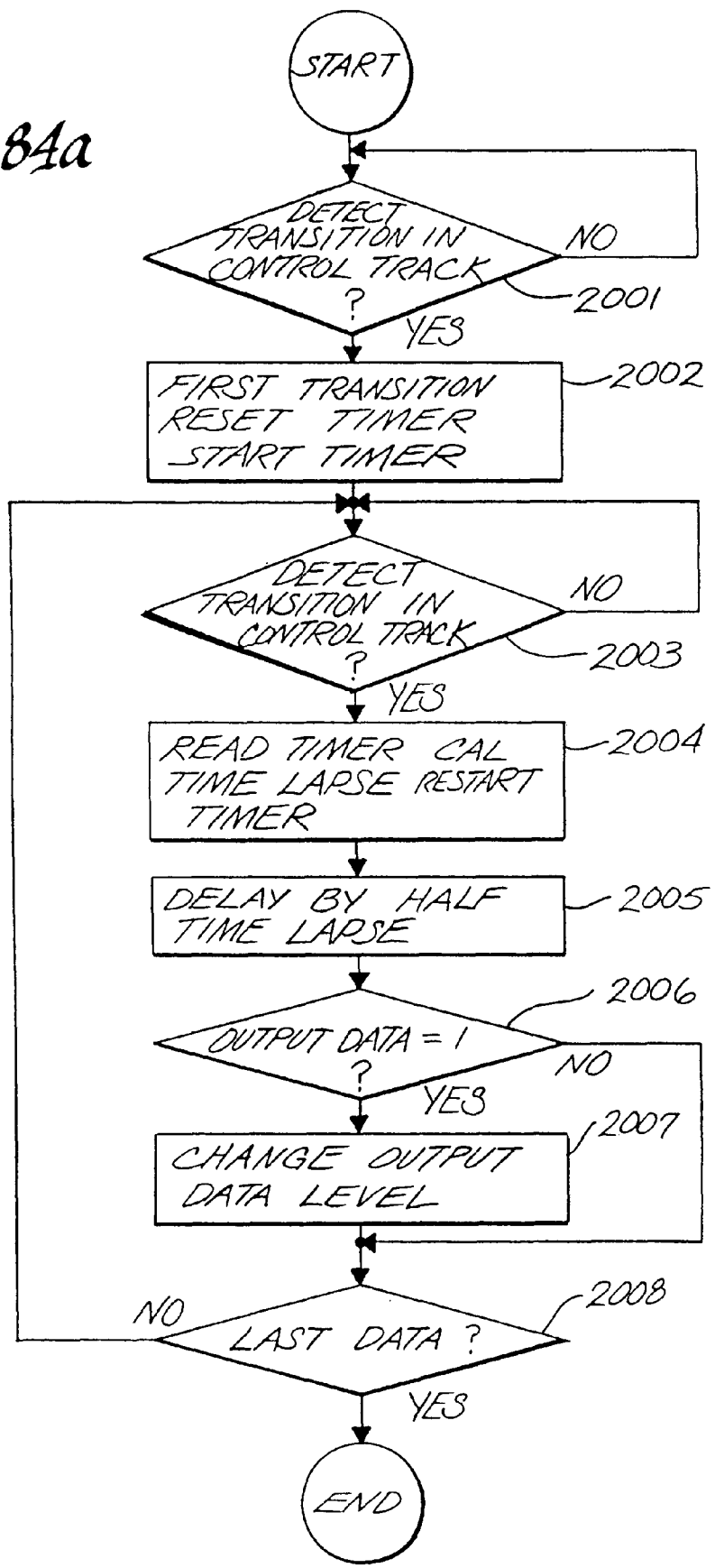
FIG. 84a is a flow chart illustrating the logic sequence of a write operation to a magnetic strip.

The flow chart in FIG. 84*a* illustrates generally the logic sequence of a write operation to the magnetic strip.

The write operation is controlled by a read/write circuit which may reside either in the directory controller 30, as shown in FIG. 81, or separately (not shown) within the VCR 1. It can be implemented either by hard wired circuit or by software. Detailed description of the read/write circuit, however, is deemed unnecessary as it is well known in the art.

In step 2001, the read/write circuit waits for a transition on the control track to occur. Upon encountering the first transition, the read/write circuit enters step 2002, in which it resets and starts a timer.

In step 2003, the read/write circuit waits for the next transition on the control track to occur. When a transition occurs, the value of the timer is registered and then restarted (step 2004). In step 2005, the read/write circuit delays for a time period equal to half the timer value registered in step 2004.

Steps 2004 and 2005 are performed for the benefit of read operations, so that data can be sampled at time instances where the magnitude of the magnetic field is at peak values, as shown in FIG. 24C. These two steps can be omitted if appropriate actions are performed during the read operations.

In step 2006, the data bit to be output is examined, if the output bit is a "1", a signal is sent to the write/sensor head to change the magnetic field on the data track (step 2007). If the output bit is a "0", step 2007 is omitted.

In step 2008, the read/write circuit determines whether the write operation is completed. Step 2003 will be performed again if there are data left.

The read/write head unit 154 actually comprises a first magnetic write/sensor head for reading the control track and a second magnetic write/sensor head for reading the data track. The first magnetic write/sensor head, responsive to changes in magnetic field along the control track, generates clock pulses for sampling the signals received from the second magnetic write/sensor head.

As previously described, for a stationary head, data are written into the magnetic strip 150 when it travels in one direction and read when it travels in the reverse direction. To facilitate the read and write operations to be performed in opposite directions, the data to be written into the data track of the magnetic strip 150 is preceded by a header 1901 as shown in FIG. 83B. The header 1901 is provided to synchronize the read/write circuit to the clock signals on the control track. The header 1901 according to the preferred embodiment contains 24 bits of "1". Behind the header 1901 is a mark 1902 provided to indicate that whatever is read from the data track in the next clock cycle is a valid data bit. According to the preferred embodiment, the mark 1902 contains 6 "0" bits followed by 2 "1" bits. This bit pattern is chosen because it is not used to represent data. It will be understood that other bit patterns can be used.

As write operations are performed in a reverse direction, mirror images 1902', 1901' of the mark 1902 and header 1901 respectively are written at the end of the data field 1903 as shown in FIG. 83*b*. In addition, a parity byte 1904 is provided after the data field 1905 so that the direction of the magnetic field at each end can be determined.

FIG. 83C illustrates the output from the second magnetic write/sensor head in reading the bit pattern of FIG. 83B. Ideally, the second magnetic write/sensor head should sample the data track at the mid point of two consecutive transitions on the control track. Unfortunately, there is a possibility that magnetic strip 150 is read by a first and second magnetic heads which are misaligned with respect to one another, or that the data track was written by a different recorder whose first and second magnetic heads are aligned differently from those reading the strip, with the result that the data track is not sampled at the proper time.

To compensate for a possible misalignment between the two magnetic write/sensor heads, a calibration is performed when the header is read.

Figure 84B:
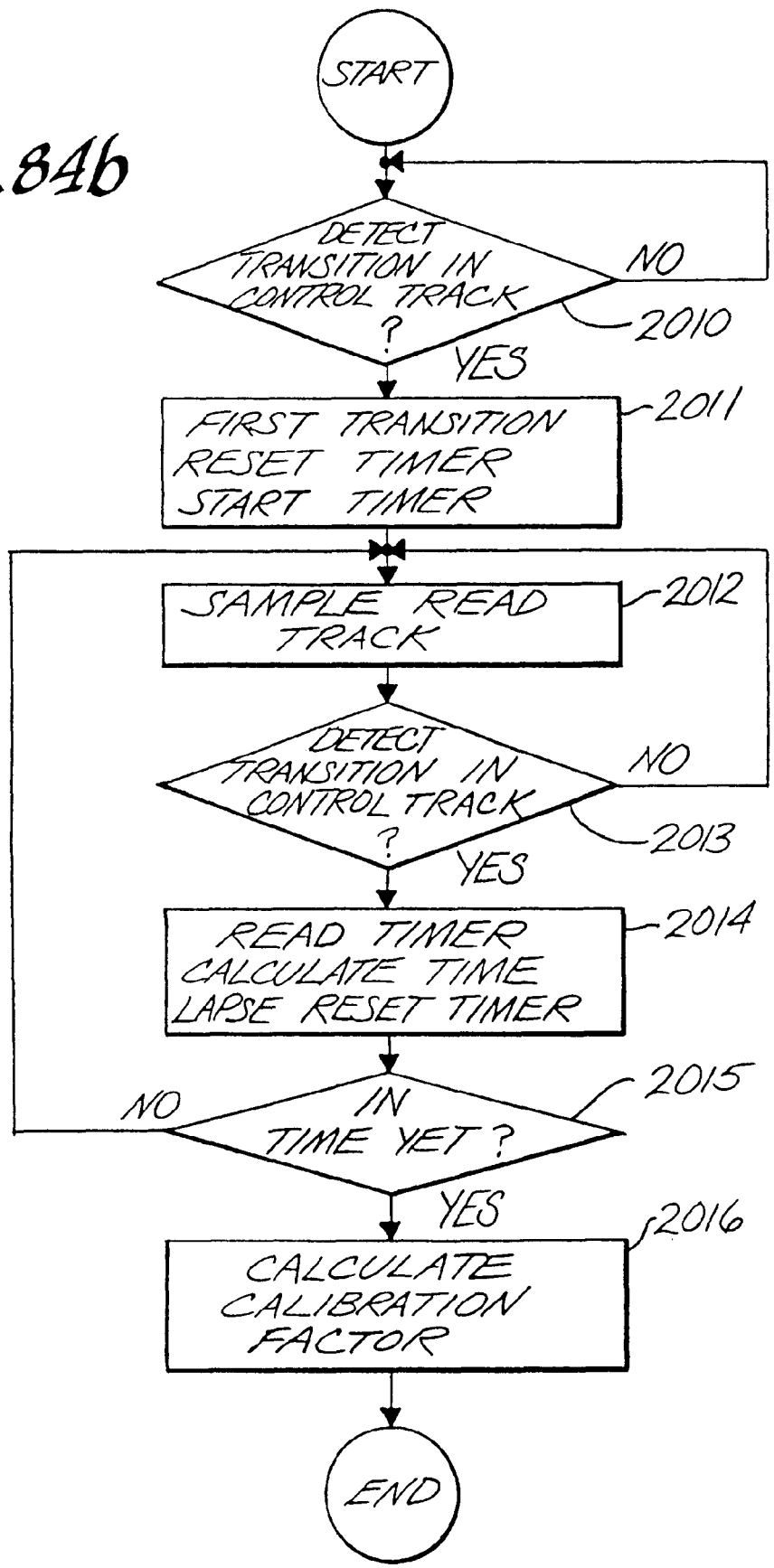
FIG. 84b is a flow chart illustrating the logic sequence of a calibration operation for compensating misalignment of magnetic heads.

With reference to the flow chart in FIG. 84B, the read/write circuit waits in step 2010 for the initiation of a read or a write operation. When a first transition at the control track is detected, the read/write circuit resets and then starts a timer (step 2011). In steps 2012 and 2013, the read/write circuit continues to sample the data track until a transition on the control track is detected.

As the field in the data track is formed by a series of "1" bits, a transition on the data track should occur within the two consecutive transitions on the control track. When a transition on the data track is detected, the time lag, Tl, between the first transition on the control track and the transition on the data track is measured. The control track is continuously read until the next transition is detected. The time difference, Tc, between the first and second transitions is calculated (step 2014).

For better accuracy, steps 2012–2014 can be repeated for N times so that average values of Tl and Tc can be obtained. A calibration value, which equals to Tl/Tc, is calculated (step 2016).

Figure 84C:
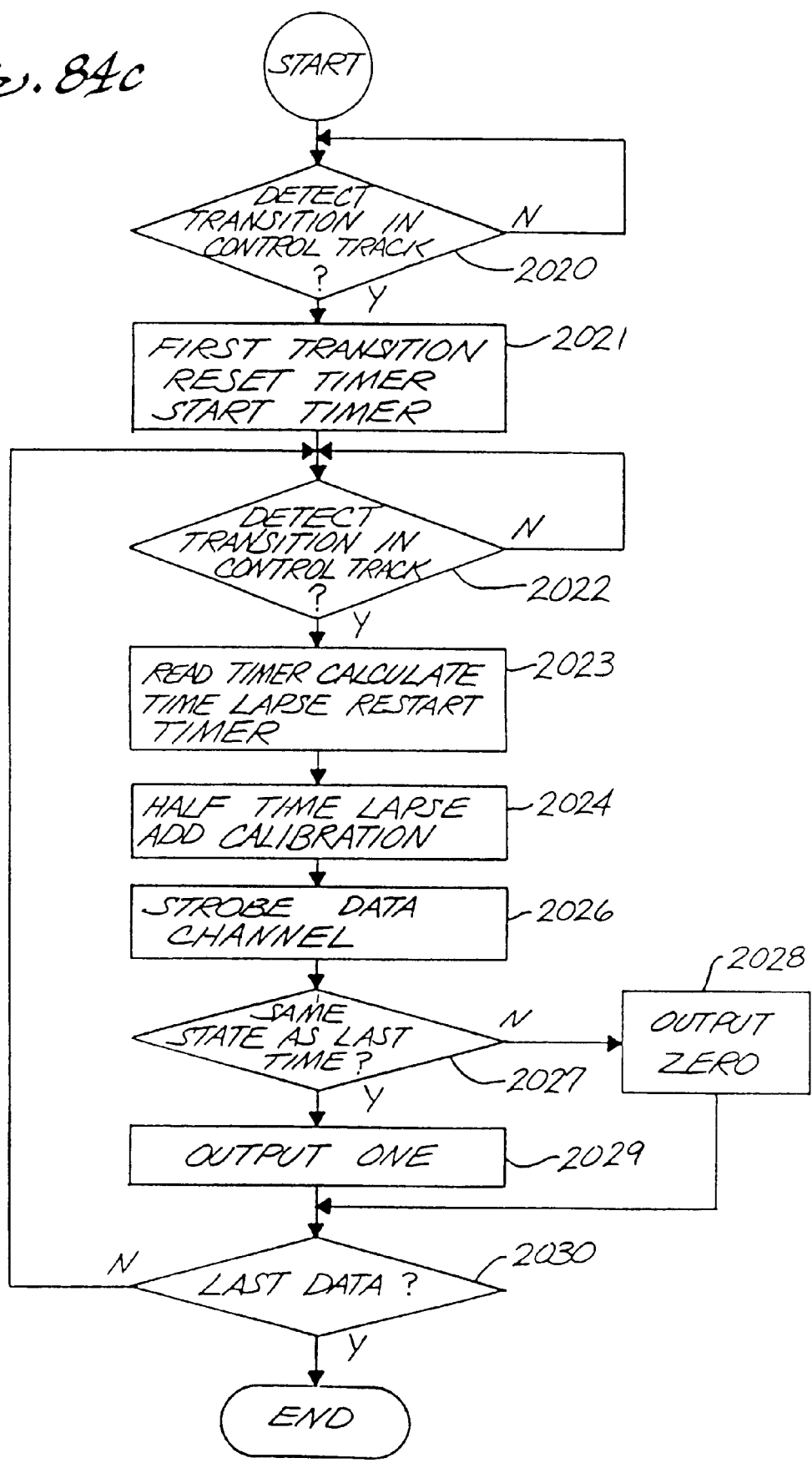
FIG. 84c is a flow chart illustrating the logic sequence of a read operation on a magnetic strip.

FIG. 84C illustrates the logic sequence for a read operation of the magnetic strip 150. In step 2020, the read/write circuit waits for detection of a transition on the control track.

When a transition is detected, the read/write circuit enters step 2021 in which it resets and starts a timer. In step 2022, the read/write circuit waits for the occurrence of another transition on the control track. When such a transition is detected, the timer is read and then reset, and the time difference, Tr, between the two consecutive transitions on the control track is calculated (step 2023). In step 2024, the read/write circuit waits for a delay so that the data track can be sampled at peak value. If steps 2004 and 2005 of the write operation of FIG. 25A are performed, the delay is Tr*(Tl/Tc). If steps 2004 and 2005 in the write operation are not performed, the delay is (Tr/2)+Tr(Tl/Tc).

At the end of the delay, the output from the data head is sampled (step 2026). If the output from the data head is the same as its value in the last clock (step 2027), a "0" bit is output (step 2028). Otherwise, if the output from the data head is changed, an "1" bit is output (step 2029). Steps 2022–2029 are repeated until the last data is read (step 2030).

A variety of other mechanical configurations and locations for the head 154 and the strip 150 may be employed to accommodate various tape cassette transport mechanisms. For example, the magnetic strip containing the directory may alternatively be accessed by a magnetic head which moves across the surface of the strip 150 when the cassette 40 is in the recorder 1, for reading or writing information from/to the strip 150.

In the case when the entire directory is stored on the magnetic strip 150 at the point of ejection and read off by the writer/sensor head 154 and into RAM 33 at the point of insertion, once the directory is in RAM 33, the tape is searched, played, recorded as described in the previous examples.

Figure 85A:
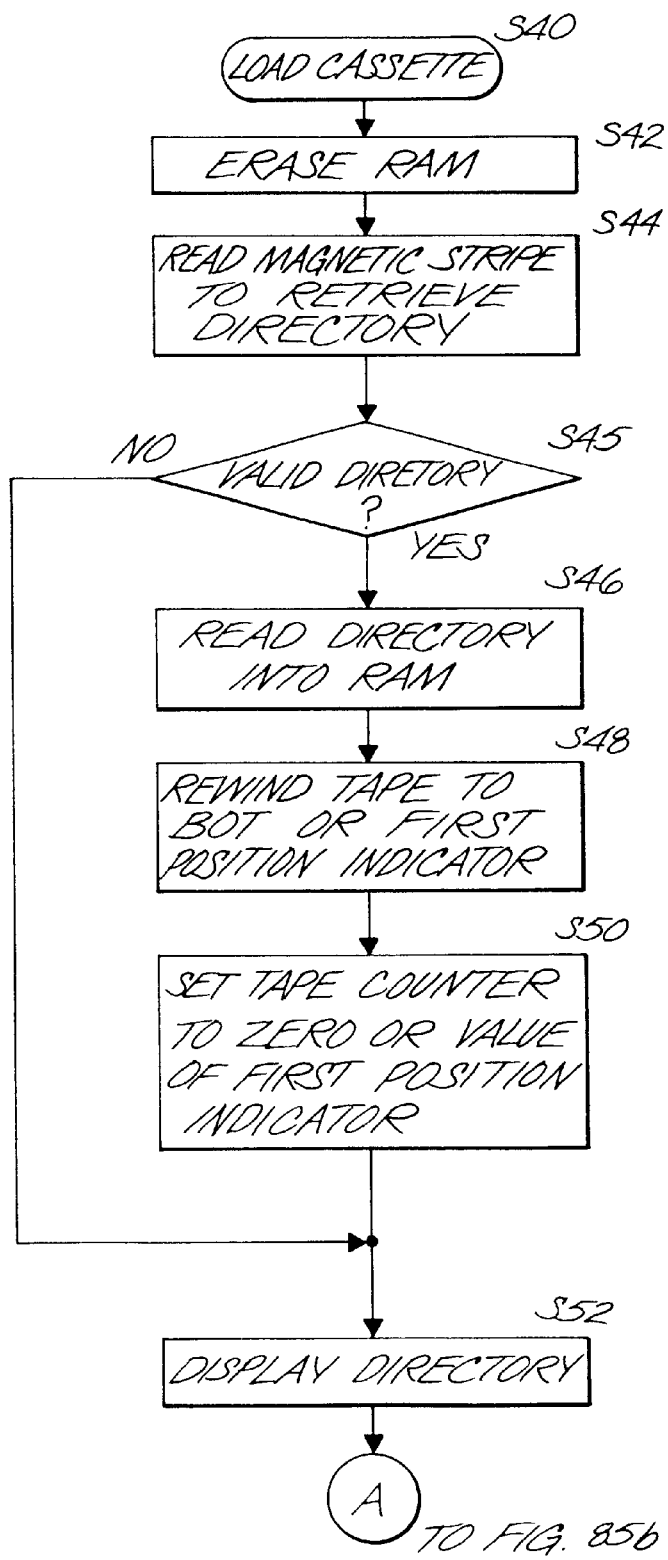
FIGS. 85a and 85b are flow charts illustrating the sequence of operation of the video cassette recorder of FIG. 81 during loading and ejecting a video tape cassette in the video cassette recorder in which the magnetic strip at the edge of the tape cassette contains the latest directory.

Referring now to FIG. 85A, the figure depicts the flow diagram for loading a magnetic cassette with a magnetic strip affixed thereto and which holds the entire directory. During block S40, the cassette is physically inserted into the VCR 1. During block S42, the RAM 33 is cleared of any directory. During block S44, the horizontal or vertical motion (depending on a front loading or top loading VCR model) of the VCR 1 cause a change of magnetic flux generated by the directory on the magnetic strip which is read by the magnetic write/sensor head 154. If no directory exists, then during block S45, the sequence jumps to block S52 to display a blank directory. Otherwise, block S46 is entered and the directory is stored into the RAM 33. The tape is then rewound to the beginning of the tape (BOT) during block S48 and the tape counter is set to zero or the first position indicator in block S50 to correspond to the absolute position of the tape.

Figure 85B:
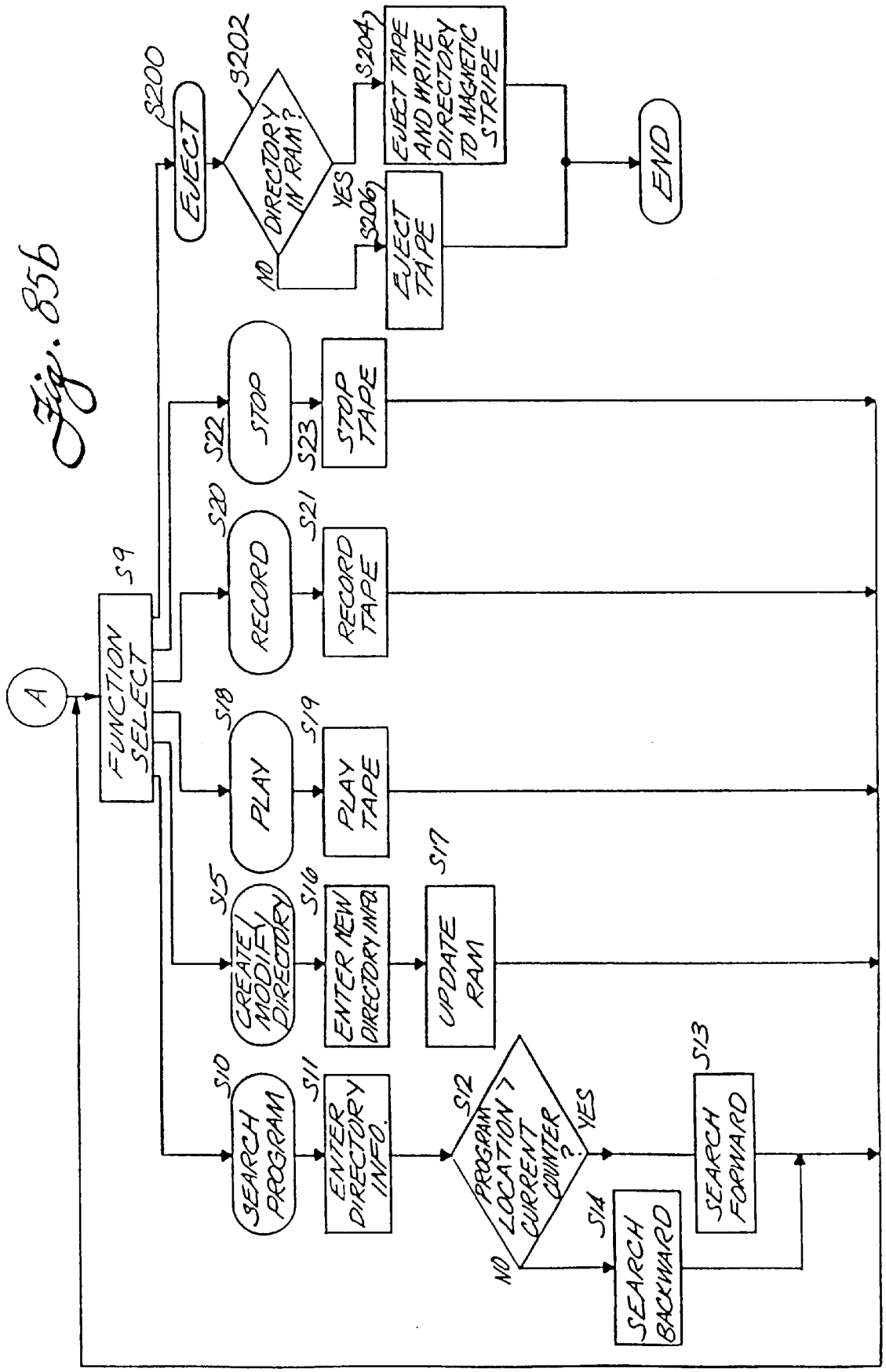

When the tape is ejected the entire directory in RAM 33 is written onto the magnetic strip 150 by the write/sensor head 154 as the cassette moves out of the VCR 1. FIG. 85B depicts the flow diagram for writing the entire directory to the magnetic strip during ejection of cassette when the EJECT button 3e is activated, block S200 is entered. During block S202 the RAM 33 is checked to determine whether a valid directory exists. If no directory exists, then block S206 is entered whereby the cassette is simply ejected. If a directory exists, then during block S204, the cassette is ejected and the directory is recorded on the magnetic strip 150 by the magnetic write/sensor head 154.

Consider briefly the operation of the system of FIGS. 1 and 81 with the directory stored in the control track of the tape. Assume that cassette 40 has a directory recorded in the control track at the beginning of the tape, or at some point along the tape, and which has not been moved in its case since its last ejection is inserted into the VCR 1. At tape insertion, the microprocessor controller 31 and VCR control logic 21 cause the directory to be read from the control track of the tape with the read head 17 and stored into the directory field 33a of the RAM 33. Optionally, the directory is erased from the tape, after reading, with the erase head 15. The VCR counter in the position logic and counter circuit 9 is set to a value corresponding to the CURRENT LOC value found in the directory. The tape is now ready to be read or recorded over in the usual manner. While the cassette is in the VCR 1, the copy of the directory that is stored in the RAM 33 can be deleted, modified or updated.

When the eject button 3e is activated, the microprocessor controller 31, and the VCR control logic circuit 21 causes the current tape location (CURRENT LOC) 1049 in the RAM 33 to be updated with the tape counter value in the position logic and counter circuit 9 and causes the directory in the RAM 33 to be recorded onto the tape at roughly its current position and then causes the tape to be slightly rewound to the beginning of where the directory was recorded on the tape, and then causes the motor and mechanical control 5 to physically eject the cassette 40. In another implementation, the rewind operation of the tape is not performed after recording the directory thereon; however, when the tape is inserted, it is read backward to retrieve the directory.

When a blank cassette tape is loaded or when the user wants to modify or create a program directory, the directory controller 30 prompts the user on the display 32e or the video display 50 for desired input. In a specific embodiment, the input may include the length of the tape, the tape label (volume number), etc. The microprocessor controller 31 then formulates the input to the required format for storage into the RAM directory 33a for recording onto the tape when the tape is ejected.

In the event that the tape has been moved either forward or backward in the cassette from its last ejection position without subjecting the tape to the directory read/write process (such as when the tape is used in a VCR 1 without the present invention), a number of methods may be used to locate the directory. Where only one directory is stored on the tape, such as where the directory is promptly erased after being copied into the RAM memory, one method is to rewind the tape all the way to the beginning of tape (BOT) and then perform a quick search to detect and locate the directory. Alternatively, a marker is written in the control track in close proximity to the directory, whether the directory is recorded in the video fields or in the control track, and is detected during searching to detect the location of the directory as this facilitates searching for the directory. Searching and interpreting data in the control track is much faster than doing so in the video fields.

FIG. 4 depicts the marker 110 adjacent the directory 112 in the control track 42C whereas FIG. 5 depicts the marker 114 in the control track 42C adjacent the directory 116 in the fields of the video frames 42B.

Figure 86A:
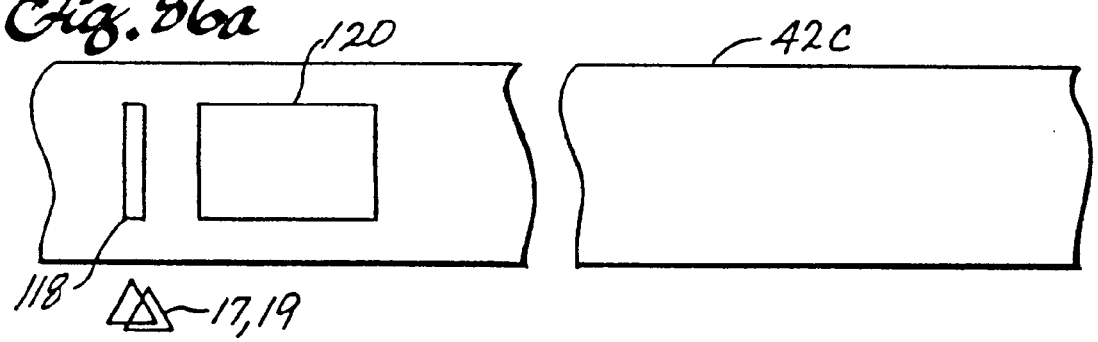
FIG. 86, composed of FIGS. 86a, 86b, 86c and 86d, is a graphical representation of the format of information recorded on the magnetic tape at different stages of operation in the embodiment of the invention depicted in FIG. 1 using 2 markers.
Figure 86B:
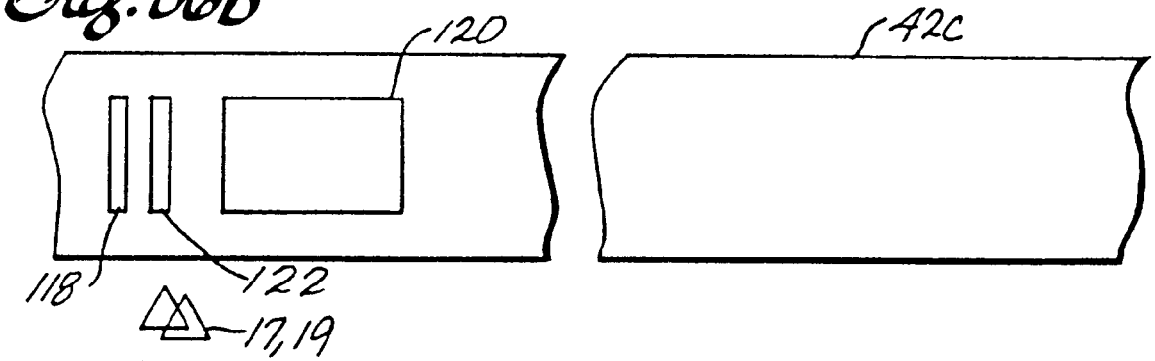
Figure 86C:
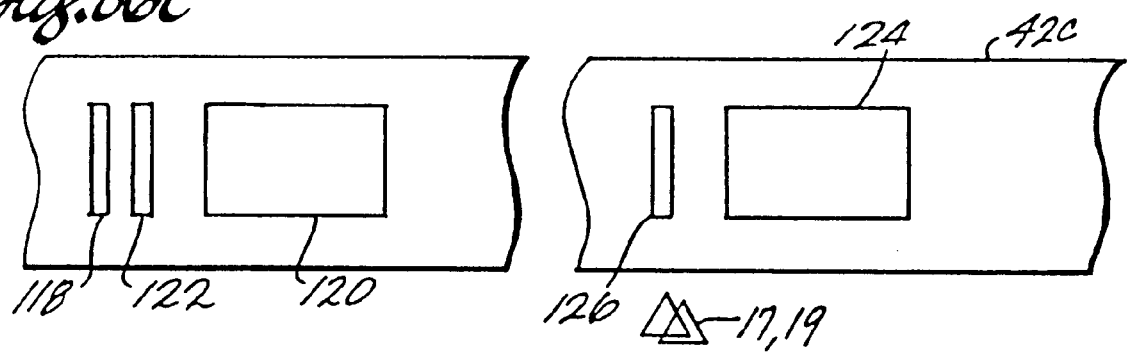
Figure 86D:
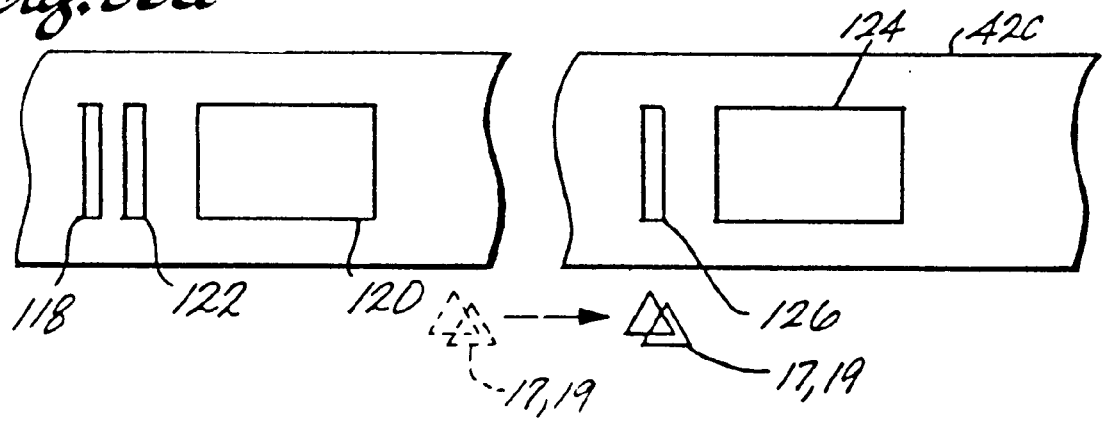
Figure 81A:
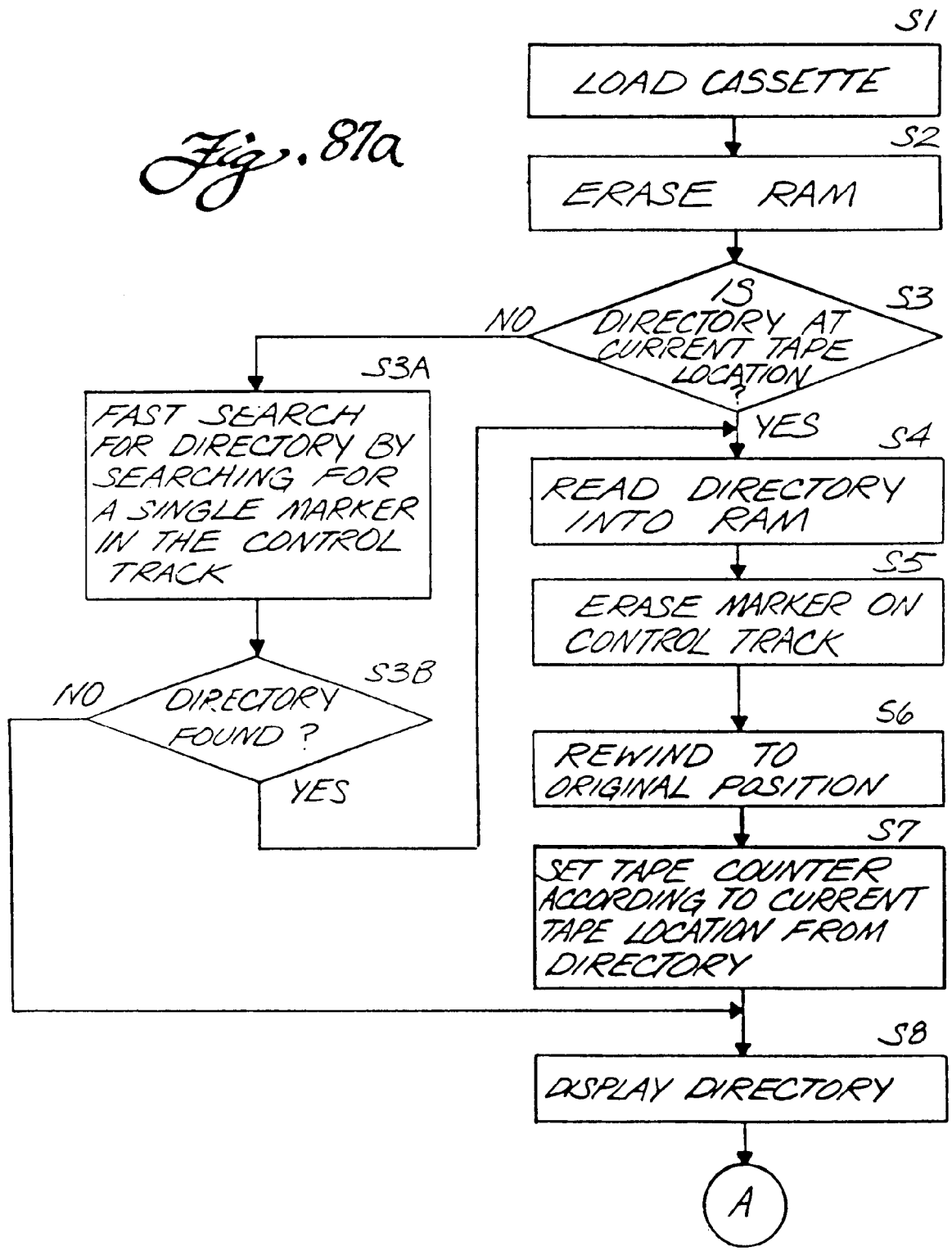

If there is more than one directory stored on the tape and only one is the current directory, two different methods may be used. The first method is depicted in FIGS. 86a–86d. In this method, a marker 118 is recorded in the control track 42C in close proximity to the directory 120, when the directory is first written during the process of ejecting the tape from the VCR 1 (whether in the control track or in the video field) as illustrated in FIG. 86a. When the directory 120 is subsequently read and copied into the RAM memory 33, a second marker 122 is recorded next to the first marker 118 as shown in FIG. 86B. When the cassette is then ejected after the second playing or recording, a new directory 124 is written at a different position on the tape along with a single marker 126 as in FIG. 86C. As a result, if the position of the tape in the cassette has been moved, as indicated by the dashed lines for read/write heads 17, 19 in FIG. 86D, the system merely looks for the directory 124 with the single marker 126, preferably in a high speed search made to reduce access time. When the located directory 124 is subsequently read, a second marker (not shown) is recorded adjacent the marker 126 as described above.

Figure 87B:
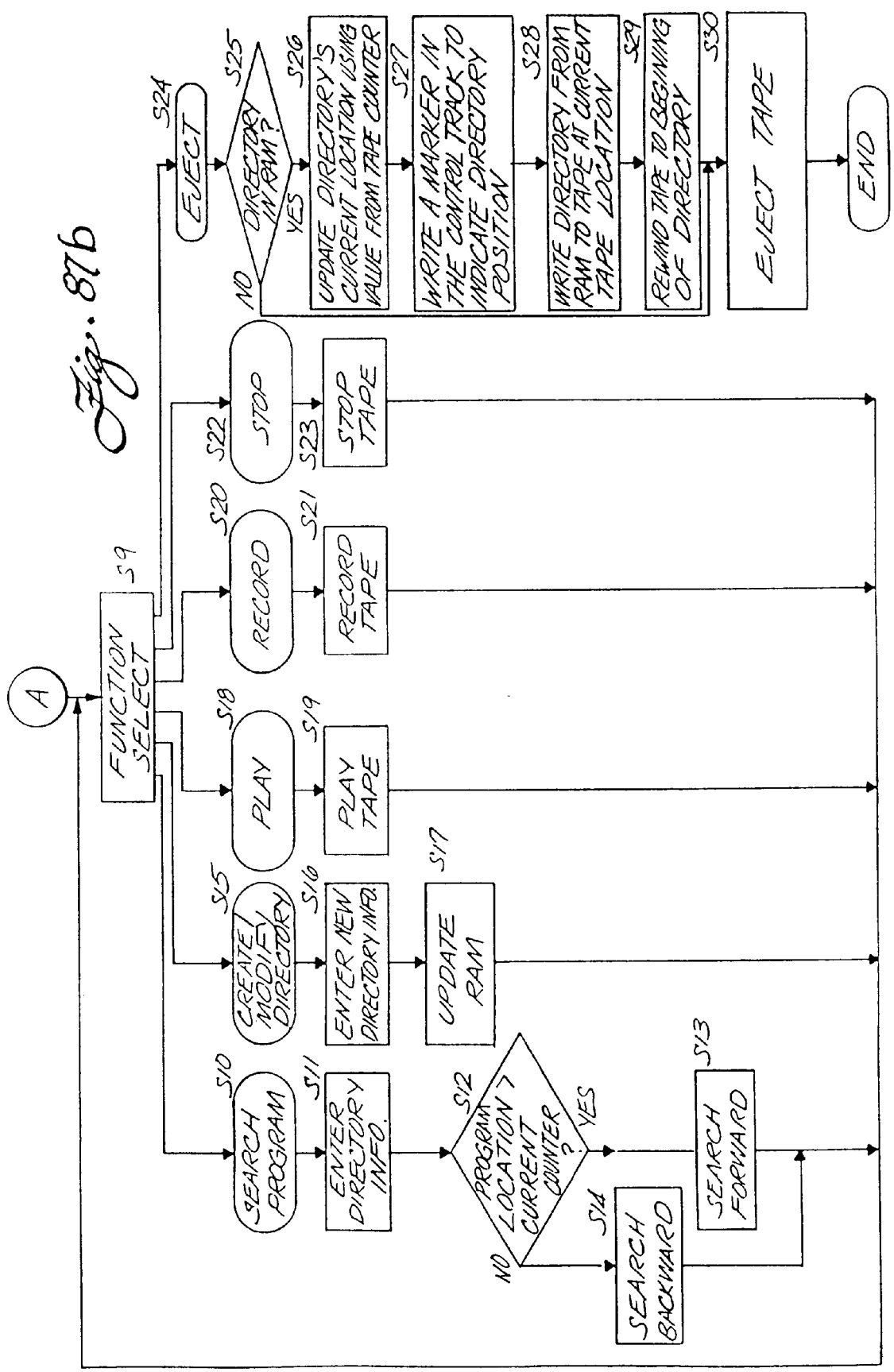

Consider now the details of the operation of the system of FIGS. 1 and 81 in more detail with reference to the method of FIGS. 87a and 87b. Assuming that the single directory marker technique of FIG. 86 is used, a directory is stored in the control track 42c of the tape 42 and that the tape is a previously recorded tape with a directory recorded at the point of last ejection and a number of video programs (or records) previously recorded on the tape.

During block S1, the cassette 40 is inserted into the VCR 1. The VCR 1 loads and mounts the cassette 40 so that tape 42 and the video head drum 13, the tape movement sensor 22, and the read/write/erase heads 17, 19, and 15, respectively, of the audio and control tracks are all in proper place with respect to the tape 42 just before the directory is at an original position.

During block S2, the microprocessor controller 31 causes the VCR 1 to erase the contents of the RAM directory 33a in the RAM memory 33.

During block S3, the microprocessor controller 31, through the VCR control logic circuit 21, enables the motor and mechanical control circuit 5 to start rotating the tape reels 40b and 40c and hence move the tape 42 in a forward direction. The microprocessor controller 31 and the VCR control logic circuit 21 also cause the control and audio track head logic circuit 11 to cause the read head 17 to read the directory from the control track 42c if the directory is there. If the directory is not adjacent the read/write heads 17, 19 at the point of insertion (such as if the tape 42 has been moved in the cassette case), then, during block S3A, the microprocessor controller 31, through the VCR control logic circuit 21 and the motor and mechanical control circuit 5, causes the tape 42 to be rewound to the BOT and fast search the control track 42c for a single marker. If the marker is not found when the end of tape (EOT) is encountered, then, during blocks 58 the microprocessor controller 31 causes a blank directory to be displayed either in the directory display 32e of the directory controller 30 or in the video display 50. On the other hand, if the directory is found as in this case, during block S4, the directory is read into the RAM 33. The marker is erased during block S5. As an alternative, both the directory and the associated mark may be erased from the tape during block S5.

During block S6, the microprocessor controller 31 causes the VCR control logic circuit 21 and the motor and mechanical control circuit 5 to rewind the tape 42 so that the read/write heads 17, 19 are just before the directory. During block S7, the CURRENT LOC value 1049 (see FIG. 2) from the directory is used to set the tape counter in the position logic and counter circuit 9. During block S8, the directory is displayed by the display 32e or by the video display 50 for user viewing, editing or input. The method now enters block S9 (FIG. 87b) and awaits further user instruction. If the PLAY button 3b is activated by the user, processing continues in block S18. During block S19, the VCR 1 records or reads, i.e., plays tape and displays video images on the video screen 50a. If instead the STOP button 3c is activated, then in block S22 the microprocessor controller 31 causes the VCR control logic circuit 21 and the motor and mechanical control circuit 5 to stop the tape 42. The tape does 42 not necessarily stop at the end or beginning of a program.

Block S24 is reached from block S9 when the EJECT button 3e is activated by the user. During block S25, the microprocessor controller 31 ascertains whether a directory 33 exists in the RAM 33. If a directory is not in the RAM 33, then block S30 is processed causing the cassette 40 to be ejected without writing a directory onto the tape 42. This occurs when the tape has no directory and the user does not create one or the user deleted the directory from the RAM 33 through the directory input/output display and control panel 32.

Assume a directory exists in the RAM 33. In block S26, the microprocessor controller 31 causes the CURRENT LOC value 1049 (see FIG. 2) in the RAM 33 to be updated with the current tape location value in the position logic and counter circuit 9. During blocks S27 and S28, the microprocessor controller 31 causes the VCR control logic circuit 21 and the motor and mechanical control circuit 5 to start moving the tape 42 in a forward direction. During block S27, the microprocessor controller 31 causes the VCR control logic circuit 21 and the control and audio track head logic circuit 11 to record a single marker on the control track 42c where the directory is stored on the tape 42. During block S28, the microprocessor controller 31 causes the directory from the RAM 33 to be recorded onto the control track 42c of the tape 42 in close proximity to the marker. During block S29, the microprocessor controller 31 causes the control and audio track head logic circuit 11 and the motor and mechanical control circuit 5 to rewind slightly to a position before the directory. Thereafter during block S30, the microprocessor controller 31 causes the motor and mechanical control circuit 5 to eject the cassette tape 40 from the VCR 1.

Next, consider the operation of the system of FIGS. 1 and 81 where the ejected tape of the previous example is reinserted into the VCR 1 without disturbing the tape location in its cassette case, and the user starts to search for a particular program on the tape 42. The same method as in the previous example is used except that the VCR 1 under control of the microprocessor controller 31 reads the directory off the tape at the position where the tape is inserted, and no searching of the tape for the directory is necessary.

The operation sequence enters block S9 (FIG. 87B) after the tape cassette is loaded and awaits a function selection. The program enters block S10 when the user actuates the function SEARCH button 32b. During block S11, under control of the microprocessor controller 31, information is displayed on either the directory display 32e or the video display 50 which prompts the user to input on the keyboard 32a the name of the program or optionally, a program number on which to search. During block S12, the microprocessor controller 31 compares the value of the current tape location counter 1049 (see FIG. 3) with the program location value LOC from the RAM 33 for the program input by the user. If the program is located ahead on the tape, the microprocessor controller 31 causes the VCR control logic circuit 21 and the motor and mechanical control circuit 5 to advance the tape 42 to the desired location during block S13. Otherwise, if the program is already past the current location, then the microprocessor controller 31 causes the VCR control logic circuit 21 and the motor and mechanical control circuit 5 to rewind the tape 42 to the desired location during block S14 following which the program is read and is displayed on the screen 50a.

Referring now to FIG. 1, in another embodiment, the VBI portion of the video frames 42b (see FIGS. 5–6) can be used for providing address marks on the tape. In one implementation, when a cassette is inserted for the first time into a recorder embodying this invention, it is rewound to the beginning, and the tape counter is then reset to zero. When a VBI is encountered during the recording of a program, the value of the tape counter is registered. This tape counter value is then written in one of the free spaces (such as line 20) among the VBI portion of the broadcast signals recorded onto the tape.

The tape counter value can be written on the control track as in the VHS Address Search System (VASS). Alternatively, according to one aspect of this invention, it can be written onto the video frame 42b (see FIGS. 4, 5); and the VBI decoder 60a can thereby be used advantageously to both decode the program name and the address mark.

If address marks are stored in the VBI portion of the cassette tape, the search operation can be performed by obtaining the difference between the current address mark and the address mark of the target program. If the address marks are written onto the video frame as previously disclosed, the VCR control logic circuit 21 can obtain their values through the VBI decoder 60a (see FIG. 1). The difference between the current address mark and the address mark of the target program is then set into the position logic and counter circuit 9 (see. FIG. 1). Depending on the sign of the subtraction, either a fast forward or a fast rewind operation is then performed. When the tape counter reaches zero, the fast forward or the fast rewind operation is stopped and a PLAY operation is initiated to start playing the tape.

In an alternate implementation, each program is accompanied by a cue signal, preferably at either the beginning or the end of the program. Each recorded program is addressed by its relative position on the tape, in other words, the number of cue signals which the VCR would encounter in reaching the program from a predefined tape position. Assuming, for illustration, that the tape is positioned between the third program and fourth program, a target program, say, the seventh program, can be accessed by moving the tape fast forward until four cue signals are encountered. Furthermore, under this implementation, the cue signal may encode an identifier identifying the program.

Next consider the operation of the system of FIG. 1 where either a blank tape cassette or a prerecorded tape cassette with no directory is inserted into the VCR 1. The directory controller 30 is equipped to either play the tape as a regular tape or to allow the user to create a directory on the tape.

Referring again to FIGS. 87A and 87B, the cassette is loaded into the VCR 1 during block S1. The microprocessor controller 31 erases the directory 33a portion of the RAM 33 of any remnant directory from the last tape during block S2. During block S3, the microprocessor controller 31 causes the VCR control logic circuit 21, the motor and mechanical control circuit 5, and the control and audio track head logic circuit 11 to advance and read the tape to determine whether a directory exists on the control track 42c at the current tape location. If no directory exists on the tape at the point of insertion, the program enters block S3A during which time the tape is searched for a directory and if none are found, a blank directory is displayed and the sequence enters block S9 (FIG. 87b) where the microprocessor controller 31 awaits function selections.

When the user actuates the MODIFY button 32c, the program enters block S15 and then block S16. During block S16, the microprocessor controller 31 causes the user to be prompted on the display 32e to enter a program name and/or program number, program location and program length (an entry) through the keyboard 32a. Alternatively, the prompt can appear on the display 50 and one of the titling methods described below can be used. During block S17, an entry is processed by the microprocessor controller 31 to form an entry for the directory, and the resultant entry is then stored into the directory 33a of the RAM 33. The program then returns to block S9 to wait for a further function selection.

Figure 88A:
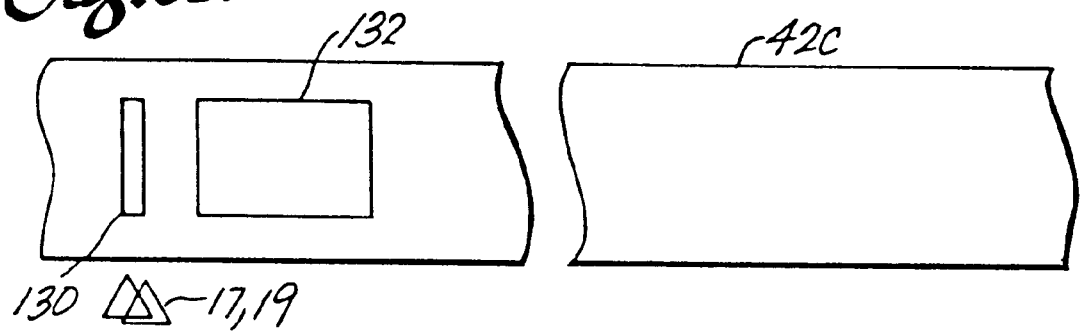
FIG. 88, composed of FIGS. 88a, 88b, 88c and 88d, is a graphical representation of the format of information recorded on the magnetic tape at different stages of operation in the embodiment of the inventions depicted in FIG. 1 using one marker.
Figure 88B:
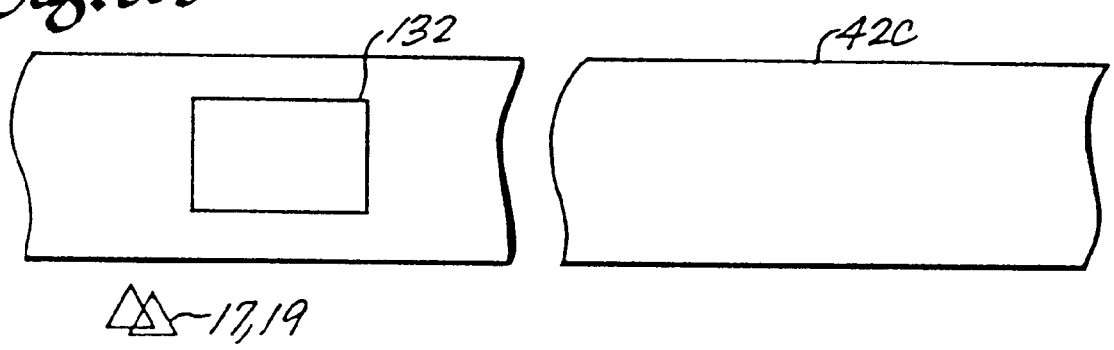
Figure 88C:
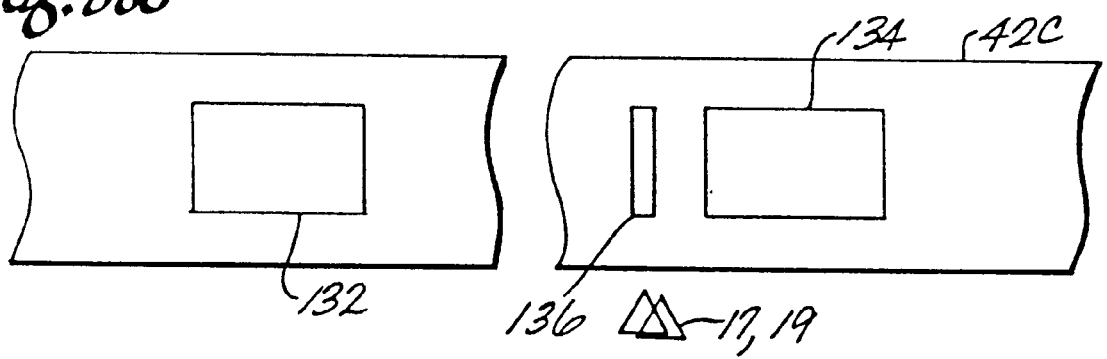
Figure 88D:
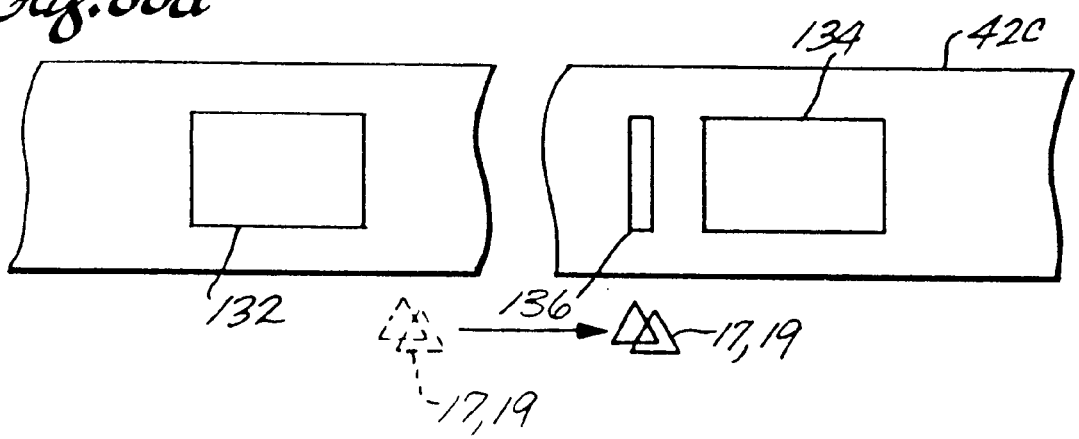

Alternatively, as depicted in FIG. 88, a marker 130 is recorded on the control track 42C next to a directory 132 whenever a new directory is created as shown in FIG. 88a. But, unlike the previous method, when the directory 132 is searched and copied into the RAM 33, the marker 130 is erased as shown in FIG. 88b. When a second new directory 134 is created, a marker 136 is recorded as in FIG. 88c. So even though there is more than one directory on the tape, and the tape has been moved in the cassette as indicated by the dashed illustration of the read/write heads 17, 19 in FIG. 88d, only the current directory 134 has a marker 136 associated with it for detection and location of such current directory.

To be discussed, in the embodiment of the invention depicted in FIG. 81, the location on the tape of the valid directory (i.e. the location of the tape at the point of ejection) is recorded on a store or a storage medium, for example a magnetic strip 150. The magnetic strip can be affixed at any side of the cassette, if that side would be moved relative to a fixed point in the VCR during loading and eject operations. However, since the mechanism for raising and lowering a cassette is on the sides of the opening, the magnetic strip is preferably affixed to either the top or the back side of the tape cassette 40, and the data (i.e. the location of the tape) is recorded by a magnetic write/sensor head 154 using the physical movement of the cassette load/eject drive mechanism to cause changes in magnetic flux detectable by the magnetic write/sensor head 154. Load/eject drive mechanisms are well known in the art as they are part of most VCRs. The physical cassette movement typically involves a horizontal movement and a vertical movement for a VCR using either front loading or top loading as shown in FIGS. 74 and 75, respectively. When the tape cassette is inserted into the VCR 1, the magnetic write/sensor head 154 reads off the location information from the magnetic strip to allow easy searching and locating of the valid directory.

Figure 89:
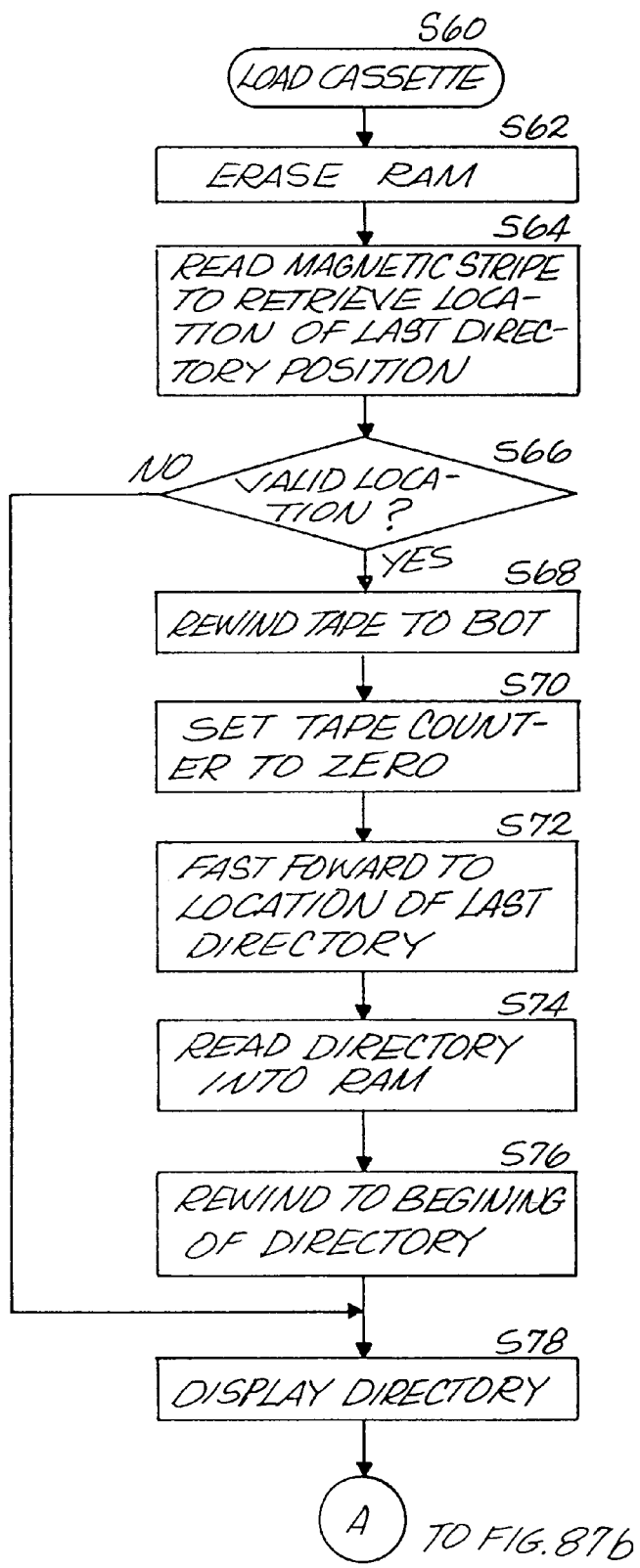
FIG. 89 is a flow chart which in combination with the flow chart of FIG. 87b illustrates the sequence of operation of the video cassette recorder of FIG. 81 in which the magnetic strip at the edge of the tape cassette contains the location of the latest directory.

Consider the embodiment of FIG. 81 where the location of the latest or valid directory on the tape is stored on the magnetic strip 150 at the time of ejection. The location of the latest directory is read off the strip 150 by the magnetic write/sensor 154 into the RAM 33 at reinsertion as a result of a change of magnetic flux caused by the horizontal or vertical movement of the tape cassette 40 with respect to the magnetic write/sensor 154. The use of the directory location information is only necessary if the tape has been moved in its cassette case such that when the tape is inserted, the directory cannot be immediately read off from the tape at the point of insertion. FIG. 89 depicts how the directory location information is used to facilitate searching for the valid directory, where the tape addresses include a position indicator which indicate position along the tape from the BOT. During block S60, the tape cassette 40 is inserted into the VCR 1. During block S62, any directory in the RAM 33 is cleared. During block S64, the encoded directory location information is read off by the magnetic write/sensor head 154 as the magnetic strip 150 moves across the head. If the location read is not a valid location, then block S78 is entered to display a blank directory. Otherwise, the tape is rewound to BOT or to the first position indicator, if any, during block S68 to ascertain its absolute location. During block S70, the position logic and counter circuit 9 is set to a value corresponding to the BOT or the value of the position indicator. The tape is then fast forwarded to the directory location during block S72 and the content of the directory is then read into the RAM 33 during block S74 and displayed during block S76.

In the above embodiments, locations of programs recorded on the tape are identified as a function of address marks written at predetermined space intervals on the tape as a value of a tape reel counter at each of said predetermined space intervals.

In another embodiment, the tape is not address-marked at predetermined space intervals. Instead, each addressable recorded program is associated with a cue signal located at a predetermined location (i.e. either the start or the end) of the program. The cue signal can be written on one of the tracks of the tape, but preferably on the control track, by modifying the duty cycle of the synchronization pulse. Under this addressing system, a program is addressed by the order of its position relative to other programs recorded on the tape, for example, the first program has an address of 1 and the second program has an address of 2, etc. A counter is kept by the microprocessor controller 31 for tracking the position of the tape; for example, when the tape is positioned between the cue signals of the third program and the fourth program, the counter would contain a value of "3". To access a particular program, the difference between the program's address and the counter value is determined. Depending on sign of the difference, the tape is moved either forward or backward until the corresponding number of cue signals are encountered.

Title Editing

Titles can be created and edited by a user before addition to the directory using the apparatus and methods described below and in FIGS. 1 and 90–91. Referring to FIG. 1, a jog shuttle knob 3*f*, as is well-known in the art, can be used to rapidly advance the tape in the direction in which the knob is turned. Usually the knob has a center detent position which causes the display 50 to display a still frame of the video data on the tape directly over the read/write head 17, 19. The jog shuttle knob 3*f* is found on many professional-quality video cassette recorders, and is now available on some devices intended for the home market. An exemplary recorder with a jog shuttle knob 3*f* is the Sony model SLV-373UC video cassette recorder, commercially available from Sony corporation. Essentially, the jog shuttle knob 3*f* replaces the traditional fast forward and rewind controls on a VCR, and further enables slow-motion playback and rewinding, and still-frame viewing. As indicated, the jog shuttle knob 3*f* is coupled to the VCR control logic 21 using means known in the art.

Figure 90A:
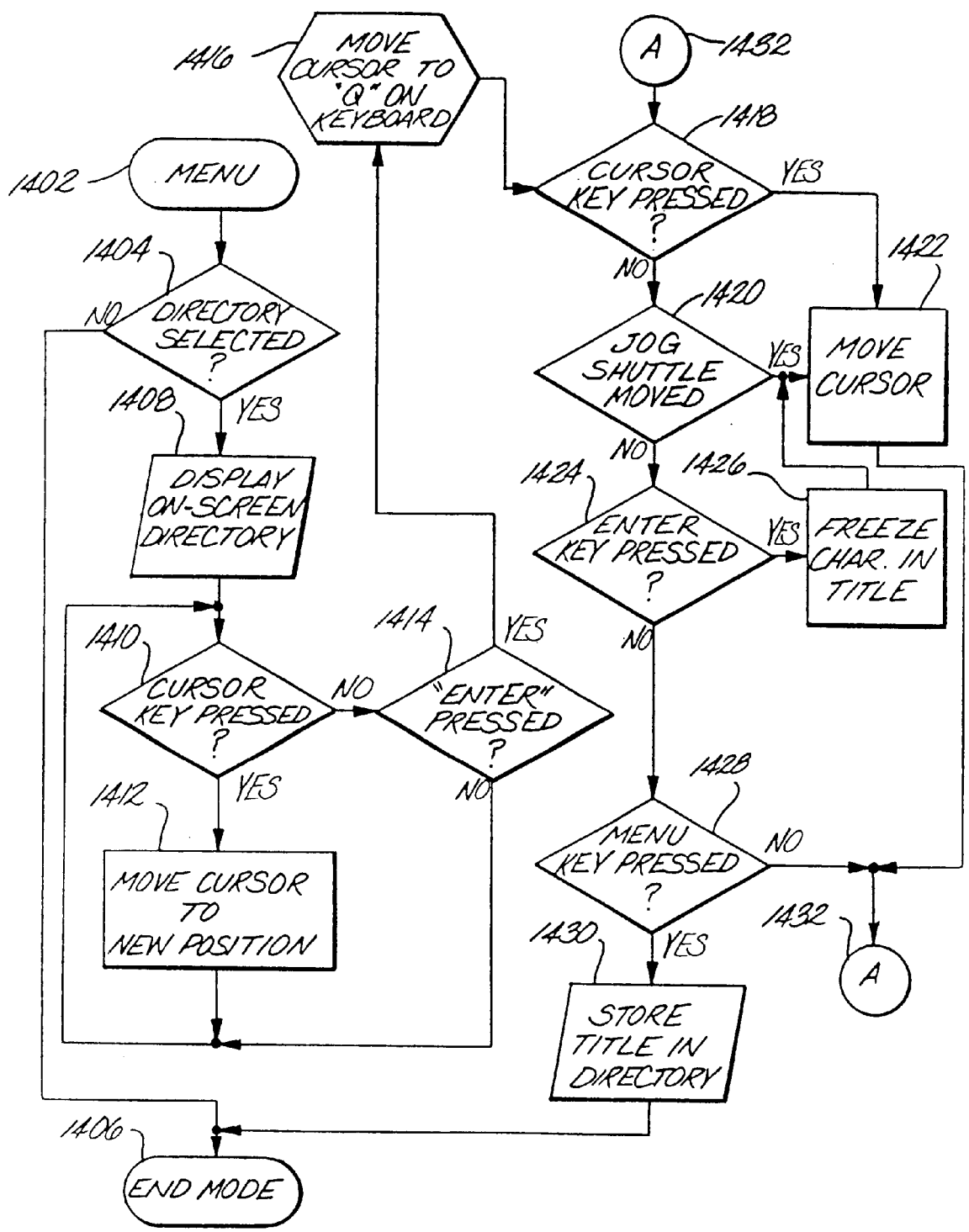
FIG. 90a is a flow diagram of a keyboard character entry titling method.
Figure 906:
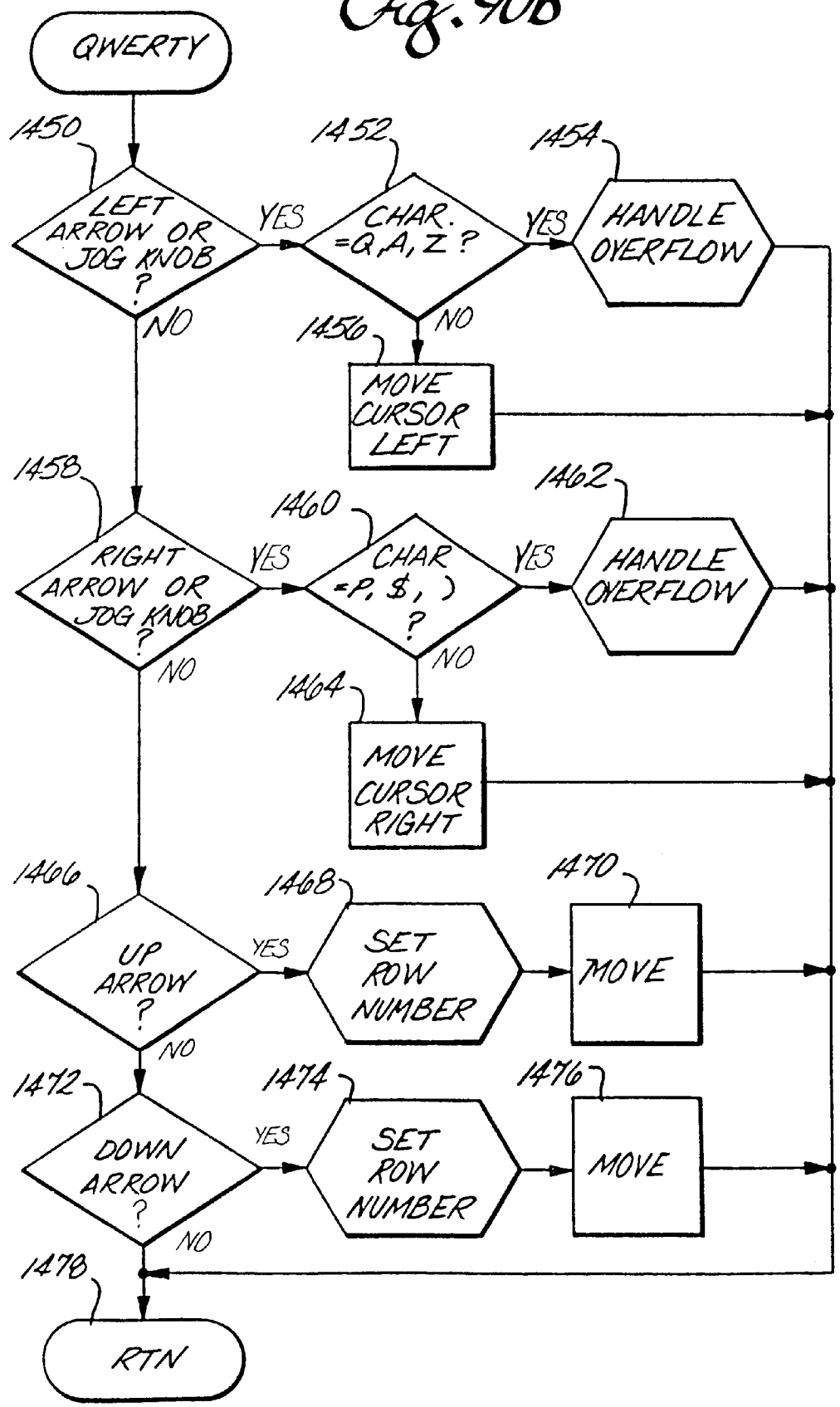
Figure 90C:
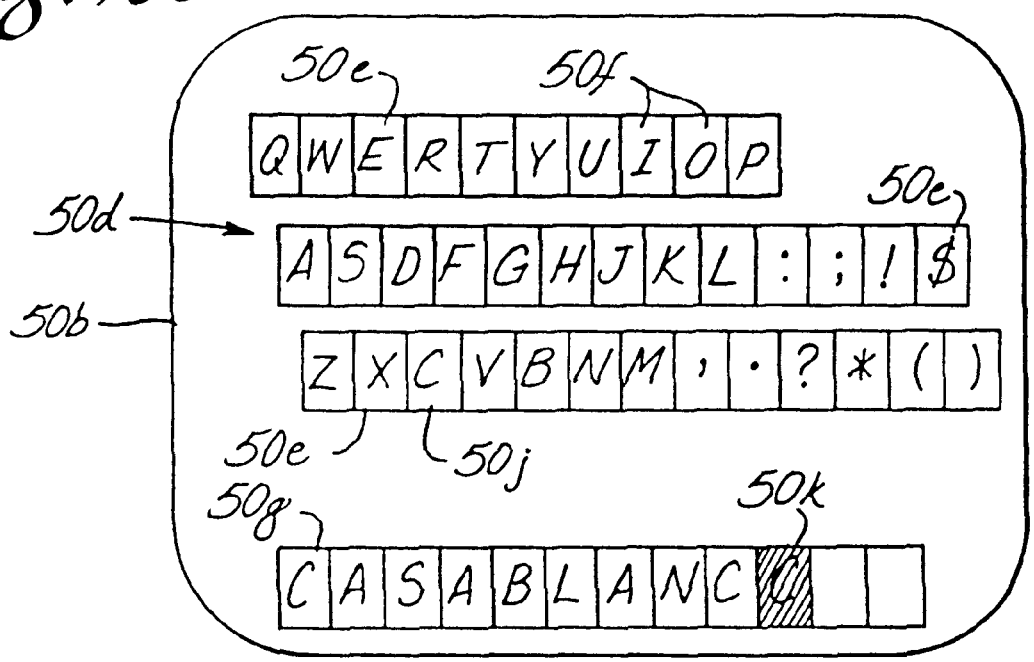
FIG. 90c is a diagram of a keyboard-mode title display.
Figure 91B:
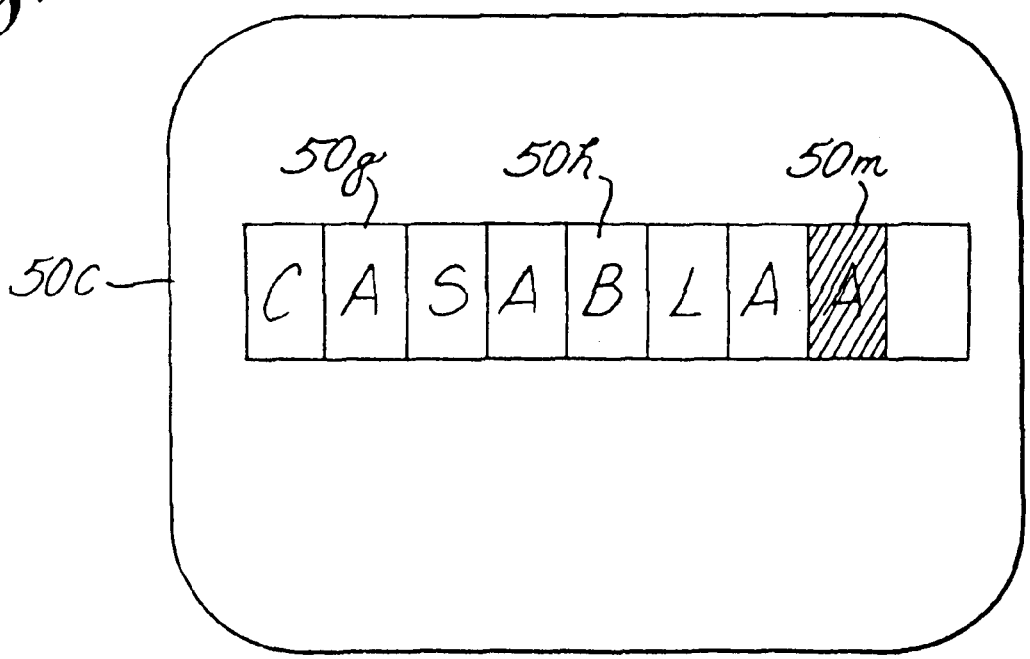
FIG. 91b is a diagram of a scroll-mode title display.

The remote shuttle control 1300, the character generator 23, and a control program 33*b* stored in the directory controller 30 can be used to create video titles for the program directory. In one embodiment, the methods of FIGS. 91A, 91B are used in connection with an on-screen video display shown in FIG. 90C. The steps shown in FIGS. 90A, 90B are invoked when the system enters steps S11 or S16 of FIG. 87B, step S78 of FIG. 89, step S52 of FIG. 85A, or steps S11, S16 of FIG. 88B. Upon entry of these steps, the system is placed under the control of a stored program coupled to the microprocessor controller 31 containing instructions to implement the steps of FIG. 90A. A menu is displayed at step 1402 and control is passed to step 1404 in which the system tests whether the directory display has been selected. If not, control is passed to step 1406 and the data-entry mode of FIG. 90A is terminated.

Otherwise, control passes to step 1408 in which the directory display 32*e* is shown on the video screen from the caption data sent to the directory during or immediately before the display of the directory. Thus, the caption data immediately appears in the directory display. The user then may edit the caption to adjust it as desired. The display may take the form of FIG. 90C, comprising a representation of an alphabetic keyboard 50*b* in the upper portion of the screen, and a video title 50*g* in the lower portion. The keyboard representation 50*d* resembles a standard QWERTY-style typewriter keyboard. A plurality of rows 50*e* are displayed, each including a plurality of single characters 50*f*. The characters 50*f* match the labels of the standard typewriter keys in a QWERTY-layout keyboard. Initially, the title 50*g* is entirely blank. If desired, the character spaces available for filling with a title can be represented by adjacent squares or rectangles as shown in FIG. 90C.

Control is passed to step 1410 in which the system waits until a key is pressed on the remote control unit 1300. If a cursor key 1305 if pressed, control is passed to step 1412 and the on-screen cursor is moved to a new location. Otherwise, the control is passed to step 1414 in which the system tests whether the enter button 1303 has been pressed. If so, control is passed to step 1416 and the cursor is moved to the character "Q" in the first row 50*e* of the keyboard representation 50*d*. Control is passed to step 1418 in which the system tests whether a cursor key 1305 has been pressed. If so, control is passed to step 1422 and the cursor is moved to the next character in the keyboard representation 50*d*. If desired, the current character can be highlighted or shown in reverse video, as indicated by the character "C" at 50*j*. Otherwise, control is passed to step 1420 and the system tests whether the jog shuttle knob 3*f* has been moved. If so, control is passed to step 1422 to move the cursor. Otherwise, control is passed to step 1424 and the system tests whether the enter key 1303 has been pressed. If so, the user is indicating that the current highlighted character 50*j* is desired to be entered in the current character 50*k* of the title 50*g*. Therefore, the control is passed to step 1426 in which the character 50*j* is copied to location 50*k* and "frozen" in place by displaying it in normal video. Control is then passed to step 1422, to advance the character position cursor 50*k* to the next position.

Otherwise, control is passed to step 1428 and the system tests whether the menu button 1304 has been pressed. If not, control is passed back to step 1418. If so, the user has indicated that the displayed title is complete and the user wishes to save the title in the directory. Therefore, control is passed to step 1430 in which the title shown at 50*g* is copied into one of the program title locations in the directory controller RAM 33. Control is passed to step 1406, thereby ending entry of a title.

FIG. 90B illustrates a method for advancing a keyboard representation cursor such as that shown at position 50*j*. Since the entire keyboard 50*d* is represented as a plurality of rows 50*e*, a command (using the cursor keys or jog shuttle knob) to advance the cursor requires special processing at the end of each row. For example, in step 1450 the system tests whether the left arrow cursor key has been pressed or the jog shuttle knob has been moved to the left. If so, the next task (step 1452) is to test whether the current character position is at the far left end of one of the rows 50*e*, i.e., whether the current character is Q, A, or Z. If so, control is passed to step 1454 in which the system handles the overflow condition by taking one of a plurality of possible steps. If desired, the system can simply do nothing, causing the cursor to freeze at the left end of the row. Alternatively, the cursor can jump to the far right end of the same row. For example, if the current character is "Q" and the user presses the left arrow cursor key, the cursor could jump to the letter "P" at the far end of the row. Further, the method could cause the cursor to jump to the end of the previous row, with "wrap around" if desired. Thus, if the cursor is on the letter "A" and the user presses the left arrow, the cursor can jump to the letter "P" on the row above. Any of these steps can be taken in step 1454. Otherwise, if the current cursor position is in the middle of a row, control is passed to step 1456 and the cursor is moved to the left.

A similar series of steps 1458, 1460, 1462, 1464 handles movement of the cursor to the right. In this case, overflow at step 1462 can result in freezing the cursor, moving it to the next row, etc.

As shown in steps 1466 to 1476, similar processing can be conducted for the "up" and "down" arrow cursor keys. Wrap around can be implemented. For example, when the "up" arrow button is pressed and the cursor is currently on the first row 50e, the cursor can be made to jump to the third row.

As is known in the art, the keyboard representation 50d can be created by commanding the character generator circuit 23 to output a particular character at a particular screen position. Thus, the microprocessor controller 31 can command the VCR control logic circuit 21 to "write" a character on the screen by providing an ASCII code for a character and coordinates of the desired screen position. The VCR control logic circuit 21 passes these parameters to the character generator 23 with a command signal. The character generator 23 receives the parameter data, retrieves a character bit map from the character ROM 25, and returns the appropriate display information to the VCR control logic circuit 21. The VCR control logic circuit 21 inserts the character information into the output video signal and sends it to the video display 50a. This step for commanding a character generator to output video characters to a display is known in the art.

Using the above steps, the jog shuttle remote can serve as a rapid data-entry unit to facilitate a quick selection of characters for a video program title.

An alternate method for creating video titles is shown in FIGS. 91A and 91B. Steps 1502–1508 are the same as steps 1404–1412 of FIG. 90A. When step 1404 is reached, the display shown in FIG. 91B is placed on the video screen 50a by the character generator unit 23.

As shown in FIG. 91B, a "scrollable" display 50c can comprise one or more title lines 50g, each comprising a plurality of characters 50h. During entry of a title, one of the characters 50h may be highlighted as designated by 50m. The highlighted characters is referred to as the "cursor position" of the title.

When a new title is being entered, after the display of FIG. 91B is shown, control is passed to step 1510 of FIG. 91A. The cursor 50m is moved to the first (leftmost) position of the on-screen title. Control is next passed to step 1512 to display the current character at that location. Initially, the current character will be "A", which will appear in the leftmost position of the title. Control is passed to step 1514 in which the system tests whether an arrow button or the jog shuttle knob has been moved. If so, control is passed to step 1516. If the current character is "Z" or "A", special processing is required. If the current character is "Z", and the right button was pressed, then the cursor is changed to "A". Likewise, if the current character is "A", and the left button is pressed, the current cursor changes to "Z". These steps are effected in step 1518. Otherwise, control is passed to step 1520 in which the current character is incremented or decremented depending on whether the left or right buttons (or jog shuttle knob) have been pressed. Thereafter, control is passed to step 1512 to display the current cursor. In real time, the user sees the character at the current cursor position rapidly change from "A" through each letter of the alphabet as long as an arrow button or the jog shuttle knob is being operated.

If an arrow button or the jog shuttle knob is not in operation, control is passed to step 1522 and the system tests whether the "enter" button 1303 has been pressed. If so, the user desires to freeze and save the current character. Therefore, control is passed to step 1524 in which the current displayed character (and the remainder of the title) are saved in a memory location coupled to the microprocessor controller. The cursor is then advanced to the next available cursor position, if any, as indicated in step 1525. After the cursor is advanced, the current character at that position is displayed; as indicated above, this will be the letter "A".

If "ENTER" has not been pressed, control is passed to step 1526, in which the system tests whether the menu button 1304 has been pressed. If not, control is passed back to step 1512. If so, the user desires to save the entire title. Therefore, control is passed to step 1528 in which the entire displayed title is saved into one of the program title locations of the directory 33a in the RAM 33. Entry of a title is then complete and control terminates at step 1530.

Thus, using the method of FIG. 91A, rapid entry of video titles is possible. Each character position is handled seriatim, with the cursor passing from character to character until completion. At each character position, the display initially shows the letter "A", and then rapidly advances through the alphabet as the arrow buttons or jog shuttle knob are operated.

If no title is detected from the broadcast signals and if no title is entered by a user, then a default title is inserted into the directory. The default title may include such information as the channel from which the program is received, the date and time the program is recorded, and so forth.

As an optional embodiment, a field, hereinafter referred to as a "program category" is also provided. The program category identifies the kind, such as whether the corresponding program is a sport program, a movie, a talk show, and so forth. The availability of this program category field further facilitates selection of recorded programs and operation of the VCR. The program category can be entered in the same way as a title. This is, the program category can be transmitted during the VBI portion of the broadcast video signal, and decoded by means of special decoding circuitry; alternatively, it can be entered by means of a jog as described above.

Insertion of the cassette, as used herein, includes the manual insertion of the cassette into any mechanical tape carriage in the VCR as well as any movement by the VCR of the cassette on the carriage into a reading position adjacent heads 13, 15, 17 and 19.

Figure 93A:
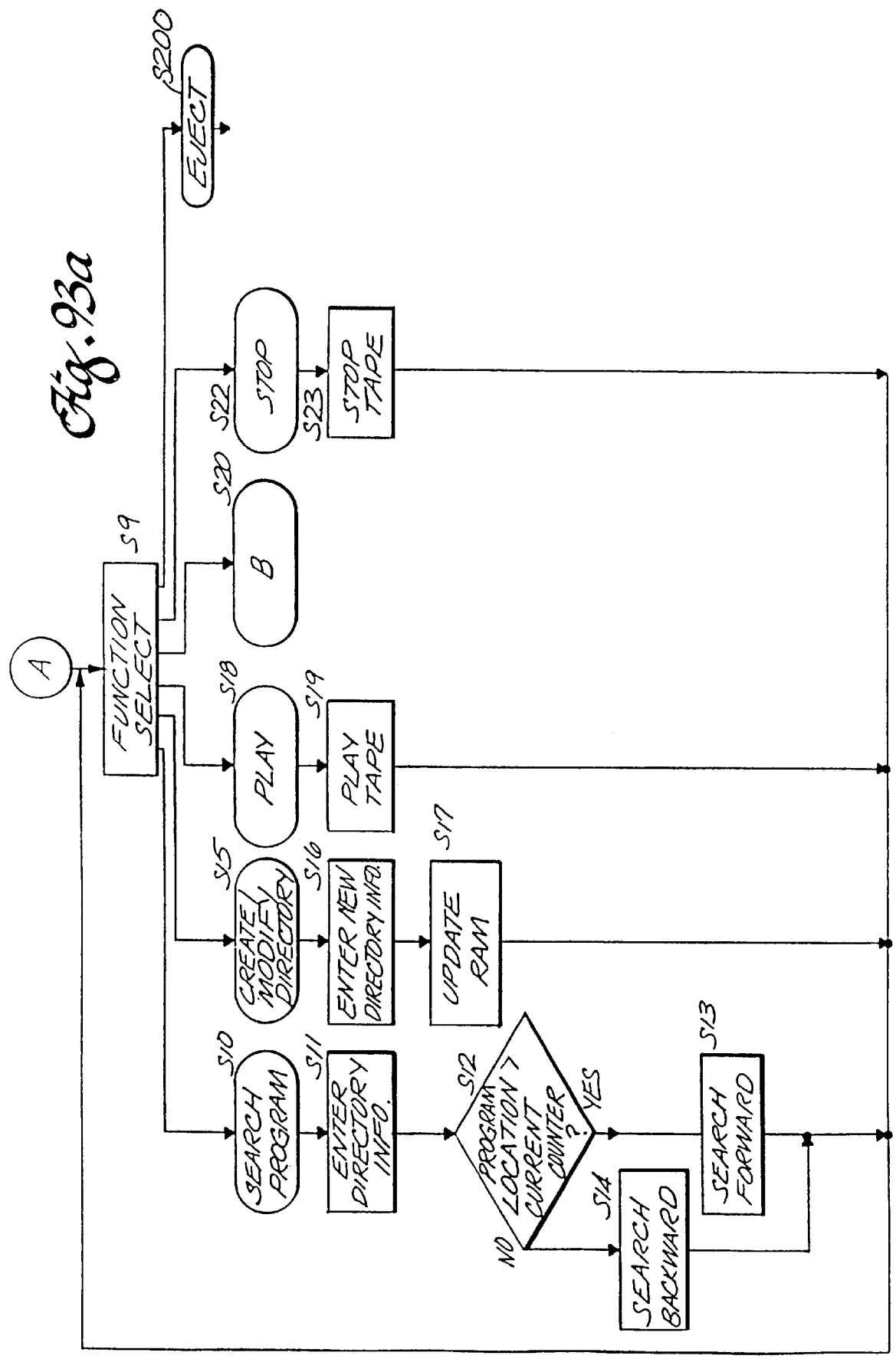
FIGS. 93a and 93b are flow charts that are counterparts to FIGS. 92a and 92b for a system which has a moving head or a semiconductor memory.
Figure 93B:
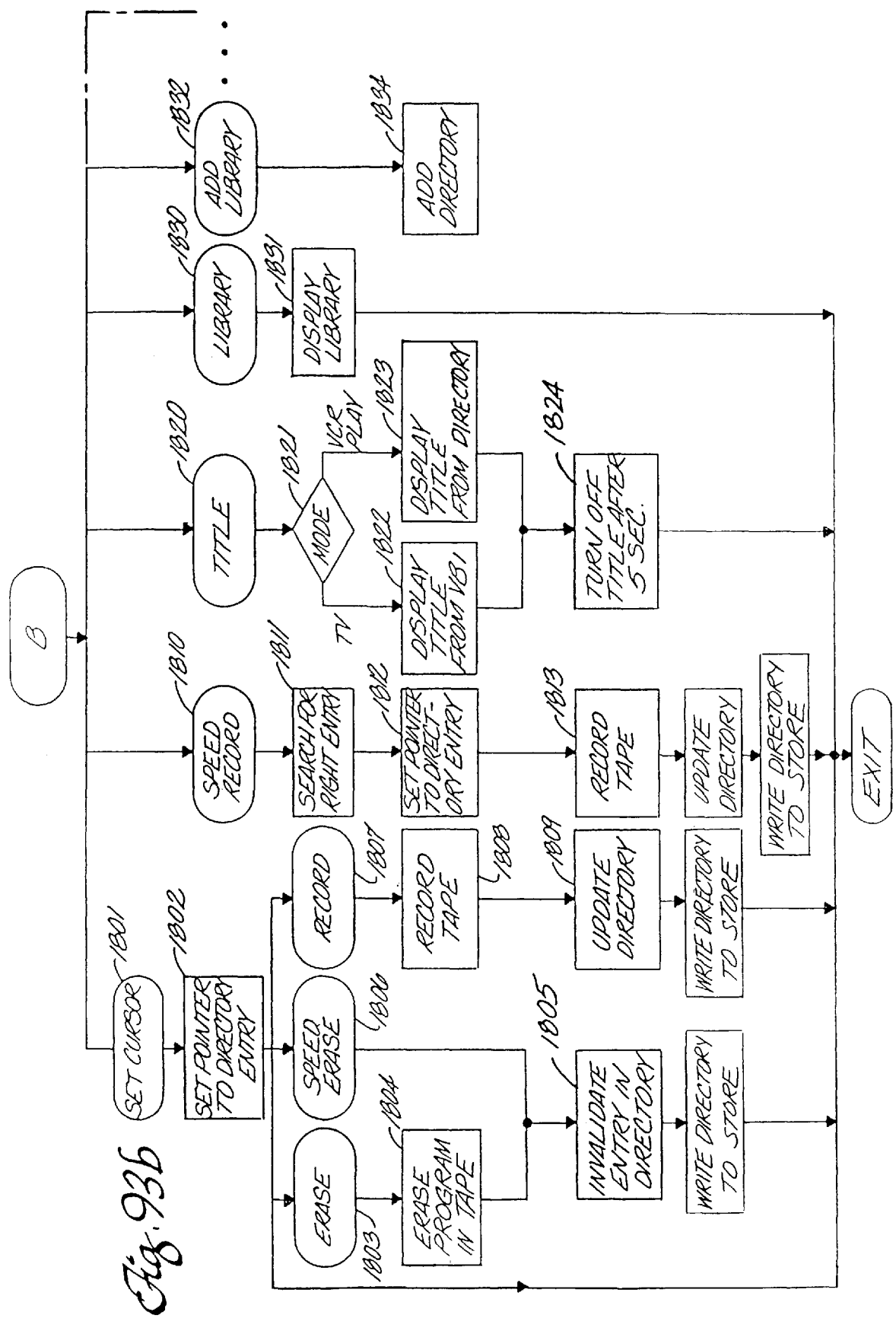

The flow chart in FIGS. 92a, 92b show additional options that are provided to a user when a directory is available. FIGS. 92a–92b are steps that specifically relate to a system which uses a stationary head to access directory information from a magnetic strip. Counterpart flow charts for a system which has a moving head or a semiconductor memory are shown in FIGS. 93a and 93b. When the user actuates the cursor movement keys, step 1801 is entered. A pointer is provided in the microprocessor controller 31 to point to the directory 33a at the entry (or a field within an entry) identified by the cursor; when the cursor movement keys are actuated, this pointer moves correspondingly (step 1802).

If the ERASE button is then actuated (step 1803), the directory controller 30 will use the information from the directory 33a to locate the program and erase that program from the tape 42 (step 1804). After the program is erased, the directory 33a in the RAM 33 is updated (step 1805) to show that the entry is empty or available for recording a new program. For a moving head or semiconductor memory system the strip or the semiconductor memory ("store") can be updated then.

In addition to the normal erase operation described hereinabove, the directory controller 30 allows a user to "speed erase" a program. When this operation is initiated, by actuation (step 1806) a "SPEED ERASE" key, the directory controller 30 simply invalidates the corresponding entry in the directory 33a without actually performing an erase operation on the tape 42 (step 1805). For a moving head or semiconductor memory system the secondary store can be updated.

The invalidation of step 1805 can be performed, for example, by setting an "invalidate" bit stored with the entry.

A recording operation can be performed in two different modes. According to the first mode, the cursor is moved to select an entry from the directory 33*a*. After the entry is selected, if a recording operation is initiated from the keyboard (step 1807), the directory controller 30 will record the program on the tape portion corresponding to the selected entry (step 1808). After the program is recorded on tape, the directory 33*a* is updated (step 1809). For a moving head or semiconductor memory system, the store can be updated then.

The second mode of operation is initiated when the user actuates (step 1810) a predefined key pattern and sequence to perform a fast recording operation. In a fast recording operation, the director controller 30 operates to search for an empty entry which is long enough to record the program (step 1811). Algorithms may also be implemented so that an optimal entry, for example, one whose length is closest to the length of the program, is selected. When the entry is selected (step 1813), the directory controller 30 records the program thereon (step 1813), and the directory 33*a* is updated accordingly (step 1814). For a moving head or semiconductor memory system, the directory in the secondary store can be updated then.

The directory controller 33*a* also gives a user the option to view the title of the program being shown on the television. When this operation is initiated by actuating a predefined key pattern (step 1820), the directory controller 30 first investigates whether the VCR is showing a broadcasting program or a recorded program (step 1821). If the VCR is showing a broadcasting program and if the title of the program is transmitted among the broadcast signals (as in the VBI portion as described above), the directory controller 30 will generate the title from the broadcast signals and display it on the television screen (step 1822). On the other hand, if the VCR is playing a recorded program, the directory controller 30 will retrieve the title from the directory 33*a* and display it on the screen (step 1823). In the preferred embodiment, a timer is kept in the directory controller 30 so that the title is removed from the screen after five seconds (step 1824). When the user presses the EJECT, the cassette is ejected. For a stationary head system, the store is updated while the cassette is being ejected. However, for a moving head or semiconductor memory system, since all updates are performed, no action is then needed.

In an alternate embodiment to all systems using pointers, the indexing VCR 10 has a VBI decoder capable of decoding all lines of the VBI or at least those lines containing relevant information. In this embodiment, pointers are not used, because the VCR processes all lines of the VBI. After reading all lines, the microprocessor controller 31 identifies the data by the type symbol. Subsequent processing of the data then continues as it does in a pointer system.

In the foregoing, certain values and representations are used to facilitate description and understanding of the invention. For example, operations of the microprocessor controller 31 is described as being responsive to activation of certain keys ("RECORD", "PLAY", "I", "VCR PLUS+™", etc.). It will be understood, however, that such keys may be implemented by any predefined sequence of keys. Moreover, values of electrical components are shown for circuits illustrated in some of the figures, it will be understood such values are shown to facilitate implementation of the invention and the functions of the circuits can be accomplished by other values or even other components. Therefore, the foregoing description should not be read as pertaining only to the precise structures and techniques described, but rather should be read consistent with, and as support for, the following claims, which are to have their fullest and fair scope.

What is claimed is:

1. A method of displaying a directory of programs stored on home recorded (HR) and prerecorded (PR) video tapes, the method comprising the steps of:

repeatedly storing an on tape directory of programs recorded on each PR tape directly on the same tape as the recorded programs;

storing a directory of programs recorded on each HR tape in a random access memory (RAM);

inserting a video tape in a video tape recorder (VCR);

sensing whether the inserted video tape is an HR or a PR tape;

accessing the directories stored in RAM when the inserted video tape is an HR tape to retrieve the directory for the inserted video tape;

accessing the on tape directory when the inserted video tape is a PR tape to retrieve the directory for the inserted video tape; and displaying the retrieved directory.

2. The method of claim 1, in which the step of storing a directory in RAM comprises:

recording a unique tape identification (TID) on each HR tape; and linking the TID of each HR tape to the location of its directory in RAM.

3. The method of claim 2, in which the step of recording a unique TID comprises recording the TID in the VBI of each frame while recording the programs so the TID can be read as soon as an HR tape is inserted in the VCR.

4. The method of claim 3, in which the step of accessing the directories stored in RAM comprises:

reading the TID of the inserted tape; and coupling the TID to the RAM to retrieve the directory linked to the coupled TID.

5. The method of claim 4, in which the step of storing an on tape directory comprises:

storing the directory in the VBI of each frame recorded on the tape so the on tape directory can be read as soon as a PR tape is inserted in the VCR.

6. The method of claim 1, in which the step of storing an on tape directory comprises:

storing the directory in the VBI of each frame recorded on the tape so the on tape directory can be read as soon as a PR tape is inserted in the VCR.

7. The method of claim 1, in which the sensing step searches the VBI of the inserted tape for an on tape directory and the step of accessing the directories stored on RAM accesses the directories stored in RAM when the on tape directory is not found in the VBI.

8. The method of claim 7, in which the step of accessing the on tape directory accesses the on tape directory when the on tape directory is found in the VBI.

9. The method of claim 1, in which the sensing step searches the VBI of the inserted tape for an on tape directory and the step of accessing the on tape directory accesses the on tape directory when the on tape directory is found in the VBI.

10. The method of claim 1, in which PR tapes have unique TID's, the method additionally comprising the steps of transferring the on tape directory to the RAM when the inserted tape is a PR tape and linking the TID of the inserted PR tape to the location of its directory in RAM.

11. The method of claim 1, in which the step of storing a directory in the RAM comprises:

recording a unique tape identification (TID) on each tape, the TIDs of HR tapes being distinguishable from the TIDs of PR tapes; and linking the TID of each HR tape to the location of its directory in the RAM.

12. The method of claim 11, in which the sensing step retrieves the TID from the inserted tape and determines if such TID is a TID for an HR tape or a PR tape.

13. The method of claim 12, additionally comprising the steps of transferring the on tape directory to the RAM when the inserted tape is a PR tape and linking the TID of the inserted PR tape to the location of its directory in the RAM.

14. The method of claim 13, in which the step of accessing the on tape directory comprises:

determining if the TID of the inserted PR tape is linked to a directory in the RAM;

if the TID of the inserted PR tape is linked to a directory in the RAM, retrieving the directory of the inserted PR tape from the RAM;

if the TID of the inserted PR tape is not linked to a directory in the RAM, retrieving the directory for the inserted PR tape from the inserted PR tape.

15. A method of indexing a prerecorded (PR) cassette video tape at the time that a video program is recorded thereon, the method comprising the steps of:

recording on a control track of the tape marks that indicate the start of each program;

recording on the tape an identification;

repeatedly recording on selected lines of each program recorded on the tape a directory of the programs recorded on the tape so the directory is immediately accessible regardless of the tape location in the cassette when inserted in a VCR;

inserting a blank (HR) cassette tape in a VCR, recording video programs on the blank tape with the VCR, simultaneously creating a directory of the recorded programs, storing the created directory in a RAM; and repeating the recited steps to form a library of all the HR tapes in the RAM; and determining whether a tape inserted in the VCR is a PR tape or an HR tape, accessing the inserted tape to retrieve the directory of the inserted tape from the tape if the inserted tape is a PR tape, accessing the RAM to retrieve the directory of the inserted tape from the RAM if the inserted tape is an HR tape, and displaying the inserted tape.

16. The method of claim 15, additionally comprising the step of inserting the cassette tape in a VCR connected to a television having a screen, transporting the tape to retrieve the first encountered repetition of the directory recorded on the tape, and displaying the directory on the screen.

17. The method of claim 15, in which the step of recording the directory records the directory on vertical blanking interval lines of each video frame.

18. The method of claim 15, in which the step of recording the tape identification records the tape identification in the control track of the tape.

19. The method of claim 15, in which the step of recording the marks that indicate the start of each program records absolute addresses in the control track of the tape.

20. The method of claim 15, additionally comprising the steps of inserting the PR tape in the VCR and transferring the directory thereof to the library in the RAM.

21. The method of claim 20, in which the directories include program identifiers, the method additionally comprising the steps of selecting a particular program identifier, searching the RAM for directories that contain the selected program identifier, and displaying the directories that contain the selected program identifier.

* * * * *